(12) United States Patent
Joao

(10) Patent No.: US 11,798,335 B2
(45) Date of Patent: *Oct. 24, 2023

(54) CONTROL, MONITORING, AND/OR SECURITY, APPARATUS AND METHOD FOR PREMISES, VEHICLES, AND/OR ARTICLES

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,838

(22) Filed: Dec. 28, 2021

(65) Prior Publication Data
US 2022/0122396 A1    Apr. 21, 2022

Related U.S. Application Data

(63) Continuation of application No. 16/699,564, filed on Nov. 30, 2019, now Pat. No. 11,270,538, which is a continuation of application No. 14/281,922, filed on May 20, 2014, now Pat. No. 10,546,441.

(60) Provisional application No. 61/956,242, filed on Jun. 4, 2013.

(51) Int. Cl.
| | |
|---|---|
| *G07C 9/00* | (2020.01) |
| *H04L 67/125* | (2022.01) |
| *H04L 9/40* | (2022.01) |
| *G08B 25/00* | (2006.01) |

(52) U.S. Cl.
CPC ..... *G07C 9/00896* (2013.01); *G07C 9/00571* (2013.01); *H04L 63/08* (2013.01); *H04L 67/125* (2013.01); *G07C 2209/02* (2013.01); *G08B 25/008* (2013.01)

(58) Field of Classification Search
CPC ............ G07C 9/00896; G07C 9/00571; G07C 2209/02; H04L 63/08; H04L 67/125; G08B 25/008
See application file for complete search history.

(56) References Cited

U.S. PATENT DOCUMENTS

| | | | | |
|---|---|---|---|---|
| 6,658,091 | B1 * | 12/2003 | Naidoo | .................. H04M 11/04 379/37 |
| 2004/0187138 | A1 * | 9/2004 | Desurvire | ............... H04W 4/12 719/319 |
| 2007/0216764 | A1 * | 9/2007 | Kwak | ................ G07C 9/00309 348/14.06 |

(Continued)

*Primary Examiner* — Mohamed Barakat
(74) *Attorney, Agent, or Firm* — Raymond A. Joao, Esq.

(57) ABSTRACT

An apparatus, including a server computer, located remote from a premises. The server computer receives a first message, transmitted from a user device located remote from the premises, and generates a second message containing information regarding an individual identified as being present inside or using the premises. If the premises is occupied or in use, the second message contains information identifying the individual. The server computer transmits a control signal or monitoring signal to a computer or processor located at the premises. The computer or processor performs a control operation or a monitoring operation regarding the premises, or the system, equipment, or device, of the premises in response to the control signal or monitoring signal.

20 Claims, 19 Drawing Sheets

(56) References Cited

U.S. PATENT DOCUMENTS

2007/0262857 A1\* 11/2007 Jackson ........... G08B 13/19663
340/506

\* cited by examiner

CONTROL, MONITORING, AND/OR SECURITY, APPARATUS AND METHOD FOR PREMISES, VEHICLES, AND/OR ARTICLES

RELATED APPLICATIONS

This application is a continuation application of U.S. patent application Ser. No. 16/699,564, filed Nov. 30, 2019, and entitled "CONTROL, MONITORING, AND/OR SECURITY, APPARATUS AND METHOD FOR PREMISES, VEHICLES, AND/OR ARTICLES", now U.S. Pat. No. 11,270,538, the subject matter and teachings of which are hereby incorporated by reference herein in their entirety, which application is a continuation application of U.S. patent application Ser. No. 14/281,922, filed May 20, 2014, and entitled "CONTROL, MONITORING, AND/OR SECURITY, APPARATUS AND METHOD FOR PREMISES, VEHICLES, AND/OR ARTICLES", now U.S. Pat. No. 10,546,441, the subject matter and teachings of which are hereby incorporated by reference herein in their entirety. U.S. patent application Ser. No. 14/281,922 claims the benefit of the priority of U.S. Provisional Patent Application Ser. No. 61/956,242, filed Jun. 4, 2013, and entitled "CONTROL, MONITORING, AND/OR SECURITY, APPARATUS AND METHOD FOR PREMISES, VEHICLES, AND/OR ARTICLES", the subject matter and teachings of which are hereby incorporated by reference herein in their entirety.

FIELD OF THE INVENTION

The present invention pertains to a control, monitoring, and/or security, apparatus and method for premises, vehicles, and/or articles, and, in particular, the present invention pertains to a control, monitoring, and/or security, apparatus and method for premises, vehicles, and/or articles, which can be utilized to provide a wide range of secured and improved control, monitoring, and/or security, features and functionality.

BACKGROUND OF THE INVENTION

A number of control, monitoring, and/or security, systems, products, and services, are available in the marketplace today which allows individuals, businesses, or other entities, to control, monitor, and/or to secure, their homes, businesses, premises, and/or vehicles. Many of these systems, products, and services, also allow or facilitate the use of same via the Internet and/or the World Wide Web. While these systems, products, and services, can prove to be valuable and convenient in accomplishing their intended goals, there are number of problems associated with same.

For example, a home control, monitoring, and/or security, system, which operates over a communication network, the Internet, or the World Wide Web, or any other network, and which allows an individual to control or monitor one or more home systems, equipment, devices, or cameras or video recording devices in his or her home, can be illegally accessed by, or infiltrated by, an unauthorized third party or any unscrupulous individual, or by a hacker, from anywhere in the World who could then, for example, exercise unauthorized control over a camera or video recording device in the home and use same in an unauthorized manner or fashion to record or to invade the privacy, or to spy on, an individual who is present in the home without that individual's knowledge or consent. In fact, news stories have been reported of individuals being photographed or recorded in a video recording, or otherwise spied on, in their own home, dorm room, or other place where it is typical to expect personal privacy, by an unauthorized individual who was able to gain access to a webcam associated with a computer located in the home.

In a similar manner, any Internet or web-based home, business, premises, vehicle, or article, control, monitoring and/or security system, and/or any system, equipment, or device, associated with or controlled by same, can also be accessed by or can be infiltrated by any unauthorized and/or unscrupulous individual who can then perform countless unauthorized actions in order to interfere with, or even sabotage, a home, business, premises, vehicle, or article, or any system, equipment, or device, or the operation of same, to invade an individual's privacy or spy on an individual, or in order to perform countless numbers of unauthorized activities or actions. The same can also hold true for any type or kind of control, monitoring, and/or security, systems, for or used in connection with any kind or type of premises, for any kind or type of vehicles, and/or for any kind or type of devices, and/or for any systems, equipment, or devices associated with same. Numerous other complications, and/or causes for concern, can arise when access to these control, monitoring, and/or security, systems are operated or accessible over a communication network of any kind or are Internet-based or web-based.

In short, there are numerous problems and shortfalls associated with present day control, monitoring, and/or security, systems for homes, business, premises, and vehicles. The present invention overcomes many of these problems and shortfalls.

SUMMARY OF THE INVENTION

The present invention pertains to a control, monitoring, and/or security, apparatus and method for premises, vehicles, and/or articles, and, in particular, the present invention pertains to a control, monitoring, and/or security, apparatus and method for premises, vehicles, and/or articles, which can be utilized to provide a wide range of secured and improved control, monitoring, and/or security, features and functionality which overcomes the shortfalls of the prior art.

The apparatus of the present invention includes a central processing computer which can perform any of the processing routines and functionality described herein as being performed by the present invention. The central processing computer can be any computer, computer system, group of computers, server, server system, or group of servers, which can be programmed and/or equipped to perform any of the herein-described functions, operations, or actions, described herein as being performed by the central processing computer and/or the present invention. Any number of central processing computers can be utilized in conjunction with the present invention.

Any of the central processing computer(s) described as being utilized in connection or in conjunction with the present invention can also be performed by or implemented using cloud computer hardware and/or software. In this regard, any and/or all of the central processing computers described herein can be implemented using a cloud computing architecture, server computers or network computers, and/or any cloud computing hardware and/or software. In this manner, the present invention can be utilized in connection with any number of central processing computers and the present invention can also be utilized in connection with a cloud computing system, network, and/or architecture. Any number, type, or kind, of central processing computers can be utilized in the present invention.

The apparatus of the present invention can also include a server computer which can also perform any of the processing routines and functionality described herein as being performed by the present invention and/or the central processing computer or any of the central processing computers described herein as being utilized in the present invention. The server computer can be any server, computer, computer system, group of computers, server system, or group of servers, which can be programmed and/or equipped to perform any of the herein-described functions, operations, or actions, described herein as being performed by the central processing computer and/or the present invention. Any number of server computers can be utilized in conjunction with the present invention.

Any of the server computer(s) described as being utilized in connection or in conjunction with the present invention can also be performed by or implemented using cloud computer hardware and/or software. In this regard, any and/or all of the server computers described herein can be implemented using a cloud computing architecture, server computers or network computers, and/or any cloud computing hardware and/or software. In this manner, the present invention can be utilized in connection with any number of server computers and the present invention can also be utilized in connection with a cloud computing system, network, and/or architecture.

The server computer can be connected with, linked to, or linked with, the central processing computer and any server computers can be connected with, linked to, or linked with, any central processing computer.

The apparatus of the present invention can also include a premises computer which can be assigned to or associated with any premises with which the present invention can be utilized. The premises computer can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the premises computer. The premises computer can be utilized to perform any of the control, monitoring, or security, operations, actions, or functions, described herein as being preformed or provided by the present invention in controlling, monitoring, or providing security for or regarding any of the herein-described premises and/or any of the herein-described systems, equipment, devices, or components, of or associated with, or located at, a respective premises.

The term "premises" means any residential home, residential house, apartment, condominium, cooperative (co-op), residential premises, home, or household, or a commercial premises, commercial office, commercial building, commercial structure, shopping center, store, retail facility, repair facility, healthcare facility, hospital, healthcare provider's office, bank, financial institution, brokerage firm, financial intermediary building or facility, government building, or municipal building, or business premises, private land, public land, vacant land, privately-owned land or building, publicly-owned land or building, municipality-owned land or building, government-owned land or building, or entertainment venue or building, stadium, arena, concert hall, theatre, sports venue, athletic venue, entertainment venue, or professional office or building, or healthcare office or building, doctor's office, service provider office or facility, hospital, healthcare facility, or manufacturing building, manufacturing plant, manufacturing facility, industrial building, industrial plant, industrial facility, assembly building, assembly plant, or assembly facility, or a building or structure in which any type of services are provided and/or rendered, or equipment, industrial equipment, construction equipment, structure, man-made structure, off shore platform, drilling platform, research platform, or light pole, or cellular tower, or any land, building or structure, or land having a building or structure on or associated with same, vacant land, government land or municipality owned land, parkland, any stationary premises, or any moveable or mobile premises, or any natural structure, or any other entity which can be determined to be a premises and/or any component thereof and/or control system thereof and/or therefore. In a preferred embodiment, the term "premises" can also mean any industrial facility, industrial structure, manufacturing facility, manufacturing equipment, manufacturing machine, drilling platform, drilling rig, oil drilling platform, off-shore drilling platform, off-shore drilling rig, excavation equipment, construction equipment, mining platform, mining equipment, assembly facility, assembly line facility and/or equipment, assembly equipment, industrial robotic equipment, mass production facility, production facility, assembly line, or any other industrial structure, building, edifice, equipment, system, device, or component thereof or control system thereof or therefore.

The term "premises" can also mean any building, room, studio, television studio, television station, radio studio radio station, educational institution, school, college, university of other educational facility, classroom, sports venue, arena, stadium, theater, concert hall, of any other sports, athletic or entertainment venue, other any location of place from which any pictures, video information or video, and/or audio information, can be transmitted to a communication device of a user or listener for viewing and/or listening. The term "premises" can also mean any building, room, studio, television studio, television station, radio studio radio station, educational institution, school, college, university of other educational facility, classroom, sports venue, arena, stadium, theater, concert hall, of any other sports, athletic or entertainment venue, other any location of place from which any pictures, video information or video, and/or audio information, can be transmitted to a communication device of a user or listener for viewing and/or listening and/or video conferencing and/or video chatting with any individuals or persons located in, on, at, or in the vicinity or, the premises.

The premises computer can be located at, in, or on, the premises. The premises computer can also be located at a place or location separate and apart from, or at a distance from, or remote from, the premises.

Any number of premises computers can be utilized in conjunction with the present invention. Any premises computer can be used in connection or in association any single premises or any premises computer can be used in connection with any number of premises. The premises computer can be connected with, linked to, or linked with, the central processing computer and/or a server computer or any of the central processing computers or server computers which can be utilized in connection with the present invention.

The apparatus can also include any number, type, or kind, of the premises system(s), equipment, or device(s) which are described herein and/or which are identified herein. The premises computer can be connected with, linked to, or linked with, each of any of the premises system(s), equipment, or device(s) described herein and/or identified herein. The premises computer can also be connected directly with or to, directly linked to, or directly linked with, each of any of the premises system(s), equipment, or device(s) described herein and/or identified herein. The premises computer can also be wirelessly connected with or to, wirelessly linked to, or wirelessly linked with, each of any of the premises system(s), equipment, or device(s) described herein and/or identified herein. The premises computer can also be connected with, linked with, or linked to, each of any of the premises system(s), equipment, or device(s) described herein and/or identified herein via or using an interface device, component, or system.

The premises computer can be utilized to control, monitor, or perform security operations or functions, or security-related operations or functions, for any number, types, or kinds, of premises system(s), equipment, or device(s). The premises system(s), equipment, or device(s) can be or can include any of the herein-identified and/or herein-described, or any other, system(s), equipment, device(s), component(s), or appliance(s) which can be utilized in, on, at, or in connection with, any of the premises identified and/or described herein.

The apparatus can also include a vehicle computer which can be assigned to or associated with any vehicle with which the present invention can be utilized. The vehicle computer can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the vehicle computer. The vehicle computer can be utilized to perform any of the control, monitoring, or security, operations, actions, or functions, described herein as being performed or provided by the apparatus of the present invention in controlling, monitoring, or providing security for or regarding any of the herein-described vehicles and/or any of the herein-described systems, equipment, devices, or components, of or associated with, or located at, a respective vehicle.

The vehicle can be, and the term "vehicle" means, any automobile, car, truck, sport utility vehicle, crossover vehicle, bus, school bus, truck, train, subway train, trolley, tractor trailer, mass transportation vehicle, tractor trailer, construction equipment, equipment, mobile structure, mobile and/or moveable industrial and/or commercial and/or equipment, structure and/or work platform, mining equipment, drilling equipment, drilling platform, farm equipment, tractor, commercial vehicle, recreational vehicle, motorcycle, motor home and/or mobile home, personal vehicle, commercial vehicle, military vehicle, tank, construction vehicle or equipment vehicle, recreational vehicle, all terrain vehicle or ATV, snowmobile, scooter, hot-air balloon, jet ski, go-cart, moped, motorcycle, motor scooter, motorized bicycle, mini-bike, boat, marine vessel, cargo ship, cruise ship, ferry boat, submarine, naval or military boat or marine craft, motor boat, sailboat, airplane, aircraft, jet, private aircraft, commercial aircraft, or military aircraft, or hot air balloon, pod, glider, helicopter, drone, space vehicle, spacecraft, space shuttle, or satellite, or any other land, sea or water, air, or space, vehicle, entity or thing, whether manned or unmanned, regardless or type, kind, or size, which can be used to convey an individual or an object or thing from one place or point to another or which can move from one place or point to another. The vehicle can be any private, commercial, or military vehicle.

Any of the above noted vehicles may be manned and/or unmanned and may also include law enforcement and/or military vehicles and/or equipment. The present invention can also be utilized in marine vehicles and/or vessels, boats, ships, aircraft, airplanes, jets, submersible and/or underwater vehicles and/or vessels, space vehicles and/or vessels and satellites, all of which can be manned and/or unmanned. The present invention can also be employed in conjunction with gasoline, diesel, alternate fuel and/or electrically powered and/or propelled vehicles.

The vehicle computer can be located at, in, or on, the vehicle. The vehicle computer can be located at a place or location separate and apart from, at a distance from, or remote from, the vehicle.

Any number of vehicle computers can be utilized in conjunction with the apparatus of the present invention. Any vehicle computer can be used in connection or in association any single vehicle and/or any vehicle computer can be used in connection with any number of vehicles. A vehicle computer is or can be wirelessly or otherwise connected with, linked to, or linked with, the central processing computer or any of the central processing computers which can be utilized in connection with the apparatus of the present invention. Any vehicle computer is or can also be wirelessly or otherwise connected with, linked to, or linked with, the server computer or any of the server computers which can be utilized in connection with the apparatus of the present invention.

The apparatus also includes any number, type, or kind, of vehicle system(s), equipment, or device(s) described herein which can be or which can include any vehicle system, equipment, equipment system, device, or component of the vehicle, located at, on, or in, the vehicle, or associated with the vehicle or any system, equipment, equipment system, device, or component, of the vehicle. Any vehicle system, equipment, equipment system, device, or component, can also be any such system, equipment, equipment system, device, or component, which can be controlled by, monitored by, or for which a security function can be provided by or facilitated by the vehicle computer, by the central processing computer, or the by the apparatus of the present invention or any of the herein-described computers, communications devices or components of same. Any vehicle system, equipment, equipment system, device, or component, can also be any such system, equipment, equipment system, device, or component, which can be electrically, electronically, mechanically, hydraulically, pneumatically, or otherwise, controlled and/or monitored by or using the apparatus of the present invention or any of computers, communication devices, or components of same.

The vehicle computer can be connected with, linked to, or linked with, each of any of the vehicle system(s), equipment, or device(s) described herein. The vehicle computer can also be connected directly with or to, directly linked to, or directly linked with, each of any of the vehicle system(s), equipment, or device(s) described herein. The vehicle computer can also be wirelessly connected with or to, wirelessly linked to, or wirelessly linked with, each of any of the vehicle system(s), equipment, or device(s) described herein. The vehicle computer can also be connected with, linked with, or to linked to, each of any of the vehicle system(s), equipment, or device(s) described herein via or using an interface device, component, or system.

The vehicle computer can be utilized to control, monitor, or perform security operations or functions, or security-related operations or functions, for any number, types, or kinds, of vehicle system(s), equipment, or device(s). The vehicle system(s), equipment, or device(s) can be or can include any of the herein-identified and/or herein-described, or any other, system(s), equipment, device(s), component(s), or appliance(s) which can be utilized in, on, at, or in connection with, any of the vehicles identified and/or described herein.

The apparatus of the present invention can also include an article computer which can be assigned to or associated with any article with which the present invention can be utilized. The article computer can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the article computer. The article computer can be utilized to perform any of the control, monitoring, or security, operations, actions, or functions, described herein as being preformed or provided by the present invention in controlling, monitoring, or providing security for or regarding any of the herein-described articles and/or any of the herein-described systems, equipment, devices, or components, of or associated with, or located at, a respective article.

In a preferred embodiment, the article can be, and the term "article" can mean, any device or article such as a cellular telephone, a Smartphone or smart phone, or a personal digital assistant to PDA, a personal music player, a game player, a gaming device or system, a tablet, a tablet computer, a laptop computer, a notebook computer, a handheld computer, or a camera, a video recording device, a microphone, an audio recording device, a global positioning device, a global positioning system, a navigation device, a navigation system, or a wearable computer, a watch, medical equipment, a medical device, medical monitoring equipment, a medical monitoring device, wearable or implantable medical equipment, a wearable or implantable medical device, a prosthesis, a prosthetic device, an artificial limb, an artificial organ, or a monitoring device or system, or any other device or article for which the apparatus and method of the present invention can be utilized to provide any of the herein-described control, monitor, or security functions or functionality. The term "article" can also mean or refer to any device or entity which can be a standalone device or entity.

The article computer can be located at, in, or on, the article and/or the article computer can be located at a place or location separate and apart from, at a distance from, or remote from, the article. Any number of article computers can be utilized in conjunction with the apparatus of the present invention. Any article computer can be used in connection or in association any single article and/or any article computer can be used in connection with any number of articles.

The article computer is or can be connected with, linked to, or linked with, the central processing computer or any of the central processing computers which can be utilized in connection with the apparatus of the present invention. The article computer is or can also be connected with, linked to, or linked with, the server computer or any of the server computers which can be utilized in connection with the apparatus of the present invention.

The apparatus of the present invention can also include any number, type, or kind, of article system(s), equipment, or device(s) described herein or identified herein which can be or which can include any article system, equipment, equipment system, device, or component of the article, located at, on, or in, the article, or associated with the article or any system, equipment, equipment system, device, or component, of the article. Any article system, equipment, equipment system, device, or component, can also be any such system, equipment, equipment system, device, or component, which can be controlled by, monitored by, or for which a security function can be provided by or facilitated by the article computer, by the central processing computer, or the by the apparatus of the present invention or any of the herein-described computers, communications devices or components of same. Any article system, equipment, equipment system, device, or component, can also be any such system, equipment, equipment system, device, or component, which can be electrically, electronically, mechanically, hydraulically, pneumatically, or otherwise, controlled and/or monitored by or using the present invention or any of computers, communication devices, or components of same.

The article computer can be connected with, linked to, or linked with, each of any of the article system(s), equipment, or device(s) described herein and/or identified herein. The article computer can also be connected directly with or to, directly linked to, or directly linked with, each of any of the article system(s), equipment, or device(s) described herein and/or identified herein. The article computer can also be wirelessly connected with or to, wirelessly linked to, or wirelessly linked with, each of any of the article system(s), equipment, or device(s) described herein. The article computer can also be connected with, linked with, or to linked to, each of any of the article system(s), equipment, or device(s). The article system(s), equipment, or device(s) can be or can include any system, hardware, software, processing device, peripheral device, any interface device, or any component which performs any function in the operation or use of the respective article. For example, in the case of the article being a Smartphone, smart phone, cellular telephone, or personal digital assistant, the article system(s), equipment, or device(s), can be or can include the cellular telephone receiver, transmitter, global positioning device, music player, camera, video recording device, display screen, audio recording device, calculator application, or any other application or app used in or by the respective Smartphone, smart phone, cellular telephone, or personal digital assistant. The article system(s), equipment, or device(s) can be or can include the article itself.

The article computer can be utilized to control, monitor, or perform security operations or functions, or security-related operations or functions, for any number, types, or kinds, of article system(s), equipment, or device(s).

The apparatus also includes a communication device which can be utilized by any individual, user, or entity (hereinafter as referred to as "user") who or which utilizes the present invention, in order to communicate with, transmit signals, data, and/or information to, receive signals, data, and/or information from, or to access, or which can be linked with, or which can be wirelessly linked with, any of the central processing computers and/or server computers described herein. The communication device can also be utilized to communicate with, transmit signals, data, and/or information to, receive signals, data, and/or information from, or to access, or which can be linked with, or which can be wirelessly linked with, any of the premises computers, premises system(s), equipment, and/or device(s), vehicle computers, vehicle system(s), equipment, or device(s), article computer(s), and/or article system(s), equipment, or device(s), and/or any of the other communication device(s) described herein.

The communication device can be a personal computer, a laptop computer, a notebook computer, a tablet, a tablet computer, a cellular telephone, a personal digital assistant, a wireless telephone, a wireless communication device, a personal communication device, a personal communications services device, a smart phone, a Smartphone, a mobile telephone, a hand-held device or computer, a palm-top device or computer, a watch, a telephone, a television, an interactive television, a digital television, a smart television or entertainment device, an internet-enabled television or entertainment device, or any other suitable device, which can be equipped to perform the functions described herein as being performed by the communication device.

The communication device can include a central processing unit or device, an input device, a retinal scanning device, a fingerprint recognition device, a voice recognition device, a retinal scanner, a fingerprint device, a voice recognition device, a handprint recognition device, a handprint geometry recognition device, facial feature recognition device, and/or any one or more of the biometric devices used to control access to a computer or a computer network which are known to those skilled in the art at the time of the filing of this patent application, a pointing device, a mouse, an output device, a database or a memory device and/or system, a random access memory (RAM) device, a read only memory (ROM) device, a video recording system or equipment, a camera(s), an audio recording system, device, or equipment, a microphone, a receiver or any number of receivers, a transmitter or any number of transmitters, a network interface device, an information or content gathering device, and/or any other devices, equipments, or systems, typically found in and/or utilized by any of the herein-described communication devices described herein as being utilized in connection with the apparatus of the present invention. The communication device can also be equipped with a global positioning device which can be utilized to calculate, determine, or ascertain, the position or location of the communication device.

The communication device can also contain, include, or be equipped with, a transmitter(s), a receiver(s), or any other network interface devices or equipment for facilitating bi-directional communication with, data and/or information exchange with, and/or remote control or monitoring by, the central processing computer, the server computer, or any one or more of any of the premises computers, premises system(s), equipment, and/or device(s), vehicle computers, vehicle system(s), equipment, or device(s), article computer(s), and/or article system(s), equipment, or device(s), and/or any of the other communication device(s) described herein.

The communication device can also transmit, from its transmitter or any one or more of its transmitters, the location or position information, which is calculated, determined, or ascertained, by the global positioning device, to the central processing computer, the server computer, or any one or more of any of the premises computers, premises system(s), equipment, and/or device(s), vehicle computers, vehicle system(s), equipment, or device(s), article computers, and/or article system(s), equipment, or device(s), and/or any of the other communication device(s) described herein.

The communication device can also be utilized as a remote control and/or monitoring device. The communication device can include, contain, or be equipped with any hardware, software, firmware, or any other technology or equipment, typically found in or included in a remote control and/or monitoring device.

The communication device can also include, contain, or be equipped with a camera, a digital video recording system or equipment, a microphone, a digital audio recording system or equipment, or any another digital video and audio recording device or equipment or other digital media recoding equipment, that can allow the communication device to record and store, for later play-back, any of the video and/or audio information which can or may be obtained using the apparatus of the present invention. The communication device can also be used to take or record a photograph, picture, video, a video clip, audio, or an audio clip, of the user or of any other individual or entity when using the communication device.

Any number of communication devices can be assigned to, utilized with, or associated with, any of the herein-described users or any of the herein-described control and/or monitoring accounts.

Each of the central processing computer(s), the server computer(s), the premises computer(s), the vehicle computer(s), and/or the article computer(s) can also include, contain, or be equipped with a camera, a digital video recording system or equipment, a microphone, a digital audio recording system or equipment, or any another digital video and audio recording device or equipment or other digital media recoding equipment, that can allow a user of the respective central processing computer(s), the server computer(s), the premises computer(s), the vehicle computer(s), and/or the article computer(s) to record and store, for later play-back, any of the video and/or audio information which can or may be obtained using the apparatus of the present invention. Each of the central processing computer(s), the server computer(s), the premises computer(s), the vehicle computer(s), and/or the article computer(s) can also be used to take or record a photograph, picture, video, a video clip, audio, or an audio clip, of the user or of any other individual or entity when using the respective central processing computer(s), the server computer(s), the premises computer(s), the vehicle computer(s), and/or the article computer(s).

The present invention can be utilized on, and/or over, the Internet and/or the World Wide Web. The present invention can also utilize wireless Internet and/or World Wide Web services, equipment and/or devices. The central processing computer(s) and/or the server computer can also have a web site or web sites associated therewith. Each of the premises computers, premises system(s), equipment, and/or device(s), vehicle computers, vehicle system(s), equipment, or device(s), article computer(s), and/or article system(s), equipment, or device(s), and/or any of the other communication device(s) described herein can also have a web site or web sites associated with same.

The present invention can also be utilized with any appropriate communication network or system including, but not limited to, a communication network or system, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

Each of the central processing computer(s), the server computer(s), the premises computer(s), the vehicle computer(s), the article computer(s), and the communication device(s), can be equipped with transmitters, receivers, network interface devices, and/or any other appropriate hardware and/or software, so as to communicate, in a bi-directional manner with, so as to transmit signals, data, information, or a message to, and/or so as to receive signals, data, information, or a message from, any other central processing computer(s), server computer(s), premises computer(s), vehicle computer(s), article computer(s), and communication device(s). In this regard, it is also to be understood that, as for each of the premises computer(s), the vehicle computer(s), and the article computer(s), each premises computer, vehicle computer, and article computer can communicate, in a bi-directional manner with, so as to transmit signals, data, information, or a message to, and/or so as to receive signals, data, information, or a message from, any other premises computer(s), vehicle computer(s), and article computer(s).

The present invention can also provide for cloud-based control, monitoring and/or security apparatus, method, or platform, which can be utilized to perform any of the herein-described control, monitoring, and/or security, operations, functions, and/or functionality for premises, vehicles, and/or articles, which can be utilized to perform cloud-based data and/or information access, processing and/or storage, which can be utilized to perform cloud-based access and/or utilization of any data and/or information described herein as being processed and/or utilized by the present invention and/or which can be utilized to access and utilized control and monitoring accounts, and/or which can be utilized to perform cloud-based data and/or information record keeping, cloud-based data and/or information storage and/or retrieval, and/or cloud based processing and/or storage of any and/or all of the data and/or information described herein as being utilized and/or processed by the present invention.

The central processing computer can be a computer, a computer system, a group of computers, a network computer, or a network computer system, or any other communication device which can provide the functionality of, and which can be utilized as a central processing computer, such as an Internet computer, an Internet server computer, and/or a web site server computer. The central processing computer includes a central processing unit or CPU, which can be a microprocessor, a microcomputer, a minicomputer, a macro-computer, and/or a mainframe computer, depending upon the application, a random access memory device(s) (RAM) and a read only memory device(s) (ROM), each of which is connected to the CPU, and a user input device, for entering data, information, and/or commands, into the central processing computer, which can be or can include any of the herein-described and/or herein-identified input devices. The input devices are also connected to or with, or linked to or with, the CPU.

The central processing computer can also include a transmitter(s), for transmitting signals and/or data and/or information, or a message(s), to any one or more of the server computer(s), the premises computer(s), the vehicle computer(s), the article computer(s), and/or any other communication device(s), described herein, or to any other central processing computer(s), a receiver(s), for receiving signals and/or data and/or information, or a message(s), from any one or more of the server computer(s), the premises computer(s), the vehicle computer(s), the article computer(s), and/or any other communication device(s), described herein, or from any other central processing computer(s) and a database(s), which is also connected to or linked with the CPU, which can contain and/or include any and/or all of the data and/or information needed or desired for performing any and/or all of the functions and/or functionality described herein as being performed by the present invention.

The central processing computer can also include an output device, which is also connected to the CPU, for outputting any data and/or information, described herein, a global positioning device which can be connected to the CPU and which can be utilized to calculate, determine, or ascertain, the position or location of the central processing computer, and/or a video and/or audio recording device which can include a camera, a video recoding device, a microphone, and/or an audio recording device. The video and/or audio recording device can be utilized to take a picture, record video, record a video clip, record sound, record audio, or record an audio clip, of a user of the central processing computer and/or to record any picture, a sound or voice, video information, or audio information at the central processing computer and/or at, near, or in the vicinity of, the central processing computer.

The server computer(s) can also contain or include any and/or all of the herein-described components, elements, and/or data and/or information, described herein as being utilized in the central processing computer. In this regard, the server computer can include a central processing unit (CPU), a random access memory device(s) (RAM), a read only memory device(s) (ROM), a user input device, a transmitter(s), a receiver(s), a database, an output device, a global positioning device, and/or a video and/or audio recording device.

The premises computer can include a central processing unit or CPU which can be a microprocessor, a microcomputer, a minicomputer, a macro-computer, and/or a mainframe computer, depending upon the application, a random access memory device(s) (RAM) and a read only memory device(s) (ROM), each of which is connected to the CPU, and a user input device, for entering data, information, and/or commands, into the premises computer, and which can be or which can include any of the herein-described and/or herein-identified input devices. The input devices are also connected to or with, or linked to or with, the CPU.

The premises computer also includes a transmitter(s), for transmitting signals and/or data and/or information, or a message(s), to any one or more of the central processing computer(s), the server computer(s), any other premises computer(s), the vehicle computer(s), the article computer(s), and/or any of the communication device(s), described herein, a receiver(s), for receiving signals and/or data and/or information from any one or more of the central processing computer(s), the server computer(s), any other premises computer(s), the vehicle computer(s), the article computer(s), and/or any of the communication device(s), described herein, and a database(s), which is also connected to or linked with the CPU, which can contain and/or include any and/or all of the data and/or information needed or desired for performing any and/or all of the functions and/or functionality described herein as being performed by the premises computer and/or the present invention.

The premises computer can also include an output device, which is also connected to the CPU, for outputting any data and/or information, described herein, a global positioning device which can be connected to the CPU and which can be utilized to calculate, determine, or ascertain, the position or location of the premises computer or the premises to which it is associated or assigned, and/or a video and/or audio recording device which can include a camera, a video recoding device, a microphone, and/or an audio recording device. The video and/or audio recording device can be utilized to take a picture, record video, record a video clip, record sound, record audio, or record an audio clip, of a user of the premises computer and/or to record any picture, a sound or voice, video information, or audio information at the premises computer and/or at, near, or in the vicinity of, the premises computer or the premises in which it is utilized or to which it is associated or assigned.

The vehicle computer includes a central processing unit or CPU, which can be a microprocessor, a microcomputer, a minicomputer, a macro-computer, and/or a mainframe computer, depending upon the application, a random access memory device(s) (RAM) and a read only memory device(s) (ROM), each of which is connected to the CPU 40A, and a user input device, for entering data, information, and/or commands, into the vehicle computer 40, which can be or include any of the input devices described herein and/or identified herein.

The vehicle computer can also include a transmitter(s), for transmitting signals and/or data and/or information, or a message(s), to any one or more of the central processing computer(s), the server computer(s), the premises computer(s), any other vehicle computer(s), the article computer(s), and/or any of the communication device(s), described herein, a receiver(s), for receiving signals and/or data and/or information from any one or more of the central processing computer(s), the server computer(s), the premises computer(s), any other vehicle computer(s), the article computer(s), and/or any of the communication device(s), described herein, and a database(s), which is also connected to or linked with the CPU, which can contain and/or include any and/or all of the data and/or information needed or desired for performing any and/or all of the functions and/or functionality described herein as being performed by the vehicle computer and/or the present invention.

The vehicle computer can also include an output device, which is also connected to the CPU, for outputting any data and/or information, described herein, a global positioning device which can be connected to the CPU and which can be utilized to calculate, determine, or ascertain, the position or location of the vehicle computer or the vehicle to which it is associated or assigned, and/or a video and/or audio recording device which can include a camera, a video recoding device, a microphone, and/or an audio recording device. The video and/or audio recording device can be utilized to take a picture, record video, record a video clip, record sound, record audio, or record an audio clip, of a user of the vehicle computer and/or to record any picture, a sound or voice, video information, or audio information at the vehicle computer and/or at, near, or in the vicinity of, the vehicle computer or the vehicle in which it is utilized or to which it is associated or assigned.

The article computer includes a central processing unit or CPU which can be a microprocessor, a microcomputer, a minicomputer, a macro-computer, and/or a mainframe computer, depending upon the application, a random access memory device(s) (RAM) and a read only memory device(s) (ROM), each of which is connected to the CPU, and a user input device, for entering data, information, and/or commands, into the article computer, and which can be or include any of the input devices described herein and/or identified herein. The input device(s) are also connected to or with, or linked to or with, the CPU.

The article computer can also include a transmitter(s), for transmitting signals and/or data and/or information, or a message(s), to any one or more of the central processing computer(s), the server computer(s), the premises computer(s), the vehicle computer(s), any other article computer(s), and/or any of the communication device(s), described herein, a receiver(s), for receiving signals and/or data and/or information from any one or ore of the central processing computer(s), the server computer(s), the premises computer(s), the vehicle computer(s), any other article computer(s), and/or any of the communication device(s), described herein, and a database(s), which is also connected to or linked with the CPU, which can contain and/or include any and/or all of the data and/or information needed or desired for performing any and/or all of the functions and/or functionality described herein as being performed by the article computer and/or the method of the present invention.

The article computer can also include an output device, which is also connected to the CPU, for outputting any data and/or information, described herein, a global positioning device which can be connected to the CPU and which can be utilized to calculate, determine, or ascertain, the position or location of the article computer or the article in which it is utilized or to which it is associated or assigned, and/or a video and/or audio recording device which can include a camera, a video recoding device, a microphone, and/or an audio recording device. The video and/or audio recording device can be utilized to take a picture, record video, record a video clip, record sound, record audio, or record an audio clip, of a user of the article computer and/or to record any picture, a sound or voice, video information, or audio information at the article computer and/or at, near, or in the vicinity of, the article computer or the article to which it is associated or assigned.

Any communication device can include a central processing unit or CPU which can be a microprocessor, a microcomputer, a minicomputer, a macro-computer, and/or a mainframe computer, depending upon the application, a random access memory device(s) (RAM), read only memory device(s) (ROM), each of which is connected to the CPU, a user input device, which can be any of the herein-described and/or herein-identified input devices, for entering data and/or commands into the communication device, which can also be connected to or with, or linked to or with, the CPU. The communication device can also include a display device for displaying data and/or information to a user or operator, a transmitter(s), for transmitting signals and/or data and/or information, or a message(s), to any one or more of the central processing computer(s), the server computer(s), the premises computer(s), the vehicle computer(s), the article computer(s), and/or any other communication device(s), described herein, and a receiver(s), for receiving signals and/or data and/or information from any one or more of the central processing computer(s), the server computer(s), the premises computer(s), the vehicle computer(s), the article computer(s), and/or any other communication device(s), described herein.

The communication device can also include a database(s), which is also connected to or linked with the CPU which can contain and/or include any and/or all of the data and/or information needed or desired for performing any and/or all of the functions and/or functionality described herein as being performed by the communication device and/or the present invention, an output device, which is also connected to the CPU, for outputting any data and/or information, described herein, a global positioning device which can be connected to the CPU and which can be utilized to calculate, determine, or ascertain, the position or location of the communication device, and a video and/or audio recording device which can include a camera, a video recoding device, a microphone, and/or an audio recording device. The video and/or audio recording device can be utilized to take a picture, record video, record a video clip, record sound, record audio, or record an audio clip, of a user of the communication device and/or to record any picture, a sound or voice, video information, or audio information at the communication device and/or at, near, or in the vicinity of, the communication device.

The present invention can be utilized in order to activate, de-activate, control an operation of, monitor an operation of, perform a security operation regarding, enable, disable, or re-enable, any premises system(s), equipment, or device(s). The communication device can be utilized in order to transmit a control signal to the central processing computer, either directly and/or indirectly via the server computer. The central processing computer can then transmit the same control signal or a different control signal to the premises computer. The premises computer can then generate and/or transmit the same control signal or a different control signal in order to activate, de-activate, control an operation of, monitor an operation of, perform a security operation regarding, enable, disable, or re-enable, any premises system(s), equipment, or device(s).

The present invention can be utilized in order to activate, de-activate, control an operation of, monitor an operation of, perform a security operation regarding, enable, disable, or re-enable, any vehicle system(s), equipment, or device(s). The communication device can be utilized in order to transmit a control signal to the central processing computer, either directly and/or indirectly via the server computer. The central processing computer can then transmit the same control signal or a different control signal to the vehicle computer. The vehicle computer can then generate and/or transmit the same control signal or a different control signal in order to activate, de-activate, control an operation of, monitor an operation of, perform a security operation regarding, enable, disable, or re-enable, any vehicle system(s), equipment, or device(s).

The present invention can be utilized in order to activate, de-activate, control an operation of, monitor an operation of, perform a security operation regarding, enable, disable, or re-enable, the article or any article system(s), equipment, or device(s). The communication device can be utilized in order to transmit a control signal to the central processing computer, either directly and/or indirectly via the server computer. The central processing computer can then transmit the same control signal or a different control signal to the article computer. The article computer can then generate and/or transmit the same control signal or a different control signal in order to activate, de-activate, control an operation of, monitor an operation of, perform a security operation regarding, enable, disable, or re-enable, the article or any article system(s), equipment, or device(s).

The present invention can also be utilized in connection with or in conjunction with a law enforcement agency, department, or bureau. The law enforcement agency, department, or bureau can be any local, municipal, county, provincial, state, or federal, law enforcement agency, department, or bureau. The present invention cane be utilized in order to report information, illegal activity, an occurrence, and/or any other activity, action, event, happening, or occurrence, relating to, regarding, or involving any of the users of the present invention, and/or any of the premises, vehicles, and/or articles, with which the present invention is utilized.

The apparatus of the present invention can include a law enforcement computer which can be any computer, computer system, group of computers, server, server system, or group of servers, which can be utilized by a law enforcement agency, department, or bureau. Any number of law enforcement computers can be utilized in connection with the present invention. Any law enforcement agency, department, or bureau, can utilize any number of law enforcement computers, each of which may receive and/or process signals, data, information, or a message, regarding different types or kinds of information, illegal activities, occurrences, and/or any other activities, actions, events, happenings, or occurrences, relating to, regarding, or involving any of the users of the present invention and/or any premises, vehicles, and/or articles, with which the present invention can be utilized.

Any of the central processing computer(s), the server computer(s), the premises computer(s), the premises system(s), equipment, device(s), the vehicle computer(s), the vehicle system(s), equipment, device(s), the article computer(s), the article system(s), equipment, device(s), and the communication device(s), can transmit signals, data, information, reports, or messages, to, as well as receive signals, data, information, reports, or messages, from the law enforcement computer(s).

Interface device(s) (I/F) can also be utilized in connection with or in conjunction with the present invention so as to provide an interface in connection with or in conjunction with a premises computer and one or more of the premises system(s), equipment, device(s), in connection or in conjunction with a vehicle computer(s) and one or more of the vehicle system(s), equipment, device(s), and/or in connection or in conjunction with an article computer(s) and one or more of the article system(s), equipment, device(s). Any interface device utilized in connection with the present invention can contain and/or can include any hardware, software, circuitry, and/or any other devices and/or equipment, which may be needed or desired for its respective interfacing function or functionality.

The apparatus and method of the present invention can be utilized in order to create, establish, and/or provide service for, a personal control and monitoring account (hereinafter also referred to as a "PCMA"). A personal control and monitoring account or PCMA can be assigned to or associated with each individual or user, or entity, who or which utilizes the present invention.

A premises control and monitoring account ("premises CMA" or "premises account") can be established and assigned to and/or associated with each premises for which the present invention is to be utilized, a vehicle control and monitoring account ("vehicle CMA" or "vehicle account") can be established and assigned to and/or associated with each vehicle for which the present invention is to be utilized, and an article control and monitoring account ("article CMA" or "article account") can be established and assigned to and/or associated with each article for which the present invention is to be utilized.

Each premises CMA, each vehicle CMA, and each article CMA can be established and information regarding same can be stored in central processing computer and/or in the server computer. For each premises serviced by the present invention, data and/or information regarding the respective premises CMA associated with that premises can be stored in the respective premises computer of or associated with that premises, for each vehicle serviced by the present invention, data and/or information regarding the respective vehicle CMA associated with that vehicle can be stored in the respective vehicle computer of or associated with that vehicle, and for each article serviced by the present invention, data and/or information regarding the respective article CMA of or associated with that article can be stored in the respective article computer of or associated with that article.

Each premises CMA, each vehicle CMA, and each article CMA, can include and/or can contain, data and/or information regarding the respective premises, the respective vehicle, or the respective article, data and/or information identifying the respective premises, the respective vehicle, or the respective article, data and/or information regarding any authorized user or authorized individual or entity authorized to perform any control and/or monitoring and/or security operations, actions, or functions, regarding the respective premises, the respective vehicle, or the respective article, data and/or information regarding any restrictions or limitations regarding the use of the respective premises, the respective vehicle, or the respective article, data and/or information regarding any restriction(s) or limitation(s) placed on an authorized user's or an authorized individual's or entity's ability to perform any control and/or monitoring and/or security operation, action, or function regarding the respective premises, the respective vehicle, or the respective article, data and/or information regarding each authorized user's or authorized individual's, including but not limited to, name, address, telephone number, cellular telephone number, wireless telephone number, e-mail address, text messaging or SMS messaging number or information, user name, user access code(s), user password(s), a photograph or a digital photograph of the respective authorized user or authorized individual, a voice sample of the respective authorized user or authorized individual, retinal scan data and/or information of or for the respective authorized user or authorized individual, fingerprint and/or digital fingerprint information of or for the respective authorized user or authorized individual, handprint and/or digital handprint information of or for the respective authorized user or authorized individual, handprint geometry data and/or information of or for the respective authorized user or authorized individual, facial feature data and/or information of or for the respective authorized user or authorized individual, and/or any other biometric information of or for the respective authorized user or authorized individual.

Each premises CMA, each vehicle CMA, and each article CMA, can include and/or can contain, data and/or information regarding an authorized user's or an authorized individual's request to receive alert messages or alerts for or regarding any activities, events, occurrences, status, regarding or involving, any premises which is the subject of a premises CMA, any vehicle which is the subject of a vehicle CMA, or any article which is the subject of an article CMA for which the authorized user or the authorized individual is authorized.

Each premises CMA, each vehicle CMA, and each article CMA, can also include and/or can contain, any other data and/or information regarding any and/or all users, individuals, or entities, who or which are authorized to use or access the respective premises CMA, the respective vehicle CMA, or the respective article CMA and/or are otherwise authorized to perform any control and/or monitoring and/or security operations, actions, or functions, regarding the respective premises, the respective vehicle, or the respective article. Each premises CMA, each vehicle CMA, and each article CMA, can also include and/or can contain, any other data and/or information needed or desired for performing any of the herein-described functions and/or functionality described herein as being performed by the present invention.

Each personal control and monitoring account or PCMA can include and/or can contain, data and/or information regarding the user or individual ("the authorized user" or "the authorized individual") for whom the personal control and monitoring account, the user's or individual's name, name, address, telephone number, cellular telephone number, wireless telephone number, e-mail address, text messaging or SMS messaging number or information, user name, user access code(s), user password(s), a photograph or a digital photograph of the respective authorized user or authorized individual, a voice sample of the respective authorized user or authorized individual, retinal scan data and/or information of or for the respective authorized user or authorized individual, fingerprint and/or digital fingerprint information of or for the respective authorized user or authorized individual, handprint and/or digital handprint information of or for the respective authorized user or authorized individual, handprint geometry data and/or information of or for the respective authorized user or authorized individual, facial feature data and/or information of or for the respective authorized user or authorized individual, and/or any other biometric information of or for the respective authorized user or authorized individual.

The personal control and monitoring account can also contain any data and/or information regarding, and/or any link(s) or hyperlink(s), to any premises CMA(s), to any vehicle CMA(s), and/or any article CMS(s), for which the authorized user or authorized individual is authorized to access, use, and/or otherwise authorized to perform any control and/or monitoring and/or security operations, actions, or functions, regarding the a respective premises, a respective vehicle, or a respective article. The personal control and monitoring account can also contain any data and/or information regarding any restriction(s) or limitation(s) regarding the authorized user's use or the authorized individual's use of any of premises CMA(s), vehicle CMA(s), or article CMS(s), regarding which the authorized user or authorized individual is authorized to access, use, and/or otherwise authorized to perform any control and/or monitoring and/or security operations, actions, or functions.

The personal control and monitoring account or PCMA can also include and/or can contain, data and/or information regarding the authorized user's or the authorized individual's request to receive alert messages or alerts for or regarding any activities, events, occurrences, status, regarding or involving, any premises which is the subject of a premises CMA, any vehicle which is the subject of a vehicle CMA, or any article which is the subject of an article CMA for which the authorized user or the authorized individual is authorized.

The personal control and monitoring account or PCMA can also include and/or can contain, any other data and/or information regarding any and/or all other users, individuals, or entities, who or which are authorized, either by the authorized user, by the authorized individual, or by a third party, to use or access any respective premises CMA, any respective vehicle CMA, or any respective article CMA, and/or who or which are also authorized to perform any control and/or monitoring and/or security operations, actions, or functions, regarding the respective premises, the respective vehicle, or the respective article. The personal control and monitoring account or PCMA can also contain any data and/or information, including any link(s) or hyperlink(s) to, any premises CMAs, vehicle(s), or article CMAs, for which he or she is authorized or registered to access or use. Authorized user or an authorized individual can access any premises CMAs, vehicle(s), or article CMAs, for which he or she is authorized or registered via his or her personal control and monitoring account or PCMA.

The personal control and monitoring account or PCMA can also include and/or can contain any other data and/or information needed or desired for performing any of the herein-described functions and/or functionality described herein as being performed by the present invention.

Any authorized user or authorized individual can establish or create a respective premises CMA, vehicle CMA, or article CMA, with the central processing computer and/or the server computer, by accessing same, and by transmitting, using a communication device, any and/or all of the herein-described data and/or information needed or desired for establishing or creating the respective premises CMA, vehicle CMA, or article CMA. Any authorized user or authorized individual can also establish or create a respective personal control and monitoring account, with the central processing computer and/or the server computer, by accessing same, and by transmitting, using a communication device, any and/or all of the herein-described data and/or information needed or desired for establishing or creating the respective personal control and monitoring account.

Any and/or all data and/or information regarding any of the herein-described personal control and monitoring accounts or PCMAs any and/or all of the premises CMAs, vehicle CMAs, and article CMAs serviced by the present invention can be stored in the central processing computer, the server computer, each premises computer, each vehicle computer, each article computer, and/or the communication device associated with or used by an authorized user or an authorized individual, and/or any law enforcement computer or any security monitoring computer.

Any authorized user or authorized individual can also, at any time, access the central processing computer and/or the server computer using a communication device and transmit any changes or updates to any and/or all of the herein-described personal control and monitoring accounts or PCMAs and/or any and/or all of the herein-described premises CMAs, vehicle CMAs, and/or article CMAs.

The present invention can be utilized in connection with and/or in conjunction with personal control and monitoring accounts or PCMAs and/or premises CMAs, vehicle CMAs, and/or article CMAs, and/or can be utilized in order to establish or create, and/or modify, change, or alter, any data and/or information contained in and/or included in any of the herein-described personal control and monitoring accounts or PCMAs and/or premises CMAs, vehicle CMAs, and/or article CMAs.

Any authorized user or individual can establish or create a premises CMA for a premises, a vehicle CMA for a vehicle, and/or for an article CMA for an article by using the present invention.

An authorized user or authorized individual can also access the central processing computer at any time and can make changes, modifications, or alterations, to the premises CMA or premises account, add or delete authorized users or authorized individual, make changes, modifications, or alterations, to any restriction(s) or limitation(s) on or regarding the premises CMA or premises account, make changes, modifications, or alterations, to any restriction(s) or limitation(s) on or regarding the premises CMA or premises account, for or regarding an authorized users or authorized individuals and/or any premises system(s), equipment, or device(s), establish, create, and/or make changes, modifications, or alterations, to any request(s) to receive alert messages or alerts or notification, and/or make or effectuate any other changes, modifications, or alterations, to or regarding the premises CMA or premises account. The present invention can also be utilized in a same, a similar, and/or an analogous, manner, in order to make the same, similar, and/or analogous, changes, modifications, or alterations, to the a vehicle premises CMA or vehicle account and/or to an article CMA or article account.

Any user or individual can establish or create a personal control and monitoring account or PCMA which can contain or include any and/or all premises CMAs or premises accounts, any and/or all vehicle CMAs or vehicle accounts, and/or any and/or article CMAs or article accounts, which the user or individual is authorized to access and/or use and/or is authorized to perform any control and/or monitoring and/or security operations, actions, or functions, regarding any of the respective premises, the respective vehicle(s), and/or the respective article(s). In this manner the present invention can be utilized to establish or create a comprehensive and personal control and monitoring account which can be utilized by an authorized user or individual access and use any and/or all premises CMAs or premises accounts, any and/or all vehicle CMAs or vehicle accounts, and/or any and/or article CMAs or article accounts for which the authorized user or authorized individual is so authorized.

The present invention can be utilized a centralized control and monitoring system or platform of allowing a user or individual to use the present invention in order to gain access to and use any premises CMA(s) or premises account(s), any vehicle CMA(s) or vehicle account(s), and/or any article CMA(s) or article account(s), for which the user or individual is an authorized user or an authorized individual or for which the user or individual is an authorized lead user or an authorized lead individual.

The central processing computer can be programmed so as to automatically include, in a user's or individual's personal control and monitoring account or PCMA, any newly created remises CMA(s) or premises account(s), any newly created vehicle CMA(s) or vehicle account(s), and/or any newly created article CMA(s) or article account(s), which names or includes the user or individual as an authorized user or authorized individual on that respective newly created account. Any time a new premises CMA or premises account is created, any time a new vehicle CMA or vehicle account is created, and/or any time a new article CMA or article account is created, or has been created, the central processing computer can be programmed to automatically process information regarding the name(s) of any and/or all of the authorized user(s) or authorized individual(s) or any authorized lead user(s) or authorized lead individual(s) listed for each respective account, compare the name(s) against the names of all users or individuals having a personal control and monitoring account or PCMA registered with the present invention, and, if a user or individual is or was named as being an authorized user or authorized individual or an authorized lead user or an authorized lead individual on the newly created premises CMA or premises account, the newly created vehicle CMA or vehicle account, or the newly created article CMA or article account, then the present invention will automatically update the user's or individual's personal control and monitoring account or PCMA so as to add or include that newly created premises CMA or premises account, vehicle CMA or vehicle account, or article CMA or article account among the accounts for which the user or individual is authorized to access, use, and/or otherwise perform any control, monitoring, and/or security, operations, actions, or functions.

The present invention can be utilized to provide personal control and monitoring accounts or PCMAs, as well as a premises CMA or premises account for each premises, a vehicle CMA or vehicle account for each vehicle, and/or an article CMA or article account for each article, which can allow a user to access, use, and/or perform, a control, monitoring, and/or security operation, action, or function, from his or her own personal control and monitoring account. The present invention can provide a more convenient and a more secure system and platform by which a user can access, use, and/or perform a control, monitoring, and/or security operation, action, or function, for any number or combination of premises, vehicles, and/or articles by using a single service or service provider and from a single comprehensive personal control and monitoring account.

The personal control and monitoring account or PCMA can be designed in any appropriate manner so as to include any and/or all of the data and/or information described herein as being included in a personal control and monitoring account or PCMA as well as any and/or all of the data and/or information regarding, or a link(s) or a hyperlink(s) to, any and/or all of the user's or individual's premises CMAs or premises accounts, vehicle CMAs or vehicle accounts, and/or article CMAs or article accounts, or any of the premises CMAs or premises accounts, vehicle CMAs or vehicle accounts, and/or article CMAs or article accounts which name the user or individual as an authorized user, an authorized individual, or an authorized lead user or an authorized lead individual.

The present invention can be utilized in order to allow a user or individual to perform a control, monitoring, and/or security, operation, action, or function, for any premises, for any premises system(s), equipment, or device(s), for any vehicle, for any vehicle system(s), equipment, or device(s), and/or for any article or for any article system(s), equipment, or device(s), for which the user or individual is authorized. In situations where authorization is not needed, the invention can be utilized in order to allow a user or individual to perform a control, monitoring, and/or security, operation, action, or function, for any premises, for any premises system(s), equipment, or device(s), for any vehicle, for any vehicle system(s), equipment, or device(s), and/or for any article or for any article system(s), equipment, or device(s). The present invention can be utilized so as to prevent an unauthorized user or an unauthorized individual from performing any unauthorized control, monitoring, and/or security, operation, action, or function.

The present invention can be utilized so as to provide information to a user or individual seeking to perform a control, monitoring, and/or security, operation, action, or function, for any premises, for any premises system(s), equipment, or device(s), for any vehicle, for any vehicle system(s), equipment, or device(s), and/or for any article or for any article system(s), equipment, or device(s), before the user or individual is able to perform the control, monitoring, and/or security, operation, action, or function.

Any type or kind of restriction(s) or limitation(s) can be placed on the use of the present invention if a certain individual(s) or person(s) might be present in, on, or at, or using, a premises, a vehicle, or an article. Use of the present invention may be restricted, limited, or suspended if an authorized lead user, an authorized lead individual, or any authorized user or authorized individual is present in, on, or at, or using, a premises, a vehicle, or an article.

An authorized user or an authorized individual (hereinafter referred to as "authorized user") or an authorized lead user or authorized lead individual (hereinafter "authorized lead user") can be provided with information regarding who might be present in, on, or at, or using, a premises, a vehicle, or an article, or who might be using a respective premises system(s), equipment, or device(s), a respective vehicle system(s), equipment, or device(s), or a respective article system(s), equipment, or device(s). A premises may be equipped with a premises security device, which is also a premises system(s), equipment, or device(s), and which can include a keypad for receiving an access code(s) for the premises and/or an access code(s) for each user, individual, authorized user, authorized lead user, or any other user, individual or person who or may live at the premises, work at the premises, or have another reason for being at the premises.

The present invention can be utilized to provide an authorized user or an authorized lead user with information regarding who might be present in, on, or at, or using, a premises, a vehicle, or an article, or who might be using a respective premises system(s), equipment, or device(s), a respective vehicle system(s), equipment, or device(s), or a respective article system(s), equipment, or device(s). Any user(s) or individual(s), any authorized user(s), or any authorized lead user(s), who present in, on, or at, or using, a premises, a vehicle, or an article, or who might be using a respective premises system(s), equipment, or device(s), a respective vehicle system(s), equipment, or device(s), or a respective article system(s), equipment, or device(s), can have information regarding their respective entry and/or presence recorded and stored.

In another preferred embodiment, the central processing computer and/or the premises computer, and/or the communication device, can record and store, any operations, activities, or functions, performed by the user and any data and/or information regarding any habits of the user regarding same and/or which are either identified at the time of the creation of the user's personal control and monitoring account or PCMA and/or the premises account, and/or which can be recorded and/or ascertained at any time thereafter. Data and/or information regarding a user's habits can also be stored and/or updated automatically by the present invention.

The present invention can be utilized to generate a user alert message or a user notification message and/or can transmit same to any authorized user or authorized lead user for any of the herein-described premises, vehicles, and/or articles, and/or to a central control and/or monitoring center or service or to a law enforcement agency, department, or bureau, upon the occurrence of any activity, attempt, event, or happening. An alert message or a notification message can be generated upon any occurrence when or any time when or any time any user, individual, or person, whether authorized to do so or not authorized to do so, enters into or onto, or attempts to enter into, or onto, any premises or any vehicle, or any occurrence when or any time any user, individual, or person, whether authorized to do so or not authorized to do so, uses, or attempts to use, any premises, any vehicle, or any article, or any premises system(s), equipment, or device(s) of any premises, any vehicle system(s), equipment, or device(s), or any article system(s), equipment, or device(s) of any article, or any occurrence when or any time any user, individual, or person, whether authorized to do so or not authorized to do so, accesses or gains access to, or attempts to access or attempts to gain access to, any premises, any vehicle, any article, any premises account, any vehicle account, any article account, any personal control and monitoring account or PCMA of any user or individual, any premises computer, any vehicle computer, or any article computer, or any occurrence when or any time any user, individual, or person, whether authorized to do so or not authorized to do so, performs, or attempts to perform, any control, monitoring, and/or security, operation, action, or function, on or regarding any premises, any premises system(s), equipment, or device(s) of any premises, any vehicle, any vehicle system(s), equipment, or device(s) of any vehicle, or any article or any article system(s), equipment, or device(s) of any article, or upon any occurrence of any activity, attempt, even, or happening, for which any authorized user or an authorized lead user of any premises, vehicle, or article, desires to be notified or for which an alert message or a notification message is warranted.

The present invention can also generate an alert message or a notification message, and can transmit same to a communication device of or associated with an authorized user or an authorized lead user of or associated with any premises described herein, any vehicle described herein, or any article described herein. The central processing computer can generate an alert message or a notification message any time a user seeks to perform, a control, monitoring, or security, operation, action, or function, on or regarding a premises or any of the premises system(s), equipment, or device(s) of the premises, on or regarding a vehicle or any of the vehicle system(s), equipment, or device(s) of the vehicle, or on regarding an article or any of the article system(s), equipment, or device(s) of the article.

The user can be required to submit a photograph, a picture, or a video clip, of the user, obtained from, provided by, submitted by, or taken by the user, at the time the user attempts to perform any control, monitoring, or security, operation, action, or function. The user can also record a voice sample of himself or herself or provide a retinal scan, a fingerprint scan, a handprint scan, a hand geometry scan, a facial feature scan, or any other biometric data and/or information.

Once the central processing computer receives any signal(s), control signal(s), or monitoring signal(s), or any other signal(s), which is associated with the control, monitoring, or security, operation, action, or function, attempted to be performed, or performed, by the user, and the picture, photograph, or video clip, of the user, the central processing computer can generate an alert message or a notification message containing information regarding the control, monitoring, or security, operation, action, or function, attempted to be performed, or performed, by the user, and the picture, photograph, or video clip, of the user. Thereafter, the central processing computer can then transmit the alert message or the notification message to a communication device of or associated with any authorized user(s) and any authorized lead user(s). Any authorized user or authorized lead user can then review the information contained in the alert message or the notification message and can transmit an alert response message or a notification response message which can contain information regarding an instruction for allowing or authorizing the control, monitoring, or security, operation, action, or function, for disallowing or cancelling the control, monitoring, or security, operation, action, or function, or for reporting the incident to a law enforcement agency, department, or bureau.

The user can then transmit an alert response message or a notification response message to the central processing computer which can then process the information contained in the alert response message or the notification response message. If the central processing computer determines that the alert response message or the notification response message contains or includes an instruction to allow the control, monitoring, or security, operation, action, or function, then the central processing computer will allow the control, monitoring, or security, operation, action, or function. If the central processing computer determines that the alert response message or the notification response message contains an instruction to disallow the control, monitoring, or security, operation, action, or function, then the central processing computer will disallow the control, monitoring, or security, operation, action, or function. If the central processing computer determines that the alert response message or the notification response message contains an instruction to report the incident to a law enforcement agency, department, or bureau, then the central processing computer will report the incident to a law enforcement agency, department, or bureau.

In this regard, the alert message or the notification message can contain or include any data and/or information regarding the control, monitoring, or security, operation, action, or function, attempted to be performed, or performed, by the user along with the photograph, picture, or video clip, of the user, obtained from, provided by, submitted by, or taken by, the user at the time the user attempts to perform, or performs, the control, monitoring, or security, operation, action, or function.

The alert message or the notification message can contain or include any data and/or information regarding the control, monitoring, or security, operation, action, or function, attempted to be performed, or performed, by the user along with the user's voice sample. The alert message or the notification message can also contain or include any data and/or information regarding the control, monitoring, or security, operation, action, or function, attempted to be performed, or performed, by the user, along with the user's retinal scan, a fingerprint scan, a handprint scan, a hand geometry scan, a facial feature scan, or any other biometric data and/or information, obtained from, provided by, or submitted by, the user.

Any user, individual, or person, whether authorized to use the present invention or not, can be required to provide a photograph or picture of himself or herself, which can be taken with or using any camera or video recording device of or associated with any communication device which the user, individual, or person, is using, and/or which can also be any camera of or associated with any premises security device of a premises, any vehicle security device of a vehicle, or any article security device of an article. Any user, individual, or person, whether authorized to use the present invention or not, can, in addition to, or instead of, taking a photograph of himself or herself, can also be required to submit to providing a retinal scan, a fingerprint scan, a handprint scan, a hand geometry scan, a facial feature scan, or a voice sample, or any other biometric data and/or information, via any suitable input device.

Upon an occurrence of any activity, attempt, event, or happening, which can be any occurrence when or any time any user, individual, or person, whether authorized to do so or not authorized to do so, enters into or onto, or attempts to enter into, or onto, any premises or any vehicle, any occurrence when or any time any user, individual, or person, whether authorized to do so or not authorized to do so, uses, or attempts to use, any premises, any vehicle, or any article, or any premises system(s), equipment, or device(s) of any premises, any vehicle system(s), equipment, or device(s), or any article system(s), equipment, or device(s) of any article, or any occurrence when or any time any user, individual, or person, whether authorized to do so or not authorized to do so, accesses or gains access to, or attempts to access or attempts to gain access to, any premises, any vehicle, any article, any premises account, any vehicle account, any article account, any personal control and monitoring account or PCMA of any user or individual, any premises computer, any vehicle computer, or any article computer, or any occurrence when or any time any user, individual, or person, whether authorized to do so or not authorized to do so, performs, or attempts to perform, any control, monitoring, and/or security, operation, action, or function, on or regarding any premises, any premises system(s), equipment, or device(s) of any premises, any vehicle, any vehicle system(s), equipment, or device(s) of any vehicle, or any article or any article system(s), equipment, or device(s) of any article, or upon any occurrence of any activity, attempt, event, or happening, for which any authorized user or an authorized lead user of any premises, vehicle, or article, desires to be notified or for which an alert message or a notification message is warranted, the present invention can generate an appropriate alert message or notification message.

The alert message or the notification message can include, or can have attached thereto, a photograph or a picture of the user, individual, or person taken at the time of the occurrence of any activity, attempt, event, or happening. In addition to, or instead of a photograph or a picture, the alert message or the notification message can also include, or can have attached thereto, data and/or information regarding any retinal scan, fingerprint scan, handprint scan, hand geometry scan, facial feature scan, or voice sample, or any other biometric data and/or information, obtained from, provided by, or submitted by, the user, individual, or person at the time of the occurrence of any activity, attempt, event, or happening.

The alert message or the notification message can include, or can have attached thereto, a photograph, a picture, or a video clip, of the user, individual, or person, obtained from, provided by, submitted by, or taken by the user, individual, or person, at the time the user, individual, or person, attempts to perform any control, monitoring, or security, operation, action, or function, regarding any premises or any premises system(s), equipment, or device(s), of the premises, any vehicle or any vehicle system(s), equipment, or device(s), of the vehicle, or any article or any article system(s), equipment, or device(s), of the article. The alert message or the notification message can also include, or can have attached thereto, data and/or information regarding any retinal scan, fingerprint scan, handprint scan, hand geometry scan, facial feature scan, or voice sample, or any other biometric data and/or information, obtained from, provided by, submitted by, or taken by, the user, individual, or person, at the time the user, individual, or person, attempts to perform any control, monitoring, or security, operation, action, or function, regarding any premises or any premises system(s), equipment, or device(s), of the premises, any vehicle or any vehicle system(s), equipment, or device(s), of the vehicle, or any article or any article system(s), equipment, or device(s), of the article.

The alert message or the notification message can also contain or include, or have attached thereto, a Premises Occupied Message, a Vehicle Occupied or In Use Message, or an Article In Use Message, which can contain or include, for each user, individual, or person, identified as being in, on, or at, or using, the premises, the vehicle, or the article, the name, user name, file photograph, and/or photograph recorded upon his or her respective entry into or onto, or use of, the respective premises, vehicle, or article. The respective Premises Occupied Message, Vehicle Occupied or In Use Message, or Article In Use Message, can also include a video clip of the user, individual, person, entering or using the premises, vehicle, or article, and/or an audio recording or voice recording obtained upon entry into or onto, or use of, the premises, vehicle, or article. In this manner an authorized user or authorized lead user can be notified of the activity, attempt, event, or happening, and be notified as to any user, individual, or person, identified as being in, on, or at, or using, the premises, the vehicle, or the article, at the time of the activity, attempt, event, or happening The present invention can transmit the alert message or the notification message to a communication device used by or of or associated with an authorized user or an authorized lead user of the respective premises, vehicle, or article, which is the subject of the occurrence of the activity, attempt, event, or happening. The alert message or the notification message can be transmitted as or in an electronic mail (e-mail) message, an instant messaging message, and SMS message, a recorded telephone message, or any electronic communication or electronic transmission.

Once received and/or reviewed, the authorized user or the authorized lead user can transmit an alert response message or a notification response message to the central processing computer and/or to the respective premises computer, the vehicle computer, or the article computer, of the respective premises, vehicle, or article, which is the subject of the occurrence of any activity, attempt, event, or happening. The alert response message or the notification response message can contain data and/or information for disallowing, preventing, cancelling, or stopping, the activity, attempt, event, or happening, or information for allowing the activity, attempt, event, or happening. The alert response message or the notification response message can also contain data and/or information for recording information regarding the activity, attempt, event, or happening, reporting the occurrence of the activity, attempt, event, or happening, to another authorized user(s), to an authorized lead user(s), and/or to the central processing computer, and/or to a law enforcement computer of or associated with a law enforcement agency, department, or bureau so as to report the occurrence of the activity, attempt, event, or happening, to a law enforcement agency, department, or bureau.

The present invention can detect a malfunction, a state of disrepair, an operational failure or an operating failure, or a use, an unauthorized use, and/or a theft, and/or an accessing of and/or any entry into or onto, of, for, or regarding, a respective premises or a premises system(s), equipment, or device(s) of the premises, a respective vehicle or any vehicle system(s), equipment, or device(s) of the vehicle, or a respective article or any article system(s), equipment, or device(s) of the article.

Any one or more of the herein-described monitoring devices can detect an occurrence of a respective malfunction, state of disrepair, operational failure or operating failure, or use, unauthorized use, and/or theft, and/or accessing of and/or entry into or onto, of, for, or regarding, a respective premises or a premises system(s), equipment, or device(s) of the premises, a respective vehicle or any vehicle system(s), equipment, or device(s) of the vehicle, or a respective article or any article system(s), equipment, or device(s) of the article. The respective monitoring device can generate an appropriate signal or message and transmit same to the respective promises computer, vehicle computer, or article computer, which can, in turn, generate and transmit a signal or an alert message or a notification message to the central processing computer. The central processing computer can them generate an alert message or a notification message to the communication device of or associated with an authorized user or an authorized lead user of the respective premises, vehicle, or article. The respective promises computer, vehicle computer, or article computer, can generate and transmit an alert message or a notification message to the communication device of or associated with the authorized user or the authorized lead user of the respective premises, vehicle, or article.

In the case of a detected malfunction, state of disrepair, or operational failure or operating failure, of, for, or regarding, a respective premises or a premises system(s), equipment, or device(s) of the premises, a respective vehicle or any vehicle system(s), equipment, or device(s) of the vehicle, or a respective article or any article system(s), equipment, or device(s) of the article, a respective diagnostic device can be activated, either automatically or otherwise, and can perform an diagnostic evaluation of the respective premises or a premises system(s), equipment, or device(s) of the premises, a respective vehicle or any vehicle system(s), equipment, or device(s) of the vehicle, or a respective article or any article system(s), equipment, or device(s) of the article, generate a diagnostic report, and transmit the diagnostic report to the respective premises computer, vehicle compute, article computer, and/or to the central processing computer, and/or the communication device of or associated with the authorized user or the authorized lead user of the respective premises, vehicle, or article.

Any one or more of the diagnostic device, the monitoring device, the respective premises computer, vehicle computer, or article computer, the central processing computer, and/or the communication device can generate and/or transmit a repair or a re-programming signal, program, or software, to the respective premises system(s), equipment, or device(s), vehicle or any vehicle system(s), equipment, or device(s), or article system(s), equipment, or device(s) of the article so as to effectuate a repair and/or re-programming of same.

The present invention can also, for each detected malfunction, state of disrepair, operational failure or operating failure, or use, unauthorized use, and/or theft, and/or accessing and/or entry, generate and transmit the respective alert message or notification message and/or the respective user alert message or user notification message to the communication device of any user or individual present in, on, at, or using the respective premises, vehicle, or article. The present invention can also, for each detected malfunction, state of disrepair, operational failure or operating failure, or use, unauthorized use, and/or theft, and/or accessing and/or entry, provide an audio or audible announcement in or at the premises, in or at the vehicle, or at article, via an appropriate speaker, intercom, or public address system.

The present invention can also, for each control, monitoring, or security, operation, action, or function, performed, or for each repair, reprogramming or re-setting, performed regarding of any respective premises system(s), equipment, or device(s), any respective vehicle system(s), equipment, or device(s), or any respective article system(s), equipment, or device(s), generate a message containing information regarding the respective control, monitoring, or security, operation, action, or function, performed, or regarding each repair, reprogramming or re-setting, performed, and transmit the message to the communication device of any user or individual present in, on, at, or using the respective premises, vehicle, or article.

The present invention can also, for each control, monitoring, or security, operation, action, or function, performed, or each repair, reprogramming or re-setting, performed, provide an audio or audible announcement in or at the premises, in or at the vehicle, or at article, via an appropriate speaker, intercom, or public address system.

The present invention can also be programmed to perform a systematic check, and/or can be programmed to poll, each and/or every premises system(s), equipment, or device(s) for each premises, each and/or every vehicle system(s), equipment, or device(s) for each vehicle, and/or each and/or every article system(s), equipment, or device(s) for each article. The systematic check and/or the polling can be done on a system-by-system basis, and equipment-by-equipment basis, and/or a device-by-device basis, on a room-by-room basis, on a floor-by-floor basis, on a building-by-building basis, and/or on any other basis or using any another methodology.

The systematic check and/or the polling can also be done in order to determine or ascertain, for each premises system, equipment, or device, its presence in the premises control, monitoring, and/or security system, its connection to or with the premises computer, its operation status, whether it is on, off, activated, de-activated, enabled, and/or disabled, it state of operability, whether it is functioning correctly or malfunctioning, whether it is in a state of disrepair, whether it is experiencing an operating failure or any operation failure, whether it has been activated or has experienced a disturbance, and/or any operating information or operational information, and/or can determine or ascertain any other data or information regarding the premises system, equipment, or device, its status, its readiness, and/or its operability, or any other data or information.

The present invention can perform the systematic check or polling and can generate a comprehensive system report or system report for the premises. The system report can, for each premises system, equipment, or device, contain or include data and/or information regarding its presence in the premises control, monitoring, and/or security system, its connection to or with the premises computer, its operation status, whether it is on, off, activated, de-activated, enabled, and/or disabled, it state of operability, whether it is functioning correctly or malfunctioning, whether it is in a state of disrepair, whether it is experiencing an operating failure or any operation failure, whether it has been activated or has experienced a disturbance, and/or any operating information or operational information, and/or can determine or ascertain any other data or information regarding the premises system, equipment, or device, its status, its readiness, and/or its operability, or any other data or information.

The present invention can transmit the system report to the central processing computer and to each communication device(s) associated with each authorized user(s) or authorized lead user(s) of the premises. If generated by the central processing computer, the central processing computer can transmit the system report to the premises computer and to each communication device(s) associated with each authorized user(s) or authorized lead user(s) of the premises. If generated by a communication device, the communication device can transmit the system report to the central processing computer and to the premises computer. The present invention can be utilized in a same, a similar, and/or an analogous, manner, in order to perform a systematic check for, and/or to poll, the vehicle system(s), equipment, or device(s) for each vehicle, and to perform a systematic check for, and/or to poll, the article system(s), equipment, or device(s) for each article.

Any and/or all system reports for a respective premises, vehicle, or article, can be stored by the present invention. Any of the herein-described systematic checks and/or polling can be programmed to be performed automatically on certain days, at certain times, at certain time intervals, at certain times of the year, month, week, or day, or upon an occurrence of a detection of a malfunction, a state of disrepair, an operational failure or operating failure, or a use, or an unauthorized use, and/or a theft, and/or accessing and/or entry, of or regarding the respective premises or a premises system(s), equipment, or device(s) of the premises, of or regarding a respective vehicle or any vehicle system(s), equipment, or device(s) of the vehicle, or of or regarding a respective article or an article system(s), equipment, or device(s) of the article.

Any of the systematic checks and/or polling can be activated at any time by any authorized user or any authorized lead user of the respective premises, vehicle, or article. If an authorized user or any authorized lead user of the respective premises, vehicle, or article, activates the systematic check or the polling, then he or she, in a preferred embodiment, can be required to take a picture, photograph, or video or video clip of himself or herself with the communication device camera or video recording device and transmit same to the central processing computer along with the request or instruction to perform the systematic check or polling.

Any user or individual, or any authorized user or authorized individual, or any authorized lead user, can utilize the present invention in order to access a camera or video recording device associated with any of the herein-described premises, vehicles, or articles, and request via his or her communication device and/or the central processing computer, or a respective premises computer, vehicle computer, or article computer, that a picture(s), photograph(s), or video information, taken or recorded by, or which has been taken by or which has been recorded by the camera or the video recording device be transmitted to the communication device. In this manner, the user or individual, or the authorized user or the authorized individual, or the authorized lead user can view the picture(s), photograph(s), or video information, and/or view activity in, on, at, or in the vicinity of the respective premises, vehicle, or article.

The user or individual, or the authorized user or authorized individual, or the authorized lead user, can also engage in a video conference and/or a video chat with any other users, individuals, or persons, located at, on, in, or in the vicinity of, the respective premises, vehicle, or article, by using any camera(s), video recording device(s), microphone(s), audio recording device(s), speaker(s), public address system, intercom system, or any other appropriate device(s) or system(s). The video conferencing and/or video chatting capability of the present invention can also be used in interactive learning of any subject matter taught in any education institutions, schools, colleges, universities, and/or in any instruction or classes in physical activities, exercise and fitness classes, martial arts classes, Krav Maga classes, mixed martial arts classes, wrestling classes, yoga, aerobics classes, and/or any other exercise and/or fitness classes.

Any user or individual, or any authorized user or authorized individual, or any authorized lead user, can utilize the present invention in order to access a microphone, or audio recording device, associated with any of the herein-described premises, vehicles, or articles, and request via his or her communication device and/or the central processing computer, or a respective premises computer, vehicle computer, or article computer, that a audio information, taken or recorded by, or which has been taken by or which has been recorded by the microphone or audio recording device be transmitted to the communication device. In this manner, the user or individual, or the authorized user or the authorized individual, or the authorized lead user can listen to the audio information, and/or listen to any activity in, on, at, or in the vicinity of the respective premises, vehicle, or article.

In another preferred embodiment, the user or individual, or the authorized user or authorized individual, or the authorized lead user, can also engage in an audio conference via an speaker, a public address system, an intercom system or any other appropriate device or system, in order to speak or talk with, or engage in or participate in an audio conference with, any other users, individuals, or persons, located at, on, in, or in the vicinity of the respective premises, vehicle, or article. In another preferred embodiment, the audio conferencing capability of the apparatus can also be used in connection with and/or to facilitate interactive learning of any subject matter taught in any education institutions, schools, colleges, universities, and/or in any instruction or classes in physical activities, exercise and fitness classes, martial arts classes, Krav Maga classes, mixed martial arts classes, wrestling classes, yoga, aerobics classes, and/or any other exercise and/or fitness classes.

In another preferred embodiment, as well as any and/or all of the embodiments described herein, the apparatus of the present invention can be used to take or record pictures, photographs, or video information and/or audio information, in, on, at, or in the vicinity or a respective premises, vehicle, or article and store same, use same for any purpose, and/or to submit same or to transmit same to a law enforcement agency, department or bureau. In another preferred embodiment, the apparatus can be utilized to record a picture, photograph, video information, and/or audio information at, in, on, or in the vicinity of, a respective premises, vehicle, or article, and submit same or transmit same to a to a law enforcement agency, department or bureau in connection with reporting criminal or other activity, violations, motor vehicle violations, traffic violations, speeding violations, passing school bus violations, red light violations, or any other activities.

In another preferred embodiment, the apparatus and method of the present invention can be utilized in connection with or in conjunction with a law enforcement agency, department, or bureau. The law enforcement agency, department, or bureau can be any local, municipal, county, provincial, state, or federal, law enforcement agency, department, or bureau.

The present invention can also be utilized by any user, individual, person, authorized user, or authorized lead user, in order to obtain a picture, a photograph, video information and/or audio information from a premises camera or video recording device and submit or transmit same to a law enforcement computer. The respective user, individual, person, authorized user, or authorized lead user, can utilize the present invention in order to report a theft of the premises, an unlawful access into or onto the premises, a trespassing upon the premises, or a breaking and/or entering regarding the premises, and/or any other activity, event, or happening, the occurrence of which the user, individual, person, authorized user, or authorized lead user, desires to report to the law agency, department, or bureau. The user can also report any criminal activity at the premises and/or any report any detected malfunction, failure, or state of disrepair, of or regarding any of the herein-described premises or any premises system(s), equipment, or device(s). The present invention can also be utilized in a same, a similar, and/or an analogous, manner, in connection with any of the other herein-described premises, with any of the herein-described vehicles, and/or with any of the herein-described articles, in order to report any criminal activity or any other activity, event, or happening, to a law enforcement agency, department, or bureau, along with a picture(s), photograph, video information, and/or audio information obtained from the respective premises, the respective vehicle(s), or the respective article(s), and which can be utilized for evidentiary purposes and/or for any other purpose.

The present invention can be utilized to report a traffic violation or illegal activity or conduct by another driver or motorist, or to report a driver or motorist who is about to or has passed a red light, who is about to make or has made an illegal turn, who is driving in excess of the speed limit, who is driving unsafely, who is driving erratically, who is driving below the speed limit in an unsafe manner, who is tailgating another vehicle, who is driving while texting, who is driving while using a cellular telephone or handheld telephone, who is driving aggressively, who is violating vehicle and traffic laws, who is exhibiting road rage, and/or who engaging in conduct that constitutes road rage or aggressive driving, or who is driving while intoxicated, or who driving while under the influence of alcohol or drugs, or who is otherwise driving while impaired, and/or who has caused and/or who has been involved in an accident. The present invention can also be utilized by an user, operator, passenger, or any authorized user or authorized lead user, of a vehicle, while in, or, or at, the vehicle, in order to report the sighting of a vehicle which is the subject of a public alert message regarding an Amber Alert, a missing child, a kidnapped child, or an elderly or other ill individual, or a vehicle identified as being stolen or identified as being operated by or used by a fugitive from justice.

The present invention can also maintain and/or store an activity history or activity histories for each and every respective premises account, vehicle account, and article account, as well as can maintain and/or store an activity history for each and every respective personal control and monitoring account. The activity history or activity histories can contain or include data and/or information regarding each instance when any user, individual, or person, or any authorized user or authorized lead user, has attempted to gain access to the respective account, has used the respective account, has used or has accessed a respective premises, vehicle, or article, associated with the respective account, has entered onto or into or has operated a respective premises, vehicle, or article, has attempted to perform, or has performed, a control, monitoring, or security, operation, action, or function, on, for, or regarding a respective premises or premises system(s), equipment, device(s) of the premises, a respective vehicle or a vehicle system(s), equipment, device(s) of the vehicle, or an article or an article system(s), equipment, device(s) of the article, and/or has attempted to perform, or has performed, a repair, a reprogramming, or a re-setting, operation, action, or function, on, for, or regarding a respective premises or premises system(s), equipment, device(s) of the premises, a respective vehicle or a vehicle system(s), equipment, device(s) of the vehicle, or an article or an article system(s), equipment, device(s) of the article, along with the date and time of each occurrence, event, or happening and a picture, photograph, or video or video clip of the respective user, individual, person, authorized user, or authorized lead user, who performed any such access, attempted access, use, attempted use, or who has performed, or who has attempted to perform, any such control, monitoring, or security, operation, action, or function, or who has performed, or who has attempted to perform, any such repair, reprogramming, or re-setting, operation, action, or function.

The activity history or activity histories can also contain or include data and/or information regarding any alert messages or notification messages or any user alert messages or user notification messages which were generated as described herein along with the data and time of such and any Premises Occupied Message, a Vehicle Occupied or In Use Message, or an Article In Use Message which was contained in or attached to the respective alert messages, notification messages, user alert messages, or user notification messages. Any other communications described herein as being transmitted to and/or transmitted by the present invention can also be stored in the activity history or activity histories for the respective account along with the date and time of same.

The present invention, can, upon receiving a request, from an authorized user or an authorized lead user, or any other user, individual, or person authorized to obtain same, for a respective activity report or a respective periodic activity report for a respective premises account, vehicle account, or article account, or for a respective personal control and monitoring account, and for a selected or desire time period and can, can generate the respective activity report and transmit same to the communication device of or associated with requesting user. A copy of the activity report can also be stored in the central processing computer and in the respective premises account, vehicle account, article account, or personal control and monitoring account.

The present invention can also be programmed, by the requesting user or by another, to automatically generate and transmit any of the herein-described activity reports regarding any of the respective premises accounts, vehicle accounts, article accounts, or personal control and monitoring accounts, hourly, daily, weekly, monthly, quarterly, yearly, or at any other time interval, or upon the elapsing of any pre-selected time period. Any activity report can also include or contain, in addition to any other data and/or information, a picture, photograph, video recording, or video clip, or a voice sample of audio sample, of any user or individual involved in each activity reported.

Any activity report can be generated and transmitted on demand or upon request by a user, individual, or person authorized to do so, or by any authorized user an authorized lead user. Any activity report can also be generated and transmitted upon the occurrence of any of the detected malfunctions, failures, or state of disrepairs, of or regarding any of the premises or any premises system(s), equipment, or device(s), vehicle or any vehicle system(s), equipment, or device(s), or article or any vehicle system(s), equipment, or device(s).

The present invention can also provide the user or individual seeking to perform a control, monitoring, or security, operation, action, of function, with a control panel or other graphical user interface (GUI) with and/or from which the user or individual can perform any control, monitoring, or security, operations, actions, or functions, and/or any repair, reprogramming or re-setting, operations, actions, or functions. The control panel or graphical user interface can be accessed via the central processing computer, and/or a respective premises computer, vehicle computer, or article computer. Any communication device can also be provided with a control panel or graphical user interface or an application or an "app" for same. Any and/or all of the signals, messages, or reports, which can be transmitted from the central processing computer, and/or any respective premises computer, vehicle computer, and/or article computer, can include or contain a link(s) or hyperlink(s) to a control panel or graphical user interface for the respective premises, vehicle, or article.

The present invention can also process any information regarding any control, monitoring, or security, operation, action, or function, in conjunction with any limitation(s) or restriction(s) which can be, or which may have been, placed on a user's or an individual's ability to access and/or use a respective personal control and monitoring account, premises account, vehicle account, or article account, an allowed time(s) of allowed or authorized use of same, disallowed time(s) of use, any limitation(s) or restriction(s) regarding a user's or individual's ability to perform, and/or the extent to which the user or individual can perform, any control, monitoring, or security, operation, action, or function, for or regarding any respective premises or any premises system(s), equipment, or device(s) of the premises, vehicle or any vehicle system(s), equipment, or device(s) of the vehicle, or article or any article system(s), equipment, or device(s) of the article.

Any limitation(s) or restriction(s) can also be, or can pertain to, any limitation or restriction on a user's or individual's ability or authority to perform any control, monitoring, or security, operation, action, of function. The present invention can also process any operation, activity, or function, attempted to be performed, or performed, in connection with any limitation(s) or restriction(s) placed on any personal control and monitoring account, premises account, vehicle account, or article account.

The present invention can also record and store data and/or information regarding a user's or individual's habits in using the present invention. The present invention can also determine whether or not a use, or an attempted use, or any control, monitoring, or security, operation, action, or function, sought or attempted to be performed, is consistent with the user's or individual's use habits.

Any of the personal control and monitoring accounts can have a link(s) or hyperlink(s) to any of premises account or premises accounts, any vehicle account or vehicle accounts, and/or any article account or article accounts, included in the respective personal control and monitoring account. Any personal control and monitoring account can also have a link(s) or hyperlink(s) to any control panel or control panels associated with any premises, any control panel or control panels associated with any vehicle, or any control panel or control panels associated with any article.

Any of the premises accounts, vehicle accounts, or article accounts, can have a link(s) or hyperlink(s) to any personal control and monitoring account(s) associated with same. Any of the premises accounts, vehicle accounts, or article accounts, can also have a link(s) or hyperlink(s) to any control panel or control panels associated with any premises, any control panel or control panels associated with any vehicle, and/or any control panel or control panels associated with any article.

Any communication devices used with the present invention can also be equipped with appropriate hardware and/or software, can be utilized in connection with a suitable interface device or interface devices, or can be programmed with software or software applications or "apps" in order to operate or to function as a premises computer, a vehicle computer, or an article computer.

The communication devices described herein can also be equipped with appropriate hardware and/or software, can be utilized in connection with a suitable interface device or interface devices, or can be programmed with software or software applications or "apps" in order to operate or to function as a central processing computer.

The present invention and/or any of the central processing computers, server computers, premises computers, vehicle computers, article computers, and/or communication devices, can also be programmed for automatic and/or for automatic or programmed activation, operation, and/or de-activation.

The present invention and/or any of the central processing computers, server computers, premises computers, vehicle computers, article computers, and/or communication devices, can also be programmed to automatically control, monitor, and/or provide security for a respective premises, a respective vehicle, or a respective article, and/or can be programmed to effectuate pre-programmed, automatic, or scheduled, control, monitoring, or security operations for any of the herein-described premises system(s), equipment, device(s), vehicle system(s), equipment, device(s), and/or article system(s), equipment, device(s).

In another preferred embodiment, the present invention can also be programmed and/or can be equipped to "ping" a communication device being used by a user or individual in order to ascertain the user's or the individual's location or position as a way in which to confirm or verify that the user or individual is in fact an authorized user or an authorized lead user on a respective premises, vehicle, or article, account.

DESCRIPTION OF THE PREFERRED EMBODIMENTS

The present invention pertains to a control, monitoring, and/or security, apparatus and method for premises, vehicles, and/or articles, and, in particular, the present invention pertains to a control, monitoring, and/or security, apparatus and method for premises, vehicles, and/or articles, which can be utilized to provide a wide range of secured and improved control, monitoring, and/or security, features and functionality.

Applicant hereby incorporates by reference herein the subject matter and teachings of U.S. Provisional Patent Application Ser. No. 61/956,242, filed Jun. 4, 2013, and entitled "CONTROL, MONITORING, AND/OR SECURITY, APPARATUS AND METHOD FOR PREMISES, VEHICLES, AND/OR ARTICLES", the subject matter and teachings of which are hereby incorporated by reference herein in their entirety.

Figure 1:
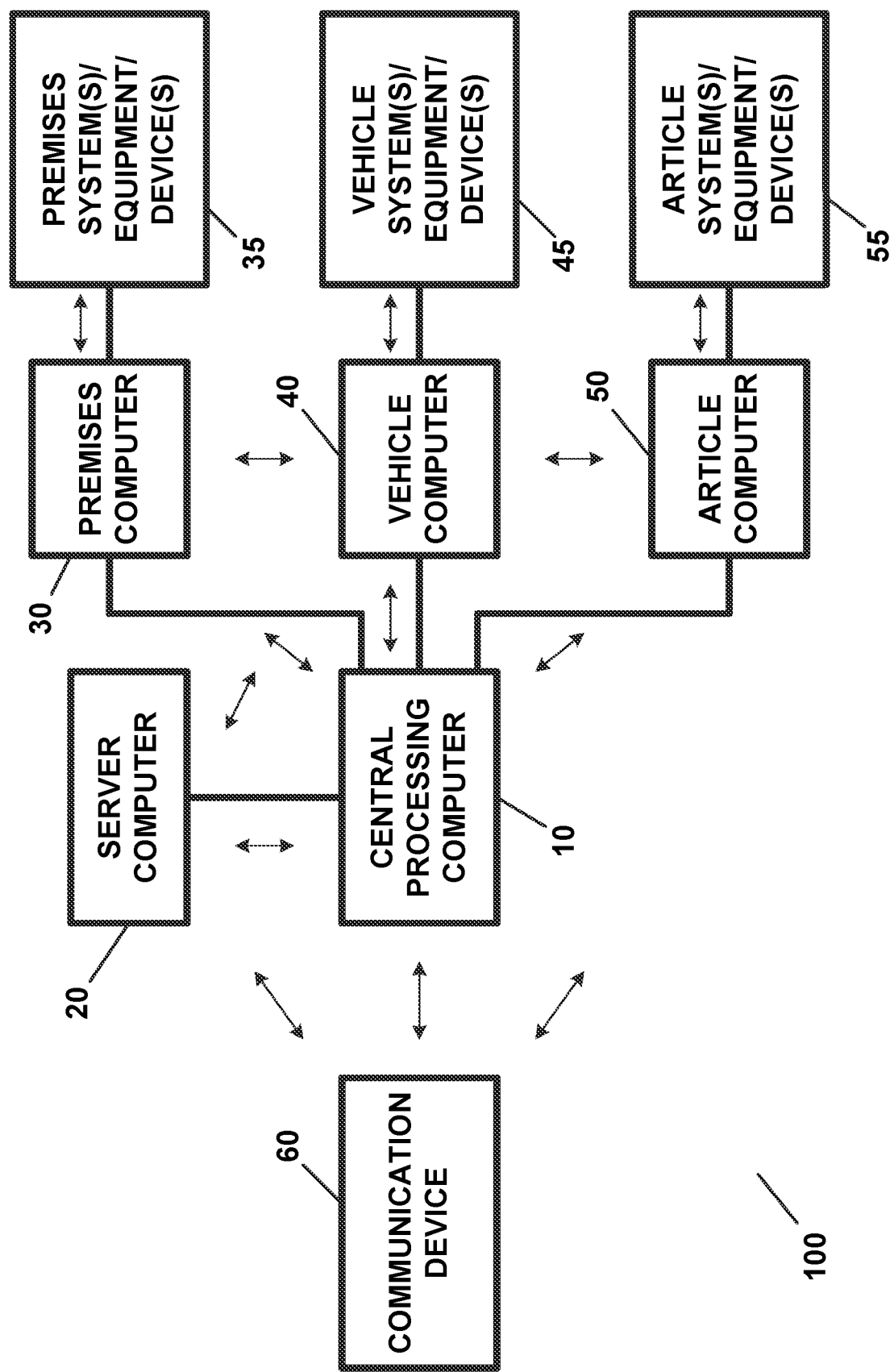
FIG. 1 illustrates a preferred embodiment of the apparatus of the present invention, in block diagram form.

FIG. 1 illustrates a preferred embodiment of the apparatus 100 of the present invention which is denoted generally by the reference numeral 100, in block diagram form. With reference to FIG. 1, the apparatus 100 includes a central processing computer 10 which can perform any of the processing routines and functionality described herein as being performed by the apparatus 100 of the present invention. In a preferred embodiment, the central processing computer 10 can be any computer, computer system, group of computers, server, server system, or group of servers, which can be programmed and/or equipped to perform any of the herein-described functions, operations, or actions, described herein as being performed by the central processing computer 10 and the apparatus 100 of the present invention. Any number of central processing computers 10 can be utilized in conjunction with the apparatus 100 of the present invention.

In another preferred embodiment, any of the central processing computer(s) 10 described as being utilized in connection or in conjunction with the apparatus 100 and method or the present invention can also be performed by or implemented using cloud computer hardware and/or software. In this regard, any and/or all of the central processing computers 10 described herein can be implemented using a cloud computing architecture, server computers or network computers, and/or any cloud computing hardware and/or software. In this manner, the apparatus 100 of the present invention can be utilized in connection with any number of central processing computers 10 and the apparatus 100 of the present invention can also be utilized in connection with a cloud computing system, network, and/or architecture. Any number, type, or kind, of central processing computers 10 can be utilized in the apparatus 100 of the present invention.

With reference once again to FIG. 1, the apparatus 100 includes a server computer 20 which can also perform any of the processing routines and functionality described herein as being performed by the apparatus 100 of the present invention and/or the central processing computer 10 or any of the central processing computers 10 described herein as being utilized in the apparatus 100 of the present invention. In a preferred embodiment, the server computer 20 can be any server, computer, computer system, group of computers, server system, or group of servers, which can be programmed and/or equipped to perform any of the herein-described functions, operations, or actions, described herein as being performed by the central processing computer 10 and/or the apparatus 100 of the present invention. Any number of server computers 20 can be utilized in conjunction with the apparatus 100 of the present invention.

In another preferred embodiment, any of the server computer(s) 20 described as being utilized in connection or in conjunction with the apparatus 100 and method or the present invention can also be performed by or implemented using cloud computer hardware and/or software. In this regard, any and/or all of the server computers 20 described herein can be implemented using a cloud computing architecture, server computers or network computers, and/or any cloud computing hardware and/or software. In this manner, the apparatus 100 of the present invention can be utilized in connection with any number of server computers 20 and the apparatus 100 of the present invention can also be utilized in connection with a cloud computing system, network, and/or architecture. Any number, type, or kind, of server computers 20 can be utilized in the apparatus 100 of the present invention.

In a preferred embodiment, the server computer 20 is or can be connected with, linked to, or linked with, the central processing computer 10 and any server computers 20 can be connected with, linked to, or linked with, any central processing computer 10.

With reference once again to FIG. 1, the apparatus 100 can also include a premises computer 30 which can be assigned to or associated with any premises with which the apparatus 100 and method of the present invention can be utilized. In a preferred embodiment, the premises computer 30 can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the premises computer 30. In a preferred embodiment, the premises computer 30 can be utilized to perform any of the control, monitoring, or security, operations, actions, or functions, described herein as being preformed or provided by the apparatus 100 of the present invention in controlling, monitoring, or providing security for or regarding any of the herein-described premises and/or any of the herein-described systems, equipment, devices, or components, of or associated with, or located at, a respective premises.

In a preferred embodiment, the premises can be, and the term "premises" means, any residential home, residential house, apartment, condominium, cooperative (co-op), residential premises, home, or household, or a commercial premises, commercial office, commercial building, commercial structure, shopping center, store, retail facility, repair facility, healthcare facility, hospital, healthcare provider's office, bank, financial institution, brokerage firm, financial intermediary building or facility, government building, or municipal building, or business premises, private land, public land, vacant land, privately-owned land or building, publicly-owned land or building, municipality-owned land or building, government-owned land or building, or entertainment venue or building, stadium, arena, concert hall, theatre, sports venue, athletic venue, entertainment venue, or professional office or building, or healthcare office or building, doctor's office, service provider office or facility, hospital, healthcare facility, or manufacturing building, manufacturing plant, manufacturing facility, industrial building, industrial plant, industrial facility, assembly building, assembly plant, or assembly facility, or a building or structure in which any type of services are provided and/or rendered, or equipment, industrial equipment, construction equipment, structure, man-made structure, off shore platform, drilling platform, research platform, or light pole, or cellular tower, or any land, building or structure, or land having a building or structure on or associated with same, vacant land, government land or municipality owned land, parkland, any stationary premises, or any moveable or mobile premises, or any natural structure, or any other entity which can be determined to be a premises and/or any component thereof and/or control system thereof and/or therefore. In a preferred embodiment, the term "premises" can also mean any industrial facility, industrial structure, manufacturing facility, manufacturing equipment, manufacturing machine, drilling platform, drilling rig, oil drilling platform, off-shore drilling platform, off-shore drilling rig, excavation equipment, construction equipment, mining platform, mining equipment, assembly facility, assembly line facility and/or equipment, assembly equipment, industrial robotic equipment, mass production facility, production facility, assembly line, or any other industrial structure, building, edifice, equipment, system, device, or component thereof or control system thereof or therefore.

In a preferred embodiment, the premises computer 30 can be located at, in, or on, the premises. In another preferred embodiment, the premises computer 30 can also be located at a place or location separate and apart from, or at a distance from, or remote from, the premises.

Any number of premises computers 30 can be utilized in conjunction with the apparatus 100 of the present invention. In a preferred embodiment, any premises computer 30 can be used in connection or in association any single premises. In another preferred embodiment, any premises computer 30 can be used in connection with any number of premises.

In a preferred embodiment, the premises computer 30 is or can be connected with, linked to, or linked with, the central processing computer 10 or any of the central processing computers 10 which can be utilized in connection with the apparatus 100 of the present invention.

In a preferred embodiment, the premises computer 30 is or can also be connected with, linked to, or linked with, the server computer 20 or any of the server computers 20 which can be utilized in connection with the apparatus 100 of the present invention.

With reference once again to FIG. 1, the apparatus 100 also includes any number, type, or kind, of premises system(s), equipment, or device(s) 35 described herein which can be or which can include any premises system, equipment, equipment system, device, or component of the premises, located at, on, or in, the premises, or associated with the premises or any system, equipment, equipment system, device, or component, of the premises. In a preferred embodiment, any premises system, equipment, equipment system, device, or component, can also be any such system, equipment, equipment system, device, or component, which can be controlled by, monitored by, or for which a security function can be provided by or facilitated by the premises computer 30, by the central processing computer 10, or the by the apparatus 100 of the present invention or any of the herein-described computers, communications devices or components of same. In a preferred embodiment, any premises system, equipment, equipment system, device, or component, can also be any such system, equipment, equipment system, device, or component, which can be electrically, electronically, mechanically, hydraulically, pneumatically, or otherwise, controlled and/or monitored by or using the apparatus 100 of the present invention or any of computers, communication devices, or components of same.

In a preferred embodiment, the premises computer 30 can be connected with, linked to, or linked with, each of any of the premises system(s), equipment, or device(s) 35 described herein. In a preferred embodiment, the premises computer 30 can also be connected directly with or to, directly linked to, or directly linked with, each of any of the premises system(s), equipment, or device(s) 35 described herein. In a preferred embodiment, the premises computer 30 can also be wirelessly connected with or to, wirelessly linked to, or wirelessly linked with, each of any of the premises system(s), equipment, or device(s) 35 described herein. In another preferred embodiment, the premises computer 30 can also be connected with, linked with, or linked to, each of any of the premises system(s), equipment, or device(s) 35 described herein via or using an interface device, component, or system.

In a preferred embodiment, the premises computer 30 can be utilized to control, monitor, or perform security operations or functions, or security-related operations or functions, for any number, types, or kinds, of premises system(s), equipment, or device(s) 35. The premises system(s), equipment, or device(s) 35 can be or can include any of the herein-identified or any other system(s), equipment, device(s), component(s), or appliance(s) which can be utilized in, on, at, or in connection with, any of the premises identified and/or described herein.

In a preferred embodiment, the premises system(s), equipment, or device(s) 35 can be or can include a central electrical system, an electrical system, an electrical circuit, one or more of the electrical circuits utilized in a central electrical system or an electrical system, a central heating system, a heating system, thermostat system, a furnace, one or more heating zones in a central heating system or a heating system, a central air conditioning system, an air conditioning system, an air conditioner, one or more air conditioning zones in or of a central air conditioning system or an air conditioning system, a water system, a well water pumping system, a water filter, a water filtration system, a water contamination detection system or device, a water purification system, a water shut-off valve, system, or device or similar device, a thermostat system, a thermostat, an environment al control system, an interior lighting system, an exterior lighting system, a security system, a security monitoring system, and/or an anti-theft system, a burglar or burglary alarm system, a computer display system or a video monitoring monitor or display device, a siren or alarm, an exterior siren or alarm, lighting system(s), an exterior lighting system(s), an interior lighting systems, "smart" windows which turn opaque and/or darker depending upon interior lighting, an electrical or electronically controlled locking device(s) or system for doors and/or windows, an electrical and/or electronic dead-bolt locking system and/or device, and electrical circuit, and/or an electrical system for controlling an electrical circuit or system room-by-room, device-by-device, appliance-by-appliance, or circuit-by-circuit, a device for controlling any one or more of electrical circuits, such as circuits controlled by fuses, circuit breakers, or equivalent devices, and/or a hot water heater, a garage door opener, a lawn sprinkler system, an electric fence and/or fencing, a fountain, an in-ground or above-ground pool equipment, a filter, a heater, a central water valve, an interior or exterior individual water valve, a premises fire detector system or equipment, a fire extinguisher or fire extinguishment equipment system or device, power door and/or window closing, locking, and/or opening, equipment, and/or a "smart" window(s) and/or "smart" glass which can turn opaque depending upon the amount and/or intensity of interior lighting, and/or any device or system for controlling and/or monitoring any of the above-identified or herein identified premises systems, equipment, or devices 35.

In a preferred embodiment, the premises system(s), equipment, or device(s) 35 can also be or can also include any and/or all of a wide variety of appliances, devices, or equipment, such as, but not limited to, a television, a telephone, a printer, a scanner, a facsimile machine, a telephone answering machine, a telephone caller identification system, an alarm system, a digital video recording device, a video cassette recording device, a DVR, a VCR, a router, a cable television box, a satellite television box, a television signal receiving equipment, a home theatre, a home entertainment, system, a theatre system, an entertainment system, a stove, an oven, a toaster, a blender, a microwave oven, any kitchen equipment, exercise equipment, a door bell, a light(s) or lamp(s), a blender(s), a coffee maker, a toaster over, a food processor, a personal computer, a laptop computer, a tablet, a tablet computer, a computer or computer system, a data processing system or device, a computer peripheral device, a commercial computer system, a healthcare monitoring device, system, and/or equipment, a word processors, office equipment, machinery, robots, robotic equipment, systems, and/or devices, manufacturing equipment, systems, and/or devices, a stereo, a home entertainment system, a radio, and/or any other device, equipment, component, or appliance, which is electrically and/or electronically activated and/or controllable.

The premises system(s), equipment, or device(s) 35 can also be or can also include an elevator, an escalator, a conveyor belt system, a central vacuum system, a vacuum system, a climate control system, a hot tub, Jacuzzi, a sauna, a steam room, fitness equipment, exercise equipment, an air filtration system, an air freshener system, a water filtration system, a water purification system, a speaker system, a public address system, an energy management system.

In a preferred embodiment, the premises system(s), equipment, or device(s) 35 can also be or can also include a camera, a video recording device, and/or photographing or video recording equipment.

In a preferred embodiment, any video recording device(s) or equipment or camera(s) has associated therewith a transceiver or transmitter/receiver system for transmitting video images or pictures recorded or taken by the video recording device(s) or camera(s) to the user or operator and for receiving signals such as, for example, control signals, by which the user or operator can exercise control over the video recording device(s) or camera(s).

The video recording device(s) or camera(s) can be located at any location on, in, or at, the interior of the premises, on an exterior of the premises, or at any suitable location at, on, or in the vicinity of the premises so as to take a picture(s), or record video or video information, at, near, or in the vicinity of the premises. The video recording device(s) or camera(s) can have wide angle lenses for maximum angular viewing and can also be pivotable and/or movable. The video device(s) or camera(s) can be moveable along a track or other guiding device or element so that the respective video recording device or camera can be moved along the premises interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions can be provided.

In a preferred embodiment, the premises system(s), equipment, or device(s) can also be or can also include audio recording equipment, which can include an audio recording device(s) or equipment, a microphone, and/or a tape recorder. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator can exercise control over the audio recording device(s).

The audio recording device(s) can be located at any location on the interior of the premises, on an exterior of the premises, or at, near, or in the vicinity of the premises, or at any suitable location, so as to record audio or audio information at, near, or in the vicinity of the premises. The audio recording device(s) can also be pivotable and/or movable. The audio recording device(s) and/or microphone(s) can be moveable along a track or other guiding device or element so that the respective audio recording device or microphone can be moved along the premises interior or exterior or in the vicinity of the premises. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

The premises system(s), equipment, or device(s) 35 can also be or can also include an intercom system or device, a communication device, a radio, a television, an entertainment device, a two-way radio, a telephone, a cellular or digital telephone, a video conferencing device(s) and/or equipment for enabling the premises occupants and/or individuals inside the premises, outside the premises, and/or in the vicinity of the premises, to engage in and/or partake in conversations, communications, and/or video conferences and/or video conferencing with others via a communication network.

The premises system(s), equipment, or device(s) 35 can also be or can also include a premises battery or batteries, a premises fuel cell or fuel cells, battery monitoring equipment, a battery charge level monitoring device or measuring device, a fuel cell output monitoring device or measuring device, a fuel cell fuel supply monitoring device or measuring device, fuel cell temperature measuring device or monitoring device, a fuel cell by-product (i.e. water or other by-product, heat, etc.) measuring device or monitoring device, a fuel cell output measuring device or monitoring device (i.e. voltmeter, ammeter, current measure, power meter, etc.), a electrical generator, an alternator, an electrical energy usage measuring device, a premises data recorder and/or a premises or premises systems, equipment, or devices operation data recorder, a radar system, an emergency oxygen control and/or monitoring device, an emergency oxygen deployment detection device, a premises control console display device, a gun or a weapon system, an electronic warfare system, a threat detection system, a radiation detection system, a radiation level detection or monitoring system, a carbon monoxide detection system, a carbon monoxide level detection or monitoring system, a biological hazard detection system, a biological weapon detection system, and/or a fire control system.

The premises system(s), equipment, or device(s) 35 can also be or can also include a monitoring device(s) for reading and/or for monitoring the status and/or condition of any of the premises fuel supply, water and/or coolant supply, electrical generator and/or alternator operation, battery charge level, fuel cell electrical power output, fuel cell fuel supply level, fuel cell operating temperature, fuel cell by-product output level, and/or premises or premises system, equipment, or device, temperature level and/or any other premises operation and/or system function and/or premises equipment system(s) operating status and/or condition for any premises system(s), equipment, or device(s) 35. The premises system(s), equipment, or device(s) 35 can also be or can also include a monitoring device(s) for detecting a malfunction, state of disrepair, or operation or operating failure or any other failure of, in, or regarding, the premises and/or any of the premises system(s), equipment, or device(s) 35 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The premises system(s), equipment, or device(s) 35 can also be or can also include a monitoring device(s) for detecting a use of any of the premises system(s), equipment, or device(s) 35 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The premises system(s), equipment, or device(s) 35 can also be or can also include a monitoring device(s) for detecting a use of the premises, an authorized and/or an unauthorized access of, or entry into or onto, the premises, a theft of the premises, or any other occurrence which would warrant providing notice to a user or operator. The monitoring device(s), in a preferred embodiment, can also have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The premises system(s), equipment, or device(s) 35 can also be or can also include a diagnostic device(s) for diagnosing any malfunction, state of disrepair, or operation or operating failure of any other failure of, in, or regarding, the premises and/or any of the premises system(s), equipment, or device(s) 35 described herein. The diagnostic device(s), in a preferred embodiment, can have associated therewith a transceiver or transmitter/receiver system for transmitting diagnostic data and/or information to the user or operator and for receiving signals such as, for example, control signals by which the user or operator can exercise control over the diagnostic device(s).

The premises system(s), equipment, or device(s) 35 can also be or can also include a monitoring device(s) for detecting any event such as, but not limited to, a use of, an accessing of, an unauthorized use of, or an unauthorized accessing of, or a theft of, or an accident involving, the premises and/or any of the premises system(s), equipment, or device(s) 35 described herein. The monitoring device(s), in a preferred embodiment, can have associated therewith a transceiver or transmitter/receiver system for transmitting data and/or information regarding the event and any data and/or information detected, recorded, and/or read by, the monitoring device(s) to the user or operator and for receiving signals such as, for example, control signals, by which the user or operator can exercise control over the monitoring device(s).

The premises system(s), equipment, or device(s) 35 can also be or can also include a monitoring device(s) for reading and/or for monitoring the status and/or condition of any of the premises fuel supply, water supply, water quality, air quality. electrical generator and/or alternator operation, water usage, heat and/or air conditioning usage, electricity usage, gas and/or oil or other fuel usage, battery charge level, electrical system charge level, fuel cell electrical power output, fuel cell fuel supply level, fuel cell operating temperature, fuel cell by-product output level, telephone usage and charges, television usage, utilities usage, and/or appliance usage, and/or a premises control system and/or any other system or device(s) for monitoring premises or premises system(s), equipment, or device(s) 35 operation, functioning, and/or operating status and/or condition. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The premises system(s), equipment, or device(s) 35 can also be or can also include communication devices, two-way radios, emergency and/or distress signal equipment, and any electrical, electronic and/or otherwise activated appliances and/or equipment which can be utilized in or at the premises. The premises system(s), equipment, or device(s) 35 can also be or can also include electrical and/or electronically controlled dead bolt locking devices for use on doors, windows, and/or in conjunction with any other opening components and/or components for gaining access to various locations on and/or in, and/or any systems, devices, and/or components of, the premises. The premises system(s), equipment, or device(s) 35 can also be or can also include a premises automatic control device or premises automatic control system which can be utilized to control and/or monitor any one or more of the herein-described premises system(s), equipment, or device(s) 35 automatically. In this manner, the premises automatic control device or premises automatic control system can automatically control and/or monitor the operation of any one or more of the premises system(s), equipment, or device(s) 35 described herein. The premises automatic control device or the premises automatic control system can also control and/or monitor any and/or all of the systems, electrical systems, electronic systems, mechanical systems, hydraulic systems, pneumatic systems, appliances, components, and/or devices, of the premises.

In any and/or all of the embodiments described herein, the premises automatic control device or the premises automatic control system can be programmed to operate and/or to control and/or monitor the operation of the premises and/or any of the premises system(s), equipment, or device(s) 35 described herein. The premises automatic control device or the premises automatic control system can utilize a pre-stored program to control the operation of the premises and/or any of the premises system(s), equipment, or device(s) 35 described herein. A user can also upload a program to the premises automatic control device or the premises automatic control system during the operation or use of the apparatus 100 of the present invention.

The premises system(s), equipment, or device(s) 35 can also be or can also include a noise cancellation device or noise cancellation system for eliminating noise in or about the premises, a color video camera, an acoustic sensor or acoustic sensing device, a door sensing device which can be utilized to sense an open state or a closed state of a door or doors, a motion sensor or a motion detection device or system for detecting the motion or movement inside the premises, outside the premises, and/or in the vicinity of the premises, and/or a window opening or closing sensing device which can be utilized to sense an open state or a closed state of a window or windows.

The premises system(s), equipment, or device(s) 35 can also be or can also include a power "on" sensor and/or a power "off" sensor or a power "on" sensing device for sensing a power "on" condition and/or a power "off" sensing device for sensing a power "off" condition for any of the premises system(s), equipment, or device(s) 35 described herein.

The premises system(s), equipment, or device(s) 35 can also be or can also include a thermometer or temperature sensor or temperature sensing device and/or a water sensor or a water sensing device, a well water pump or pumping device, and/or a water pump or water pumping device for pumping water out of the premises.

The premises system(s), equipment, or device(s) 35 can also be or can also include hydraulic and/or pneumatic equipment and/or other equipment, including winches, etc, which can be remotely activated as described herein. The premises system(s), equipment, or device(s) 35 can also be or can also include a system(s) or device(s) systems for detecting a failure(s), malfunction(s), or state(s) of disrepair, in any of the herein-described premises system(s), equipment, or device(s) 35 and for reporting such failure(s), malfunction(s), or state(s) of disrepair to the user or operator whether or not he or she is in or at the premises and/or for reporting same to the premises computer 30, the central processing computer 10, and/or the communication device 60.

The premises system(s), equipment, or device(s) 35 can also be or can also include a premises command computer which is utilized to control and/or to monitor any of the premises system(s), equipment, or device(s) 35. The command computer can control and/or monitor any of the herein-described premises system(s), equipment, or device(s) 35 which can be controlled and/or monitored by the premises command computer. The premises command computer can transmit control signals and/or status request signals to any of the herein-described premises system(s), equipment, or device(s) 35 so as to respectively control and/or monitor the operating status and/or condition of the respective premises system(s), equipment, or device(s) 35. The premises command computer can also receive signals from the respective premises system(s), equipment, or device(s) 35, with said signals containing data and/or information concerning the operating status, operating state, and/or condition, of the respective premises system(s), equipment, or device(s) 35. The premises command computer can also be utilized so as to control, monitor, and/or provide diagnostic information, for any of the premises and/or the premises system(s), equipment, or device(s) 35, which are controlled and/or monitored with or by the premises command computer.

The premises system(s), equipment, or device(s) 35 can also be or can also include wear and/or usage indicators and/or detection devices which can be connected with either the premises computer 30 and/or the central processing computer 10 and which can be utilized so as to monitor the wear and/or usage of any of the herein-described premises system(s), equipment, or device(s) 35.

The premises system(s), equipment, or device(s) 35 can also be or can also include commercial equipment, computers and/or data processing equipment, financial transaction processing systems, and/or any computers, computer systems, host computers, transaction processing computers, check imaging computers, check sorting computers, electronic bill pay computers, securities brokerage computers or computers systems, used in banks, brokerage houses, financial institutions, financial intermediaries, and/or insurance companies, any healthcare processing and/or monitoring equipment, systems, and/or devices, healthcare processing computer systems, electronic healthcare record system computers, electronic medical record system computers, telehealth devices, systems, or equipment, industrial equipment, farm equipment, construction equipment, drilling equipment, mining equipment, excavating equipment, and/or other commercial equipment, loading and/or unloading mechanisms, cutting mechanisms, bailing mechanisms, winches, hydraulic equipment, excavation equipment, mining equipment, assembly line equipment, assembly equipment, industrial robotic equipment, mass production equipment, and/or any other system(s), equipment, or device(s), which can be utilized in or in connection with any premises, residential premises, commercial premises, or any other type or kind of premises.

In the case of a mobile premises, the premises system(s), equipment, or device(s) 35 can also be or can also include a global positioning device or global positioning system (GPS) and/or a position and locating device which can be utilized in order to determine the position and/or location of the mobile premises and/or in order to track the mobile premises. The global positioning device or global positioning system (GPS) and/or a position and locating device also has associated therewith a transmitter(s) for transmitting position and/or location data and/or information to user, operator and/or authorized individual.

The premises system(s), equipment, and/or device(s) 35 can also be or can also include any of the vehicle system(s), equipment, or device(s) 45 identified herein and/or which can also be adapted for or utilized in or in connection with any premises. The premises system(s), equipment, and/or device(s) 35 can also be or can also include any of the articles identified herein. The premises system(s), equipment, and/or device(s) 35 can also be or can also include any system, equipment, or device that can be controlled, activated, de-activated, enabled, disable, and/or re-enabled, and/or which can be operated, electrically or electronically.

In a preferred embodiment, any of the cameras, video recording devices or video recording equipment can be equipped with wide angle lenses for maximum angle viewing capabilities.

Any and/all of the herein-identified or herein-described premises system(s), equipment, and/or device(s) 35 can also be utilized in connection with any of the herein-identified or herein-described premises, vehicles, or articles.

With reference once again to FIG. 1, the apparatus 100 can also include a vehicle computer 40 which can be assigned to or associated with any vehicle with which the apparatus 100 and method of the present invention can be utilized. In a preferred embodiment, the vehicle computer 40 can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the vehicle computer 40. In a preferred embodiment, the vehicle computer 40 can be utilized to perform any of the control, monitoring, or security, operations, actions, or functions, described herein as being preformed or provided by the apparatus 100 of the present invention in controlling, monitoring, or providing security for or regarding any of the herein-described vehicle and/or any of the herein-described systems, equipment, devices, or components, of or associated with, or located at, a respective vehicle.

In a preferred embodiment, the vehicle can be, and the term "vehicle" means, any automobile, car, truck, sport utility vehicle, crossover vehicle, bus, school bus, truck, train, subway train, trolley, tractor trailer, mass transportation vehicle, tractor trailer, construction equipment, equipment, mobile structure, mobile and/or moveable industrial and/or commercial and/or equipment, structure and/or work platform, mining equipment, drilling equipment, drilling platform, farm equipment, tractor, commercial vehicle, recreational vehicle, motorcycle, motor home and/or mobile home, personal vehicle, commercial vehicle, military vehicle, tank, construction vehicle or equipment vehicle, recreational vehicle, all terrain vehicle or ATV, snowmobile, scooter, hot-air balloon, jetski, go-cart, moped, motorcycle, motor scooter, motorized bicycle, mini-bike, boat, marine vessel, cargo ship, cruise ship, ferry boat, submarine, naval or military boat or marine craft, motor boat, sailboat, airplane, aircraft, jet, private aircraft, commercial aircraft, or military aircraft, or hot air balloon, pod, glider, helicopter, drone, space vehicle, spacecraft, space shuttle, or satellite, or any other land, sea or water, air, or space, vehicle, entity or thing, whether manned or unmanned, regardless or type, kind, or size, which can be used to convey an individual or an object or thing from one place or point to another or which can move from one place or point to another. The vehicle can be any private, commercial, or military vehicle.

Any of the above noted vehicles may be manned and/or unmanned and may also include law enforcement and/or military vehicles and/or equipment. The present invention can also be utilized in marine vehicles and/or vessels, boats, ships, aircraft, airplanes, jets, submersible and/or underwater vehicles and/or vessels, space vehicles and/or vessels and satellites, all of which can be manned and/or unmanned. The present invention can also be employed in conjunction with gasoline, diesel, alternate fuel and/or electrically powered and/or propelled vehicles.

In a preferred embodiment, the vehicle computer 40 can be located at, in, or on, the vehicle. In another preferred embodiment, the vehicle computer 40 can be located at a place or location separate and apart from, at a distance from, or remote from, the vehicle.

Any number of vehicle computers 40 can be utilized in conjunction with the apparatus 100 of the present invention. In a preferred embodiment, any vehicle computer 40 can be used in connection or in association any single vehicle. In another preferred embodiment, any vehicle computer 40 can be used in connection with any number of vehicles.

In a preferred embodiment, the vehicle computer 40 is or can be wirelessly or otherwise connected with, linked to, or linked with, the central processing computer 10 or any of the central processing computers 10 which can be utilized in connection with the apparatus 100 of the present invention.

In a preferred embodiment, the vehicle computer 40 is or can also be wirelessly or otherwise connected with, linked to, or linked with, the server computer 20 or any of the server computers 20 which can be utilized in connection with the apparatus 100 of the present invention.

With reference once again to FIG. 1, the apparatus 100 also includes any number, type, or kind, of vehicle system(s), equipment, or device(s) 45 described herein which can be or which can include any vehicle system, equipment, equipment system, device, or component of the vehicle, located at, on, or in, the vehicle, or associated with the vehicle or any system, equipment, equipment system, device, or component, of the vehicle. In a preferred embodiment, any vehicle system, equipment, equipment system, device, or component, can also be any such system, equipment, equipment system, device, or component, which can be controlled by, monitored by, or for which a security function can be provided by or facilitated by the vehicle computer 40, by the central processing computer 10, or the by the apparatus 100 of the present invention or any of the herein-described computers, communications devices or components of same. In a preferred embodiment, any vehicle system, equipment, equipment system, device, or component, can also be any such system, equipment, equipment system, device, or component, which can be electrically, electronically, mechanically, hydraulically, pneumatically, or otherwise, controlled and/or monitored by or using the apparatus 100 of the present invention or any of computers, communication devices, or components of same.

In a preferred embodiment, the vehicle computer 40 can be connected with, linked to, or linked with, each of any of the vehicle system(s), equipment, or device(s) 45 described herein. In a preferred embodiment, the vehicle computer 40 can also be connected directly with or to, directly linked to, or directly linked with, each of any of the vehicle system(s), equipment, or device(s) 45 described herein. In a preferred embodiment, the vehicle computer 40 can also be wirelessly connected with or to, wirelessly linked to, or wirelessly linked with, each of any of the vehicle system(s), equipment, or device(s) 45 described herein. In another preferred embodiment, the vehicle computer 40 can also be connected with, linked with, or to linked to, each of any of the vehicle system(s), equipment, or device(s) 45 described herein via or using an interface device, component, or system.

In a preferred embodiment, the vehicle computer 40 can be utilized to control, monitor, or perform security operations or functions, or security-related operations or functions, for any number, types, or kinds, of vehicle system(s), equipment, or device(s) 45. The vehicle system(s), equipment, or device(s) 45 can be or can include any of the herein-identified or any other system(s), equipment, device(s), component(s), or appliance(s) which can be utilized in, on, at, or in connection with, any of the vehicles identified and/or described herein.

In a preferred embodiment, for any type or kind of vehicle, any vehicle system(s), equipment, or device(s) 45 can be or can include a vehicle command and/or control computer or processor, a vehicle ignition system, a vehicle fuel pump system, a vehicle electrical system, a vehicle exhaust blocking system device for blocking the flow of exhaust gases through the exhaust system, a loud siren or alarm which may be located in the passenger compartment of the motor vehicle, an external or interior siren or alarm, a horn, a vehicle external, exterior, internal, and/or interior, light system(s), vehicle head lights, tail lights or flashers, a power door lock system, a hood or engine compartment locking system, such as a mechanical hood locking system, "smart" windows which turn opaque and/or darker depending upon interior lighting, a thermostat, an air conditioner system, a heating system, an anti-theft system, a vehicle recovery system or device, a homing and/or a tracking device or system, a global positioning system (GPS) or device, a collision avoidance system, a parking assist system, a navigation system, a video monitor, a computer display system or a video monitoring monitor or display device, an autopilot system, a cruise control system or a propulsion control system, an electrical or electronic braking system, an electrical or electronic steering system, a navigation system, a guidance system, a camera, a video recording device, and/or photographing or video recording equipment, a video recording device and/or a camera.

The vehicle system(s), equipment, or device(s) 45 can also be or can also include a telephone, a telephone answering machine, and/or a telephone caller identification system The vehicle system(s), equipment, or device(s) 45 can also be or can also include an elevator, an escalator, a conveyor belt system, a central vacuum system, a vacuum system, a climate control system, a hot tub, Jacuzzi, a sauna, a steam room, fitness equipment, exercise equipment, an air filtration system, an air freshener system, a water filtration system, a water purification system, a speaker system, a public address system, an energy management system.

In a preferred embodiment, the vehicle system(s), equipment, or device(s) 45 can also be or can also include a camera, a video recording device, and/or photographing or video recording equipment.

In a preferred embodiment, any video recording device(s) or equipment or camera(s) has associated therewith a transceiver or transmitter/receiver system for transmitting video images or pictures recorded or taken by the video recording device(s) or camera(s) to the user or operator and for receiving signals such as, for example, control signals, by which the user or operator can exercise control over the video recording device(s) or camera(s).

The video recording device(s) or camera(s) can be located at any location on the interior of the vehicle such as, for example, in the dashboard of the vehicle so that the user or operator, or any other authorized individual, can observe and/or photograph the driver of the vehicle, or the occupants and/or cargo of the vehicle. The video recording(s) or camera(s) can also be located on the vehicle exterior so as to record video information at or from the exterior of the vehicle and/or in the vicinity of the vehicle. The video recording device(s) or camera(s) can have wide angle lenses for maximum angular viewing and can also be pivotable and/or movable. The video device(s) or camera(s) can be moveable along a track or other guiding device or element so that the respective video recording device or camera can be moved along the vehicle interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions can be provided.

In a preferred embodiment, for any type or kind of vehicle, any vehicle system(s), equipment, or device(s) 45 can also be or can also include audio recording equipment, which can include audio recording device(s) or equipment, microphones, and/or tape recorders. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator can exercise control over the audio recording device(s).

The audio recording device(s) can be located at any location on the interior and/or exterior of the vehicle so that the user or operator, or any other authorized individual, may hear what is transpiring, and/or what has transpired, inside and/or outside the vehicle or in the vicinity of the vehicle. The audio recording device(s) can also be pivotable and/or movable. The audio recording device(s) and/or microphone(s) can be moveable along a track or other guiding device or element so that the respective audio recording device or microphone can be moved along the vehicle interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

In a preferred embodiment, for any type or kind of vehicle, any vehicle system(s), equipment, or device(s) 45 can also be or can also include an intercom system or device or telephone, cellular, digital or otherwise, for providing a means by which to allow the user or operator, or other authorized operator, to communicate with the operator and/or occupants of the vehicle over a designated communication line. The vehicle system(s), equipment, or device(s) 45 can also be or can include video conferencing devices and/or equipment for enabling the vehicle occupants and/or individuals inside the vehicle, outside the vehicle, and/or in the vicinity of the vehicle, to engage in and/or partake in video conferences and/or video conferencing with others via a communication network.

The vehicle system(s), equipment, or device(s) 45 can also be or can also include a vehicle battery or batteries, a vehicle fuel cell or fuel cells, battery monitoring equipment, a battery charge level monitoring device or measuring device, a fuel cell output monitoring device or measuring device, a fuel cell fuel supply monitoring device or measuring device, fuel cell temperature measuring device or monitoring device, a fuel cell by-product (i.e. water or other by-product, heat, etc.) measuring device or monitoring device, a fuel cell output measuring device or monitoring device (i.e. voltmeter, ammeter, current measure, power meter, etc.), a generator, an alternator, an electrical energy usage measuring device, an air bag deployment device, an air bag deployment detection device, a vehicle dashboard display device, a gyroscope for measuring vehicle pitch, roll, yaw, or attitude, a gyrocompass for measuring direction of travel, a vehicle data recorder and/or a vehicle operation data recorder, a navigation system, a navigation control and/or monitoring system, an automatic pilot, a radar system, a vehicle voice recorder, a vehicle voice recorder control and/or monitoring device, an emergency oxygen control and/or monitoring device, an emergency oxygen deployment detection device, an air bag deployment device, an air bag deployment detection device, a vehicle control console display device, a gun or a weapon system, an electronic warfare system, a threat detection system, a radiation detection system, a radiation level detection or monitoring system, a carbon monoxide detection system, a carbon monoxide level detection or monitoring system, a biological hazard detection system, a biological weapon detection system, and/or a fire control system.

The vehicle system(s), equipment, or device(s) 45 can also be or can also include a monitoring device(s) for reading and/or for monitoring the status and/or condition of any of the vehicle fuel supply, water and/or coolant supply, electrical generator and/or alternator operation, battery charge level, fuel cell electrical power output, fuel cell fuel supply level, fuel cell operating temperature, fuel cell by-product output level, and/or engine temperature level and/or any other vehicle operation and/or system function and/or vehicle equipment system(s) operating status and/or condition for any vehicle system(s), equipment, or device(s) 45. The vehicle system(s), equipment, or device(s) 45 can also be or can also include a monitoring device(s) for detecting a malfunction, state of disrepair, or operation or operating failure or any other failure of, in, or regarding, the vehicle and/or any of the vehicle system(s), equipment, or device(s) 45 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle system(s), equipment, or device(s) 45 can also be or can also include a monitoring device(s) for detecting a use of any of the vehicle system(s), equipment, or device(s) 45 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle system(s), equipment, or device(s) 45 can also be or can also include a monitoring device(s) for detecting a use of the vehicle, an authorized and/or an unauthorized access of, or entry into or onto, the vehicle, a theft of the vehicle, or any other occurrence which would warrant providing notice to a user or operator. The monitoring device(s), in a preferred embodiment, can also have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle system(s), equipment, or device(s) 45 can also be or can also include a diagnostic device(s) for diagnosing any malfunction, state of disrepair, or operation or operating failure of any other failure of, in, or regarding, the vehicle and/or any of the vehicle system(s), equipment, or device(s) 45 described herein. The diagnostic device(s), in a preferred embodiment, can have associated therewith a transceiver or transmitter/receiver system for transmitting diagnostic data and/or information to the user or operator and for receiving signals such as, for example, control signals by which the user or operator can exercise control over the diagnostic device(s).

The vehicle system(s), equipment, or device(s) 45 can also be or can also include a monitoring device(s) for detecting any event such as, but not limited to, a use of, an accessing of, an unauthorized use of, or an unauthorized accessing of, or a theft of, or an accident involving, the vehicle and/or any of the vehicle system(s), equipment, or device(s) 45 described herein. The monitoring device(s), in a preferred embodiment, can have associated therewith a transceiver or transmitter/receiver system for transmitting data and/or information regarding the event and any data and/or information detected, recorded, and/or read by, the monitoring device(s) to the user or operator and for receiving signals such as, for example, control signals, by which the user or operator can exercise control over the monitoring device(s).

The vehicle system(s), equipment, or device(s) 45 can also include communication devices, such as two-way radios, radios, televisions, navigational devices and/or equipment, fire extinguishing equipment, radar devices and equipment, emergency and/or distress signal equipment, and any electrical, electronic and/or otherwise activated appliances and/or equipment which can be utilized in a vehicle. Appliances can include household appliances such as refrigerators, stoves, air conditioners, ovens, microwave ovens, lighting systems, etc. The vehicle system(s), equipment, or device(s) 45 can also include electrical and/or electronically controlled dead bolt locking devices for use on doors, windows, hood, trunk and/or in conjunction with any other opening components and/or components for gaining access to various locations on and/or in, and/or any systems, devices, and/or components of, the vehicle.

The vehicle system(s), equipment, or device(s) 45 can also include a wheel and/or brake locking device or mechanism, a hydraulic and/or pneumatic equipment and/or other equipment, including winches, etc, which can be remotely activated as described herein. The vehicle system(s), equipment, or device(s) 45 can also include vehicle communication devices including, but not limited to radios, televisions and entertainment devices, two-way radios, and/or cellular telephones and equipment.

The vehicle system(s), equipment, or device(s) 45 can also include an automatic pilot device or system or any other type or kind of automatic vehicle operating device or system which can be utilized to drive or operate the vehicle automatically and/or to control any one or more of the vehicle's direction of travel or movement, speed of travel or movement, forward movement, reverse movement, vehicle turning or steering, engine operation, directional light signals, side movement, and/or stopping or parking. The automatic pilot device or system can also control or monitor any and/or all of the electrical systems, electronic systems, mechanical systems, and/or hydraulic systems, braking systems of the vehicle. In any and/or all of the embodiments described herein, the automatic pilot device or system can be programmed, at any time, to operate and/or to control the operation of the vehicle. The automatic pilot device or system can utilize a pre-stored travel program to control the travel of the vehicle. A user can also upload a travel program to the automatic pilot device or system during the operation or use of the vehicle and/or the apparatus 100 of the present invention.

In a preferred embodiment, the automatic pilot device or system or any other type or kind of automatic vehicle operating device or system can be utilized in conjunction with a global positioning device, the position and locating device (system), and/or a navigation system with or without a map database, in order to automatically control, move, fly, and/or maneuver, the vehicle from a location to a destination. In the case of an aircraft, a hijacking, an incapacitation of the flight crew and/or any other emergency situation, a cockpit flight controls can be disabled so as to prevent the flying of the airplane by an unauthorized individual. Thereafter, a revised or emergency flight plan can be transmitted to the automatic pilot in order to direct or fly the airplane to an emergency landing location. The revised or emergency flight plan can also include data and/or information regarding the airport or airfield selected for landing as well as a runway code or codes corresponding to the runway selected for landing. The automatic pilot can also automatically transmit a runway code to the tower or other entity associated with the airport or airfield selected for landing.

The vehicle system(s), equipment, or device(s) 45 can also be or can also include a fuel draining system or a fuel dumping system, a noise cancellation device or noise cancellation system, a parachute, a parachute deployment system and/or a vehicle navigation system.

The vehicle system(s), equipment, or device(s) 45 can also be or can also include a color video camera, an acoustic sensor or acoustic sensing device, a door sensing device which can be utilized to sense an open state or a closed state of a door or doors, a motion sensor, a motion detection device or system, and/or a window opening or closing sensing device which can be utilized to sense an open state or a closed state of a window or windows.

The vehicle system(s), equipment, or device(s) 45 can also be or can also include a power "on" sensor and/or a power "off" sensor or a power "on" sensing device for sensing a power "on" condition and/or a power "off" sensing device for sensing a power "off" condition for any of the vehicle system(s), equipment, or device(s) 45 described herein.

The vehicle system(s), equipment, or device(s) 45 can also be or can also include a temperature sensor or temperature sensing device and/or a water sensor or a water sensing device. The vehicle system(s), equipment, or device(s) 45 can also include a water pump or water pumping device for pumping water out of the vehicle.

The vehicle system(s), equipment, or device(s) 45 can also be or can also include a motion sensor for detection the motion or movement of individuals or objects inside the vehicle, outside the vehicle, and/or in the vicinity of the vehicle.

The vehicle system(s), equipment, or device(s) 45 can also be or can also include systems for detecting failures in any of the herein-described vehicle system(s), equipment, or device(s) 45 and which also report such failure(s) to the user or operator whether he or she is operating the vehicle or is not in the vehicle and/or for reporting such failures to a central office.

The vehicle system(s), equipment, or device(s) 45 can also be or can also include vehicle command computer which is utilized to control and/or to the various electronic, electrical, mechanical, and/or electromechanical systems, components, devices, of the vehicle. The command computer can control and/or monitor any of the systems, components, and/or devices, of the vehicle, including, but not limited to, the ignition system, the fuel system, fuel injection system, electrical systems for ignition, lights, horn, door locks, exhaust system, windows, fuel pump, oil pump, engine timing device, battery, fuel cells, fuel supply device, video recording equipment, audio recording equipment, vehicle integrated positioning device, tire pressure indicator, and/or any other system, device, or component which can be controlled and/or monitored by the command computer and/or any of the vehicle system(s), equipment, or device(s) 45 described herein.

In a preferred embodiment, any vehicle command computer can transmit control signals and/or status request signals to any of the herein-described vehicle system(s), equipment, or device(s) 45 so as to respectively control and/or monitor the operating status and/or condition of the respective vehicle system(s), equipment, or device(s) 45. The vehicle command computer can also receive signals from the respective vehicle system(s), equipment, or device(s) 45, with said signals containing data and/or information concerning the operating status, operating state, and/or condition, of the respective vehicle system(s), equipment, or device(s) 45. The vehicle command computer can be utilized so as to control, monitor, and/or provide diagnostic information for any of the vehicle system(s), equipment, or device(s) 45, which are controlled and/or monitored with the vehicle command computer.

The vehicle system(s), equipment, or device(s) 45 can also be or can also include wear and/or tear and/or usage indicators and/or detection devices which can be connected with either the vehicle command computer, the vehicle computer 40, and/or the central processing computer 10 and which can also be utilized so as to monitor the wear and/or tear and/or usage of any of the herein-described vehicle system(s), equipment, or device(s) 45. The vehicle system(s), equipment, or device(s) 45 can also be or can also include a tire pressure monitoring system.

The vehicle system(s), equipment, or device(s) 45 can also be or can also include automatic control devices for controlling and/or monitoring vehicle systems and/or devices for vehicle movement and/or motion, such as, but not limited to, vehicle transmission system for controlling vehicle forward and/or reverse direction of movement, vehicle acceleration system for controlling speed of movement, vehicle braking system for controlling vehicle braking, vehicle steering system for steering the vehicle, and/or any other system and/or component for controlling and/or for effecting remote-control over the movement and/or the motion of the vehicle.

The vehicle system(s), equipment, or device(s) 45 can also be or can also include a guidance system. The vehicle system(s), equipment, or device(s) 45 can also be or can also include a monitoring device or monitoring system for measuring and/or monitoring any one or more of vehicle attitude, pitch, roll, yaw, speed, erratic movement, sudden movement in any direction, sudden movement or jolts in any direction inconsistent with normal or expected movement or operation and/or for detecting a collision of, with, or involving the vehicle. The monitoring device or monitoring system can detect sudden changes in normal vehicle operation, abnormal vehicle behavior, abnormal or erratic vehicle behavior (i.e. an intentional or an accidental crashing or collision of or involving the vehicle, accidental loss of control, deviation from an expected course of travel, etc.), and/or a loss of control condition. The monitoring device or monitoring system can detect sudden change(s) in vehicle movement, erratic behavior, and/or abnormal behavior, and generate and transmit a signal to any one or more of the vehicle computer 40, the central processing computer 10, the server computer 20, and/or the communication device 60 to alert an authorized user of the sudden change(s) in vehicle movement, erratic behavior, and/or abnormal behavior. A user or operator can also take control of the vehicle from a remote location via the communication device 60, the central processing computer 10 and/or the vehicle computer 40.

The vehicle system(s), equipment, or device(s) 45 can also be or can also include a computer, a notebook computer, a laptop computer, a tablet, a tablet computer, a cellular telephone, a smart phone or Smartphone, a personal digital assistant, a digital camera, or a data processing device or any data processing equipment, computers, and/or peripherals, or a healthcare monitoring device or healthcare equipment which can be used to monitor an individual or patient.

In the case of commercial, industrial, and/or farm and/or construction equipment, drilling equipment, mining equipment, excavating equipment, and/or other commercial equipment, the vehicle system(s), equipment, or device(s) 45 can also be or can also include loading and/or unloading mechanisms, cutting mechanisms, bailing mechanisms, winches, and/or any and all of the various systems and devices utilized in conjunction with these vehicles and/or equipment.

The vehicle system(s), equipment, or device(s) 45 can also be or can also include a gun, a weapon or a weapon system, a shot detection system, a self defense system, a radar system, a radar acquisition and/or tracking system, an infra-red acquisition and/or tracking system, a self defense system, an electronic warfare system, a countermeasures system, and/or any other system for defending the vehicle and/or operator and/or occupants.

The vehicle system(s), equipment, or device(s) 45 can also be or can also include any other suitable vehicle system or equipment, device or feature which can be utilized to draw attention to the vehicle and/or in some other way impede the vehicle theft. The vehicle system(s), equipment, or device(s) 45 can also be or can also include a vehicle position and locating device which can be utilized in order to determine the position and/or the location of the vehicle. The vehicle position and locating device can be utilized so as to determine the position of the vehicle anywhere in the World and can provide for the transmission of vehicle position and/or location data to any appropriate system receiver so that the vehicle can be located and/or tracked and recovered. In the preferred embodiment, the vehicle position and locating device includes and utilizes a global positioning device and an associated transmitter for transmitting position and/or location data to the authorized user or operator and/or to an authorized office or agency authorized to receive and/or to monitor such data transmissions.

The vehicle system(s), equipment, or device(s) 45 can also be or can also include a vehicle operating data recorder, a vehicle data monitoring device, or a vehicle operation data monitoring device and/or recorder which can record operating data and/or information for a vehicle. In a preferred embodiment, the vehicle operating data recorder, the vehicle data monitoring device, or the vehicle operation data monitoring device and/or recorder, can perform the same functions as a flight data recorder or a "black box" which is used in an aircraft. The vehicle system(s), equipment, or device(s) 45 can also be or can also include a vehicle voice recorder for recording voices, conversations, and/or other sounds in or at the vehicle. In a preferred embodiment, the vehicle voice recorder can perform the same functions as a "cockpit voice recorder" which is used in an aircraft.

The vehicle system(s), equipment, or device(s) 45 can also be or can also include an automatic control device for controlling and/or monitoring vehicle movement and/or motion, transmission system for controlling vehicle forward and/or reverse direction of movement, acceleration system for controlling vehicle speed of movement, braking system for controlling vehicle braking, vehicle steering system for steering the vehicle, and/or any other system and/or component for controlling and/or for effecting remote-control over the movement and/or the motion of the vehicle, an automatic pilot system for controlling direction of travel or movement, speed of travel or movement, forward movement, reverse movement, turning or steering, engine operation, directional light signals, side movement, and/or stopping or parking. The vehicle system(s), equipment, or device(s) 45 can also be or can also include a fuel draining system or dumping system, a noise cancellation device or noise cancellation system, a parachute, and/or a parachute deployment system. The vehicle system(s), equipment, or device(s) 45 can also be or can also include a monitoring system or device which can be utilized to monitor vehicle operation, to investigate a malfunction, to diagnosis a malfunction or other problem, to investigate a cause of an accident, and/or for any other purpose.

As noted herein, the apparatus 100 and method of the present invention can also be utilized in connection with a boat or marine vessel of any type or kind an can be any boat, marine vessel, marine vehicle, ship, cruise ship, cargo ship, ferry boat, submarine, a submersible vehicle, any motor powered boat, sailboat, or any other boat or marine vessel, whether manned or unmanned, and regardless of size, shape or form. The boat of marine vessel can be a private, commercial, or military, boar or marine vessel.

In addition to any the herein identified items, systems, equipment, or devices which are identified as being any of the herein-identified vehicle system(s), equipment, or device(s) 45 or premises system(s), equipment, or device(s) 35, which can also be utilized in connection with any of the herein-described boats or marine vessels, the vehicle system(s), equipment, or device(s) 45 can also be or can also include a boat ignition system, a boat fuel pump system, a boat electrical system, a power door or hatch locking system, an electronic and/or electrical dead bolt locking device, an engine compartment locking device, an electrical and/or mechanical locking device, an anti-theft system, a boat recovery system or device, a homing and/or a tracking system, a communication device(s), a two-way radio, a radio, a television, a navigation device and/or navigation equipment, fire extinguishing equipment, a pump or pumping device for pumping water out of the boat, a radar device or radar equipment, emergency and/or distress signal equipment, a sonar device or sonar equipment, an appliance, any electrical, electronic and/or otherwise activated appliances and/or equipment which can be utilized on a boat, a household appliance, a refrigerator, a stove, an air conditioner, a heater, an oven, a microwave oven, and/or a light or a lighting systems.

The vehicle system(s), equipment, or device(s) 45 can also be or can also include a device or system for detecting a failure, malfunction, or state of disrepair, in any of the herein-identified vehicle system(s), equipment, or device(s) 35 and for reporting said failure to a user or operator of the apparatus 100.

The vehicle system(s), equipment, or device(s) 45 can also be or can also include a camera or video recording device or equipment, a transceiver or transmitter/receiver system associated with the camera or video recording device, for transmitting pictures or video images recorded by the camera or video recording device to the user or operator and for receiving signals such as, for example, control signals, by which the user or operator can exercise control over the camera or video recording device, a microphone or audio recording equipment, a tape recorder or a digital audio recording device, and/or a transceiver or transmitter/receiver system for transmitting the recorded audio to the user or operator and for receiving signals such as, for example, control signals, by which the user or operator can exercise control over the audio recording device(s).

A camera, video recording device, microphone, or audio recording device, can be located on or at any location on the boat's or marine vessel's interior and/or exterior and can be pivotable and/or movable. The camera, video recording device, microphone, or audio recording device can be moveable along a track or other guiding device or element so that the respective camera, video recording device, microphone, or audio recording device can be moved along the boat interior or exterior.

The vehicle system(s), equipment, or device(s) 45 can also be or can also include an intercom system or device or telephone, cellular, digital or otherwise for providing a means by which to allow the user or operator, or other authorized operator, to communicate with the operator and/or occupants of the boat. The vehicle system(s), equipment, or device(s) 45 can also be or can also include video conferencing devices and/or equipment for enabling the boat occupants and/or individuals inside the boat, outside the boat, and/or in the vicinity of the boat, to engage in and/or partake in video conferences and/or video conferencing with others via a communication network.

The vehicle system(s), equipment, or device(s) 45 can also be or can also include a boat or marine vessel battery or batteries, a fuel cell or fuel cells, a battery monitoring equipment, a battery charge level measuring device, a fuel cell output measuring device, a fuel cell fuel supply measuring device, a fuel cell temperature measuring device, a fuel cell by-product (i.e. water or other by-product, heat, etc.) measuring device, a fuel cell output measuring device (i.e. voltmeter, ammeter, current measure, power meter, etc.), a rudder, a rudder control and/or monitoring device, a depth sounding device and/or depth sounding control and/or monitoring device, a propeller or propulsion system or device, a navigation system, a navigation control and/or monitoring system, an automatic pilot, a radar system, a global positioning system (GPS) or device, a collision avoidance system, an autopilot system, a cruise control system or a propulsion control system, a sonar system, boat or marine vessel data recorder, a boat or marine data recorder control and/or monitoring device, a boat or marine cockpit voice recorder, a boat or marine cockpit voice recorder control and/or monitoring device, an emergency oxygen control and/or monitoring device, an emergency oxygen deployment detection device, an air bag deployment device, an air bag deployment detection device, a boat dashboard or control console display device, a gyroscope for measuring boat pitch, roll, yaw, or attitude, a gyrocompass for measuring direction of travel, a boat or marine vessel data recorder and/or a boat or marine vessel operation data recorder.

The vehicle system(s), equipment, or device(s) 45 can also be or can also include a monitoring device(s) for reading and/or monitoring the status and/or condition of any of the boat or marine vessel fuel supply, water and/or coolant supply, electrical generator and/or alternator operation, battery charge level, fuel cell electrical power output, fuel cell fuel supply level, fuel cell operating temperature, fuel cell by-product output level, and/or engine or motor temperature level, marine control system and/or any other boat operation and/or system function and/or boat equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle system(s), equipment, or device(s) 45 can also be or can also include a communication device, a two-way radio, a radio, a television, a navigation devices and/or equipment, fire extinguishing equipment, a radar device or equipment, an emergency and/or distress signal equipment, and/or any electrical, electronic and/or otherwise activated appliances and/or equipment which can be utilized in or on a boat or marine vessel. Appliances can include household appliances such as refrigerators, stoves, air conditioners, ovens, microwave ovens, heating systems, climate control systems, and/or lighting systems. The vehicle system(s), equipment, or device(s) 45 can also be or can also include electrical and/or electronically controlled dead bolt locking devices for use on doors, windows, and/or in conjunction with any other opening components and/or components for gaining access to various locations and/or in, and/or any systems, devices, and/or components of, the boat or marine vessel.

The vehicle system(s), equipment, or device(s) 45 can also be or can also include a automatic pilot device which can be utilized to drive the boat or marine vessel automatically and/or to control any one or more of the boat's or marine vessel's direction of travel or movement, speed of travel or movement, forward movement, reverse movement, turning or steering, engine operation, directional light signals, side movement, and/or stopping or parking. The automatic pilot can also control or monitor any and/or all of the electrical systems, electronic systems, mechanical systems, hydraulic systems, braking systems, etc., of the boat or marine vessel and/or any of the vehicle system(s), equipment, or device(s) 45. In any and/or all of the embodiments described herein the automatic pilot can be programmed to operate and/or to control the operation of the boat or marine vessel. The automatic pilot can utilize a pre-stored travel program to control the travel of the boat or marine vessel. A user can also upload a travel program to the automatic pilot during the operation or use of the present invention.

The vehicle system(s), equipment, or device(s) 45 can also be or can also include a fuel draining system or dumping system, a noise cancellation device or noise cancellation system, a parachute, a parachute deployment system and/or a boat or marine vessel navigation system. The vehicle system(s), equipment, or device(s) 45 can also be or can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The vehicle system(s), equipment, or device(s) 45 can also be or can also include a power "on" sensor or power "on" sensing device for sensing a power "on" condition for any of the vehicle system(s), equipment, or device(s) 45. The vehicle system(s), equipment, or device(s) 45 can also include a power "off" sensor or power "off" sensing device for sensing a power "off" condition for any of the vehicle system(s), equipment, or device(s) 45.

The vehicle system(s), equipment, or device(s) 45 can also be or can also include a temperature sensor or temperature sensing device, a water sensor or a water sensing device, a water pump or water pumping device for pumping water out of the boat or marine vessel, and/or a motion sensor for detection the motion or movement of individuals or objects inside the boat or marine vessel, outside the boat or marine vessel, and/or in the vicinity of the boat or marine vessel.

The vehicle system(s), equipment, or device(s) 45 can also be or can also include locks for preventing use and/or access to various locations, systems, devices, and/or components of the boat or marine vessel, hydraulic and/or pneumatic equipment and/or other equipment, including winches, etc, which can be remotely activated as described herein, and/or boat or marine vessel communication devices including, but not limited to radios, televisions and entertainment devices, two-way radios, cellular telephones and/or equipment. The vehicle system(s), equipment, or device(s) 45 can also be or can also include systems for detecting failures in any of the above, or any other, equipment systems and for reporting such failure(s) to the user or operator whether or not he or she is operating the boat or marine vessel or is otherwise on the boat or marine vessel and/or for reporting such failures to a central office.

The vehicle system(s), equipment, or device(s) 45 can also be or can also include a boat or marine vessel command computer which is utilized to control and/or to the various electronic, electrical, mechanical, and/or electromechanical systems, components, devices, of the boat or marine vessel and which can control and/or monitor any of the vehicle system(s), equipment, or device(s) 45, of the boat or marine vessel, including, but not limited to, the ignition system, the fuel system, fuel injection system, electrical systems for ignition, lights, horn, door locks, exhaust system, windows, fuel pump, oil pump, engine timing device, battery, fuel cells, fuel supply device, video recording equipment, audio recording equipment, boat or marine vessel integrated positioning device, and/or any other system, device, or component which can be controlled and/or monitored by the command computer.

In a preferred embodiment, boat or marine vessel command computer can transmit control signals and/or status request signals to any of the herein-described vehicle system(s), equipment, or device(s) 45 so as to respectively control and/or monitor the operating status and/or condition of same. The command computer can also receive signals from the respective vehicle system(s), equipment, or device(s) 45, with said signals containing data and/or information concerning the operating status, operating state, and/or condition, of the respective vehicle system(s), equipment, or device(s) 45. The command computer can also be utilized so as to control, monitor, and/or provide, diagnostic information for any of the vehicle system(s), equipment, or device(s) 45 which are controlled and/or monitored with the command computer.

The vehicle system(s), equipment, or device(s) 45 can also be or can also include wear and/or usage indicators and/or detection devices which can be connected with either the command computer and/or the central processing computer 10 and which can be utilized so as to monitor the wear and/or usage of any of the herein-described electronic, electrical, mechanical, and/or electro-mechanical, systems, devices, and/or components.

The vehicle system(s), equipment, or device(s) 45 can also be or can also include automatic control devices for controlling and/or monitoring boat or marine vessel systems and/or devices for boat or marine vessel movement and/or motion, such as, but not limited to, boat or marine vessel motor, propeller, and/or transmission system for controlling boat or marine vessel forward and/or reverse direction of movement, boat or marine vessel acceleration system for controlling speed of movement, boat or marine vessel rudder system and/or boat or marine vessel steering system, boat or marine vessel pump system, and/or any other system and/or component for controlling and/or for effecting remote-control over the movement, motion and/or operation of the boat or marine vessel.

The vehicle system(s), equipment, or device(s) 45 can also be or can also include a life boat deployment device or a life boat deployment system and/or a life raft deployment device or a life raft deployment system, and, in the case of commercial equipment, industrial equipment, drilling equipment, mining equipment, excavating equipment, and/or and other commercial equipment, loading and/or unloading mechanisms, cutting mechanisms, bailing mechanisms, winches and/or any and all of the various systems and devices utilized in conjunction with these boats or marine vessels and/or equipment.

The vehicle system(s), equipment, or device(s) 45 can also be or can also include a gun, a weapon or a weapon system, a torpedo system, a fire control system, a shot detection system, a self defense system, a radar system, a radar acquisition and/or tracking system, an infra-red acquisition and/or tracking system, a self defense system, an electronic warfare system, a countermeasures system, a threat detection system, a radiation detection system, a radiation level detection or monitoring system, a carbon monoxide detection system, a carbon monoxide level detection or monitoring system, a biological hazard detection system, a biological weapon detection system, and/or a fire control system, and/or any other system for defending the vehicle and/or operator and/or occupants.

The vehicle system(s), equipment, or device(s) 45 can also be or can also include a boat or marine vessel operation monitoring device or system which can perform the same function or functions as the herein-described vehicle operating data recorder, vehicle data monitoring device, or vehicle operation data monitoring device, and which can monitors boat or marine vessel operation such as boat or marine vessel speed, the status of any of the boat or marine vessel systems (i.e. ignition system, fuel pump system, positioning system), and/or any of the boat or marine vessel equipment systems described herein, direction of travel, attitude of travel, video inside, outside, and/or at, the boat or marine vessel, audio inside, outside, and/or at, the boat or marine vessel, activity inside, outside, and/or at, the boat or marine vessel, and/or any other electrical, mechanical, electro-mechanical, hydraulic, and/or other system, equipment system, device, component, and/or appliance.

The boat or marine vessel operation monitoring device or system can be connected to, and/or linked with, any of the herein-described vehicle system(s), equipment, or device(s) 45, including, but not limited to, speedometer, cruise control device, rudder, gyroscope, gyrocompass, directional light device(s), light system(s), door lock system(s), depth sounding measurement devices, attitude measuring device(s), ignition system, braking system, electronic system(s), hydraulic system(s), video recording device(s) or camera(s), audio recording device(s) or microphone(s), and/or any other vehicle system(s), equipment, or device(s) 45, described herein and/or otherwise, for controlling and/or monitoring the operation of same and/or for monitoring activity at the boat or marine vessel.

The vehicle system(s), equipment, or device(s) 45 can also be or can also include a guidance system, a monitoring device or monitoring system for measuring and/or monitoring any one or more of boat attitude, pitch, roll, yaw, speed, erratic movement, sudden movement in any direction, sudden movement or jolts in any direction inconsistent with normal or expected movement or operation, for detecting sudden changes in normal boat operation, abnormal boat behavior, abnormal or erratic boat behavior (i.e. intentional or unintentional ditching of the boat, loss of control, deviation from an expected course of travel, etc.), and/or a loss of control condition. The monitoring device or monitoring system can detect sudden change(s) in boat movement, erratic behavior, and/or abnormal behavior, and generate and transmit a signal to any one or more of the vehicle computer 40, the central processing computer 10, and/or the communication device 60.

As noted herein, the apparatus 100 and method of the present invention can also be utilized in connection with an aircraft, an airplane, a jet, a helicopter, a drone, a glider, a fighter aircraft, a surveillance aircraft, a spaceship, a spacecraft, a hot air balloon, a space shuttle, a commercial or passenger aircraft, a military aircraft, manned aircraft of any size, type, or kind, unmanned aircraft of any size, type, or kind, and/or a satellite or orbiting space station (hereinafter also referred to as "aircraft").

In addition to any the herein identified items, systems, equipment, or devices which are identified as being any of the herein-identified vehicle system(s), equipment, or device(s) 45 or premises system(s), equipment, or device(s) 35, which can also be utilized in connection with any of the herein-described aircraft, the vehicle system(s), equipment, or device(s) 45 can also be or can also include an aircraft ignition system, propulsion system, fuel pump system or fuel supply system, flight control system, instrumentation system, navigation system, electrical system, exhaust system, climate control system, cabin pressurization system, command computer system, and/or any other system, equipment, or device found in or used in any of the herein-identified aircraft.

The vehicle system(s), equipment, or device(s) 45 can be or can include a loud siren or alarm, which can be located in the cabin, passenger compartment and/or cockpit of the aircraft, an external siren or alarm, a horn, "smart" windows which turn opaque and/or darker depending upon interior lighting, an external light system(s), head lights, tail lights or flashers, a power door or hatch locking system or device, for securing the airplane cabin, passenger compartment and/or cockpit so as to prevent an unauthorized entry thereunto or an exit therefrom, a locking system, such as a mechanical locking system, for preventing an unauthorized access into the aircraft engine compartment, an anti-theft system, an aircraft recovery system or device, a beacon, a flare dispensing system, a homing system and/or a tracking system, landing gear, a cabin and/or interior pressurization system or device, and/or a cabin pressurization control and/or monitoring system and/or device.

The vehicle system(s), equipment, or device(s) 45 can also be or can also include a communication device, a two-way radio, a radio, a television, a navigational device and/or equipment, a fire extinguishing device or equipment, a radar device or equipment, an emergency and/or distress signal device or equipment, a sonar device or equipment, and/or any electrical, electronic and/or otherwise activated appliance and/or equipment which can be utilized on an aircraft. Appliances can include household appliances such as refrigerators, stoves, air conditioners, ovens, microwave ovens, lighting systems, heaters, thermostats, and/o any other appliance.

The vehicle system(s), equipment, or device(s) 45 can also be or can also include a device or system for detecting a failure, a state of disrepair, or a malfunction, in any of the herein described or identified vehicle system(s), equipment, or device(s) 45 and for reporting such failures to the user or operator whether or not he or she is operating the aircraft or is onboard the aircraft and/or for reporting such failure, state of repair, or malfunction, to a central office.

The vehicle system(s), equipment, or device(s) 45 can also be or can also include a camera or video recording device or equipment, a transceiver or transmitter/receiver system associated with the camera or video recording device, for transmitting pictures or video images recorded by the camera or video recording device to the user or operator and for receiving signals such as, for example, control signals, by which the user or operator can exercise control over the camera or video recording device, a microphone or audio recording equipment, a tape recorder or a digital audio recording device, and/or a transceiver or transmitter/receiver system for transmitting the recorded audio to the user or operator and for receiving signals such as, for example, control signals, by which the user or operator can exercise control over the audio recording device(s).

A camera, video recording device, microphone, or audio recording device, can be located on or at any location on the aircraft's interior and/or exterior and can be pivotable and/or movable. The camera, video recording device, microphone, or audio recording device can be moveable along a track or other guiding device or element so that the respective camera, video recording device, microphone, or audio recording device can be moved along the aircraft interior or exterior.

The vehicle system(s), equipment, or device(s) 45 can also be or can also include an intercom system or device or a telephone, cellular, digital, or otherwise, for providing a means by which to allow the user or operator, or other authorized operator, to communicate with the operator and/or occupants of the aircraft, video conferencing devices and/or equipment for enabling the aircraft occupants and/or individuals inside the airplane, outside the airplane, and/or in the vicinity of the airplane, to engage in and/or partake in video conferences and/or video conferencing with others via a communication network.

The vehicle system(s), equipment, or device(s) 45 can also be or can also include the aircraft battery, batteries, or battery system, power supply system, fuel cell or fuel cells, battery monitoring equipment, battery charge level monitoring or measuring equipment, fuel cell output monitoring or measuring equipment, fuel cell fuel supply and/or fuel cell supply monitoring or measuring equipment, fuel cell temperature measuring device, fuel cell by-product (i.e. water or other by-product, heat, etc.) measuring device, fuel cell output measuring device (i.e. voltmeter, ammeter, current measure, power meter, etc.), an aircraft aileron control and/or monitoring device, rudder control and/or monitoring device, horizontal stabilizer control and/or monitoring device, vertical stabilizer control and/or monitoring device, altimeter, landing gear system, emergency landing parachute control and/or monitoring device, emergency parachute deployment control and/or deployment detection device, navigation system, a global positioning system (GPS) or device, a collision avoidance system, an autopilot system, a cruise control system or a propulsion control system, navigation control and/or monitoring system, automatic pilot, radar system, flight data recorder, flight data recorder control and/or monitoring device, cockpit voice recorder, cockpit voice recorder control and/or monitoring device, wing flap control and/or monitoring device, emergency oxygen control and/or monitoring device, emergency oxygen deployment detection device, air bag deployment device, air bag deployment detection device, airplane cockpit or control console display device, gyroscope for measuring airplane pitch, roll, yaw, or attitude, gyrocompass for measuring direction of travel, aircraft data recorder, and/or airplane operation data recorder.

The vehicle system(s), equipment, or device(s) 45 can also be or can also include a instrument landing system and/or a guidance system, flight monitoring device or flight monitoring system for measuring and/or monitoring any one or more of flight attitude, altitude, pitch, roll, yaw, speed, rate of descent, erratic movement, sudden movement in any direction, and/or any sudden movement or jolts in any direction inconsistent with normal or expected flight movement or operation. The flight monitoring device or flight monitoring system can also detect sudden changes in normal flight operation, abnormal flight behavior, abnormal or erratic flight behavior (i.e. intentional or unintentional ditching of the aircraft, loss of control, etc.), and/or a loss of control condition. The flight monitoring device or flight monitoring system can also detect sudden change(s) in aircraft flight, erratic behavior, and/or abnormal behavior, and/or can generate and/or transmit a signal to any one or more of the vehicle computer 40, the central processing computer 10, and/or the communication device 60.

The vehicle system(s), equipment, or device(s) 45 can also be or can also include a navigation device or navigation system which can be programmed to detect when the aircraft is deviating from a pre-established or expected flight plan and which can generate and/or transmit a signal to any one or more of the vehicle computer 40, the central processing computer 10, and/or the communication device 60.

The vehicle system(s), equipment, or device(s) 45 can also be or can also include a monitoring device(s) for reading and/or monitoring the aircraft fuel supply, water and/or coolant supply, electrical generator and/or alternator operation, battery charge level, fuel cell electrical power output, fuel cell fuel supply level, fuel cell operating temperature, fuel cell by-product output level, and/or engine or motor temperature level, aircraft flight control systems and/or any other aircraft operation and/or system function and/or aircraft equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle system(s), equipment, or device(s) 45 can also be or can also include communication devices, two-way radios, radios, televisions, navigational devices and/or equipment, fire extinguishing equipment, radar devices and equipment, emergency and/or distress signal equipment, and/or any electrical, electronic and/or otherwise activated appliances and/or equipment which can be utilized in or on an aircraft. Appliances can include household appliances such as televisions, entertainment devices, refrigerators, stoves, air conditioners, heaters, ovens, microwave ovens, and/or lighting systems, etc. The vehicle system(s), equipment, or device(s) 45 can also be or can also include electrical and/or electronically controlled dead bolt locking devices for use on doors, windows, and/or in conjunction with any other opening components and/or components for gaining access to various locations on and/or in, and/or any systems, devices, and/or components of, the aircraft.

The vehicle system(s), equipment, or device(s) 45 can also be or can also include locks for preventing use and/or access to various locations, systems, devices, and/or components of the aircraft, hydraulic and/or pneumatic equipment and/or other equipment, including hydraulic control devices and/or control systems, and/or winches, etc, which can be remotely activated as described herein.

The vehicle system(s), equipment, or device(s) 45 can also be or can also include an aircraft command computer which is utilized to control and/or monitor various electronic, electrical, mechanical, and/or electromechanical systems, components, devices, of the aircraft, including, but not limited to, the automatic pilot system, the radar system, the lift control system, the control surface system, the ignition system, the engine and/or thrusting system, the braking system, the fuel system, the fuel injection system, the landing gear, the fuel dumping system, and/or any electrical systems for ignition, lights, horn, door locks, exhaust system, windows, fuel pump, oil pump, engine timing device, battery, fuel cells, fuel supply device, video recording equipment, audio recording equipment, airplane integrated positioning device, and/or any other system, device, or component which can be controlled and/or monitored by the aircraft command computer.

The aircraft command computer can transmit control signals, monitoring signals, and/or status request signals, to any of the herein-identified vehicle system(s), equipment, or device(s) 45 so as to respectively control and/or monitor the operating status and/or condition of same. The aircraft command computer can also receive signals from the respective vehicle system(s), equipment, or device(s) 45, with said signals containing data and/or information concerning the operating status, operating state, and/or condition, of same. The aircraft command computer can also be utilized so as to control, monitor, and/or provide diagnostic information for, any of the vehicle system(s), equipment, or device(s) 45, which are controlled and/or monitored by or with the aircraft command computer.

The vehicle system(s), equipment, or device(s) 45 can also be or can also include wear and/or usage indicators and/or detection devices which can be connected with either the aircraft command computer, the vehicle computer 40, and/or the central processing computer 10 and which can be utilized so as to monitor the wear and/or usage of any of the herein-identified vehicle system(s), equipment, or device(s) 45.

The vehicle system(s), equipment, or device(s) 45 can also be or can also include automatic control devices for controlling and/or monitoring aircraft systems and/or devices for aircraft take-off, flight, normal cruising, automatic pilot cruising, landing, airplane movement and/or motion, such as, but not limited to, aircraft takeoff, thrust, engine or propeller system, forward thrust system for controlling aircraft forward direction movement, aircraft acceleration system for controlling speed of movement, aircraft tail, wings, rudder, and/or other control surface systems and/or devices, aircraft steering system, aircraft braking system, aircraft reverse thrust system, landing gear, aircraft pump system, aircraft turning and/or banking systems, and/or any other system and/or components for controlling and/or for effecting remote-control over the movement, motion and/or operation of the aircraft.

The vehicle system(s), equipment, or device(s) 45 can also be or can also include an automatic pilot device which can be utilized to fly the aircraft automatically and/or to control any one or more of the aircraft's direction of travel or movement, speed of travel or movement, forward movement, reverse movement, turning, banking, and/or steering, engine operation, directional light signals, side movement, and/or stopping or parking. The automatic pilot can also control or monitor any and/or all of the electrical systems, electronic systems, mechanical systems, hydraulic systems, and/or braking systems, etc., of the aircraft. In any and/or all of the embodiments described herein, the automatic pilot can be programmed to operate and/or to control the operation of the aircraft. The automatic pilot can utilize a pre-stored flight plan or travel program to control the travel of, or fly, the aircraft. A user can also upload a flight plan or travel program to the automatic pilot during the operation or use of the present invention.

In another preferred embodiment, any number of emergency flight plans can be stored in the automatic pilot or a database or storage device associated with the vehicle computer 40. In an instance the location or position of a lost, off course, or distressed, aircraft has been determined, an emergency fight plan can be selected for landing the aircraft at a nearest, convenient, and/or prepared airport, air field, or landing strip. The emergency flight plan can be automatically loaded into the automatic pilot and the aircraft can be flown and landed at the selected airport, air field, or landing strip. For example, if the aircraft is located as being in a certain region, a flight plan to an airport, air field, or landing strip servicing, or in, that region can be selected.

The vehicle system(s), equipment, or device(s) 45 can also be or can also include a fuel dumping system, a noise cancellation device or noise cancellation system, a parachute, a parachute deployment system, a color video camera, an acoustic sensor or acoustic sensing device, a door sensing device which can be utilized to sense an open state or a closed state of a door or doors, and/or a window sensing device which can be utilized to sense an open state or a closed state of a window or windows. The vehicle system(s), equipment, or device(s) 45 can also be or can also include a power "on" sensor or power "on" sensing device for sensing a power "on" condition for any of the vehicle system(s), equipment, or device(s) 45 of the aircraft, as well as a power "off" sensor or power "off" sensing device for sensing a power "off" condition for any of the vehicle system(s), equipment, or device(s) 45 of the aircraft.

The vehicle system(s), equipment, or device(s) 45 can also be or can also include a vehicle battery or batteries, a vehicle fuel cell or fuel cells, battery monitoring equipment, a battery charge level monitoring device or measuring device, a fuel cell output monitoring device or measuring device, a fuel cell fuel supply monitoring device or measuring device, fuel cell temperature measuring device or monitoring device, a fuel cell by-product (i.e. water or other by-product, heat, etc.) measuring device or monitoring device, a fuel cell output measuring device or monitoring device (i.e. voltmeter, ammeter, current measure, power meter, etc.), an electrical energy usage measuring device, an air bag deployment device, an air bag deployment detection device, a vehicle dashboard display device, a gyroscope for measuring vehicle pitch, roll, yaw, or attitude, a gyrocompass for measuring direction of travel, a vehicle data recorder and/or a vehicle operation data recorder, a navigation system, a navigation control and/or monitoring system, an automatic pilot, a radar system, a vehicle voice recorder, a vehicle voice recorder control and/or monitoring device, an emergency oxygen control and/or monitoring device, an emergency oxygen deployment detection device, an air bag deployment device, an air bag deployment detection device, a vehicle control console display device, a gun or a weapon system, an electronic warfare system, a threat detection system, a radiation detection system, a radiation level detection or monitoring system, a carbon monoxide detection system, a carbon monoxide level detection or monitoring system, a biological hazard detection system, a biological weapon detection system, and/or a fire control system.

The vehicle system(s), equipment, or device(s) 45 can also be or can also include a gun, a weapon or a weapon system, a torpedo system, a fire control system, a shot detection system, a self defense system, a radar system, a radar acquisition and/or tracking system, an infra-red acquisition and/or tracking system, a self defense system, an electronic warfare system, a countermeasures system, a threat detection system, a radiation detection system, a radiation level detection or monitoring system, a carbon monoxide detection system, a carbon monoxide level detection or monitoring system, a biological hazard detection system, a biological weapon detection system, and/or a fire control system, and/or any other system for defending the vehicle and/or operator and/or occupants.

The vehicle system(s), equipment, or device(s) 45 can also be or can also include a temperature sensor or temperature sensing device and/or a water sensor or a water sensing device, a water pump or water pumping device for pumping water out of the aircraft, a motion sensor for detection the motion or movement of individuals or objects inside the aircraft, outside the aircraft, and/or in the vicinity of the aircraft, an emergency exit sliding chute, an emergency exit landing chute, an emergency life boat deployment system, a life boat deployment device, an emergency life raft deployment system, and/or a life raft deployment device.

The vehicle system(s), equipment, or device(s) 45 can also be or can also include loading and/or unloading mechanisms, and/or winches, and/or any and/or all of the various systems and devices utilized in conjunction with these commercial and/or industrial or military use aircraft or equipment.

The vehicle system(s), equipment, or device(s) 45 can also be or can also include an aircraft operation data monitoring device which monitors aircraft operation such as speed, the status of any of the aircraft systems and/or any of the vehicle system(s), equipment, or device(s) 45 described herein, direction of travel, attitude of travel, video inside, outside, and/or at, the aircraft, audio inside, outside, and/or at, the aircraft, activity inside, outside, and/or at, the aircraft, and/or any other electrical, mechanical, electro-mechanical, hydraulic, and/or other system, equipment system, device, component, and/or appliance. The aircraft operation data monitoring device can be connected to, and/or linked with, any of the herein-identified or other vehicle system(s), equipment, or device(s) 45 including, but not limited to, speedometer, cruise control device, auto pilot, control surfaces, horizontal stabilizer, vertical stabilizer, cabin pressure control, landing gear, ailerons, altimeter, navigation system, emergency parachute, emergency landing equipment, emergency evacuation equipment, data display, braking system, wing flaps, rudder, gyroscope, gyrocompass, directional light device(s), light system(s), door lock system(s), depth sounding measurement devices, attitude measuring device(s), ignition system, braking system, electronic system(s), hydraulic system(s), video recording device(s) or camera(s), audio recording device(s) or microphone(s), and/or any other systems, equipment systems, devices, components, and/or appliances, described herein and/or otherwise, for controlling and/or monitoring the operation of same and/or for monitoring activity at the aircraft.

The aircraft operation data monitoring device can operate and/or function in a manner similar to, and/or analogous to, an aircraft flight data recorder in monitoring and/or recording operation data. The airplane operation data monitoring device can transmit any and/or all aircraft operation data to the vehicle computer 40, the central processing computer 10, and/or to the communication device 60.

The vehicle system(s), equipment, and/or device(s) 45 can also be or can also include any of the premises system(s), equipment, or device(s) 35 identified herein and/or which can also be adapted for or utilized in or in connection with any vehicle. The vehicle system(s), equipment, and/or device(s) 45 can also be or can also include any of the articles identified herein. The vehicle system(s), equipment, and/or device(s) 45 can also be or can also include any system, equipment, or device that can be controlled, activated, de-activated, enabled, disable, and/or re-enabled, and/or which can be operated, electrically or electronically.

In a preferred embodiment, any of the cameras, video recording devices or video recording equipment can be equipped with wide angle lenses for maximum angle viewing capabilities.

Any and/all of the herein-identified or herein-described vehicle system(s), equipment, and/or device(s) 45 can be utilized in connection with any of the herein-identified or herein-described vehicles, premises, or articles.

With reference once again to FIG. 1, the apparatus 100 can also include an article computer 50 which can be assigned to or associated with any article with which the apparatus 100 and method of the present invention can be utilized. In a preferred embodiment, the article computer 50 can be any computer, microprocessor, microcomputer, mainframe computer, computer system, group of computers, server, server system, or group of servers, or any microprocessor, central processing unit, and/or any associated devices or peripherals, which can be programmed and/or equipped to perform any of the herein-described functions, operations, or actions, described herein as being performed by the article computer 50. In a preferred embodiment, the article computer 50 can be utilized to perform any of the control, monitoring, or security, operations, actions, or functions, described herein as being preformed or provided by the apparatus 100 of the present invention in controlling, monitoring, or providing security for or regarding any of the herein-described articles and/or any of the herein-described systems, equipment, devices, or components, of or associated with, or located at, a respective article.

In a preferred embodiment, the article can be, and the term "article" can mean, any device or article such as a cellular telephone, a Smartphone or smart phone, or a personal digital assistant to PDA, a personal music player, a game player, a gaming device or system, a tablet, a tablet computer, a laptop computer, a notebook computer, a handheld computer, or a camera, a video recording device, a microphone, an audio recording device, a global positioning device, a global positioning system, a navigation device, a navigation system, or a wearable computer, a watch, medical equipment, a medical device, medical monitoring equipment, a medical monitoring device, wearable or implantable medical equipment, a wearable or implantable medical device, or a monitoring device or system, or any other device or article for which the apparatus 100 and method of the present invention can be utilized to provide any of the herein-described control, monitor, or security functions or functionality. The term "article" can also mean or refer to any device or entity which can be a standalone device or entity.

In a preferred embodiment, the article computer 50 can be located at, in, or on, the article. In another preferred embodiment, the article computer 50 can be located at a place or location separate and apart from, at a distance from, or remote from, the article.

Any number of article computers 50 can be utilized in conjunction with the apparatus 100 of the present invention. In a preferred embodiment, any article computer 50 can be used in connection or in association any single article. In another preferred embodiment, any article computer 50 can be used in connection with any number of articles.

In a preferred embodiment, the article computer 50 is or can be connected with, linked to, or linked with, the central processing computer 10 or any of the central processing computers 10 which can be utilized in connection with the apparatus 100 of the present invention.

In a preferred embodiment, the article computer 50 is or can also be connected with, linked to, or linked with, the server computer 20 or any of the server computers 20 which can be utilized in connection with the apparatus 100 of the present invention.

With reference once again to FIG. 1, the apparatus 100 also includes any number, type, or kind, of article system(s), equipment, or device(s) 55 described herein which can be or which can include any article system, equipment, equipment system, device, or component of the article, located at, on, or in, the article, or associated with the article or any system, equipment, equipment system, device, or component, of the article. In a preferred embodiment, any article system, equipment, equipment system, device, or component, can also be any such system, equipment, equipment system, device, or component, which can be controlled by, monitored by, or for which a security function can be provided by or facilitated by the article computer 50, by the central processing computer 10, or the by the apparatus 100 of the present invention or any of the herein-described computers, communications devices or components of same. In a preferred embodiment, any article system, equipment, equipment system, device, or component, can also be any such system, equipment, equipment system, device, or component, which can be electrically, electronically, mechanically, hydraulically, pneumatically, or otherwise, controlled and/or monitored by or using the apparatus 100 of the present invention or any of computers, communication devices, or components of same.

The article system(s), equipment, or device(s) 55 can also be or can also include a monitoring device(s) for detecting a malfunction, state of disrepair, or operation or operating failure or any other failure of, in, or regarding, any of the article system(s), equipment, or device(s) 55 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The article system(s), equipment, or device(s) 55 can also be or can also include a monitoring device(s) for detecting a use of any of the article system(s), equipment, or device(s) 55 described herein. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The article system(s), equipment, or device(s) 55 can also be or can also include a monitoring device(s) for detecting a use of the article, an authorized and/or an unauthorized use or operation of the article, a theft of the article, or any other occurrence which would warrant providing notice to a user or operator. The monitoring device(s), in a preferred embodiment, can also have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The article system(s), equipment, or device(s) 55 can also be or can also include a diagnostic device(s) for diagnosing any malfunction, state of disrepair, or operation or operating failure of any other failure of, in, or regarding, the article and/or any of the article system(s), equipment, or device(s) 55 described herein. The diagnostic device(s), in a preferred embodiment, can have associated therewith a transceiver or transmitter/receiver system for transmitting diagnostic data and/or information to the user or operator and for receiving signals such as, for example, control signals by which the user or operator can exercise control over the diagnostic device(s).

The article system(s), equipment, or device(s) 55 can also be or can also include a monitoring device(s) for detecting any event such as, but not limited to, a use of, an accessing of, an unauthorized use of, or an unauthorized accessing of, or a theft of, or an accident involving, the article and/or any of the article system(s), equipment, or device(s) 55 described herein. The monitoring device(s), in a preferred embodiment, can have associated therewith a transceiver or transmitter/receiver system for transmitting data and/or information regarding the event and any data and/or information detected, recorded, and/or read by, the monitoring device(s) to the user or operator and for receiving signals such as, for example, control signals, by which the user or operator can exercise control over the monitoring device(s).

In a preferred embodiment, the article computer 50 can be connected with, linked to, or linked with, each of any of the article system(s), equipment, or device(s) 55 described herein. In a preferred embodiment, the article computer 50 can also be connected directly with or to, directly linked to, or directly linked with, each of any of the article system(s), equipment, or device(s) 55 described herein. In a preferred embodiment, the article computer 50 can also be wirelessly connected with or to, wirelessly linked to, or wirelessly linked with, each of any of the article system(s), equipment, or device(s) 55 described herein. In another preferred embodiment, the article computer 50 can also be connected with, linked with, or to linked with, each of any of the article system(s), equipment, or device(s) 55. In a preferred embodiment, the article system(s), equipment, or device(s) 55 can be or can include any system, hardware, software, processing device, peripheral device, any interface device, or any component which performs any function in the operation or use of the respective article. For example, in the case of the article being a Smartphone, smart phone, cellular telephone, or personal digital assistant, the article system(s), equipment, or device(s) 55, can be or can include the cellular telephone receiver, transmitter, global positioning device, music player, camera, video recording device, display screen, audio recording device, calculator application, or any other application or app used in or by the respective Smartphone, smart phone, cellular telephone, or personal digital assistant. In a preferred embodiment, the article system(s), equipment, or device(s) 55 can be or can include the article itself.

The article, or any of the article system(s), equipment, or device(s) 55, can also be or can also include any of the premises system(s), equipment, and/or device(s) 35 identified herein or any of the vehicle system(s), equipment, and/or device(s) 45 identified herein. The article system(s), equipment, and/or device(s) 55 can also be or can also include any system, equipment, or device that can be controlled, activated, de-activated, enabled, disable, and/or re-enabled, and/or which can be operated, electrically or electronically.

In a preferred embodiment, the article computer 50 can be utilized to control, monitor, or perform security operations or functions, or security-related operations or functions, for any number, types, or kinds, of article system(s), equipment, or device(s) 55.

With reference once again to FIG. 1, the apparatus 100 also includes a communication device 60 which can be utilized by any individual, user, or entity (hereinafter as referred to as "user") who or which utilizes the apparatus 100 of the present invention, in order to communicate with, transmit signals, data, and/or information to, receive signals, data, and/or information from, or to access, or which can be linked with, or which can be wirelessly linked with, any of the central processing computers 10 and/or server computers 20 described herein. In a preferred embodiment, the communication device 60 can also be utilized to communicate with, transmit signals, data, and/or information to, receive signals, data, and/or information from, or to access, or which can be linked with, or which can be wirelessly linked with, any of the premises computers 30, premises system(s), equipment, and/or device(s) 35, vehicle computers 40, vehicle system(s), equipment, or device(s) 45, article computer(s) 50, and/or article system(s), equipment, or device(s) 55, and/or any of the other communication device(s) 60 described herein.

In a preferred embodiment, the communication device 60 can be a personal computer, a laptop computer, a notebook computer, a tablet, a tablet computer, a cellular telephone, a personal digital assistant, a wireless telephone, a wireless communication device, a personal communication device, a personal communications services device, a smart phone, a Smartphone, a mobile telephone, a hand-held device or computer, a palm-top device or computer, a watch, a telephone, a television, an interactive television, a digital television, a smart television or entertainment device, an internet-enabled television or entertainment device, or any other suitable device, which can be equipped to perform the functions described herein as being performed by the communication device 60. In a preferred embodiment, the communication device 60 can include a central processing unit or device, an input device, a retinal scanning device, a fingerprint recognition device, a voice recognition device, a retinal scanner, a fingerprint device, a voice recognition device, a handprint recognition device, a handprint geometry recognition device, facial feature recognition device, and/or any one or more of the biometric devices used to control access to a computer or a computer network which are known to those skilled in the art at the time of the filing of this patent application, a pointing device, a mouse, an output device, a database or a memory device and/or system, a random access memory (RAM) device, a read only memory (ROM) device, a video recording system or equipment, a camera(s), an audio recording system, device, or equipment, a microphone, a receiver or any number of receivers, a transmitter or any number of transmitters, a network interface device, an information or content gathering device, and/or any other devices, equipments, or systems, typically found in and/or utilized by any of the herein-described communication devices 60 described herein as being utilized in connection with the apparatus 100 of the present invention. In a preferred embodiment, the communication device 60 can also be equipped with a global positioning device which can be utilized to calculate, determine, or ascertain, the position or location of the communication device 60.

In a preferred embodiment, the communication device 60 can also contain, include, or be equipped with, a transmitter(s), a receiver(s), or any other network interface devices or equipment for facilitating bi-directional communication with, data and/or information exchange with, and/or remote control or monitoring by, the central processing computer 10, the server computer 20, or any one or more of any of the premises computers 30, premises system(s), equipment, and/or device(s) 35, vehicle computers 40, vehicle system(s), equipment, or device(s) 45, article computer(s) 50, and/or article system(s), equipment, or device(s) 55, and/or any of the other communication device(s) 60 described herein.

In a preferred embodiment, the communication device 60 can also transmit, from its transmitter or any one or more of its transmitters, the location or position information, which is calculated, determined, or ascertained, by the global positioning device, to the central processing computer 10, the server computer 20, or any one or more of any of the premises computers 30, premises system(s), equipment, and/or device(s) 35, vehicle computers 40, vehicle system(s), equipment, or device(s) 45, article computer(s) 50, and/or article system(s), equipment, or device(s) 55, and/or any of the other communication device(s) 60 described herein.

In a preferred embodiment, the communication device 60 can also be utilized as a remote control and/or monitoring device. In a preferred embodiment, the communication device 60 can include, contain, or be equipped with any hardware, software, firmware, or any other technology or equipment, typically found in or included in a remote control and/or monitoring device.

In a preferred embodiment, the communication device 60 can also include, contain, or be equipped with a camera, a digital video recording system or equipment, a microphone, a digital audio recording system or equipment, or any another digital video and audio recording device or equipment or other digital media recoding equipment, that can allow the communication device 60 to record and store, for later play-back, any of the video and/or audio information which can or may be obtained using the apparatus 100 of the present invention. The communication device 60 can also be used to take or record a photograph, picture, video, a video clip, audio, or an audio clip, of the user or of any other individual or entity when using the communication device 60.

In a preferred embodiment, any number of communication devices 60 can be assigned to, utilized with, or associated with, any of the herein-described users or any of the herein-described control and/or monitoring accounts.

In a preferred embodiment, each of the central processing computer(s) 10, the server computer(s) 20, the premises computer(s) 30, the vehicle computer(s) 40, and/or the article computer(s) 50 can also include, contain, or be equipped with a camera, a digital video recording system or equipment, a microphone, a digital audio recording system or equipment, or any another digital video and audio recording device or equipment or other digital media recoding equipment, that can allow a user of the respective central processing computer(s) 10, the server computer(s) 20, the premises computer(s) 30, the vehicle computer(s) 40, and/or the article computer(s) 50 to record and store, for later play-back, any of the video and/or audio information which can or may be obtained using the apparatus 100 of the present invention. Each of the central processing computer(s) 10, the server computer(s) 20, the premises computer(s) 30, the vehicle computer(s) 40, and/or the article computer(s) 50 can also be used to take or record a photograph, picture, video, a video clip, audio, or an audio clip, of the user or of any other individual or entity when using the respective central processing computer(s) 10, the server computer(s) 20, the premises computer(s) 30, the vehicle computer(s) 40, and/or the article computer(s) 50.

In the preferred embodiment, the apparatus 100 of the present invention is utilized on, and/or over, the Internet and/or the World Wide Web. The apparatus 100 of the present invention, in the preferred embodiment, can also utilize wireless Internet and/or World Wide Web services, equipment and/or devices. The central processing computer(s) 10 and/or the server computer 20, in the preferred embodiment, has or can have a web site or web sites associated therewith. Each of the premises computers 30, premises system(s), equipment, and/or device(s) 35, vehicle computers 40, vehicle system(s), equipment, or device(s) 45, article computer(s) 50, and/or article system(s), equipment, or device(s) 55, and/or any of the other communication device(s) 60 described herein can also have a web site or web sites associated with same.

Although the Internet and/or the World Wide Web is a preferred communication system, network, and/or medium, utilized, the present invention, in any and/or all of the embodiments described herein, can also be utilized with any appropriate communication network or system including, but not limited to, a communication network or system, a telecommunication network or system, a telephone communication network or system, a cellular communication network or system, a wireless communication network or system, a line or wired communication network or system, a wireless Internet network or system, a wireless World Wide Web network or system, a digital communication network or system, a personal communication network or system, a personal communication services (PCS) network or system, a satellite communication network or system, a broad band communication network or system, a low earth orbiting (LEO) satellite network or system, a public switched telephone network or system, a telephone communication network or system, a radio communication network or system, a cable television network or system, and/or any other communication network or system, and/or any combination of the above communication networks or systems.

In a preferred embodiment, each of the central processing computer(s) 10, the server computer(s) 20, the premises computer(s) 30, the vehicle computer(s) 40, the article computer(s) 50, and the communication device(s) 60, can be equipped with transmitters, receivers, network interface devices, and/or any other appropriate hardware and/or software, so as to communicate, in a bi-directional manner with, so as to transmit signals, data, information, or a message to, and/or so as to receive signals, data, information, or a message from, any other central processing computer(s) 10, server computer(s) 20, premises computer(s) 30, vehicle computer(s) 40, article computer(s) 50, and communication device(s) 60. In this regard, it is also to be understood that, as for each of the premises computer(s) 30, the vehicle computer(s) 40, and the article computer(s) 50, each premises computer 30, vehicle computer 40, and article computer 50 communicate, in a bi-directional manner with, so as to transmit signals, data, information, or a message to, and/or so as to receive signals, data, information, or a message from, any other premises computer(s) 30, vehicle computer(s) 40, and article computer(s) 50.

The apparatus 100 and method of the present invention can also provide for cloud-based control, monitoring and/or security apparatus, method, or platform, which can be utilized to perform any of the herein-described control, monitoring, and/or security, operations, functions, and/or functionality for premises, vehicles, and/or articles, which can be utilized to perform cloud-based data and/or information access, processing and/or storage, which can be utilized to perform cloud-based access and/or utilization of any data and/or information described herein as being processed and/or utilized by the apparatus 100 and/or which can be utilized to access and utilized control and monitoring accounts, and/or which can be utilized to perform cloud-based data and/or information record keeping, cloud-based data and/or information storage and/or retrieval, and/or cloud based processing and/or storage of any and/or all of the data and/or information described herein as being utilized and/or processed by the apparatus 100 and methods of the present invention.

Figure 2:
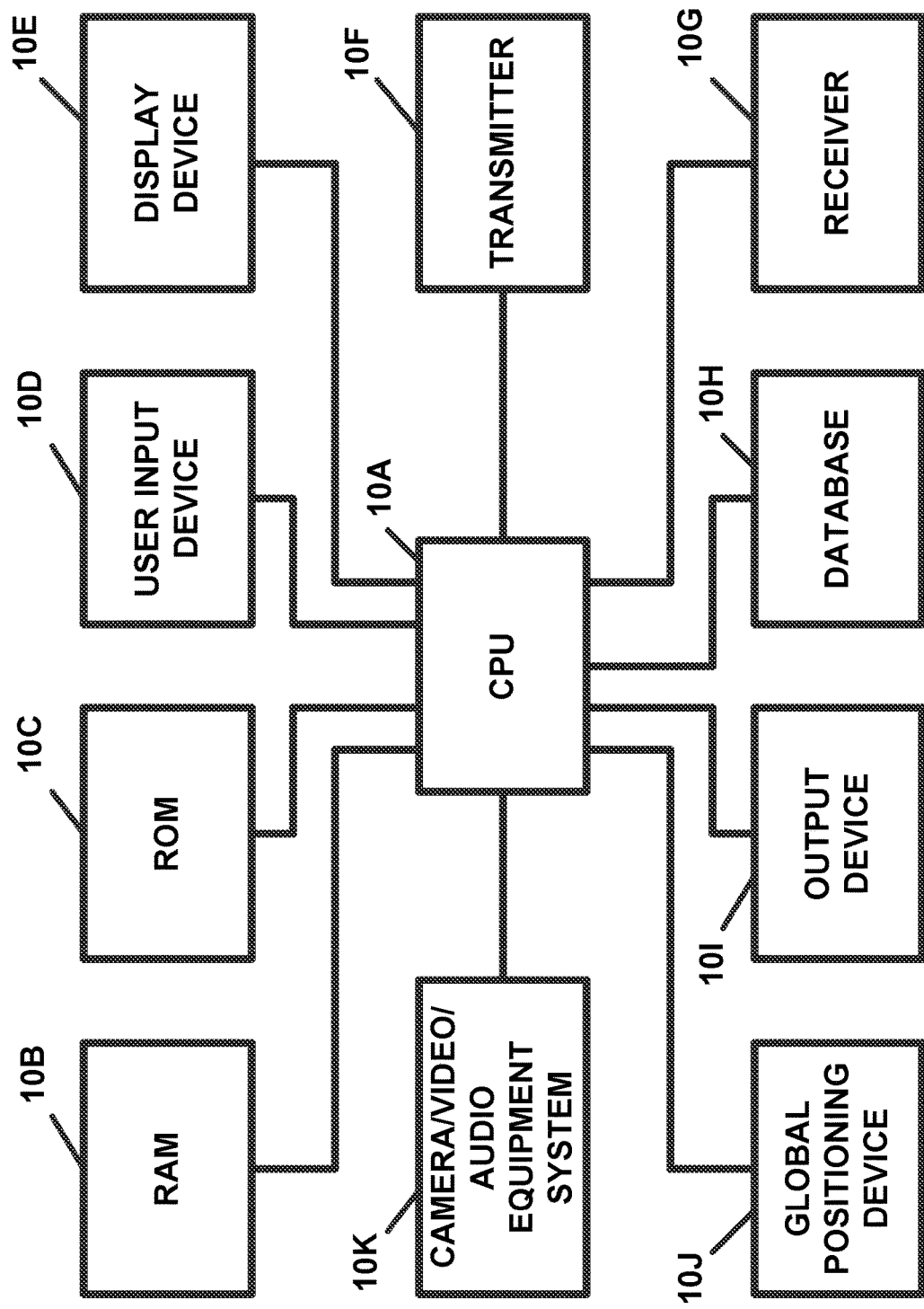
FIG. 2 illustrates a preferred embodiment of the central processing computer of FIG. 1, in block diagram form.

FIG. 2 illustrates a preferred embodiment of the central processing computer 10 of FIG. 1, in block diagram form. The central processing computer 10, in the preferred embodiment, is a computer, a computer system, a group of computers, a network computer, or a network computer system, or any other communication device which can provide the functionality of, and which can be utilized as a central processing computer 10, such as an Internet computer, an Internet server computer, and/or a web site server computer. In the preferred embodiment, the central processing computer 10 includes a central processing unit or CPU 10A, which in the preferred embodiment, is a microprocessor. The CPU 10A may also be a microcomputer, a minicomputer, a macro-computer, and/or a mainframe computer, depending upon the application.

The central processing computer 10 also includes a random access memory device(s) 10B (RAM) and a read only memory device(s) 10C (ROM), each of which is connected to the CPU 10A, and a user input device 10D, for entering data, information, and/or commands, into the central processing computer 10, which includes any one or more of a keyboard, a scanner, a touch screen, a user pointing device, such as, for example, a mouse, a touch pad, and/or an audio input device and/or a video input device, a microphone or an audio recording device, a camera or a video recording device, and/or any device, electronic and/or otherwise which can be utilized for inputting and/or entering data and/or information, of any kind or type pertinent to the operation of the apparatus 100 of the present invention, into the central processing computer 10. The input device 10D can also be any other input device(s) which are or can be utilized with or in connection with any of the central processing computer(s) 10 described herein as being utilized in connection with the apparatus 100 of the present invention. The input devices 10D are also connected to or with, or linked to or with, the CPU 10A. In a preferred embodiment, the input device 50 can also include a retinal scanner, a fingerprint recognition device, a voice recognition device, or any other type or kind of biometric device which can be used for determining whether or not a user or operator of the central processing computer 10 is an authorized user, individual, or person. The central processing computer 10 also includes a display device 10E for displaying data and/or information to a user or operator.

The central processing computer 10 also includes a transmitter(s) 10F, for transmitting signals and/or data and/or information, or a message(s), to any one or more of the server computer(s) 20, the premises computer(s) 30, the vehicle computer(s) 40, the article computer(s) 50, and/or any other communication device(s) 60, described herein, or to any other central processing computer(s) 10.

The central processing computer 10 also includes a receiver(s) 10G, for receiving signals and/or data and/or information, or a message(s), from any one or more of the server computer(s) 20, the premises computer(s) 30, the vehicle computer(s) 40, the article computer(s) 50, and/or any other communication device(s) 60, described herein, or from any other central processing computer(s) 10.

The central processing computer 10 also includes a database(s) 10H, which is also connected to or linked with the CPU 10A, which can contain and/or include any and/or all of the data and/or information needed or desired for performing any and/or all of the functions and/or functionality described herein as being performed by the apparatus 100 and method of the present invention.

In a preferred embodiment, the database 10H contains and/or includes data and/or information regarding each individual, person, or entity (hereinafter referred to as "user"), who or which uses the apparatus 100 and method of the present invention in order to control, monitor, or secure, or in order to perform a control, monitoring, and/or security, operation, action, or function, for or regarding any of the premises, vehicles, and/or articles, described herein. In a preferred embodiment, for each user, the database 10H can contain and/or include data and/or information regarding the user's name, address, telephone number(s), cellular telephone number(s), wireless telephone number(s), personal communication device telephone number(s), e-mail address(es), IP address(es), text message number(s) or information, SMS message(s) or information, employer information, work information, emergency contact information, and/or any other contact or other information. The database 10H can also contain and/or include, for each user, data and/or information regarding a user's relatives, friends, next of kin, or other contact information or emergency contact information.

The database 10H can also contain and/or include, for each user, a description of the user, a photograph or video clip of the user, data and/or information regarding a digital voiceprint of the user or data and/or information for verifying an identity of the user by his or her voiceprint, data and/or information regarding a retinal scan of the user or data and/or information for verifying an identity of the user by his or her retinal scan, data and/or information regarding a fingerprint of the user or data and/or information for verifying an identity of the user by his or her fingerprint, and/or any other data and/or information for identifying and identity of the user using biometric data and/or information.

In a preferred embodiment, the database 10H can also contain and/or include, for each user, data and/or information regarding each communication device 60 which is or can be used by the user in utilizing the apparatus 100 and method of the present invention, including, but not limited to, data and/or information regarding an identification of each communication device 60, a description of, or type or kind of, the communication device 60, manufacturer, model number, and/or serial number or any other identification information, of, for, or regarding, the communication device 60, and/or the assigned telephone number, e-mail address, text messaging or SMS messaging number, and/or IP address, or any network identification information, of, for, or associated with, the communication device 60.

In a preferred embodiment, the database 10H also contains and/or includes data and/or information regarding each premises, vehicle, and article, which is registered with the apparatus 100 and which can be controlled, monitored, and/or secured, using the apparatus 100 and method of the present invention. For each premises, vehicle, and article, the database 10H can contain and/or include information regarding each user who or which is associated with the premises, the vehicle, or the article, and/or who or which is registered with the apparatus 100 as being authorized to utilize the apparatus 100 in order to perform any control, monitoring, and/or security, operation, action, or function, regarding each premises, vehicle, or article.

In a preferred embodiment, for each premises, vehicle, and/or article, registered with the apparatus 100 of the present invention, the database 10H can contain and/or include data and/or information regarding each user registered as being an owner, user, and/or occupant, or any user who or which can be designated or assigned as being an authorized user of, for, or regarding, the respective premises, vehicle, or article, data and/or information regarding each individual, the individual's relatives or next of kin, contact information for the individual, emergency contact information, local law enforcement contact information, registered communication device(s) 60 used by the individual, and/or whether or not the individual is authorized, and the extent to which the individual is authorized, to use the apparatus 100 for the respective premises, vehicle, or article. In this regard, and as and for an example, in the case of a residential premises, the database 10H can contain and/or include data and/or information for each man, woman, and/or child who resides at the premises as well as data and/or information regarding each individual, the individual's relatives or next of kin, contact information for the individual, registered communications device(s) 60 used by the individual, and/or whether or not the individual is authorized, and the extent to which the individual is authorized, to use the apparatus 100 for the residential premises.

In a preferred embodiment, for each premises, vehicle, and/or article, registered with the apparatus 100 of the present invention, the database 10H can contain and/or include data and/or information regarding each communication device 60 and/or all communication devices 60 which can associated with each respective premises, vehicle, or article, with which the apparatus 100 can be utilized.

In a preferred embodiment, for each premises for which the apparatus 100 can be utilized, the database 10H contains and/or includes data and/or information regarding each and every and/or any and/or all of the premises system(s), equipment, or device(s) 35 in, on, at, or associated with, the premises. In a preferred embodiment, for each vehicle for which the apparatus 100 can be utilized, the database 10H contains and/or includes data and/or information regarding each and every and/or any and/or all of the vehicle system(s), equipment, or device(s) 45 in, on, at, or associated with, the vehicle. In a preferred embodiment, for each article for which the apparatus 100 can be utilized, the database 10H contains and/or includes data and/or information regarding each and every and/or any and/or all of the article system(s), equipment, or device(s) 55 in, on, at, or associated with, the article.

The database 10H can also contain and/or include, for any of the herein-described premises, vehicles, and/or articles, and/or for any of the herein-described users of same, data and/or information regarding any restrictions or limitations regarding any user's or users' ability and/or authorization to access the apparatus 100, any user's or users' ability and/or authorization to access any premises, vehicle, or article, or any user's or users' ability and/or authorization to control, monitor, or to perform a security operation, action, or function, to control an operation of, and/or to activate, de-activate, enable, disable, or re-enable, any premises, vehicle, or article, described herein or any user's or users' ability and/or authorization to control, monitor, or to perform a security operation, action, or function, to control an operation of, and/or to activate, de-activate, enable, disable, or re-enable, any premises system(s), equipment, or device(s) 35 described herein, any vehicle system(s), equipment, or device(s) 45 described herein, and/or any article system(s), equipment, or device(s) 55 described herein.

The database 10H can also contain and/or include, for any of the herein-described premises, vehicles, and/or articles, and/or for any of the herein-described users of same, data and/or information regarding any requests to provide or receive an alert message(s) of, for, or regarding, any predefined or selected events or occurrences describe herein or any other events or occurrences which might warrant an alert message(s) being generated and/or transmitted to a user or other authorized individual, person, or entity. The database 10H can also contain and/or include data and/or information regarding the type, kind, mode, manner, and/or frequency of any alert messages being generated and/or transmitted to a user or users.

The database 10H can also contain and/or include data and/or information regarding any number of user personal control and monitoring accounts which can be serviced by the apparatus 100 of the present invention which can be utilized to allow a user to maintain a control and monitoring account which is personal to the user and which can allow the user to utilize the apparatus 100 of the present invention in order to control, monitor, and/or perform security for, any one or any number of premises, for any one or any number of vehicles, and/or for any one or any number of articles, from and using a single user personal control and monitoring account.

The database 10H can also contain and/or include data and/or information regarding any number of premises control and monitoring accounts which can be serviced by the apparatus 100 of the present invention which can be utilized to allow any number of users to control, monitor, and/or perform security for, a premises.

The database 10H can also contain and/or include data and/or information regarding any number of vehicle control and monitoring accounts which can be serviced by the apparatus 100 of the present invention which can be utilized to allow any number of users to control, monitor, and/or perform security for, a vehicle.

The database 10H can also contain and/or include data and/or information regarding any number of article control and monitoring accounts which can be serviced by the apparatus 100 of the present invention which can be utilized to allow any number of users to control, monitor, and/or perform security for, an article.

The database 10H can also contain and/or include any data and/or information, activity reports, alert messages, and/or any other information, reports, or messages, regarding any and/or all activities, operations, actions, or functions, performed or attempted to be performed via the apparatus 100 regarding any of the herein—describe premises, vehicles, articles, regarding any of the herein-described premises system(s), equipment, or device(s) 35, vehicle system(s), equipment, or device(s) 45, and/or any article system(s), equipment, or device(s) 55, regarding any of the herein-described users, regarding any of the herein-described user personal control and monitoring accounts, premises control and monitoring accounts, vehicle control and monitoring accounts, and/or article control and monitoring accounts.

The database 10H can also contain and/or include any data and/or information regarding historical or habitual use, activities, operations, actions, or functions, performed or attempted to be performed via the apparatus 100 regarding any of the herein-described users, regarding any of the herein-described premises, vehicles, articles, regarding any of the herein-described premises system(s), equipment, or device(s) 35, vehicle system(s), equipment, or device(s) 45, and/or any article system(s), equipment, or device(s) 55, and/or regarding any of the herein-described user personal control and monitoring accounts, premises control and monitoring accounts, vehicle control and monitoring accounts, and/or article control and monitoring accounts.

The database 10H can also contain and/or include, for each of the central processing computer(s) 10, for each server computer(s) 20, for each of the premises computers 30, for each of the vehicle computers 40, for each of the article computers 50, and/or for each communication devices 60, utilized in the apparatus 100 or in connection with the apparatus 100, data and/or information regarding the address, location, position, of same and/or the time zone in which each is registered.

The database 10H can also contain and/or include, for each of the central processing computer(s) 10, for each server computer(s) 20, for each of the premises computers 30, for each of the vehicle computers 40, for each of the article computers 50, and/or for each communication devices 60, utilized in the apparatus 100 or in connection with the apparatus 100, data and/or information, including any necessary software or processing routines for determining the position or location of same and/or the time zone in which same is located at any time when same is either located in its registered location or position or when away from or remote from its registered location or position.

The database 10H can also contain and/or include any data and/or information for enabling the central processing computer 10 to calculate, determine, or ascertain, the position or location of any communication device 60, any premises computer 30, any vehicle computer 40, and/or any article computer 50, utilized in connection with the apparatus 100 of the present invention.

The database 10H can also contain and/or include any data and/or information and/or any software or processing routines for allowing or enabling the central processing computer 10, or any premises computer 30, any vehicle computer 40, and/or any article computer 50, to calculate, determine, or ascertain, the position or location of any communication device 60 at any time by performing a "pinging" operation on or for same and/or by "pinging" same. The database 10H can also contain and/or include any data and/or information and/or any software or processing routines for allowing or enabling any premises computer 30, any vehicle computer 40, any article computer 50, and/or any communication device 60, to calculate, determine, or ascertain, the position or location of any premises computer 30, any vehicle computer 40, any article computer 50, and/or any communication device 60 at any time by performing a "pinging" operation on or for same and/or by "pinging" same.

The database 10H can also contain or include any data and/or information described herein as being stored in the databases 30H, 40H, 50H, and 60H of the respective premises computers 30, vehicle computers 40, article computers 50, and communication devices 60.

The database 10H can also contain or include any and/or all data and/or information and/or any software programs, routines, and/or software applications or "apps", needed or desired for performing any and/or of the processing routines, functions, and/or functionality, described herein as being provided by or performed by the apparatus 100 of the present invention and/or by the central processing computer(s) 10, the server computer(s) 20, and/or by any of the premises computer(s) 30, the vehicle computer(s) 40, and/or the article computer(s) 50, described herein. The database 10H can also contain or include any and/or all data and/or information and/or any software programs, routines, and/or software applications or "apps", needed or desired for performing any and/or of the processing routines, functions, and/or functionality, described herein as being provided by any of the herein-described communication devices 60, which such data and/or information and/or software applications or "apps", being downloadable to the communication device(s) 60 if and when needed or desired.

In a preferred embodiment, the database 10H can also contain or include any and/or all data and/or information needed, desired, or utilized, by the apparatus 100, or by the central processing computer(s) 10 and/or by the server computer(s) 20, or by any of the premises computers 30, vehicle computers 40, or article computers, or by any of the communications devices 60 described herein for or in performing any and/or all of the processing routines, operations, functions, and/or functionality, described herein as being performed by the apparatus 100 and method of the present invention.

The central processing computer 10 also includes an output device 101, which is also connected to the CPU 10A, for outputting any data and/or information, described herein. In the preferred embodiment, the output device 101 can be a printer, a display, a transmitter, a modem, and/or any other device which can be used to output data or information.

The central processing computer 10 can also be equipped with a global positioning device 10J which can be connected to the CPU 10A and which can be utilized to calculate, determine, or ascertain, the position or location of the central processing computer 10.

The central processing computer 10 can also include a video and/or audio recording device 10K which, in a preferred embodiment, can include a camera, a video recoding device, a microphone, and/or an audio recording device. The video and/or audio recording device 10K can be utilized to take a picture, record video, record a video clip, record sound, record audio, or record an audio clip, of a user of the central processing computer 10 and/or to record any picture, a sound or voice, video information, or audio information at the central processing computer 10 and/or at, near, or in the vicinity of, the central processing computer 10.

In a preferred embodiment, the server computer(s) 20 can also contain or include any and/or all of the herein-described components, elements, and/or data and/or information, described herein as being utilized in the central processing computer 10 of FIG. 2. In this regard, in a preferred embodiment, the server computer 20 can include a central processing unit (CPU), a random access memory device(s) (RAM), a read only memory device(s) (ROM), a user input device, a transmitter(s), a receiver(s), a database, an output device, a global positioning device, and/or a video and/or audio recording device.

Figure 3:
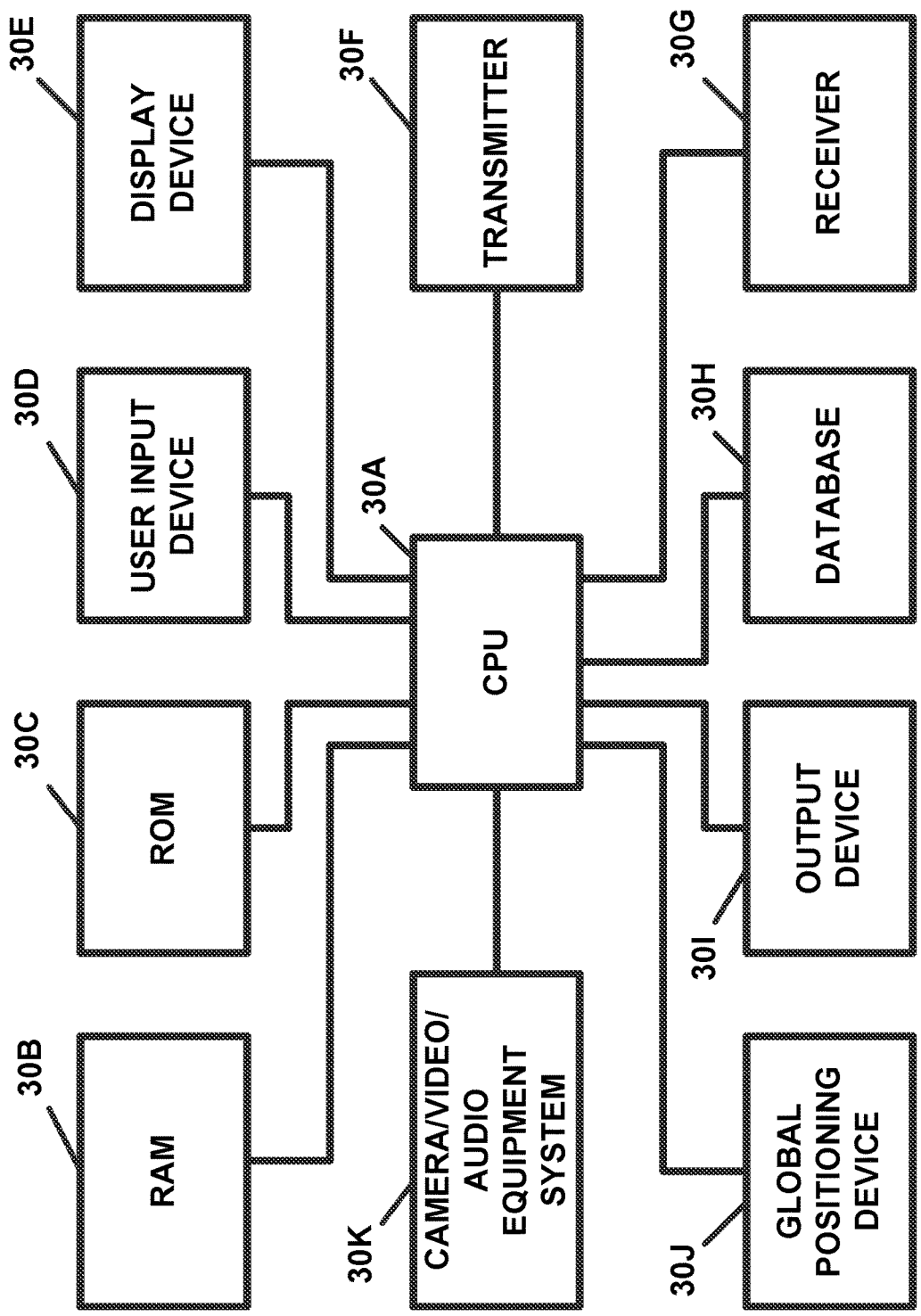
FIG. 3 illustrates a preferred embodiment of the premises computer of FIG. 1, in block diagram form.

FIG. 3 illustrates the premises computer 30 of FIG. 1, in block diagram form. With reference to FIG. 3, the premises computer 30 includes a central processing unit or CPU 30A, which in the preferred embodiment, is a microprocessor. The CPU 30A may also be a microcomputer, a minicomputer, a macro-computer, and/or a mainframe computer, depending upon the application.

With reference to FIG. 3, the premises computer 30 also includes a random access memory device(s) 30B (RAM)

and a read only memory device(s) 30C (ROM), each of which is connected to the CPU 30A, and a user input device 30D, for entering data, information, and/or commands, into the premises computer 30, which includes any one or more of a keyboard, a scanner, a touch screen, a user pointing device, such as, for example, a mouse, a touch pad, a touch screen, and/or an audio input device and/or a video input device, a microphone or an audio recording device, a camera or a video recording device, and/or any device, electronic and/or otherwise which can be utilized for inputting and/or entering data and/or information, of any kind or type pertinent to the operation of the apparatus 100 of the present invention, into the premises computer 30. The input device 30D can also be any other input device(s) which are or can be utilized with or in connection with any of the premises computers 30 described herein as being utilized in connection with the apparatus 100 of the present invention. The input devices 30D are also connected to or with, or linked to or with, the CPU 30A. In a preferred embodiment, the input device 30 can also include a retinal scanner, a fingerprint recognition device, a voice recognition device, or any other type or kind of biometric device which can be used for determining whether or not a user or operator of the premises computer 30 is an authorized user, individual, or person. The premises computer 30 also includes a display device 30E for displaying data and/or information to a user or operator.

The premises computer 30 also includes a transmitter(s) 30F, for transmitting signals and/or data and/or information, or a message(s), to any one or more of the central processing computer(s) 10, the server computer(s) 20, any other premises computer(s) 30, the vehicle computer(s) 40, the article computer(s) 50, and/or any of the communication device(s) 60, described herein.

The premises computer 30 also includes a receiver(s) 30G, for receiving signals and/or data and/or information from any one or more of the central processing computer(s) 10, the server computer(s) 20, any other premises computer(s) 30, the vehicle computer(s) 40, the article computer(s) 50, and/or any of the communication device(s) 60, described herein.

The premises computer 30 also includes a database(s) 30H, which is also connected to or linked with the CPU 30A, which can contain and/or include any and/or all of the data and/or information needed or desires for performing any and/or all of the functions and/or functionality described herein as being performed by the apparatus 100 and method of the present invention as well as any and/or all of the functions and/or functionality described herein as being performed by the premises computer 30.

The premises computer 30 also includes a database(s) 30H, which is also connected to or linked with the CPU 30A, which can contain and/or include any and/or all of the data and/or information needed or desired for performing any and/or all of the functions and/or functionality described herein as being performed by the premises computer 30 and/or the apparatus 100 and method of the present invention.

In a preferred embodiment, the database 30H contains data and/or information regarding each individual, person, or entity (hereinafter referred to as "user"), who or which uses the apparatus 100 and method of the present invention in order to control, monitor, or secure, or in order to perform a control, monitoring, and/or security, operation, action, or function, for or regarding the premises associated with the premises computer 30. In a preferred embodiment, for each user, the database 30H can contain and/or include data and/or information regarding the user's name, address, telephone number(s), cellular telephone number(s), wireless telephone number(s), personal communication device telephone number(s), e-mail address(es), IP address(es), text message number(s) or information, SMS message(s) or information, employer information, work information, emergency contact information, and/or any other contact or other information. The database 30H can also contain and/or include, for each user, data and/or information regarding a user's relatives, friends, next of kin, or other contact information or emergency contact information.

The database 30H can also contain and/or include, for each user, a description of the user, a photograph or video clip of the user, data and/or information regarding a digital voiceprint of the user or data and/or information for verifying an identity of the user by his or her voiceprint, data and/or information regarding a retinal scan of the user or data and/or information for verifying an identity of the user by his or her retinal scan, data and/or information regarding a fingerprint of the user or data and/or information for verifying an identity of the user by his or her fingerprint, and/or any other data and/or information for identifying and identity of the user using biometric data and/or information.

In a preferred embodiment, the database 30H can also contain and/or include, for each user, data and/or information regarding each communication device 60 which is or can be used by the user in utilizing the apparatus 100 and method of the present invention, including, but not limited to, data and/or information regarding an identification of each communication device 60, a description of, or type or kind of, the communication device 60, manufacturer, model number, and/or serial number or any other identification information, of, for, or regarding, the communication device 60, and/or the assigned telephone number, e-mail address, text messaging or SMS messaging number, and/or IP address, or any network identification information, of, for, or associated with, the communication device 60.

In a preferred embodiment, the database 30H also contains and/or includes data and/or information regarding each premises, vehicle, and article, which is registered with the apparatus 100 and which can be controlled, monitored, and/or secured, by each user associated with the premises. For each premises, vehicle, and article, the database 30H can contain and/or include information regarding each user who or which is associated with the premises, the vehicle, or the article, and/or who or which is registered with the premises computer 30 and/or the apparatus 100 as being authorized to utilize the apparatus 100 in order to perform any control, monitoring, and/or security, operation, action, or function, regarding the premises and each other premises, vehicle, or article.

In a preferred embodiment, for each premises, vehicle, and/or article, registered with user and with the premises computer 30, the database 30H can contain and/or include data and/or information regarding each user registered as being an owner, user, and/or occupant, or any user who or which can be designated or assigned as being an authorized user of, for, or regarding, the premises and any other respective premises, vehicle, or article, data and/or information regarding each individual, the individual's relatives or next of kin, contact information for the individual, emergency contact information, local law enforcement contact information, registered communication device(s) 60 used by the individual, and/or whether or not the individual is authorized, and the extent to which the individual is authorized, to use the apparatus 100 for or regarding the premises and any other respective premises, vehicle, or article. In this regard, and as and for an example, in the case of a residential premises, the database 30H can contain and/or include data and/or information for each man, woman, and/or child who resides at the premises as well as data and/or information regarding each individual, the individual's relatives or next of kin, contact information for the individual, registered communications device(s) 60 used by the individual, and/or whether or not the individual is authorized, and the extent to which the individual is authorized, to use the apparatus 100 for the residential premises.

In a preferred embodiment, the database 30H can also contain and/or include data and/or information regarding each communication device 60 and/or all communication devices 60 which is or can be associated with the premises and any other premises, vehicle, or article, with which the premises computer 30 can be utilized.

In a preferred embodiment, the database 30H contains data and/or information regarding each and every and/or any and/or all of the premises system(s), equipment, or device(s) 35 in, on, at, or associated with, the premises or with any other premises for which the premises computer 30 can be utilized. In a preferred embodiment, for each vehicle for which the premises computer 30 can be utilized, the database 30H contains and/or includes data and/or information regarding each and every and/or any and/or all of the vehicle system(s), equipment, or device(s) 45 in, on, at, or associated with, each vehicle and/or data and/or information regarding each and every and/or any and/or all of the article system(s), equipment, or device(s) 55 in, on, at, or associated with, each article.

The database 30H can also contain and/or include, for or regarding the premises and/or any other premises, premises, vehicles, and/or articles, serviced by the premises computer 30, and/or for any of the herein-described users of same, data and/or information regarding any restrictions or limitations regarding any user's or users' ability and/or authorization to access the apparatus 100 or the premises computer 30, any user's or users' ability and/or authorization to access the premises or any other premises, vehicle, or article, or any user's or users' ability and/or authorization to control, monitor, or to perform a security operation, action, or function, to control an operation of, and/or to activate, de-activate, enable, disable, or re-enable, the premises or any other premises, vehicle, or article, described herein or any user's or users' ability and/or authorization to control, monitor, or to perform a security operation, action, or function, to control an operation of, and/or to activate, de-activate, enable, disable, or re-enable, any premises system(s), equipment, or device(s) 35 of the premises or of any other premises or any vehicle system(s), equipment, or device(s) 45 described herein, and/or any article system(s), equipment, or device(s) 55 described herein.

The database 30H can also contain and/or include, for or regarding the premises and any other premises, vehicles, and/or articles, and/or for any of the herein-described users of same, data and/or information regarding any requests to provide or receive an alert message(s) of, for, or regarding, any pre-defined or selected events or occurrences describe herein or any other events or occurrences which might warrant an alert message(s) being generated and/or transmitted to a user or other authorized individual, person, or entity. The database 30H can also contain and/or include data and/or information regarding the type, kind, mode, manner, and/or frequency of any alert messages being generated and/or transmitted to a user or users.

The database 30H can also contain and/or include data and/or information regarding any number of user personal control and monitoring accounts associated with the premises computer 30 which can be utilized to allow a user to maintain a control and monitoring account which is personal to the user and which can allow the user to utilize the apparatus 100 of the present invention in order to control, monitor, and/or perform security for, the premises or any other premises, vehicles, and/or articles.

The database 30H can also contain and/or include data and/or information regarding any number of premises control and monitoring accounts associated with the premises and which can be serviced by the premises computer 30.

The database 30H can also contain and/or include any data and/or information, activity reports, alert messages, and/or any other information, reports, or messages, regarding any and/or all activities, operations, actions, or functions, performed or attempted to be performed via the apparatus 100 regarding the premises and any other premises, vehicles, articles, and/or regarding any of the herein-described premises system(s), equipment, or device(s) 35, vehicle system(s), equipment, or device(s) 45, and/or any article system(s), equipment, or device(s) 55, associated with same.

The database 30H can also contain and/or include any data and/or information regarding historical or habitual use, activities, operations, actions, or functions, performed or attempted to be performed via the premises computer 30 by any of the herein-described users, regarding the premises and/or any premises system(s), equipment, or device(s) 35, as well as regarding any other premises, vehicles, articles, and any respective premises system(s), equipment, or device(s) 35, vehicle system(s), equipment, or device(s) 45, and/or any article system(s), equipment, or device(s) 55, associated with same. The database 30H can also contain and/or include any data and/or information regarding historical or habitual use, activities, operations, actions, or functions, performed or attempted to be performed via any user personal control and monitoring accounts, premises control and monitoring accounts, vehicle control and monitoring accounts, and/or article control and monitoring accounts.

The database 30H can also contain or include, for each of the premises computer 30, any other premises computers 30, vehicle computers 40, article computers 50, and/or communication devices 60, data and/or information regarding the address, location, position, of same and/or time zone in which each is registered.

The database 30H can also contain and/or include, data and/or information, including any necessary software or processing routines for determining the position or location of the premises computer 30 and/or the time zone in which same is located at any time when same is either located in its registered location or position or when away from or remote from its registered location or position.

The database 30H can also include or contain and/or include data and/or information for enabling the premises computer 30 to calculate, determine, or ascertain, the position or location of any communication device 60, any other premises computer 30, any vehicle computer 40, and/or any article computer 50, utilized in connection with the apparatus 100 of the present invention.

The database 30H can also contain or include any data and/or information described herein as being stored in the database(s) 10H of the central processing computer(s) 10.

The database 30H can also contain and/or include any data and/or information and/or any software or processing routines for allowing or enabling the premises computer 30 to calculate, determine, or ascertain, the position or location of any authorized or registered communication device 60 at any time by performing a "pinging" operation on or for same and/or by "pinging" same. The database 30H can also contain and/or include any data and/or information and/or any software or processing routines for allowing or enabling the premises computer 30 to calculate, determine, or ascertain, the position or location of any other premises computer 30, any vehicle computer 40, any article computer 50, and/or any communication device 60 at any time by performing a "pinging" operation on or for same and/or by "pinging" same.

The database 30H can also contain or include any and/or all data and/or information and/or any software programs, routines, and/or software applications or "apps", needed or desired for performing any and/or of the processing routines, functions, and/or functionality, described herein as being provided by or performed by the premises computer(s) 30. The database 30H can also contain or include any and/or all data and/or information and/or any software programs, routines, and/or software applications or "apps", needed or desired for performing any and/or of the processing routines, functions, and/or functionality, described herein as being provided by any of the herein-described communication devices 60, which such data and/or information and/or software applications or "apps", being downloadable to the communication device(s) 60 from the premises computer 30 if and when needed or desired.

In a preferred embodiment, the database 30H can also contain or include any and/or all data and/or information needed, desired, or utilized, by the premises computer 30 for or in performing any and/or all of the processing routines, operations, functions, and/or functionality, described herein as being performed by the premises computer 30.

In a preferred embodiment, the database 30H can also contain or include any data and/or information needed or desired for performing any and all of the processing routines, functions, and/or functionality, described herein as being performed by the premises computer 30 and/or the apparatus 100 of the present invention.

The premises computer 30 also includes an output device 301, which is also connected to the CPU 30A, for outputting any data and/or information, described herein. In the preferred embodiment, the output device 301 can be a printer, a display, a transmitter, a modem, and/or any other device which can be used to output data or information.

The premises computer 30 can also be equipped with a global positioning device 30J which can be connected to the CPU 30A and which can be utilized to calculate, determine, or ascertain, the position or location of the premises computer 30 or the premises to which it is associated or assigned.

The premises computer 30 can also include a video and/or audio recording device 30K which, in a preferred embodiment, can include a camera, a video recoding device, a microphone, and/or an audio recording device. The video and/or audio recording device 30K can be utilized to take a picture, record video, record a video clip, record sound, record audio, or record an audio clip, of a user of the premises computer 30 and/or to record any picture, a sound or voice, video information, or audio information at the premises computer 30 and/or at, near, or in the vicinity of, the premises computer 30 or the premises in which it is utilized or to which it is associated or assigned.

Figure 4:
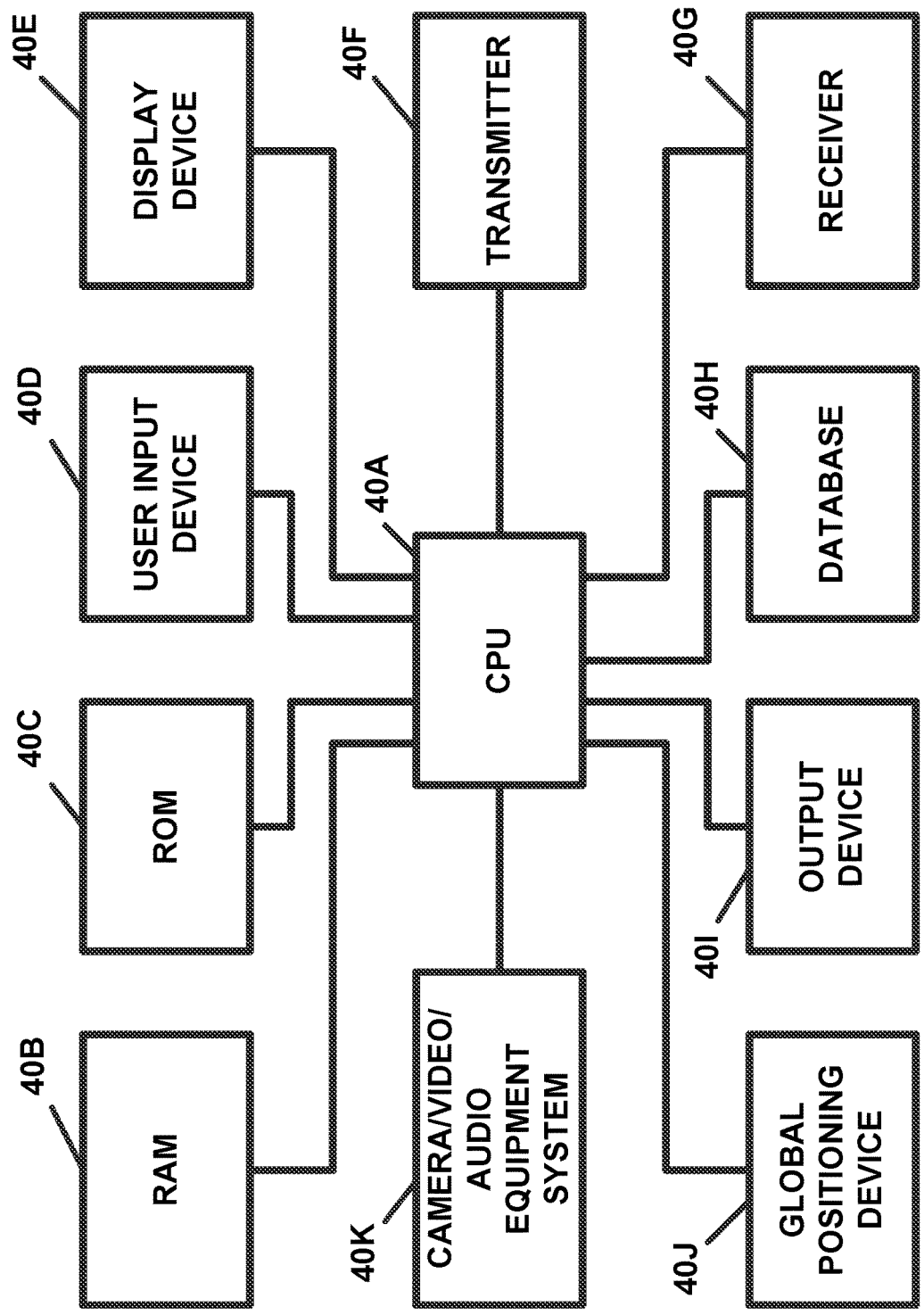
FIG. 4 illustrates a preferred embodiment of the vehicle computer of FIG. 1, in block diagram form.

FIG. 4 illustrates the vehicle computer 40 of FIG. 1, in block diagram form. With reference to FIG. 4, the vehicle computer 40 includes a central processing unit or CPU 40A, which in the preferred embodiment, is a microprocessor. The CPU 40A may also be a microcomputer, a minicomputer, a macro-computer, and/or a mainframe computer, depending upon the application.

With reference to FIG. 4, the vehicle computer 40 also includes a random access memory device(s) 40B (RAM) and a read only memory device(s) 40C (ROM), each of which is connected to the CPU 40A, and a user input device 40D, for entering data, information, and/or commands, into the vehicle computer 40, which includes any one or more of a keyboard, a scanner, a touch screen, a user pointing device, such as, for example, a mouse, a touch pad, a touch screen, and/or an audio input device and/or a video input device, a microphone or an audio recording device, a camera or a video recording device, and/or any device, electronic and/or otherwise which can be utilized for inputting and/or entering data and/or information, of any kind or type pertinent to the operation of the apparatus 100 of the present invention, into the vehicle computer 40. The input device 40D can also be any other input device(s) which are or can be utilized with or in connection with any of the vehicle computers 40 described herein as being utilized in connection with the apparatus 100 of the present invention. The input devices 40D are also connected to or with, or linked to or with, the CPU 40A. In a preferred embodiment, the input device 40 can also include a retinal scanner, a fingerprint recognition device, a voice recognition device, or any other type or kind of biometric device which can be used for determining whether or not a user or operator of the vehicle computer 40 is an authorized user, individual, or person. The vehicle computer 40 also includes a display device 40E for displaying data and/or information to a user or operator.

The vehicle computer 40 also includes a transmitter(s) 40F, for transmitting signals and/or data and/or information, or a message(s), to any one or more of the central processing computer(s) 10, the server computer(s) 20, the premises computer(s) 30, any other vehicle computer(s) 40, the article computer(s) 50, and/or any of the communication device(s) 60, described herein.

The vehicle computer 40 also includes a receiver(s) 40G, for receiving signals and/or data and/or information from any one or more of the central processing computer(s) 10, the server computer(s) 20, the premises computer(s) 30, any other vehicle computer(s) 40, the article computer(s) 50, and/or any of the communication device(s) 60, described herein.

The vehicle computer 40 also includes a database(s) 40H, which is also connected to or linked with the CPU 40A, which can contain and/or include any and/or all of the data and/or information needed or desired for performing any and/or all of the functions and/or functionality described herein as being performed by the vehicle computer 40 and/or the apparatus 100 and method of the present invention.

In a preferred embodiment, the database 40H contains and/or includes data and/or information regarding each individual, person, or entity (hereinafter referred to as "user"), who or which uses the apparatus 100 and method of the present invention in order to control, monitor, or secure, or in order to perform a control, monitoring, and/or security, operation, action, or function, for or regarding the vehicle associated with the vehicle computer 40. In a preferred embodiment, for each user, the database 40H can contain and/or include data and/or information regarding the user's name, address, telephone number(s), cellular telephone number(s), wireless telephone number(s), personal communication device telephone number(s), e-mail address(es), IP address(es), text message number(s) or information, SMS message(s) or information, employer information, work information, emergency contact information, and/or any other contact or other information. The database 40H can also contain and/or include, for each user, data and/or information regarding a user's relatives, friends, next of kin, or other contact information or emergency contact information.

The database 40H can also contain and/or include, for each user, a description of the user, a photograph or video clip of the user, data and/or information regarding a digital voiceprint of the user or data and/or information for verifying an identity of the user by his or her voiceprint, data and/or information regarding a retinal scan of the user or data and/or information for verifying an identity of the user by his or her retinal scan, data and/or information regarding a fingerprint of the user or data and/or information for verifying an identity of the user by his or her fingerprint, and/or any other data and/or information for identifying and identity of the user using biometric data and/or information.

In a preferred embodiment, the database 40H can also contain and/or include, for each user, data and/or information regarding each communication device 60 which is or can be used by the user in utilizing the apparatus 100 and method of the present invention, including, but not limited to, data and/or information regarding an identification of each communication device 60, a description of, or type or kind of, the communication device 60, manufacturer, model number, and/or serial number or any other identification information, of, for, or regarding, the communication device 60, and/or the assigned telephone number, e-mail address, text messaging or SMS messaging number, and/or IP address, or any network identification information, of, for, or associated with, the communication device 60.

In a preferred embodiment, the database 40H also contains and/or includes data and/or information regarding each vehicle, premises, and article, which is registered with the apparatus 100 and which can be controlled, monitored, and/or secured, by each user associated with the vehicle. For each vehicle, premises, and article, the database 40H can contain and/or include information regarding each user who or which is associated with the vehicle, the premises, or the article, and/or who or which is registered with the vehicle computer 40 and/or the apparatus 100 as being authorized to utilize the apparatus 100 in order to perform any control, monitoring, and/or security, operation, action, or function, regarding the vehicle and each other vehicle, premises, or article.

In a preferred embodiment, for each vehicle, premises, and/or article, registered with user and with the vehicle computer 40, the database 40H can contain and/or include data and/or information regarding each user registered as being an owner, user, and/or occupant, or any user who or which can be designated or assigned as being an authorized user of, for, or regarding, the vehicle and any other respective vehicle, premises, or article, data and/or information regarding each individual, the individual's relatives or next of kin, contact information for the individual, emergency contact information, local law enforcement contact information, registered communication device(s) 60 used by the individual, and/or whether or not the individual is authorized, and the extent to which the individual is authorized, to use the apparatus 100 for the vehicle and any other respective vehicle, premises, or article. In this regard, and as and for an example, in the case of a vehicle, the database 40H can contain and/or include data and/or information for each man, woman, and/or child who is authorized to use, operate, or travel in the vehicle, the as well as data and/or information regarding each individual, the individual's relatives or next of kin, contact information for the individual, registered communications device(s) 60 used by the individual, and/or whether or not the individual is authorized, and the extent to which the individual is authorized, to use the apparatus 100 for or regarding the vehicle.

In a preferred embodiment, the database 40H can also contain and/or include data and/or information regarding each communication device 60 and/or all communication devices 60 which is or can be associated with the vehicle and any other vehicle, premises, or article, with which the vehicle computer 40 can be utilized.

In a preferred embodiment, the database 40H contains and/or includes data and/or information regarding each and every and/or any and/or all of the vehicle system(s), equipment, or device(s) 45 in, on, at, or associated with, the vehicle or with any other vehicle for which the vehicle computer 40 can be utilized. In a preferred embodiment, for each vehicle for which the vehicle computer 40 can be utilized, the database 40H contains and/or includes data and/or information regarding each and every and/or any and/or all of the premises system(s), equipment, or device(s) 35 in, on, at, or associated with, each premises and/or data and/or information regarding each and every and/or any and/or all of the article system(s), equipment, or device(s) 55 in, on, at, or associated with, each article.

The database 40H can also contain and/or include, for or regarding the vehicle and/or any other vehicle, premises, and/or articles, serviced by the vehicle computer 40, and/or for any of the herein-described users of same, data and/or information regarding any restrictions or limitations regarding any user's or users' ability and/or authorization to access the apparatus 100 or the vehicle computer 40, any user's or users' ability and/or authorization to access the vehicle or any other vehicle, premises, or article, or any user's or users' ability and/or authorization to control, monitor, or to perform a security operation, action, or function, to control an operation of, and/or to activate, de-activate, enable, disable, or re-enable, the vehicle or any other vehicle, premises, or article, described herein or any user's or users' ability and/or authorization to control, monitor, or to perform a security operation, action, or function, to control an operation of, and/or to activate, de-activate, enable, disable, or re-enable, any vehicle system(s), equipment, or device(s) 45 of the vehicle or of any other vehicle described herein, any premises system(s), equipment, or device(s) 35 described herein, and/or any article system(s), equipment, or device(s) 55 described herein.

The database 40H can also contain and/or include, for or regarding the vehicle and any other vehicle, premises, and/or articles, and/or for any of the herein-described users of same, data and/or information regarding any requests to provide or receive an alert message(s) of, for, or regarding, any pre-defined or selected events or occurrences describe herein or any other events or occurrences which might warrant an alert message(s) being generated and/or transmitted to a user or other authorized individual, person, or entity. The database 40H can also contain and/or include data and/or information regarding the type, kind, mode, manner, and/or frequency of any alert messages being generated and/or transmitted to a user or users.

The database 40H can also contain and/or include data and/or information regarding any number of user personal control and monitoring accounts associated with the vehicle computer 40 which can be utilized to allow a user to maintain a control and monitoring account which is personal to the user and which can allow the user to utilize the apparatus 100 of the present invention in order to control, monitor, and/or perform security for, the vehicle or any other vehicle, premises, and/or articles.

The database 40H can also contain and/or include data and/or information regarding any number of vehicle control and monitoring accounts associated with the vehicle and which can be serviced by the vehicle computer 40.

The database 40H can also contain and/or include any data and/or information, activity reports, alert messages, and/or any other information, reports, or messages, regarding any and/or all activities, operations, actions, or functions, performed or attempted to be performed via the apparatus 100 regarding the vehicle and any other vehicles, premises, articles, and/or regarding any of the herein-described vehicle system(s), equipment, or device(s) 45, premises system(s), equipment, or device(s) 35, and/or any article system(s), equipment, or device(s) 55, associated with same.

The database 40H can also contain and/or include any data and/or information regarding historical or habitual use, activities, operations, actions, or functions, performed or attempted to be performed via the vehicle computer 40 by any of the herein-described users, regarding the vehicle and/or any vehicle system(s), equipment, or device(s) 45, as well as regarding any other vehicles, premises, articles, and any respective vehicle system(s), equipment, or device(s) 45, premises system(s), equipment, or device(s) 35, and/or any article system(s), equipment, or device(s) 55, associated with same. The database 40H can also contain and/or include any data and/or information regarding historical or habitual use, activities, operations, actions, or functions, performed or attempted to be performed via any user personal control and monitoring accounts, vehicle control and monitoring accounts, premises control and monitoring accounts, and/or article control and monitoring accounts.

The database 40H can also contain or include, for each of the vehicle computer 40, any other vehicle computers 40, premises computers 30, article computers 50, and/or communication devices 60, data and/or information regarding the address, location, position, of same and/or time zone in which each is registered.

The database 40H can also contain and/or include, data and/or information, including any necessary software or processing routines for determining the position or location of the vehicle computer 40 and/or the time zone in which same is located at any time when same is either located in its registered location or position or when away from or remote from its registered location or position.

The database 40H can also contain and/or include data and/or information for enabling the vehicle computer 40 to calculate, determine, or ascertain, the position or location of any communication device 60, any other vehicle computer 40, any premises computer 30, and/or any article computer 50, utilized in connection with the apparatus 100 of the present invention.

The database 40H can also contain or include any data and/or information described herein as being stored in the database(s) 10H of the central processing computer(s) 10.

The database 40H can also include or contain and/or include any data and/or information and/or any software or processing routines for allowing or enabling the vehicle computer 40 to calculate, determine, or ascertain, the position or location of any authorized or registered communication device 60 at any time by performing a "pinging" operation on or for same and/or by "pinging" same. The database 40H can also contain and/or include any data and/or information and/or any software or processing routines for allowing or enabling the vehicle computer 40 to calculate, determine, or ascertain, the position or location of any other vehicle computer 40, any premises computer 30, any article computer 50, and/or any communication device 60 at any time by performing a "pinging" operation on or for same and/or by "pinging" same.

The database 40H can also contain or include any and/or all data and/or information and/or any software programs, routines, and/or software applications or "apps", needed or desired for performing any and/or of the processing routines, functions, and/or functionality, described herein as being provided by or performed by the vehicle computer(s) 40. The database 40H can also contain or include any and/or all data and/or information and/or any software programs, routines, and/or software applications or "apps", needed or desired for performing any and/or of the processing routines, functions, and/or functionality, described herein as being provided by any of the herein-described communication devices 60, which such data and/or information and/or software applications or "apps", being downloadable to the communication device(s) 60 from the vehicle computer 40 if and when needed or desired.

In a preferred embodiment, the database 40H can also contain or include any and/or all data and/or information needed, desired, or utilized, by the vehicle computer 40 for or in performing any and/or all of the processing routines, operations, functions, and/or functionality, described herein as being performed by the vehicle computer 40.

In a preferred embodiment, the database 40H can also contain or include any data and/or information needed or desired for performing any and all of the processing routines, functions, and/or functionality, described herein as being performed by the vehicle computer 40 and/or the apparatus 100 of the present invention.

The vehicle computer 40 also includes an output device 401, which is also connected to the CPU 40A, for outputting any data and/or information, described herein. In the preferred embodiment, the output device 401 can be a printer, a display, a transmitter, a modem, and/or any other device which can be used to output data or information.

The vehicle computer 40 can also be equipped with a global positioning device 40J which can be connected to the CPU 40A and which can be utilized to calculate, determine, or ascertain, the position or location of the vehicle computer 40 or the vehicle to which it is associated or assigned.

The vehicle computer 40 can also include a video and/or audio recording device 40K which, in a preferred embodiment, can include a camera, a video recoding device, a microphone, and/or an audio recording device. The video and/or audio recording device 40K can be utilized to take a picture, record video, record a video clip, record sound, record audio, or record an audio clip, of a user of the vehicle computer 40 and/or to record any picture, a sound or voice, video information, or audio information at the vehicle computer 40 and/or at, near, or in the vicinity of, the vehicle computer 40 or the vehicle in which it is utilized or to which it is associated or assigned.

Figure 5:
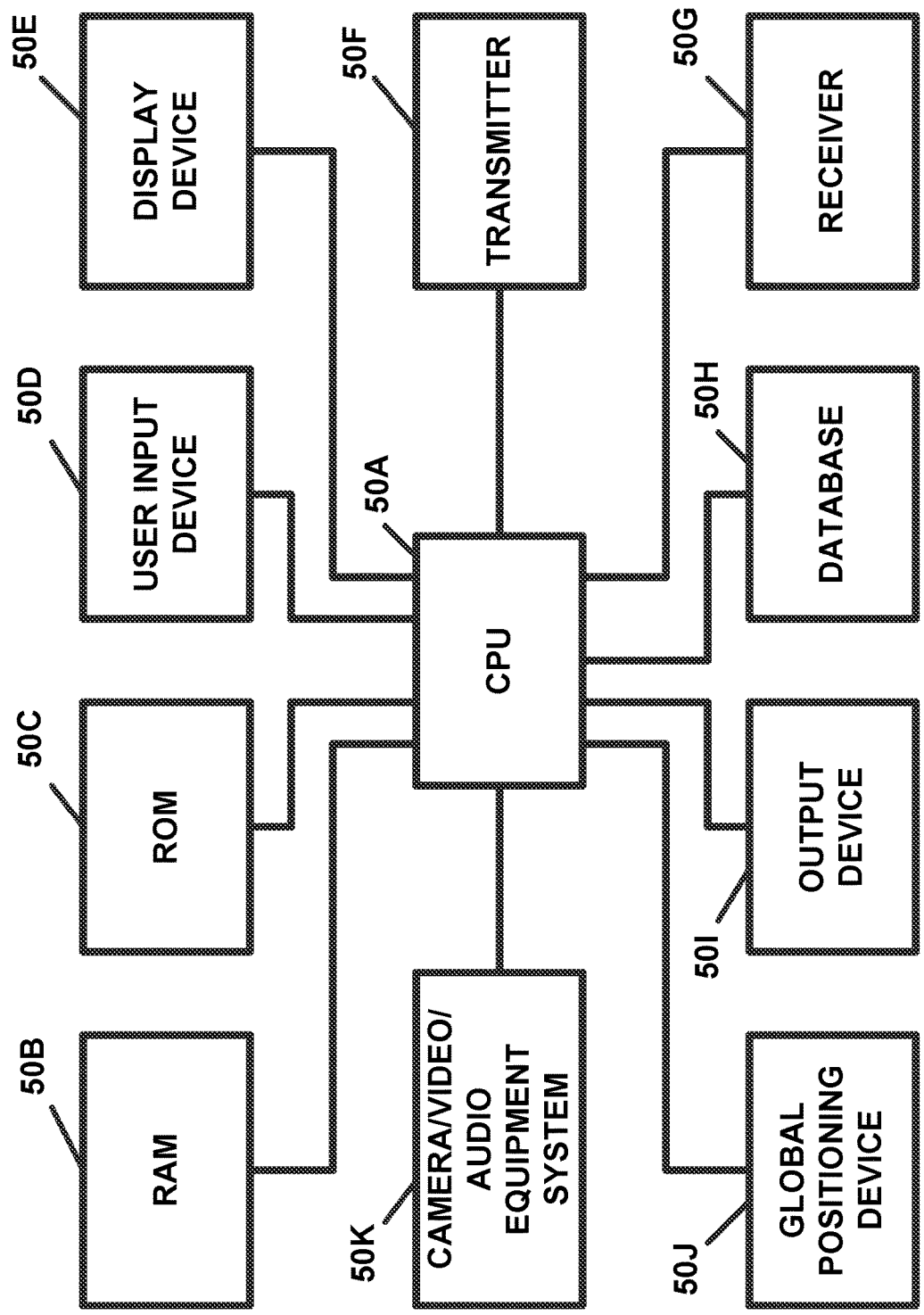
FIG. 5 illustrates a preferred embodiment of the article computer of FIG. 1, in block diagram form.

FIG. 5 illustrates the article computer 50 of FIG. 1, in block diagram form. With reference to FIG. 5, the article computer 50 includes a central processing unit or CPU 50A, which in the preferred embodiment, is a microprocessor. The CPU 50A may also be a microcomputer, a minicomputer, a macro-computer, and/or a mainframe computer, depending upon the application.

With reference to FIG. 5, the article computer 50 also includes a random access memory device(s) 50B (RAM) and a read only memory device(s) 50C (ROM), each of which is connected to the CPU 50A, and a user input device 50D, for entering data, information, and/or commands, into the article computer 50, which includes any one or more of a keyboard, a scanner, a touch screen, a user pointing device, such as, for example, a mouse, a touch pad, a touch screen, and/or an audio input device and/or a video input device, a microphone or an audio recording device, a camera or a video recording device, and/or any device, electronic and/or otherwise which can be utilized for inputting and/or entering data and/or information, of any kind or type pertinent to the operation of the apparatus 100 of the present invention, into the article computer 50. The input device 50D can also be any other input device(s) which are or can be utilized with or in connection with any of the article computers 50 described herein as being utilized in connection with the apparatus 100 of the present invention. The input devices 50D are also connected to or with, or linked to or with, the CPU 50A. In a preferred embodiment, the input device 50 can also include a retinal scanner, a fingerprint recognition device, a voice recognition device, or any other type or kind of biometric device which can be used for determining whether or not a user or operator of the article computer 50 is an authorized user, individual, or person. The article computer 50 also includes a display device 50E for displaying data and/or information to a user or operator.

The article computer 50 also includes a transmitter(s) 50F, for transmitting signals and/or data and/or information, or a message(s), to any one or more of the central processing computer(s) 10, the server computer(s) 20, the premises computer(s) 30, the vehicle computer(s) 40, any other article computer(s) 50, and/or any of the communication device(s) 60, described herein.

The article computer 50 also includes a receiver(s) 50G, for receiving signals and/or data and/or information from any one or more of the central processing computer(s) 10, the server computer(s) 20, the premises computer(s) 30, the vehicle computer(s) 40, any other article computer(s) 50, and/or any of the communication device(s) 60, described herein.

The article computer 50 also includes a database(s) 50H, which is also connected to or linked with the CPU 50A, which can contain and/or include any and/or all of the data and/or information needed or desired for performing any and/or all of the functions and/or functionality described herein as being performed by the article computer 50 and/or the apparatus 100 and method of the present invention.

In a preferred embodiment, the database 50H contains and/or includes data and/or information regarding each individual, person, or entity (hereinafter referred to as "user"), who or which uses the apparatus 100 and method of the present invention in order to control, monitor, or secure, or in order to perform a control, monitoring, and/or security, operation, action, or function, for or regarding the article associated with the article computer 50. In a preferred embodiment, for each user, the database 50H can contain and/or include data and/or information regarding the user's name, address, telephone number(s), cellular telephone number(s), wireless telephone number(s), personal communication device telephone number(s), e-mail address(es), IP address(es), text message number(s) or information, SMS message(s) or information, employer information, work information, emergency contact information, and/or any other contact or other information. The database 50H can also contain and/or include, for each user, data and/or information regarding a user's relatives, friends, next of kin, or other contact information or emergency contact information.

The database 50H can also contain and/or include, for each user, a description of the user, a photograph or video clip of the user, data and/or information regarding a digital voiceprint of the user or data and/or information for verifying an identity of the user by his or her voiceprint, data and/or information regarding a retinal scan of the user or data and/or information for verifying an identity of the user by his or her retinal scan, data and/or information regarding a fingerprint of the user or data and/or information for verifying an identity of the user by his or her fingerprint, and/or any other data and/or information for identifying and identity of the user using biometric data and/or information.

In a preferred embodiment, the database 50H can also contain and/or include, for each user, data and/or information regarding each communication device 60 which is or can be used by the user in utilizing the apparatus 100 and method of the present invention, including, but not limited to, data and/or information regarding an identification of each communication device 60, a description of, or type or kind of, the communication device 60, manufacturer, model number, and/or serial number or any other identification information, of, for, or regarding, the communication device 60, and/or the assigned telephone number, e-mail address, text messaging or SMS messaging number, and/or IP address, or any network identification information, of, for, or associated with, the communication device 60.

The database 50H can contain and/or include information regarding each user who or which is associated with the article, and/or who or which is registered with the article computer 50 and/or the apparatus 100 as being authorized to utilize the apparatus 100 in order to perform any control, monitoring, and/or security, operation, action, or function, regarding the article.

In a preferred embodiment, the database 50H can contain and/or include data and/or information regarding each user registered as being an owner or user who or which can be designated or assigned as being an authorized user of, for, or regarding, the article, data and/or information regarding each individual, the individual's relatives or next of kin, contact information for the individual, emergency contact information, local law enforcement contact information, registered communication device(s) 60 used by the individual, and/or whether or not the individual is authorized, and the extent to which the individual is authorized, to use the apparatus 100 for the article. In this regard, and as and for an example, in the case of a cellular telephone or Smartphone or smart phone, the database 50H can contain and/or include data and/or information for each man, woman, and/or child who is authorized to use or operate the article, as well as data and/or information regarding each individual, the individual's relatives or next of kin, contact information for the individual, registered communications device(s) 60 used by the individual, and/or whether or not the individual is authorized, and the extent to which the individual is authorized, to use the apparatus 100 for or regarding the article.

In a preferred embodiment, the database 50H can also contain and/or include data and/or information regarding each communication device 60 and/or all communication devices 60 which is or can be associated with the article and any other article, with which the article computer 50 can be utilized.

In a preferred embodiment, the database 50H contains and/or includes data and/or information regarding each and every and/or any and/or all of the article system(s), equipment, or device(s) 55 in, on, at, or associated with, the article or with any other article for which the article computer 50 can be utilized. In a preferred embodiment, for each article for which the article computer 50 can be utilized, the database 50H contains and/or includes data and/or information regarding each and every and/or any and/or all of the article system(s), equipment, or device(s) 55 in, on, at, or associated with, each article.

The database 50H can also contain and/or include, for or regarding the article serviced by the article computer 50, and/or for any of the herein-described users of same, data and/or information regarding any restrictions or limitations regarding any user's or users' ability and/or authorization to access the apparatus 100 or the article computer 50, any user's or users' ability and/or authorization to access the article or any other article, or any user's or users' ability and/or authorization to control, monitor, or to perform a security operation, action, or function, to control an operation of, and/or to activate, de-activate, enable, disable, or re-enable, the article or any other article described herein or any user's or users' ability and/or authorization to control, monitor, or to perform a security operation, action, or function, to control an operation of, and/or to activate, de-activate, enable, disable, or re-enable, any article system(s), equipment, or device(s) 55 described herein.

The database 50H can also contain and/or include, for or regarding the article and any other articles, and/or for any of the herein-described users of same, data and/or information regarding any requests to provide or receive an alert message(s) of, for, or regarding, any pre-defined or selected events or occurrences describe herein or any other events or occurrences which might warrant an alert message(s) being generated and/or transmitted to a user or other authorized individual, person, or entity. The database 50H can also contain and/or include data and/or information regarding the type, kind, mode, manner, and/or frequency of any alert messages being generated and/or transmitted to a user or users.

The database 50H can also contain and/or include data and/or information regarding any number of user personal control and monitoring accounts associated with the article computer 50 which can be utilized to allow a user to maintain a control and monitoring account which is personal to the user and which can allow the user to utilize the apparatus 100 of the present invention in order to control, monitor, and/or perform security for, the article or any other articles.

The database 50H can also contain and/or include data and/or information regarding any number of article control and monitoring accounts associated with the article and which can be serviced by the article computer 50.

The database 50H can also contain and/or include any data and/or information, activity reports, alert messages, and/or any other information, reports, or messages, regarding any and/or all activities, operations, actions, or functions, performed or attempted to be performed via the apparatus 100 regarding the article and any other articles and/or regarding any of the herein-described article system(s), equipment, or device(s) 55, associated with same.

The database 50H can also contain and/or include any data and/or information regarding historical or habitual use, activities, operations, actions, or functions, performed or attempted to be performed via the article computer 50 by any of the herein-described users, regarding the article, any other articles, and/or any article system(s), equipment, or device(s) 55 associated with same. The database 50H can also contain and/or include any data and/or information regarding historical or habitual use, activities, operations, actions, or functions, performed or attempted to be performed via any user personal control and monitoring accounts and/or article control and monitoring accounts.

The database 50H can also contain or include, for each of the article computer 50, any other article computers 50, and/or communication devices 60, data and/or information regarding the address, location, position, of same and/or time zone in which each is registered.

The database 50H can also contain and/or include, data and/or information, including any necessary software or processing routines for determining the position or location of the article computer 50 or the article and/or the time zone in which same is located at any time when same is either located in its registered location or position or when away from or remote from its registered location or position.

The database 50H can also include or contain and/or include data and/or information for enabling the article computer 50 to calculate, determine, or ascertain, the position or location of any communication device 60, and/or any other article computer 50 utilized in connection with the apparatus 100 of the present invention.

The database 50H can also contain or include any data and/or information described herein as being stored in the database(s) 10H of the central processing computer(s) 10.

The database 50H can also contain and/or include any data and/or information and/or any software or processing routines for allowing or enabling the article computer 50 to calculate, determine, or ascertain, the position or location of any authorized or registered communication device 60 at any time by performing a "pinging" operation on or for same and/or by "pinging" same. The database 50H can also include or contain any data and/or information and/or any software or processing routines for allowing or enabling the article computer 50 to calculate, determine, or ascertain, the position or location of any other article computer 50 and/or any communication device 60 at any time by performing a "pinging" operation on or for same and/or by "pinging" same.

The database 50H can also contain or include any and/or all data and/or information and/or any software programs, routines, and/or software applications or "apps", needed or desired for performing any and/or of the processing routines, functions, and/or functionality, described herein as being provided by or performed by the article computer(s) 50. The database 50H can also contain or include any and/or all data and/or information and/or any software programs, routines, and/or software applications or "apps", needed or desired for performing any and/or of the processing routines, functions, and/or functionality, described herein as being provided by any of the herein-described communication devices 60, with such data and/or information and/or software applications or "apps", being downloadable to the communication device(s) 60 from the article computer 50 if and when needed or desired.

In a preferred embodiment, the database 50H can also contain or include any and/or all data and/or information needed, desired, or utilized, by the article computer 50 for or in performing any and/or all of the processing routines, operations, functions, and/or functionality, described herein as being performed by the article computer 50.

In a preferred embodiment, the database 50H can also contain or include any data and/or information needed or desired for performing any and all of the processing routines, functions, and/or functionality, described herein as being performed by the article computer 50 and/or the apparatus 100 of the present invention.

The article computer 50 also includes an output device 501, which is also connected to the CPU 50A, for outputting any data and/or information, described herein. In the preferred embodiment, the output device 501 can be a printer, a display, a transmitter, a modem, and/or any other device which can be used to output data or information.

The article computer 50 can also be equipped with a global positioning device 50J which can be connected to the CPU 50A and which can be utilized to calculate, determine, or ascertain, the position or location of the article computer 50 or the article in which it is utilized or to which it is associated or assigned.

The article computer 50 can also include a video and/or audio recording device 50K which, in a preferred embodiment, can include a camera, a video recoding device, a microphone, and/or an audio recording device. The video and/or audio recording device 50K can be utilized to take a picture, record video, record a video clip, record sound, record audio, or record an audio clip, of a user of the article computer 50 and/or to record any picture, a sound or voice, video information, or audio information at the article computer 50 and/or at, near, or in the vicinity of, the article computer 50 or the article to which it is associated or assigned.

Figure 6:
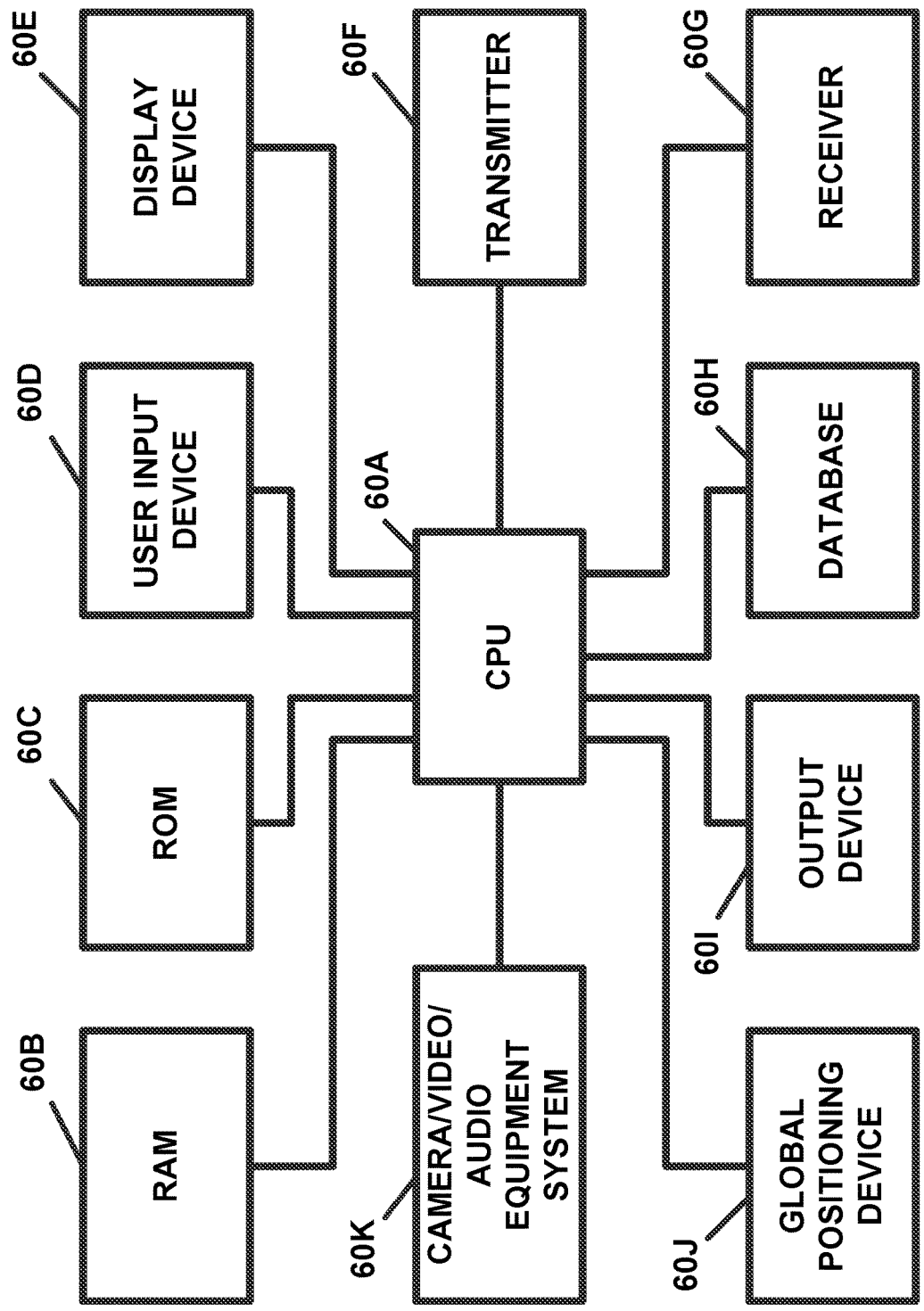
FIG. 6 illustrates a preferred embodiment of the communication device of FIG. 1, in block diagram form.

FIG. 6 illustrates the communication device 60 of FIG. 1, in block diagram form. With reference to FIG. 6, the communication device 60 includes a central processing unit or CPU 60A, which in the preferred embodiment, is a microprocessor. The CPU 60A may also be a microcomputer, a minicomputer, a macro-computer, and/or a mainframe computer, depending upon the application.

With reference to FIG. 6, the communication device 60 also includes a random access memory device(s) 60B (RAM) and a read only memory device(s) 60C (ROM), each of which is connected to the CPU 60A, and a user input device 60D, for entering data, information, and/or commands, into the communication device 60, which includes any one or more of a keyboard, a scanner, a touch screen, a user pointing device, such as, for example, a mouse, a touch pad, a touch screen, and/or an audio input device and/or a video input device, a microphone or an audio recording device, a camera or a video recording device, and/or any device, electronic and/or otherwise which can be utilized for inputting and/or entering data and/or information, of any kind or type pertinent to the operation of the apparatus 100 of the present invention, into the communication device 60. The input device 60D can also be any other input device(s) which are or can be utilized with or in connection with any of the communication devices 60 described herein as being utilized in connection with the apparatus 100 of the present invention. The input devices 60D are also connected to or with, or linked to or with, the CPU 60A. In a preferred embodiment, the input device 60 can also include a retinal scanner, a fingerprint recognition device, a voice recognition device, or any other type or kind of biometric device which can be used for determining whether or not a user or operator of the communication device 60 is an authorized user, individual, or person.

The communication device 60 also includes a display device 60E for displaying data and/or information to a user or operator.

The communication device 60 also includes a transmitter(s) 60F, for transmitting signals and/or data and/or information, or a message(s), to any one or more of the central processing computer(s) 10, the server computer(s) 20, the premises computer(s) 30, the vehicle computer(s) 40, the article computer(s) 50, and/or any other communication device(s) 60, described herein.

The communication device 60 also includes a receiver(s) 60G, for receiving signals and/or data and/or information from any one or more of the central processing computer(s) 10, the server computer(s) 20, the premises computer(s) 30, the vehicle computer(s) 40, the article computer(s) 50, and/or any other communication device(s) 60, described herein.

The communication device 60 also includes a database(s) 60H, which is also connected to or linked with the CPU 60A, which can contain and/or include any and/or all of the data and/or information needed or desired for performing any and/or all of the functions and/or functionality described herein as being performed by the communication device 60 and/or the apparatus 100 and method of the present invention.

In a preferred embodiment, the database 60H contains and/or includes data and/or information regarding each individual, person, or entity (hereinafter referred to as "user"), who or which uses the communication device 60 in order to control, monitor, or secure, or in order to perform a control, monitoring, and/or security, operation, action, or function, for or regarding any premises, vehicle, or article for which the user of the communication device 60 is authorized.

In a preferred embodiment, for the user or for each user of the communication device 60, the database 60H can contain and/or include data and/or information regarding the user's name, address, telephone number(s), cellular telephone number(s), wireless telephone number(s), personal communication device telephone number(s), e-mail address(es), IP address(es), text message number(s) or information, SMS message(s) or information, employer information, work information, emergency contact information, and/or any other contact or other information. The database 60H can also contain and/or include, for each user, data and/or information regarding the user's relatives, friends, next of kin, or other contact information or emergency contact information.

The database 60H can also contain and/or include, for the user or for each user, a description of the user, a photograph or video clip of the user, data and/or information regarding a digital voiceprint of the user or data and/or information for verifying an identity of the user by his or her voiceprint, data and/or information regarding a retinal scan of the user or data and/or information for verifying an identity of the user by his or her retinal scan, data and/or information regarding a fingerprint of the user or data and/or information for verifying an identity of the user by his or her fingerprint, and/or any other data and/or information for identifying and identity of the user using biometric data and/or information.

In a preferred embodiment, the database 60H can also contain and/or include, for the user or for each user, data and/or information regarding the communication device 60 and for any other communication device 60 which is or can be used by the user or each user in utilizing the apparatus 100 and method of the present invention, including, but not limited to, data and/or information regarding an identification of the communication device 60 and each other communication device 60, a description of, or type or kind of, the communication device 60 and each other communication device 60, manufacturer, model number, and/or serial number or any other identification information, of, for, or regarding, the communication device 60 and each other communication device 60, and/or the assigned telephone number, e-mail address, text messaging or SMS messaging number, and/or IP address, or any network identification information, of, for, or associated with, the communication device 60 and each other communication device 60.

The database 60H can contain and/or include information regarding the user or each user who or which is associated with the communication device 60, and/or who or which is registered with the communication device 60 and/or the apparatus 100 as being authorized to utilize the communication device 60 and the apparatus 100 in order to perform any control, monitoring, and/or security, operation, action, or function, regarding any of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55 associated with same.

In a preferred embodiment, the database 60H can also contain and/or include data and/or information regarding the user and/or each user registered as being an owner or user who or which can be designated or assigned as being an authorized user of, for, or regarding, the communication device 60, data and/or information regarding each individual, the individual's relatives or next of kin, contact information for the user, emergency contact information, local law enforcement contact information, registered communication device(s) 60 used by the user, and/or whether or not the user is authorized, and the extent to which the user is authorized, to use the communication device 60 and/or the apparatus 100 for any of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55 associated with same.

In this regard, and as and for an example, in the case of a cellular telephone or Smartphone or smart phone, the database 60H can contain and/or include data and/or information for each man, woman, and/or child who is authorized to use or operate the communication device 60, as well as data and/or information regarding each user, the user's relatives or next of kin, contact information for the user, registered communications device(s) 60 used by the user, and/or whether or not the user is authorized, and the extent to which the user is authorized, to use the communication device 60 and/or the apparatus 100 for or regarding any of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55 associated with same.

In a preferred embodiment, the database 60H can also contain and/or include data and/or information regarding each communication device 60 and/or all communication devices 60 which is or can be associated with any of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55 associated with same with which the communication device 60 can be utilized or is associated.

In a preferred embodiment, the database 60H contains and/or includes data and/or information regarding each and every and/or any and/or all of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55, associated with same, for or in connection with which the communication device 60 can be utilized. In a preferred embodiment, for each premises, vehicle, or article, for or in connection with which the communication device 60 can be utilized, the database 60H contains and/or includes data and/or information regarding each and every and/or any and/or all of the respective premises system(s), equipment, or device(s) 35, vehicle system(s), equipment, or device(s) 45, and/or article system(s), equipment, or device(s) 55, associated with same.

The database 60H can also contain and/or include, for or regarding each of the of the herein-described premises, vehicles, and/or articles, and/or any of the herein-described and respective premises system(s), equipment, or device(s) 35, vehicle system(s), equipment, or device(s) 45, and/or article system(s), equipment, or device(s) 55, associated with same, and for each user or users of the communication device 60, data and/or information regarding any restrictions or limitations regarding the user's and/or each user's ability and/or authorization to utilize the communication device 60 and/or to access and utilize the apparatus 100, the user's or any user's ability and/or authorization to access any premises computer 30, vehicle computer 40, and/or article computer 50, or the user's or each user's ability and/or authorization to control, monitor, or to perform a security operation, action, or function, to control an operation of, and/or to activate, de-activate, enable, disable, or re-enable, the respective premises, vehicles, and/or articles, and/or any of the herein-described and respective premises system(s), equipment, or device(s) 35, vehicle system(s), equipment, or device(s) 45, and/or article system(s), equipment, or device(s) 55, associated with same.

The database 60H can also contain and/or include, for or regarding each respective premises, vehicles, and/or articles, and/or any of the herein-described and respective premises system(s), equipment, or device(s) 35, vehicle system(s), equipment, or device(s) 45, and/or article system(s), equipment, or device(s) 55, associated with same, or which the user or each user is associated or authorized, data and/or information regarding any requests to provide or receive an alert message(s) of, for, or regarding, any pre-defined or selected events or occurrences describe herein or any other events or occurrences which might warrant an alert message(s) being generated and/or transmitted to the user or to each user. The database 60H can also contain and/or include data and/or information regarding the type, kind, mode, manner, and/or frequency of any alert messages being generated and/or transmitted to the user or to each user.

The database 60H can also contain and/or include data and/or information regarding any and/or all of the user personal control and monitoring account(s) associated with the user or associated with each user and/or in connection with which the communication device 60 can be utilized.

The database 60H can also contain and/or include any data and/or information, activity reports, alert messages, and/or any other information, reports, or messages, regarding any and/or all activities, operations, actions, or functions, performed or attempted to be performed via the communication device 60 regarding any of the herein-described and respective premises system(s), equipment, or device(s) 35, vehicle system(s), equipment, or device(s) 45, and/or article system(s), equipment, or device(s) 55, associated with same, for which the communication device 50 may be utilized.

The database 60H can also contain and/or include any data and/or information regarding historical or habitual use, activities, operations, actions, or functions, performed or attempted to be performed via the communication device 60 by the user or each user of the communication device 60 for or regarding any of the herein-described and respective premises system(s), equipment, or device(s) 35, vehicle system(s), equipment, or device(s) 45, and/or article system(s), equipment, or device(s) 55, associated with same, for which the communication device 50 may be utilized. The database 60H can also contain and/or include any data and/or information regarding historical or habitual use, activities, operations, actions, or functions, performed or attempted to be performed via any user personal control and monitoring accounts for which the communication device 60 is utilized.

The database 60H can also contain or include, for the communication device 60, data and/or information regarding the time zone in which the communication device 60 is registered.

The database 60H can also contain and/or include data and/or information, including any necessary software or processing routines for determining the position or location of the communication device 60 at any time and/or the time zone in which the communication device 60 is located at any time.

The database 60H can also contain and/or include data and/or information for enabling the communication device 60 to calculate, determine, or ascertain, the position or location of any other communication device 60 associated with the user or with any user personal control and monitoring accounts of the user or associated with the user.

The database 60H can also contain or include any data and/or information described herein as being stored in the database(s) 10H of the central processing computer(s) 10.

The database 60H can also contain and/or include any data and/or information and/or any software or processing routines for allowing or enabling the communication device 60 to calculate, determine, or ascertain, the position or location of any other authorized or registered communication device 60 at any time by performing a "pinging" operation on or for same and/or by "pinging" same.

The database 60H can also contain or include any and/or all data and/or information and/or any software programs, routines, and/or software applications or "apps", needed or desired for performing any and/or of the processing routines, functions, and/or functionality, described herein as being provided by or performed by the communication device 60. The database 60H can also contain or include any and/or all data and/or information and/or any software programs, routines, and/or software applications or "apps", needed or desired for performing any and/or of the processing routines, functions, and/or functionality, described herein as being provided by the communication devices 60, with such data and/or information and/or software applications or "apps", being downloadable to or by the communication device 60.

In a preferred embodiment, the database 60H can also contain or include any and/or all data and/or information needed, desired, or utilized, by the communication device 60 for or in performing any and/or all of the processing routines, operations, functions, and/or functionality, described herein as being performed by the communication device 60.

In a preferred embodiment, the database 60H can also contain or include any data and/or information needed or desired for performing any and all of the processing routines, functions, and/or functionality, described herein as being performed by the communication device 60 and/or the apparatus 100 of the present invention.

The communication device 60 also includes an output device 601, which is also connected to the CPU 60A, for outputting any data and/or information, described herein. In the preferred embodiment, the output device 601 can be a printer, a display, a transmitter, a modem, and/or any other device which can be used to output data or information.

The communication device 60 can also be equipped with a global positioning device 60J which can be connected to the CPU 60A and which can be utilized to calculate, determine, or ascertain, the position or location of the communication device 60.

The communication device 60 can also include a video and/or audio recording device 60K which, in a preferred embodiment, can include a camera, a video recoding device, a microphone, and/or an audio recording device. The video and/or audio recording device 60K can be utilized to take a picture, record video, record a video clip, record sound, record audio, or record an audio clip, of a user of the communication device 60 and/or to record any picture, a sound or voice, video information, or audio information at the communication device 60 and/or at, near, or in the vicinity of, the communication device 60.

In a preferred embodiment, the apparatus 100 of the present invention, and/or the communication device 60, the central processing computer 10 and/or the server computer 20, and/or the premises computer 30, can be utilized in order to activate, de-activate, control an operation of, monitor an operation of, perform a security operation regarding, enable, disable, or re-enable, any premises system(s), equipment, or device(s) 35.

In a preferred embodiment, the communication device 60 can be utilized in order to transmit a control signal to the central processing computer 10, either directly and/or indirectly via the server computer 20. The central processing computer 10 can then transmit the same control signal or a different control signal to the premises computer 30. The premises computer 30 can then generate and/or transmit the same control signal or a different control signal in order to activate, de-activate, control an operation of, monitor an operation of, perform a security operation regarding, enable, disable, or re-enable, any premises system(s), equipment, or device(s) 35.

In a preferred embodiment, the apparatus 100 of the present invention, and/or the communication device 60, the central processing computer 10 and/or the server computer 20, and/or the vehicle computer 40, can be utilized in order to activate, de-activate, control an operation of, monitor an operation of, perform a security operation regarding, enable, disable, or re-enable, any vehicle system(s), equipment, or device(s) 45.

In a preferred embodiment, the communication device 60 can be utilized in order to transmit a control signal to the central processing computer 10, either directly and/or indirectly via the server computer 20. The central processing computer 10 can then transmit the same control signal or a different control signal to the vehicle computer 40. The vehicle computer 40 can then generate and/or transmit the same control signal or a different control signal in order to activate, de-activate, control an operation of, monitor an operation of, perform a security operation regarding, enable, disable, or re-enable, any vehicle system(s), equipment, or device(s) 45.

In a preferred embodiment, the apparatus 100 of the present invention, and/or the communication device 60, the central processing computer 10 and/or the server computer 20, and/or the article computer 50, can be utilized in order to activate, de-activate, control an operation of, monitor an operation of, perform a security operation regarding, enable, disable, or re-enable, the article or any article system(s), equipment, or device(s) 55.

In a preferred embodiment, the communication device 60 can be utilized in order to transmit a control signal to the central processing computer 10, either directly and/or indirectly via the server computer 20. The central processing computer 10 can then transmit the same control signal or a different control signal to the article computer 50. The article computer 50 can then generate and/or transmit the same control signal or a different control signal in order to activate, de-activate, control an operation of, monitor an operation of, perform a security operation regarding, enable, disable, or re-enable, the article or any article system(s), equipment, or device(s) 55.

Figure 7:
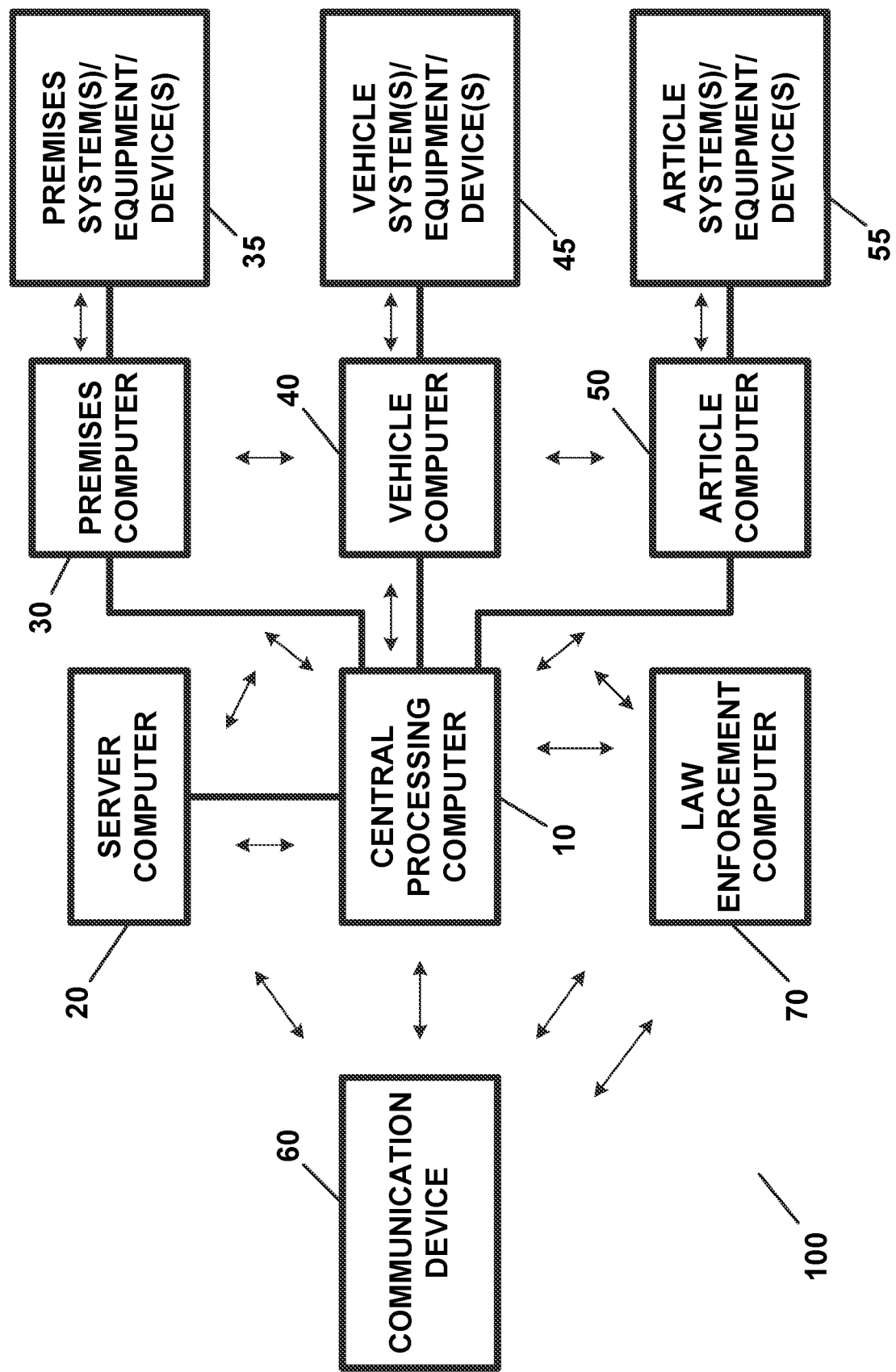
FIG. 7 illustrates another preferred embodiment of the apparatus of the present invention, in block diagram form.

In another preferred embodiment, the apparatus 100 and method of the present invention can be utilized in connection with or in conjunction with a law enforcement agency, department, or bureau. The law enforcement agency, department, or bureau can be any local, municipal, county, provincial, state, or federal, law enforcement agency, department, or bureau. FIG. 7 illustrates another preferred embodiment of the apparatus 100 of the present invention which can also be utilized to report information, illegal activity, an occurrence, and/or any other activity, action, event, happening, or occurrence, relating to, regarding, or involving any of the users of the apparatus 100, any of the premises with which the apparatus 100 is utilized, any of the vehicles with which the apparatus 100 is utilized, and/or any of the articles with which the apparatus 100 is utilized.

With reference to FIG. 7, the apparatus 100 includes the central processing computer 10, the server computer 20, the premises computer 30, the premises system(s), equipment, device(s) 35, the vehicle computer 40, the vehicle system(s), equipment, device(s) 45, the article computer 50, the article system(s), equipment, device(s) 55, and the communication device 60, as illustrated in FIG. 1. In addition, the apparatus 100 of FIG. 7 includes a law enforcement computer 70 which can be any computer, computer system, group of computers, server, server system, or group of servers, which can be utilized by a law enforcement agency, department, or bureau. Any number of law enforcement computer(s) 70 can be utilized in connection with the apparatus 100 of the present invention. In a preferred embodiment, any law enforcement agency, department, or bureau, can utilize any number of law enforcement computers 70, each of which may receive and/or process signals, data, information, or a message, regarding different types or kinds of information, illegal activities, occurrences, and/or any other activities, actions, events, happenings, or occurrences, relating to, regarding, or involving any of the users of the apparatus 100, any of the premises with which the apparatus 100 is utilized, any of the vehicles with which the apparatus 100 is utilized, and/or any of the articles with which the apparatus 100 is utilized.

In a preferred embodiment, any of the central processing computer(s) 10, the server computer(s) 20, the premises computer(s) 30, the premises system(s), equipment, device(s) 35, the vehicle computer(s) 40, the vehicle system(s), equipment, device(s) 45, the article computer(s) 50, the article system(s), equipment, device(s) 55, and the communication device(s) 60, can transmit signals, data, information, reports, or messages, to, as well as receive signals, data, information, reports, or messages, from the law enforcement computer(s) 70.

Figure 8:
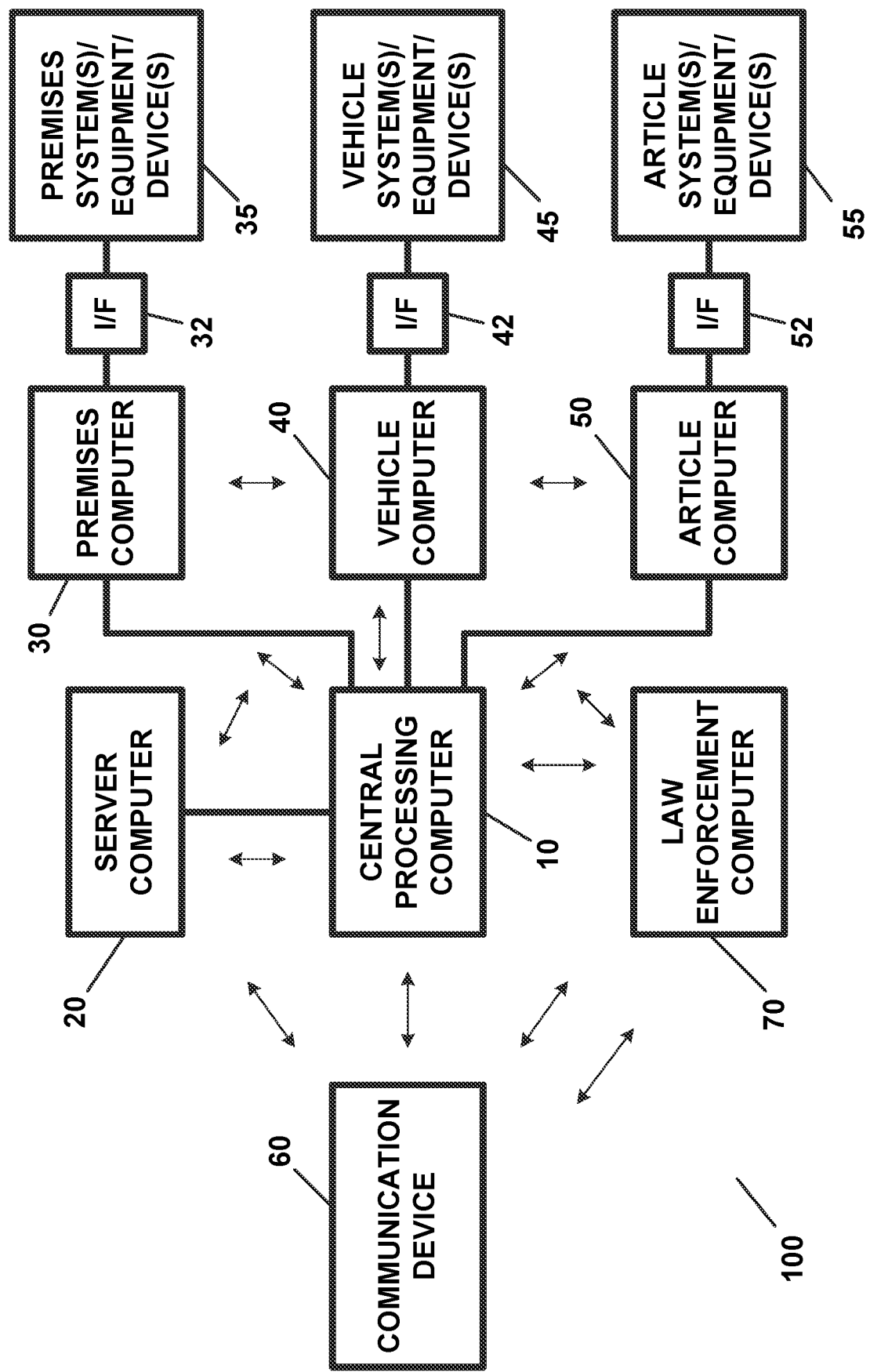
FIG. 8 illustrates another preferred embodiment of the apparatus of the present invention, in block diagram form.

In another preferred embodiment, interface device(s) (I/F) can be utilized in connection with or in conjunction with the premises computer 30 and one or more of the premises system(s), equipment, device(s) 35, in connection or in conjunction with the vehicle computer(s) 40 and one or more of the vehicle system(s), equipment, device(s) 45, and/or in connection or in conjunction with the article computer(s) 50 and one or more of the article system(s), equipment, device(s) 55. FIG. 8 illustrates another preferred embodiment of the apparatus 100 in which an interface (I/F) device(s) can be utilized in connection or in conjunction with the premises computer 30 and one or more of the premises system(s), equipment, device(s) 35, in connection or in conjunction with the vehicle computer(s) 40 and one or more of the vehicle system(s), equipment, device(s) 45, and/or in connection and/or in conjunction with the article computer(s) 50 and one or more of the article system(s), equipment, device(s) 55.

With reference to FIG. 8, the apparatus 100 includes the central processing computer 10, the server computer 20, the premises computer 30, the premises system(s), equipment, device(s) 35, the vehicle computer 40, the vehicle system(s), equipment, device(s) 45, the article computer 50, the article system(s), equipment, device(s) 55, and the communication device 60, as illustrated in FIG. 1. In addition, the apparatus 100 of FIG. 8 includes a premises I/F device 32 which can be or can serve as an interface between the premises computer 30 and any premises system(s), equipment, device(s) 35, a vehicle I/F device 42 which can be or can serve as an interface between the vehicle computer 40 and any vehicle system(s), equipment, device(s) 45, and/or an article IF device 52 which can be or can serve as an interface the article computer 50 and any article system(s), equipment, device(s) 55. In a preferred embodiment, any number of I/Fs 32, I/Fs 42, and/or I/Fs 52, can be utilized in connection or in conjunction with the apparatus 100 of the present invention. In a preferred embodiment, any of the I/Fs 32, 42, and/or 52 can contain and/or can include any hardware, software, circuitry, and/or any other devices and/or equipment, which may be needed or desired for its respective interfacing function or functionality.

In a preferred embodiment, the apparatus 100 and method of the present invention can be utilized in order to create, establish, and/or provide service for, a personal control and monitoring account (hereinafter also referred to as a "PCMA"). In a preferred embodiment, a personal control and monitoring account or PCMA can be assigned to or associated with each individual or user, or entity, who or which utilizes the apparatus 100 and method of the present invention.

In a preferred embodiment, a premises control and monitoring account ("premises CMA" or "premises account") can be established and assigned to and/or associated with each premises for which the apparatus 100 can or is to be utilized, a vehicle control and monitoring account ("vehicle CMA" or "vehicle account") can be established and assigned to and/or associated with each vehicle for which the apparatus 100 can or is to be utilized, and an article control and monitoring account ("article CMA" or "article account") can be established and assigned to and/or associated with each article for which the apparatus 100 can or is to be utilized.

In a preferred embodiment, each premises CMA, each vehicle CMA, and each article CMA can be established and information regarding same can be stored in the database 10H of the central processing computer 10 and/or in the database of the server computer 20. In a preferred embodiment, for each premises serviced by the apparatus 100 of the present invention, data and/or information regarding the respective premises CMA associated with that premises can be stored in the database 30H of the respective premises computer 30 of or associated with that premises, for each vehicle serviced by the apparatus 100 of the present invention, data and/or information regarding the respective vehicle CMA associated with that vehicle can be stored in the database 40H of the respective vehicle computer 30 of or associated with that vehicle, and for each article serviced by the apparatus 100 of the present invention, data and/or information regarding the respective article CMA of or associated with that article can be stored in the database 50H of the respective article computer 50 of or associated with that article.

In a preferred embodiment, each premises CMA, each vehicle CMA, and each article CMA, can include and/or can contain, data and/or information regarding the respective premises, the respective vehicle, or the respective article, data and/or information identifying the respective premises, the respective vehicle, or the respective article, data and/or information regarding any authorized user or authorized individual or entity authorized to perform any control and/or monitoring and/or security operations, actions, or functions, regarding the respective premises, the respective vehicle, or the respective article, data and/or information regarding any restrictions or limitations regarding the use apparatus 100 regarding the respective premises, the respective vehicle, or the respective article, data and/or information regarding any restriction(s) or limitation(s) placed on an authorized user's or an authorized individual's or entity's ability to perform any control and/or monitoring and/or security operation, action, or function regarding the respective premises, the respective vehicle, or the respective article, data and/or information regarding each authorized user's or authorized individual's, including but not limited to, name, address, telephone number, cellular telephone number, wireless telephone number, e-mail address, text messaging or SMS messaging number or information, user name, user access code(s), user password(s), a photograph or a digital photograph of the respective authorized user or authorized individual, a voice sample of the respective authorized user or authorized individual, retinal scan data and/or information of or for the respective authorized user or authorized individual, fingerprint and/or digital fingerprint information of or for the respective authorized user or authorized individual, handprint and/or digital handprint information of or for the respective authorized user or authorized individual, handprint geometry data and/or information of or for the respective authorized user or authorized individual, facial feature data and/or information of or for the respective authorized user or authorized individual, and/or any other biometric information of or for the respective authorized user or authorized individual.

In a preferred embodiment, each premises CMA, each vehicle CMA, and each article CMA, can include and/or can contain, data and/or information regarding an authorized user's or an authorized individual's request to receive alert messages or alerts for or regarding any activities, events, occurrences, status, regarding or involving, any premises which is the subject of a premises CMA, any vehicle which is the subject of a vehicle CMA, or any article which is the subject of an article CMA for which the authorized user or the authorized individual is authorized.

In a preferred embodiment, each premises CMA, each vehicle CMA, and each article CMA, can also include and/or can contain, any other data and/or information regarding any and/or all users, individuals, or entities, who or which are authorized to use or access the respective premises CMA, the respective vehicle CMA, or the respective article CMA and/or are otherwise authorized to perform any control and/or monitoring and/or security operations, actions, or functions, regarding the respective premises, the respective vehicle, or the respective article.

In a preferred embodiment, each premises CMA, each vehicle CMA, and each article CMA, can also include and/or can contain, any other data and/or information needed or desired for performing any of the herein-described functions and/or functionality described herein as being performed by the apparatus 100 of the present invention.

In a preferred embodiment, each personal control and monitoring account or PCMA can include and/or can contain, data and/or information regarding the user or individual ("the authorized user" or "the authorized individual") for whom the personal control and monitoring account, the user's or individual's name, name, address, telephone number, cellular telephone number, wireless telephone number, e-mail address, text messaging or SMS messaging number or information, user name, user access code(s), user password(s), a photograph or a digital photograph of the respective authorized user or authorized individual, a voice sample of the respective authorized user or authorized individual, retinal scan data and/or information of or for the respective authorized user or authorized individual, fingerprint and/or digital fingerprint information of or for the respective authorized user or authorized individual, handprint and/or digital handprint information of or for the respective authorized user or authorized individual, handprint geometry data and/or information of or for the respective authorized user or authorized individual, facial feature data and/or information of or for the respective authorized user or authorized individual, and/or any other biometric information of or for the respective authorized user or authorized individual. The personal control and monitoring account can also contain any data and/or information regarding, and/or any link(s) or hyperlink(s), to any premises CMA(s), to any vehicle CMA(s), and/or any article CMS(s), for which the authorized user or authorized individual is authorized to access, use, and/or otherwise authorized to perform any control and/or monitoring and/or security operations, actions, or functions, regarding the a respective premises, a respective vehicle, or a respective article.

The personal control and monitoring account can also contain any data and/or information regarding any restriction(s) or limitation(s) regarding the authorized user's use or the authorized individual's use of any of premises CMA(s), vehicle CMA(s), or article CMS(s), regarding which the authorized user or authorized individual is authorized to access, use, and/or otherwise authorized to perform any control and/or monitoring and/or security operations, actions, or functions.

In a preferred embodiment, the personal control and monitoring account or PCMA can also include and/or can contain, data and/or information regarding the authorized user's or the authorized individual's request to receive alert messages or alerts for or regarding any activities, events, occurrences, status, regarding or involving, any premises which is the subject of a premises CMA, any vehicle which is the subject of a vehicle CMA, or any article which is the subject of an article CMA for which the authorized user or the authorized individual is authorized.

In a preferred embodiment, the personal control and monitoring account or PCMA can also include and/or can contain, any other data and/or information regarding any and/or all other users, individuals, or entities, who or which are authorized, either by the authorized user, by the authorized individual, or by a third party, to use or access any respective premises CMA, any respective vehicle CMA, or any respective article CMA, and/or who or which are also authorized to perform any control and/or monitoring and/or security operations, actions, or functions, regarding the respective premises, the respective vehicle, or the respective article.

In a preferred embodiment, the personal control and monitoring account or PCMA can also contain any data and/or information, including any link(s) or hyperlink(s) to, any premises CMAs, vehicle(s), or article CMAs, for which he or she is authorized or registered to access or use.

In a preferred embodiment, an authorized user or an authorized individual can access any premises CMAs, vehicle(s), or article CMAs, for which he or she is authorized or registered via his or her personal control and monitoring account or PCMA.

In a preferred embodiment, the personal control and monitoring account or PCMA can also include and/or can contain any other data and/or information needed or desired for performing any of the herein-described functions and/or functionality described herein as being performed by the apparatus 100 of the present invention.

In a preferred embodiment, any authorized user or authorized individual can establish or create a respective premises CMA, vehicle CMA, or article CMA, with the central processing computer 10 and/or the server computer 20, by accessing same, and by transmitting, using a communication device 60, any and/or all of the herein-described data and/or information needed or desired for establishing or creating the respective premises CMA, vehicle CMA, or article CMA.

In a preferred embodiment, any authorized user or authorized individual can also establish or create a respective personal control and monitoring account, with the central processing computer 10 and/or the server computer 20, by accessing same, and by transmitting, using a communication device 60, any and/or all of the herein-described data and/or information needed or desired for establishing or creating the respective personal control and monitoring account.

In an preferred embodiment, any and/or all data and/or information regarding any of the herein-described personal control and monitoring accounts or PCMAs any and/or all of the premises CMAs, vehicle CMAs, and article CMAs serviced by the apparatus 100 and method of the present invention can be stored in the database 10H of the central processing computer 10, the database of the server computer 20, the database 30H of each premises computer 30, the database 40H of each vehicle computer 40, the database 50H of each article computer 50, the database 60 of a communication device 60 associated with or used by an authorized user or an authorized individual, and/or any database of any law enforcement computer 70 or the database of any security monitoring computer.

In a preferred embodiment, any authorized user or authorized individual can also, at any time, access the central processing computer 10 and/or the server computer 20 using a communication device 60 and transmit any changes or updates to any and/or all of the herein-described personal control and monitoring accounts or PCMAs and/or any and/or all of the herein-described premises CMAs, vehicle CMAs, and/or article CMAs.

In a preferred embodiment, the apparatus 100 and method of the present invention can be utilized in connection with and/or in conjunction with personal control and monitoring accounts or PCMAs and/or premises CMAs, vehicle CMAs, and/or article CMAs, and/or can be utilized in order to establish or create, and/or modify, change, or alter, any data and/or information contained in and/or included in any of the herein-described personal control and monitoring accounts or PCMAs and/or premises CMAs, vehicle CMAs, and/or article CMAs.

Figure 9:
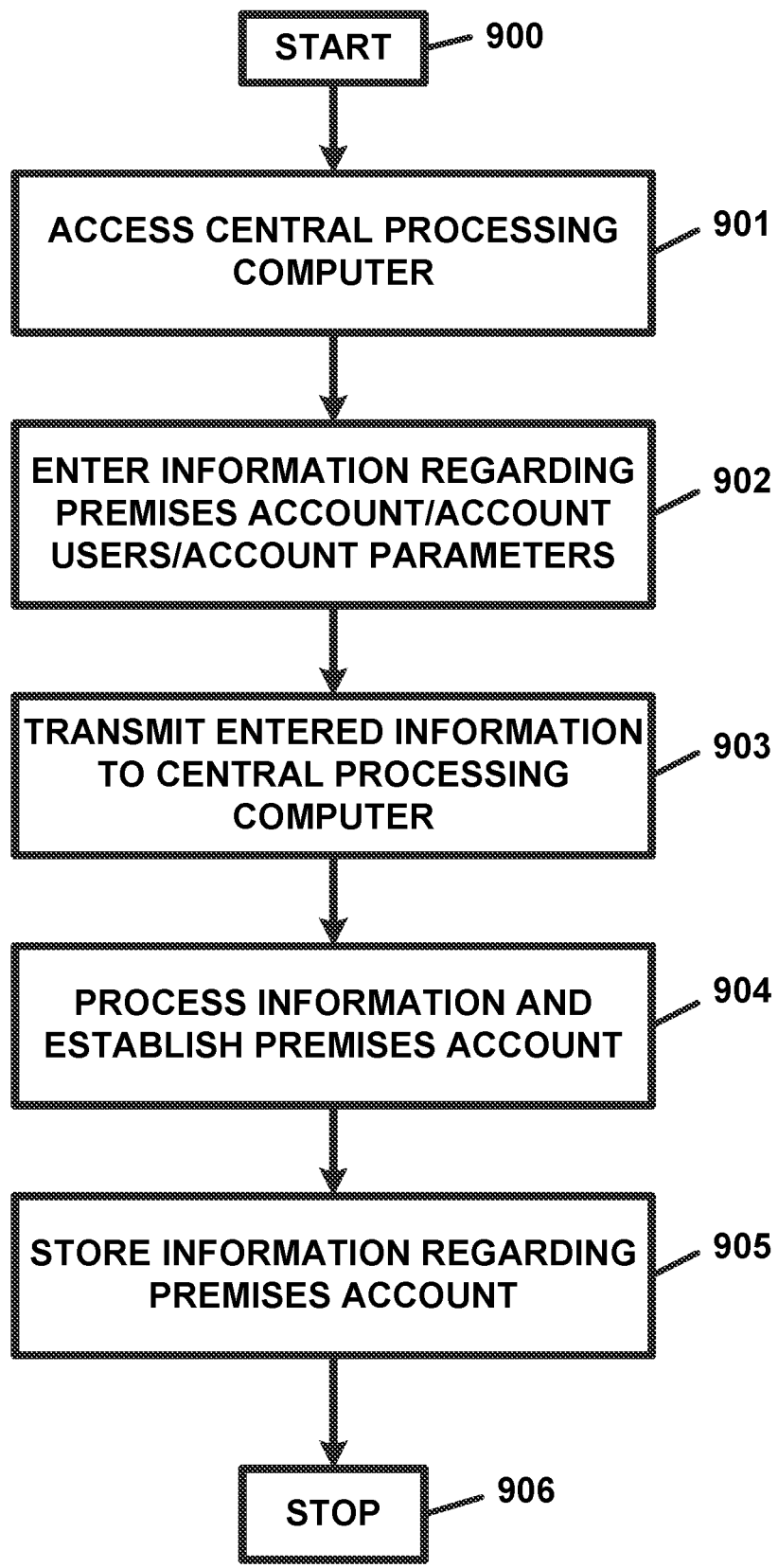
FIG. 9 illustrates a preferred embodiment method for utilizing the apparatus of the present invention, in flow diagram form.

In a preferred embodiment, any authorized user or individual can establish or create a premises CMA for a premises, a vehicle CMA for a vehicle, and/or for an article CMA for an article by using the apparatus 100 of the present invention. FIG. 9 illustrates a preferred embodiment method for utilizing the apparatus 100 of the present invention, in flow diagram form. Although the embodiment of FIG. 9 is described and illustrated in connection with establishing or creating a premises CMA, it is important to note that the embodiment of FIG. 9 can also be utilized, in a same, a similar, and/or an analogous, manner in order to establish or create a vehicle CMA and an article CMA With reference to FIG. 9, the operation of the apparatus 100 commences at step 900. At step 901, a user can access the central processing computer 10, either directly and/or via the server computer 20, with or using the communication device 60. At step 902, the user can enter, into the communication device 60, information regarding the premises which is to be controlled, monitored, and/or secured by or via, and/or which is the subject of the, premises CMA. At step 902, the user can also enter, into the communication device 60, information regarding any and/or all of the premises system(s), equipment, and device(s) 35 in, on, or at, the premises which can be controlled, monitored, and/or secured by or via the premises CMA. At step 902, the user can also enter, into the communication device 60, information regarding any authorized user(s) or authorized individual(s) who or which is authorized to utilize the premises CMA, who or which is authorized to access the premises CMA, who or which is authorized to perform any control, monitoring, and/or security, operation, action, or function, on, for, or regarding the premises or the premises system(s), equipment, and/or device(s) 35. At step 902, the user can enter, into the communication device 60, for each authorized user or authorized individual, the authorized user's or authorized individual's name, user name, contact information, user contact information, address, telephone number, cellular telephone number, wireless telephone number, e-mail address, text messaging or SMS messaging number or information, user name, user access code(s), user password(s), a photograph or a digital photograph of the respective authorized user or authorized individual, a voice sample of the respective authorized user or authorized individual, retinal scan data and/or information of or for the respective authorized user or authorized individual, fingerprint and/or digital fingerprint information of or for the respective authorized user or authorized individual, handprint and/or digital handprint information of or for the respective authorized user or authorized individual, handprint geometry data and/or information of or for the respective authorized user or authorized individual, facial feature data and/or information of or for the respective authorized user or authorized individual, and/or any other biometric information of or for the respective authorized user or authorized individual.

At step 902, the user can enter, into the communication device 60, any information in order to designate one or more authorized user(s) or authorized individual(s) who or which is or are to be the lead authorized user(s) or lead authorized individual(s) on or for the premises CMA or the premises account. For example, in the case of a residential premises associated with a family including a husband, wife, and four children or any number of children, the user can designate the husband and/or the wife as being the lead authorized user(s) of the lead authorized individual(s). At step 902, the user can also enter, into the communication device 60, information regarding, for each authorized user, the type, kind, or form, of identification or other form of authorization required for that authorized user or authorized individual to use or access the apparatus 100, the central processing computer 10, the server computer 20, the premises CMA or premises account, and/or to perform any control, monitoring, and/or security, action, operation, or function, regarding the premises or any premises system(s), equipment, or device(s) 35 in, on, or at, the premises, and the type or kind of identification or other form of authorization required for that authorized user or authorized individual to enter into or onto the premises and/or to operate any premises system(s), equipment, or device(s) 35 in, on, or at, the premises. In a preferred embodiment, the type, kind, or form of identification or other form of authorization required can include a valid user name, password, a photograph, a voice print analysis, a retinal scan analysis, a fingerprint scanning and/or reading analysis, a handprint scanning or reading analysis, a hand geometry reading analysis, or any processing and/or verification of any biometric information.

At step 902, the user can also enter, into the communication device 60, information regarding any restriction(s) or limitation(s) regarding any authorized user's ability to access the apparatus 100, any authorized user's access the central processing computer 10, any authorized user's access the premises CMA or the premises account, any authorized user's ability to control, monitor, and/or perform any security, operation, action, and/or functions regarding any of the premises system(s), equipment, or device(s) in, on, at, or associated with, the premises. Any restriction or limitation can restrict or limit an authorized user's or an authorized individual's authorized time(s) for accessing and/or using the premises CMA, restrict or limit an authorized user's or an authorized individual's authorized time(s) for accessing and/or using the premises CMA, and/or for any of the premises system(s), equipment, or device(s) 35 of the premises, restrict or limit an authorized user's or an authorized individual's ability to access, control, monitor, and/or perform a security, operation, action, or function, any given premises system(s), equipment, or device(s) 35.

At step 902, the user can also enter, into the communication device 60, information in order to set up alert message requests or alert requests for notifying or alerting the user, the lead authorized user(s) or lead authorized individual(s) of or to any pre-defined activity, action, event, happening, or occurrence, regarding or involving the premises, the premises CMA or premises account, or any premises system(s), equipment, or device(s) 35 on, in, at, or associated with the premises.

In a preferred embodiment, an alert message can be generated and transmitted upon any occurrence of any authorized user or authorized individual, or any unauthorized user or unauthorized individual, accessing or attempting to access, the premises CMA or premises account, any occurrence of any authorized user or authorized individual, or any unauthorized user or unauthorized individual, performing or attempting to perform, any control, monitoring, and/or security, operation, action, or function, on or regarding any premises system(s), equipment, or device(s) 35 on, in, at, or associated with the premises, any detected malfunction, failure, or state of disrepair, of or regarding the premises and/or any premises system(s), equipment, or device(s) 35 on, in, at, or associated with the premises, or a detected entry into the premises by any user, individual, person, or third party whether authorized or nor authorized, any detected break-in or burglary regarding the premises, and/or any other activity, action, event, happening, or occurrence, regarding or involving the premises, the premises CMA or premises account, or any premises system(s), equipment, or device(s) 35 on, in, at, or associated with the premises which would warrant providing notice to any authorized user or authorized individual, lead authorized user, lead authorized individual, any authorized third party, any individual associated to receive an alert message, a local or other law enforcement agency, department, or bureau, or any other authorized or designated individual, person, entity, or organization.

At step 903, any and/or all of the data and/or information entered into the communication device 60 at step 902 can be transmitted to and received at the central processing computer 10. At step 904, the central processing computer 10 can process the data and/or information received and can establish or create the premises CMA or premises account for the premises. In a preferred embodiment, the data and/or information contained or included in the premises CMA or premises account can include any and/or all of the data and/or information entered into the communication device 60 at or during step 902 as well as any other additional data and/or information. At step 905, the data and/or information regarding the newly established or created premises CMA or premises account can be stored in the database 10H of the central processing computer 10. At step 905, data and/or information regarding the premises CMA or premises account can also be transmitted to the premises computer 30, associated with the premises which is the subject of the premises CMA or premises account, and stored in the database 30H of same.

At step 905, data and/or information regarding the premises CMA or premises account can also be transmitted to and stored in each communication device(s) 60, associated with and/or used by each lead authorized user or lead authorized individual and/or each authorized user or authorized individual, in the respective database 60H of same. At step 905, data and/or information regarding the premises CMA or premises account can also be transmitted to and stored in the database of the server computer 20. At step 905, data and/or information regarding the premises CMA or premises account can also be transmitted to any other authorized premises computer 30, vehicle computer 40, and/or article computer 50 and can be stored in the respective database 30H, 40H, and/or 50H, of same. Thereafter, the operation of the apparatus 100 will cease at step 906.

It is important to note that, although described and illustrated as being used for establishing or creating a premises CMA or premises account for a premises, the apparatus 100 of the embodiment of FIG. 9 can also be utilized in a same, a similar, and/or an analogous, manner in order to establish or create a vehicle CMA or vehicle account for a vehicle and/or an article CMA or article account for an article.

In another preferred embodiment, an authorized user or authorized individual can also access the central processing computer 10 at any time and can make changes, modifications, or alterations, to the premises CMA or premises account, add or delete authorized users or authorized individual, make changes, modifications, or alterations, to any restriction(s) or limitation(s) on or regarding the premises CMA or premises account, make changes, modifications, or alterations, to any restriction(s) or limitation(s) on or regarding the premises CMA or premises account, for or regarding an authorized users or authorized individuals and/or any premises system(s), equipment, or device(s) 35, establish, create, and/or make changes, modifications, or alterations, to any request(s) to receive alert messages or alerts or notification, and/or make or effectuate any other changes, modifications, or alterations, to or regarding the premises CMA or premises account. In another preferred embodiment, the apparatus 100 can be utilized in a same, a similar, and/or an analogous, manner, in order to make the same, similar, and/or analogous, changes, modifications, or alterations, to the a vehicle premises CMA or vehicle account and/or to an article CMA or article account.

In a preferred embodiment, any user or individual can establish or create a personal control and monitoring account or PCMA which can contain or include any and/or all premises CMAs or premises accounts, any and/or all vehicle CMAs or vehicle accounts, and/or any and/or article CMAs or article accounts, which the user or individual is authorized to access and/or use and/or is authorized to perform any control and/or monitoring and/or security operations, actions, or functions, regarding any of the respective premises, the respective vehicle(s), and/or the respective article(s). In this manner the apparatus 100 of the present invention can be utilized to establish or create a comprehensive and personal control and monitoring account which can be utilized by an authorized user or individual access and use any and/or all premises CMAs or premises accounts, any and/or all vehicle CMAs or vehicle accounts, and/or any and/or article CMAs or article accounts for which the authorized user or authorized individual is so authorized.

Figure 10:
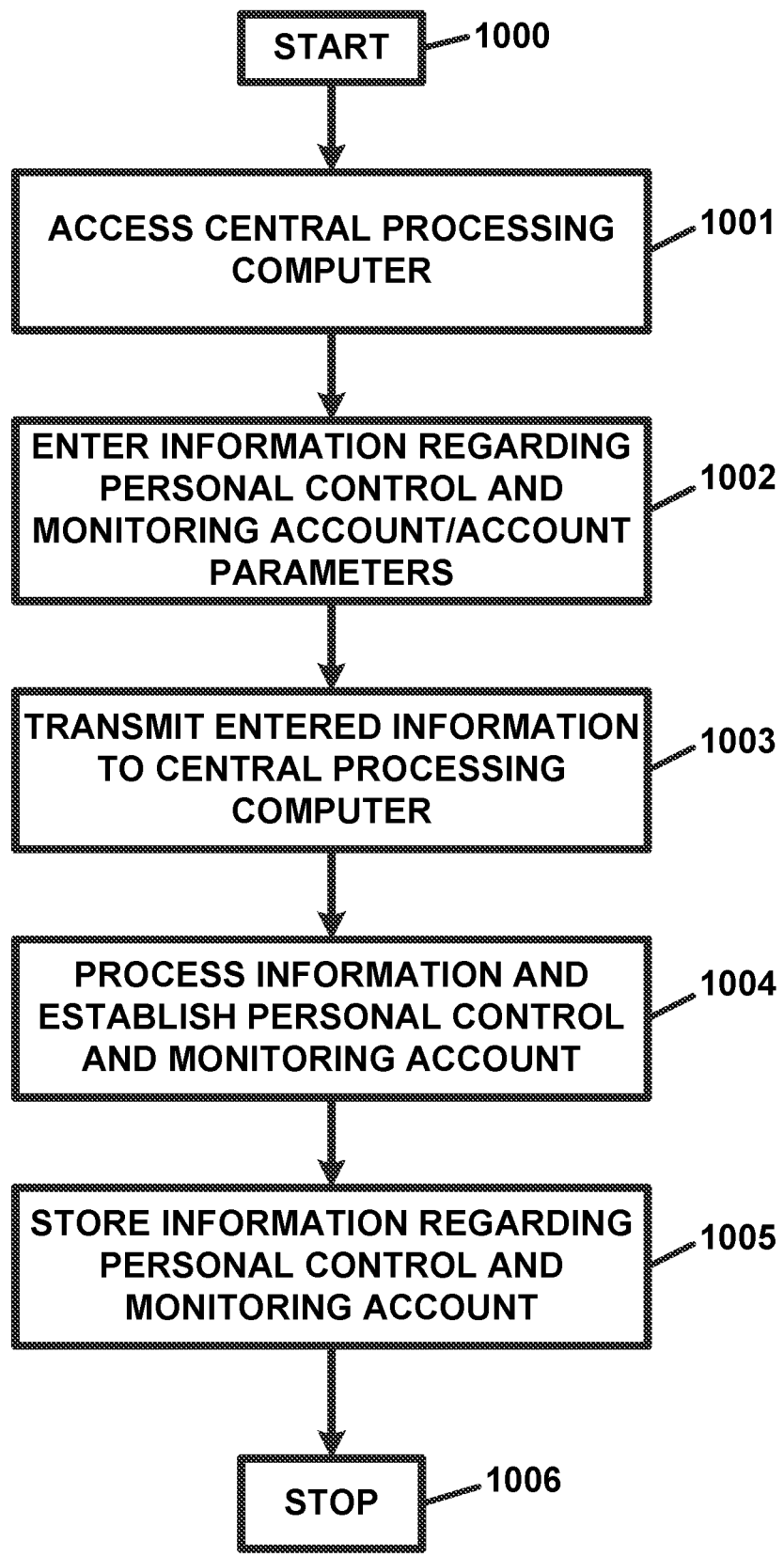
FIG. 10 illustrates another preferred embodiment method for utilizing the apparatus of the present invention, in flow diagram form.
Figure 11A:
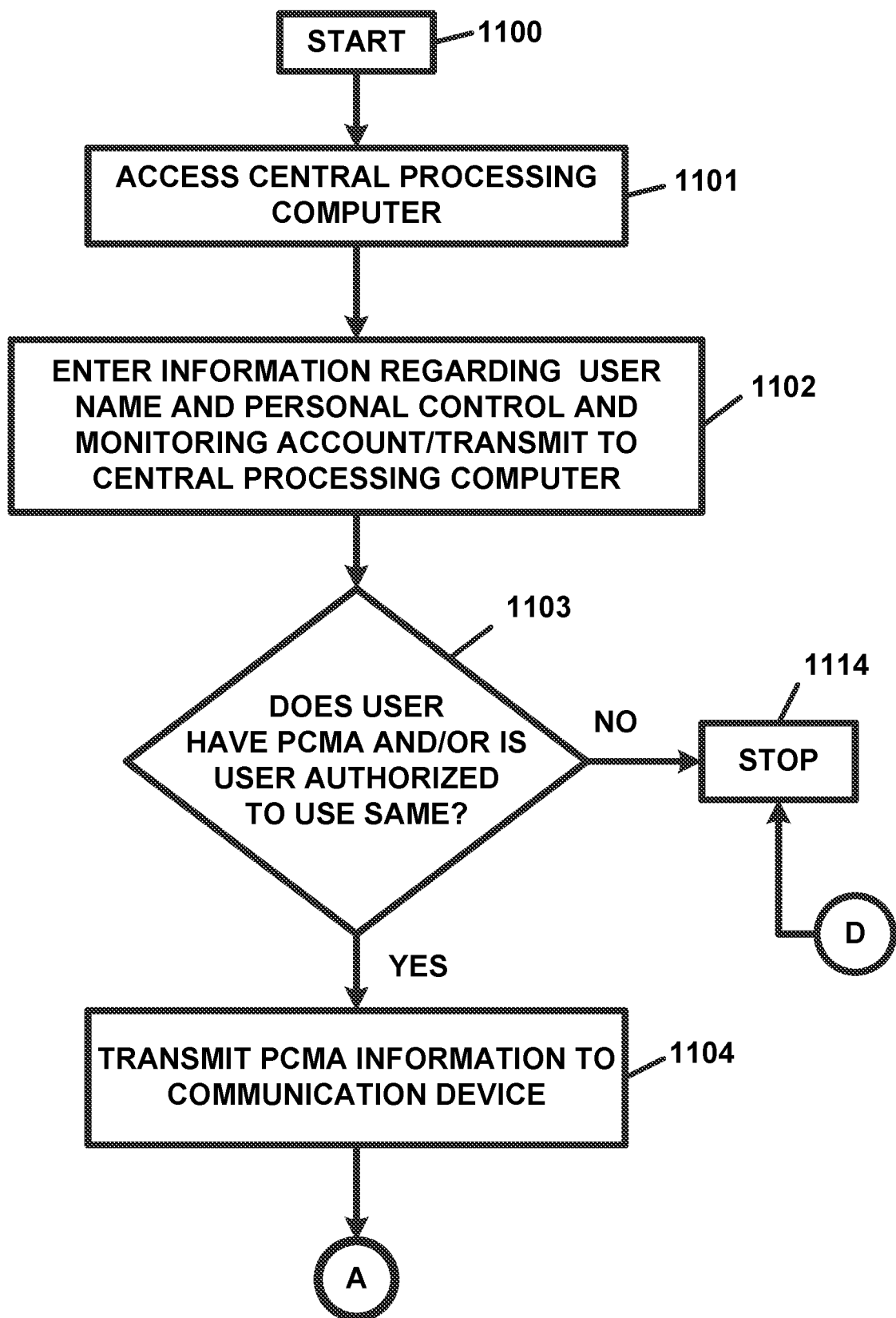
FIGS. 11A, 11B, 11C, and 11D illustrate another preferred embodiment method for utilizing the apparatus of the present invention, in flow diagram form.
Figure 11B:
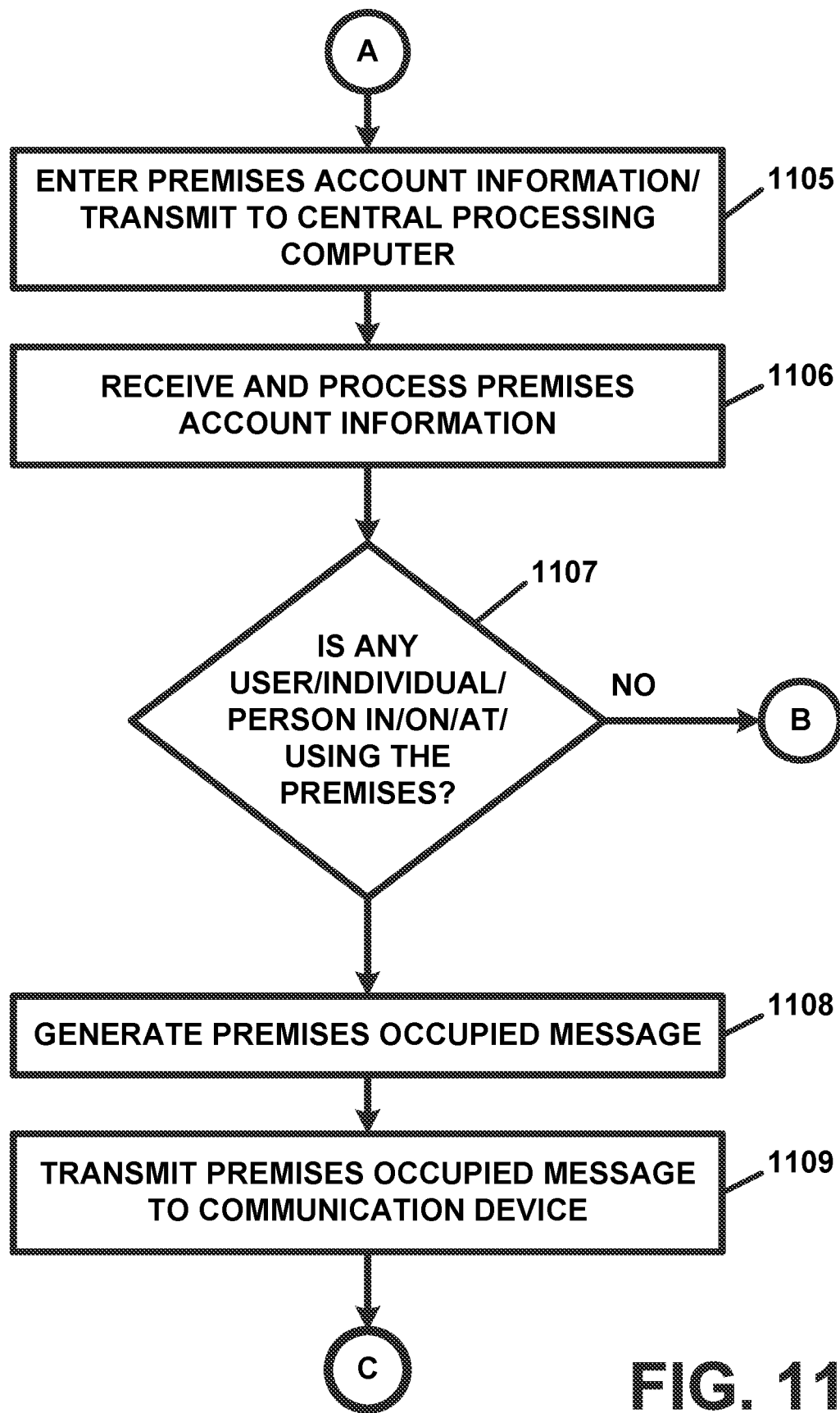
Figure 11C:
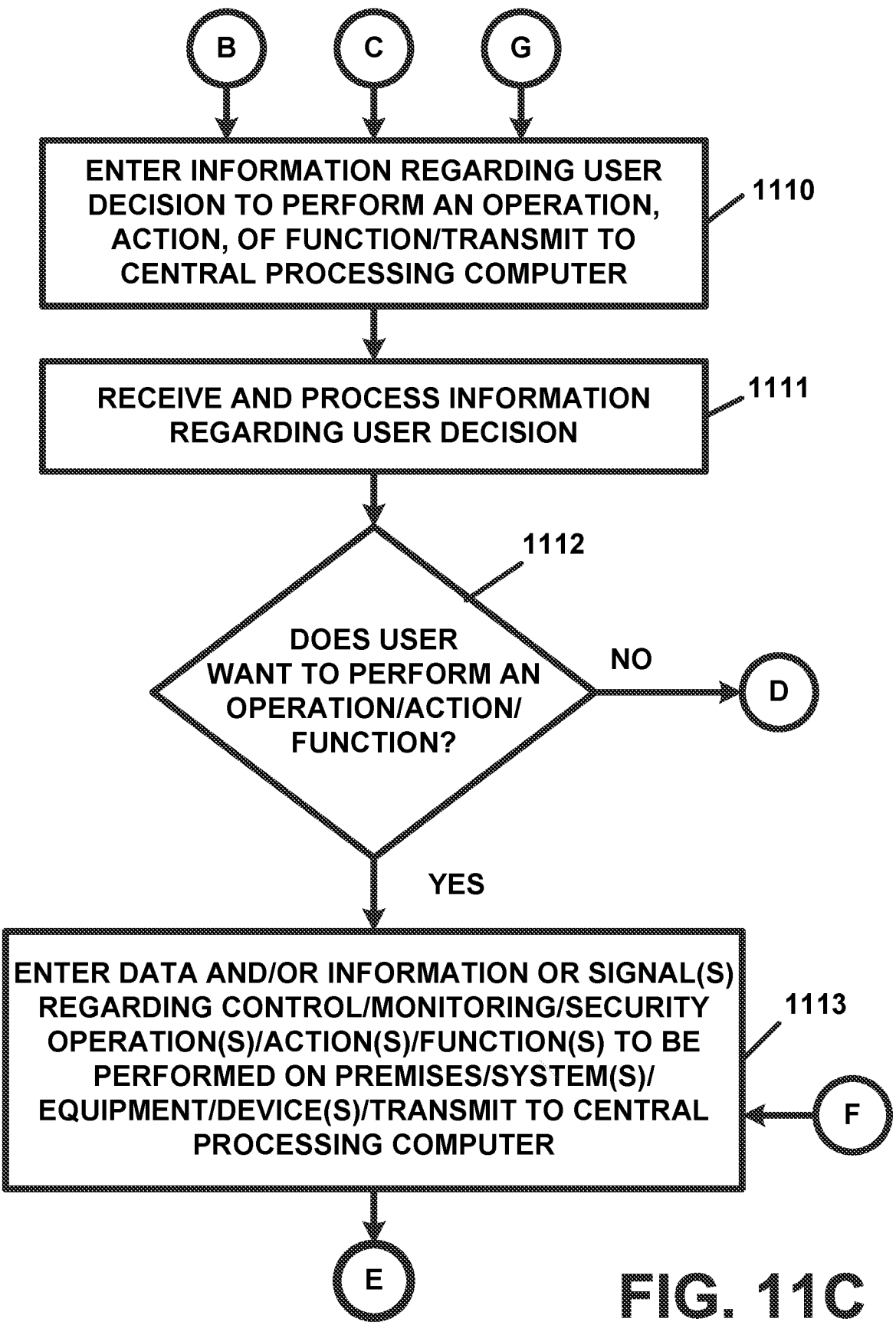
Figure 11D:
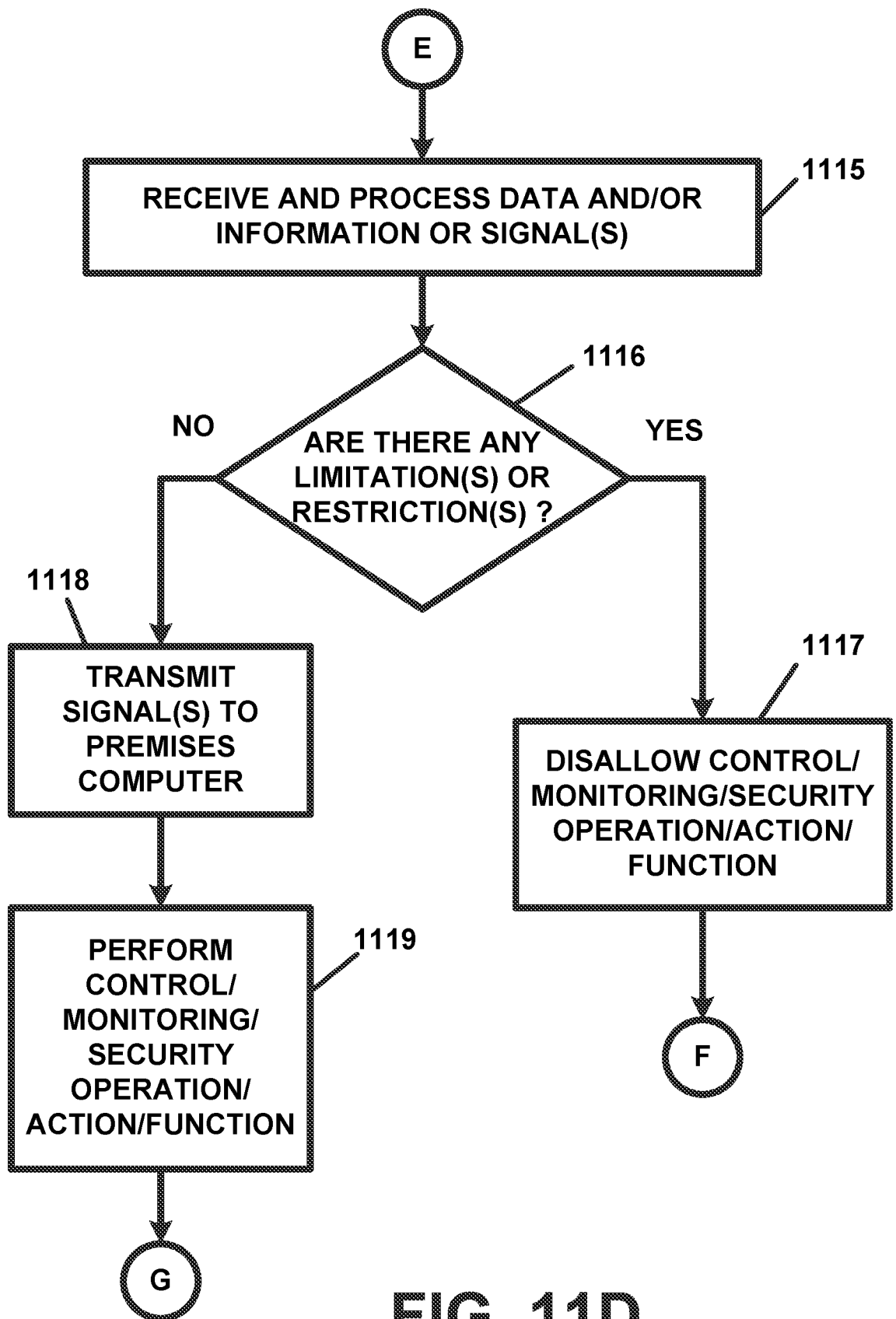

FIG. 10 illustrates another preferred embodiment method for utilizing the apparatus 100 of the present invention, in flow diagram form. With reference to FIG. 10, the operation of the apparatus 100 commences at step 1000. At step 1001, a user can access the central processing computer 10, either directly and/or via the server computer 20, with or using the communication device 60. At step 1002, the user can enter, into the communication device 60, information regarding the user's name, user name, contact information, user contact information, address, telephone number, cellular telephone number, wireless telephone number, e-mail address, text messaging or SMS messaging number or information, user name, user access code(s), user password(s), a photograph or a digital photograph of the user, a voice sample of the user, retinal scan data and/or information of or for the user, fingerprint and/or digital fingerprint information of or for the user, handprint and/or digital handprint information of or for the user, handprint geometry data and/or information of or for the user, facial feature data and/or information of or for the user, and/or any other biometric information of or for the user.

At step 1002, the user can also enter, into the communication device 60, data and/or information regarding any premises CMA or premises account, or any number of and/or all of the premises CMAs or premises accounts, which the user is authorized to access and/or use. At step 1002, the user can also enter, into the communication device 60, for each premises CMA or premises account the user is authorized to access and/or use, any data and/or information regarding any premises system(s), equipment, or device(s) 35 in at or associated with each premises which is the subject of the premises CMA or premises account, any restriction(s) or limitation(s) placed on the user's use or access of the premises CMA or premises account and/or the user's authorization or ability to perform any control, monitoring, and/or security, operation, action, or function, regarding the premises or any premises system(s), equipment, or device(s) 35 of the premises which is the subject of the premises CMA or premises account, and/or any requests to receive alert messages, or alerts or notifications, regarding the premises CMA or premises account, and/or the premises or any premises system(s), equipment, or device(s) 35 of the premises which is the subject of the premises CMA or premises account.

At step 1002, the user can also enter, into the communication device 60, data and/or information regarding any vehicle CMA or vehicle account, or any number of and/or all of the vehicle CMAs or vehicle accounts, which the user is authorized to access and/or use. At step 1002, the user can also enter, into the communication device 60, for each vehicle CMA or vehicle account the user is authorized to access and/or use, any data and/or information regarding any vehicle system(s), equipment, or device(s) 45 in at or associated with each vehicle which is the subject of the vehicle CMA or vehicle account, any restriction(s) or limitation(s) placed on the user's use or access of the vehicle CMA or vehicle account and/or the user's authorization or ability to perform any control, monitoring, and/or security, operation, action, or function, regarding the vehicle or any vehicle system(s), equipment, or device(s) 35 of the vehicle which is the subject of the vehicle CMA or vehicle account, and/or any requests to receive alert messages, or alerts or notifications, regarding the vehicle CMA or vehicle account, and/or the vehicle or any vehicle system(s), equipment, or device(s) 35 of the vehicle which is the subject of the vehicle CMA or vehicle account.

At step 1002, the user can also enter, into the communication device 60, data and/or information regarding any article CMA or article account, or any number of and/or all of the article CMAs or article accounts, which the user is authorized to access and/or use. At step 1002, the user can also enter, into the communication device 60, for each article CMA or article account the user is authorized to access and/or use, any data and/or information regarding any article system(s), equipment, or device(s) 55 in at or associated with each article which is the subject of the article CMA or article account, any restriction(s) or limitation(s) placed on the user's use or access of the article CMA or article account and/or the user's authorization or ability to perform any control, monitoring, and/or security, operation, action, or function, regarding the article or any article system(s), equipment, or device(s) 55 of the article which is the subject of the article CMA or article account, and/or any requests to receive alert messages, or alerts or notifications, regarding the article CMA or article account, the article, or any article system(s), equipment, or device(s) 35 of the article which is the subject of the article CMA or article account.

At step 1002, the user can enter, into the communication device 60, for each premises CMA or premises account, for each vehicle CMA or vehicle account, and/or article CMA or article account, any user name, contact information, user contact information, address, telephone number, cellular telephone number, wireless telephone number, e-mail address, text messaging or SMS messaging number or information, user name, user access code(s), user password(s), a photograph or a digital photograph of the user, a voice sample of the user, retinal scan data and/or information of or for the user, fingerprint and/or digital fingerprint information of or for the user, handprint and/or digital handprint information of or for the user, handprint geometry data and/or information of or for the user, facial feature data and/or information of or for the user, and/or any other biometric information of or for the user, which are to be used in connection with each respective premises CMA or premises account, each respective vehicle CMA or vehicle account, and/or each respective article CMA or article account.

At step 1003, any and/or all of the data and/or information entered into the communication device 60 at step 1002 can be transmitted to and received at the central processing computer 10. At step 1004, the central processing computer 10 can process the data and/or information received at step 1003 and can establish or create a personal control and monitoring account or PCMA for the user (also referred to herein as the "user personal control and monitoring account"). In a preferred embodiment, the data and/or information contained or included in the newly established or created user personal control and monitoring account or PCMA can include any and/or all of the data and/or information entered into the communication device 60 at or during step 1002 as well as any other additional data and/or information. The newly established or created user personal control and monitoring account or PCMA can include a link(s) or hyperlink(s) to any premises CMA or premises account and/or any premises computer(s) 30 associated with same, a link(s) or hyperlink(s) to any vehicle CMA or vehicle account and/or any vehicle computer(s) 40 associated with same, and/or a link(s) or hyperlink(s) to any article CMA or article account and/or any article computer(s) 50 associated with same.

At step 1005, the data and/or information regarding the user personal control and monitoring account or PCMA can be stored in the database 10H of the central processing computer 10. At step 905, data and/or information regarding the user personal control and monitoring account or PCMA can also be transmitted to the each respective premises computer 30, associated with the each respective premises which is the subject of the each premises CMA or premises account for which the user is authorized to access or use, and can be stored in the database 30H of same. At step 1005, data and/or information regarding the user personal control and monitoring account or PCMA can also be transmitted to the each respective vehicle computer 40, associated with the each respective vehicle which is the subject of the each vehicle CMA or vehicle account for which the user is authorized to access or use, and can be stored in the database 40H of same. At step 1005, data and/or information regarding the user personal control and monitoring account or PCMA can also be transmitted to the each respective article computer 50, associated with the each respective article which is the subject of the each article CMA or article account for which the user is authorized to access or use, and can be stored in the database 50H of same. Thereafter, the operation of the apparatus 100 will cease at step 1006.

In the above described manner, the apparatus 100 of the present invention can be utilized a centralized control and monitoring system or platform of allowing a user or individual to use the apparatus 100 of the present invention in order to gain access to and use any premises CMA(s) or premises account(s), any vehicle CMA(s) or vehicle account(s), and/or any article CMA(s) or article account(s), for which the user or individual is an authorized user or an authorized individual or for which the user or individual is an authorized lead user or an authorized lead individual.

In another preferred embodiment, the central processing computer 10 can be programmed so as to automatically include, in a user's or individual's personal control and monitoring account or PCMA, any newly created remises CMA(s) or premises account(s), any newly created vehicle CMA(s) or vehicle account(s), and/or any newly created article CMA(s) or article account(s), which names or includes the user or individual as an authorized user or authorized individual on that respective newly created account. In a preferred embodiment, any time a new premises CMA or premises account is created, any time a new vehicle CMA or vehicle account is created, and/or any time a new article CMA or article account is created, or has been created, the central processing computer 10 can be programmed to automatically process information regarding the name(s) of any and/or all of the authorized user(s) or authorized individual(s) or any authorized lead user(s) or authorized lead individual(s) listed for each respective account, compare the name(s) against the names of all users or individuals having a personal control and monitoring account or PCMA registered with the central processing computer 10 or apparatus 100 of the present invention, and, if a user or individual is or was named as being an authorized user or authorized individual or an authorized lead user or an authorized lead individual on the newly created premises CMA or premises account, the newly created vehicle CMA or vehicle account, or the newly created article CMA or article account, then the central processing computer 10 will automatically update the user's or individual's personal control and monitoring account or PCMA so as to add or include that newly created premises CMA or premises account, vehicle CMA or vehicle account, or article CMA or article account among the accounts for which the user or individual is authorized to access, use, and/or otherwise perform any control, monitoring, and/or security, operations, actions, or functions.

In the above-described manner, the apparatus 100 and method of the present invention can be utilized to provide personal control and monitoring accounts or PCMAs, as well as a premises CMA or premises account for each premises for which the apparatus 100 is utilized, a vehicle CMA or vehicle account for each vehicle for which the apparatus 100 is utilized, and/or an article CMA or article account for each article is utilized, which can allow a user to access, use, and/or perform, a control, monitoring, and/or security operation, action, or function, from his or her own personal control and monitoring account. In this manner, the apparatus 100 of the present invention can provide a more convenient and a more secure system and platform by which a user can access, use, and/or perform a control, monitoring, and/or security operation, action, or function, for any number or combination of premises, vehicles, and/or articles by using a single service or service provider and from a single comprehensive personal control and monitoring account.

In a preferred embodiment, the personal control and monitoring account or PCMA can be designed in any appropriate manner so as to include any and/or all of the data and/or information described herein as being included in a personal control and monitoring account or PCMA as well as any and/or all of the data and/or information regarding, or a link(s) or a hyperlink(s) to, any and/or all of the user's or individual's premises CMAs or premises accounts, vehicle CMAs or vehicle accounts, and/or article CMAs or article accounts, or any of the premises CMAs or premises accounts, vehicle CMAs or vehicle accounts, and/or article CMAs or article accounts which name the user or individual as an authorized user, an authorized individual, or an authorized lead user or an authorized lead individual.

In a preferred embodiment, the apparatus 100 and method of the present invention can be utilized in order to allow a user or individual to perform a control, monitoring, and/or security, operation, action, or function, for any premises, for any premises system(s), equipment, or device(s) 35, for any vehicle, for any vehicle system(s), equipment, or device(s) 45, and/or for any article or for any article system(s), equipment, or device(s) 55, for which the user or individual is authorized. In another preferred embodiment, in situations where authorization is not needed, the apparatus 100 and method of the present invention can be utilized in order to allow a user or individual to perform a control, monitoring, and/or security, operation, action, or function, for any premises, for any premises system(s), equipment, or device(s) 35, for any vehicle, for any vehicle system(s), equipment, or device(s) 45, and/or for any article or for any article system(s), equipment, or device(s) 55.

In another preferred embodiment, the apparatus 100 and method of the present invention can be utilized so as to prevent an unauthorized user or an unauthorized individual from performing an unauthorized control, monitoring, and/or security, operation, action, or function, regarding any premises, any premises system(s), equipment, or device(s) 35, any vehicle, any vehicle system(s), equipment, or device(s) 45, and/or any article or any article system(s), equipment, or device(s) 55.

In another preferred embodiment, the apparatus 100 and method of the present invention can be utilized so as to provide information to a user or individual seeking to perform a control, monitoring, and/or security, operation, action, or function, for any premises, for any premises system(s), equipment, or device(s) 35, for any vehicle, for any vehicle system(s), equipment, or device(s) 45, and/or for any article or for any article system(s), equipment, or device(s) 55, before the user or individual is able to perform the control, monitoring, and/or security, operation, action, or function.

For example, a user or individual who is an owner of a house or residential premises and who has a spouse and children could be notified that his spouse or one or more of his or her children might be in the house or residential premises before he or she decides to, for example, shut off the electricity or an electrical circuit, turn on a camera in the house, shut off the water, shut off the heat, or perform any other control, monitoring, and/or security, operation, action, or function on or regarding the premises or any premises system(s), equipment, or device(s) 35. As and for another example, the owner of a vehicle could be notified that the vehicle is occupied and/or in motion before he or she turns off the engine, turns on a camera, or performs any other control, monitoring, and/or security, operation, action, or function on or regarding the vehicle or any vehicle system(s), equipment, or device(s) 45. As and for still another example, the owner of an article such as, for example, a cellular telephone or a personal digital assistant, could be notified that the a cellular telephone or a personal digital assistant is in the possession of, and/or being used by, an authorized user or individual, before he or she de-activates the a cellular telephone or a personal digital assistant.

In another preferred embodiment, any type or kind of restriction(s) or limitation(s) can be placed on the use of the apparatus 100 if a certain individual(s) or person(s) might be present in, on, or at, or using, a premises, a vehicle, or an article. In another preferred embodiment, use of the apparatus 100 may be restricted, limited, or suspended if an authorized lead user, an authorized lead individual, or any authorized user or authorized individual is present in, on, or at, or using, a premises, a vehicle, or an article.

In another preferred embodiment, an authorized user or an authorized individual (hereinafter referred to as "authorized user") or an authorized lead user or authorized lead individual (hereinafter "authorized lead user") can be provided with information regarding who might be present in, on, or at, or using, a premises, a vehicle, or an article, or who might be using a respective premises system(s), equipment, or device(s) 35, a respective vehicle system(s), equipment, or device(s) 45, or a respective article system(s), equipment, or device(s) 55. In a preferred embodiment, a premises may be equipped with a premises security device, which is also a premises system(s), equipment, or device(s) 35, and which can include a keypad for receiving an access code(s) for the premises and/or an access code(s) for each user, individual, authorized user, authorized lead user, or any other user, individual or person who or may live at the premises, work at the premises, or have another reason for being at the premises.

As and for an example, in a preferred embodiment, the premises can be a residential premises where a family resides with each of the family members, such as for example, a father and/or mother being assigned as an authorized lead user, each child above a certain pre-selected age being an authorized user, and each child below that pre-selected age being an individual who has a reason for being at the premises, but otherwise is not authorized to use the apparatus 100 of the present invention for or regarding the premises. It is important to note that, although the example provided herein is directed to a residential premises, the apparatus 100 of the present invention can be used in a same, a similar, and/or an analogous, manner with any type or kind of premises including, but not limited to, and/or all of the premises described herein or identified herein and/or the example use is equally applicable to any type or kind of premises including, but not limited to, any and/or all of the premises described herein or identified herein.

In another preferred embodiment, the premises system(s), equipment, or device(s) 35 can be or can include a premises security device which can be located at any door or entry point into or onto the premises and which can include a camera or video recording device for taking or record a picture of each user or individual, whether authorized or not, who enters into residential premises. In another preferred embodiment, the premises security device can include a microphone or an audio recording device for recording a voice or voice sample or any other audio information for any and/or each user or individual, whether authorized or not, who enters into residential premises. Each time a user or individual enters into or onto the residential premises, his or her access code, his or her picture and/or voice recording or voice sample, along with the date and time of entry, can be recorded and/or transmitted to and/or stored in the database 10H of the central processing computer 10 and/or in the database 30H of the premises computer 30 of or associated with the premises.

In a preferred embodiment, the user's or individual's access code, his or her picture and/or voice recording or voice sample, along with the date and time of entry, can be utilized to provide information regarding who is at or in the premises at any given time, to generate a notification messages, to generate a log containing information regarding who was in, on, or at, the premises and when, and/or can be utilized for any other appropriate purpose.

In a preferred embodiment, a vehicle may be equipped with a vehicle security device, which is also a vehicle system(s), equipment, or device(s) 45, and which can include a keypad for receiving an access code(s) for the vehicle and/or an access code(s) for each user, individual, authorized user, authorized lead user, or any other user, individual or person who or may operate, or be an occupant or passenger in, the vehicle or who may have another reason for using, operating, or being in the vehicle.

As and for an example, in a preferred embodiment, the vehicle can be a family automobile with each of the family members, such as for example, a father and/or mother being assigned as an authorized lead user, any licensed child allowed to operate the vehicle being an authorized user, and each unlicensed child being an individual who has a reason for being in the vehicle, but otherwise is not authorized to use the apparatus 100 of the present invention for or regarding the vehicle. It is important to note that, although the example provided herein is directed to a family automobile, the apparatus 100 of the present invention can be used in a same, a similar, and/or an analogous, manner with any type or kind of vehicle including, but not limited to, and/or all of the vehicles described herein or identified herein and/or the example use is equally applicable to any type or kind of vehicle including, but not limited to, any and/or all of the vehicles described herein or identified herein.

In another preferred embodiment, the vehicle security device can include a camera or video recording device for taking or record a picture of each user or individual, whether authorized or not, who enters into vehicle. In another preferred embodiment, the vehicle security device can include a microphone or an audio recording device for recording a voice or voice sample or any other audio information for any and/or each user or individual, whether authorized or not, who enters into the vehicle. Each time a user or individual enters into the vehicle, his or her access code, his or her picture and/or voice recording or voice sample, along with the date and time of entry, can be recorded and/or transmitted to and/or stored in the database 10H of the central processing computer 10 and/or in the database 40H of the vehicle computer 40 of or associated with the vehicle. In a preferred embodiment, the user's or individual's access code, his or her picture and/or voice recording or voice sample, along with the date and time of entry, can be utilized to provide information regarding who is in the vehicle at any given time, to generate a notification messages, to generate a log containing information regarding who was in the vehicle and when, and/or can be utilized for any other appropriate purpose.

In a preferred embodiment, an article may be equipped with an article security device, which is also an article system(s), equipment, or device(s) 55, and which can include a keypad for receiving an access code(s) for the article and/or an access code(s) for each user, individual, authorized user, authorized lead user, or any other user, individual or person who or may use or operate the article.

As and for an example, in a preferred embodiment, the article can be a cellular telephone or a personal digital assistant which can be used by any one family member of any number of family members, such as for example, a father and/or mother being assigned as an authorized lead user any child allowed to use the cellular telephone being an authorized user. It is important to note that, although the example provided herein is directed to a cellular telephone or personal digital assistant, the apparatus 100 of the present invention can be used in a same, a similar, and/or an analogous, manner with any type or kind of article including, but not limited to, and/or all of the articles described herein or identified herein and/or the example use is equally applicable to any type or kind of article including, but not limited to, any and/or all of the articles described herein or identified herein.

In another preferred embodiment, the article security device can include a camera or video recording device for taking or record a picture of each user or individual, whether authorized or not, who uses or operates the article. In another preferred embodiment, the article security device can include a microphone or an audio recording device for recording a voice or voice sample or any other audio information for any and/or each user or individual, whether authorized or not, who uses or operates the article. Each time a user or individual uses or operates the article, his or her access code, his or her picture and/or voice recording or voice sample, along with the date and time of use or operation, can be recorded and/or transmitted to and/or stored in the database 10H of the central processing computer 10 and/or in the database 50H of the article computer 50 of or associated with the article. In a preferred embodiment, the user's or individual's access code, his or her picture and/or voice recording or voice sample, along with the date and time of entry, can be utilized to provide information regarding who is using or operating the vehicle at any given time, to generate a notification messages, to generate a log containing information regarding who using or operating the article and when, and/or can be utilized for any other appropriate purpose.

In a preferred embodiment, the apparatus 100 of the present invention can be utilized to provide an authorized user or an authorized lead user with information regarding who might be present in, on, or at, or using, a premises, a vehicle, or an article, or who might be using a respective premises system(s), equipment, or device(s) 35, a respective vehicle system(s), equipment, or device(s) 45, or a respective article system(s), equipment, or device(s) 55. In a preferred embodiment, any user(s) or individual(s), any authorized user(s), or any authorized lead user(s), who present in, on, or at, or using, a premises, a vehicle, or an article, or who might be using a respective premises system(s), equipment, or device(s) 35, a respective vehicle system(s), equipment, or device(s) 45, or a respective article system(s), equipment, or device(s) 55, can have information regarding their respective entry and/or presence recorded and stored.

FIGS. 11A, 11B, 11C, and 11D illustrate another preferred embodiment method for utilizing the apparatus 100 of the present invention, in flow diagram form. The operation of the apparatus 100 of FIGS. 11A, 11B, 11C, and 11D will be described as being performed in connection with a residential premises. Although described and illustrated as being used in connection with a residential premises, it is important to note that the preferred embodiment of FIGS. 11A, 11B, 11C, and 11D can be utilized in a same, a similar, and/or an analogous manner, with any of the various premises and/or with any of the types or kinds of premises described herein, with any of the various vehicles and/or with any of the types or kinds of vehicle described herein, and/or with any of the various articles and/or with any of the types or kinds of articles described herein.

With reference to FIGS. 11A, 11B, 11C, and 11D, the operation of the apparatus 100 commences at step 1100. At step 1101, a user desiring perform a control, monitoring, and/or security, operation, action, or function, on or regarding the residential premises can access the central processing computer 10 using any type or kind of communication device 60. The user can access the central processing computer 10 and/or can access the central processing computer 10 via the server computer 20. At step 1102, the user can enter information regarding his or her user name and any information regarding his or her personal control and monitoring account or PCMA and transmit same to the central processing computer 10. At step 1103, the central processing computer 10 can determine if the user has a personal control and monitoring account and/or is authorized to access and use same. If at step 1103, the central processing computer 10 determines that the user does not have a personal control and monitoring account and/or is not authorized to access and use same, the operation of the apparatus 100 will cease at step 1114.

If, at step 1103, it is determined that the user does have a personal control and monitoring account and authorized to use same, then the operation of the apparatus 100 will proceed to step 1104 and the central processing computer 10 will transmit to the communication device 60 information regarding the user's personal control and monitoring account to PCMA. In a preferred embodiment, the information transmitted to the communication device 60 at step 1104 can include information and/or links to each and every premises account, vehicle account, and/or article account, in the user's personal control and monitoring account or PCMA.

At step 1105, the user can enter information regarding and/or select information regarding the premises account for the residential premises for which he or she desiring to perform a control, monitoring, and/or security, operation, action, or function. At step 1105, the user can transmit the entered or selected information to the central processing computer 10. At step 1106, the central processing computer 10 can receive and process the information regarding the premises account for the residential premises. At step 1107, the central processing computer 10 can determine if any user, individual, or person, is present in, on, or at, or using, the premises, or who might be using a respective premises system(s), equipment, or device(s) 35. If at step 1107, the central processing computer 10 determines that any no user, individual, or person, is present in, on, or at, or using, the premises, then the operation of the apparatus 100 will proceed to step 1110.

If at step 1107, the central processing computer 10 determines that any user, individual, or person, is present in, on, or at, or using, the premises, or might be using a respective premises system(s), equipment, or device(s) 35, then the operation of the apparatus 100 will proceed to step 1108 and the central processing computer 100 will generate an Premises Occupied Message which, in a preferred embodiment, can contain or include, for each user, individual, or person, is present in, on, or at, or using, the premises, the name, user name, file photograph, and/or photograph recorded upon his or her entry into or onto the residential premises. The Premises Occupied Message can also include a video clip of the user, individual, person entering the residential premises and/or an audio recording or voice recording obtained upon entry into or onto the residential premises.

At step 1109, the central processing computer 10 can transmit the Premises Occupied Message to the user's communication device 60 and the user can review the information contained therein. Thereafter the operation of the apparatus 100 will proceed to step 1110. At step 1110, the user can thereafter determine and/or decide whether or not to proceed with performing a control, monitoring, and/or security, operation, action, or function, on or regarding the premises or any premises system(s), equipment, or device(s) 35 of the premises and can enter, into the communication device 60, information regarding his or her decision to do so or to not do so. At step 1110, the user can transmit information regarding his or her decision to the central processing computer 10.

At step 1111, the central processing computer 10 can receive and process the information regarding the user's decision. At step 1112, the central processing computer 10 will determine whether the user wants to perform a control, monitoring, and/or security, operation, action, or function, on or regarding the premises or any premises system(s), equipment, or device(s) 35 of the premises. If, at step 1112, it is determined by the central processing computer 10 that the user does not want to perform a control, monitoring, and/or security, operation, action, or function, on or regarding the premises or any premises system(s), equipment, or device(s) 35 of the premises, then the operation of the apparatus will cease at step 1114.

If, at step 1112, it is determined by the central processing computer 10 that the user wants to perform a control, monitoring, and/or security, operation, action, or function, on or regarding the premises or any premises system(s), equipment, or device(s) 35 of the premises, then the operation of the apparatus will proceed to step 1113. At step 1113, the user can perform any control, monitoring, and/or security, operation, action, or function, on or regarding the premises or any premises system(s), equipment, or device(s) 35 of the premises, by entering any appropriate signal(s), control signal(s), and/or monitoring signal(s), into the communication device 60 and transmitting same to the central processing computer 10. At step 113, the user, depending upon and/or subject to any limitation(s) or restriction(s) on the user's ability to do so, which limitation(s) or restriction(s) may be stored in the user's personal control and monitoring account or PCMA or in the premises account, and/or depending upon any limitation(s) or restriction(s) relating to whom is present at or in the residential premises, can also perform any control, monitoring, and/or security, operation, action, or function, on or regarding the premises or any premises system(s), equipment, or device(s) 35 of the premises by entering any appropriate signal(s), control signal(s), or monitoring signal(s) and by transmitting same to the central processing computer 10. If any such limitation(s) or restriction(s) exists, the user may also perform a limited or restricted control, monitoring, or security, operation, action, or function, on or regarding the premises or any premises system(s), equipment, or device(s) 35 of the premises.

The user's performance of any control, monitoring, and/or security, operation, action, or function, on or regarding the premises or any premises system(s), equipment, or device(s) 35 of the premises can be limited or restricted depending upon who is in or on the residential premises and/or depending upon any limitation(s) or restriction(s) stored in the user's personal control and monitoring account or PCMA or in the premises account. For example, a user who is a parent who knows that a child or children might in the residential premises and using certain electrical devices might not want to interfere with same and may, therefore, not perform any control action which might shut down an electrical circuit which could interfere with same.

As and for another example, a parent, might refrain from turning one and/or monitoring a camera or video recording device in a certain room or room so as not to invade a child's privacy. If the user's personal control and monitoring account or PCMA or in the premises account disallows or prohibits the user's ability to perform any operation, action, or function, then the user can be disallowed or prohibited from performing that operation, action, or function, regardless of who may be in or on the residential premises. The above examples are only exemplary and are not to be taken as limiting in any way the numerous situations which may exist which can have an impact on a user's ability or desire to perform any control, monitoring, and/or security, operation, action, or function, on or regarding the residential premises or any premises system(s), equipment, or device(s) 35 of the residential premises with or without any knowledge of who or which users, individuals, or persons may or may not be present in or on the residential premises.

In a preferred embodiment, any limitation(s) or restriction(s) can be defined, pre-programmed, and/or pre-stored, in the database 10 of the central processing computer 10, the database 30H of the premises computer 30, and/or the database 60H of the communication device 60 for any number of circumstances depending upon who or which users, individuals, or persons, may be present in or on the residential premises at any given time.

At step 1113, the user can enter, into the communication device 60, any data and/or information so as to perform, a control, monitoring, and/or security, operation, action, or function, regarding the premises any of the premises system(s), equipment, or device(s) 35 of the premises and can transmit a signal(s), control signal(s), and/or monitoring signal(s), to the central processing computer 10. The signal(s), control signal(s), and/or monitoring signal(s), can be transmitted over a communication network to the central processing computer 10 either directly and/or indirectly via the server computer 20. At step 1113, the user can also be required to submit a photograph, a picture, or a video clip, of the user, obtained from, provided by, submitted by, or taken by the user, individual, or person, at the time the user, individual, or person, attempts to perform any control, monitoring, or security, operation, action, or function, regarding any premises or any premises system(s), equipment, or device(s), of the premises. Thereafter, at step 1115, the central processing computer 10 can receive and process the data and/or information contained in the respective signal(s), control signal(s), and/or monitoring signal(s).

At step 1116, the central processing computer 10 can determine if there is any limitation(s) or restriction(s) which would prohibit the control, monitoring, and/or security, operation, action, or function. If, at step 1116, the central processing computer determines that the control, monitoring, and/or security, operation, action, or function, is limited or restricted or the subject of a limitation(s) or restriction(s), then the operation of the apparatus 100 will proceed to step 1117 and the central processing computer 10 will prohibit or disallow the control, monitoring, and/or security, operation, action, or function, and generate and transmit a message to that effect to the communication device 60. Thereafter, the operation of the apparatus 100 will proceed once again to step 1113 and the user can once again decide whether or not to attempt another control, monitoring, and/or security, operation, action, or function.

If at step 1116, the central processing computer determines that the control, monitoring, and/or security, operation, action, or function, is not limited or not restricted, then the operation of the apparatus 100 will proceed to step 1118 and the central processing computer 10 will transmit the same signal(s), control signal(s), and/or monitoring signal(s) or a newly generated signal(s), control signal(s), and/or monitoring signal(s) to the premises computer 30 located at, or associated with, the residential premises. At step 1119, the premises computer 30 can then generate and/or transmit the same signal(s), control signal(s), and/or monitoring signal(s) or a newly generated signal(s), control signal(s), and/or monitoring signal(s) in order to, and/or which will, activate, de-activate, control an operation of, monitor an operation of, perform a security operation regarding, enable, disable, or re-enable, the premises system(s), equipment, or device(s) 35 which is the subject of the control, monitoring, and/or security, operation, action, or function. Thereafter, the operation of the apparatus 100 will proceed once again to step 1110 and the user can once again determine and/or decide whether or not to proceed with performing another control, monitoring, and/or security, operation, action, or function.

At step 1110, the user can once again transmit information regarding his or her decision to the central processing computer 10. At step 1111, the central processing computer 10 can once again receive and process the information regarding the user's decision. At step 1112, the central processing computer 10 will once again determine whether the user wants to perform a control, monitoring, and/or security, operation, action, or function, on or regarding the premises or any premises system(s), equipment, or device(s) 35 of the premises. If, at step 1112, it is determined by the central processing computer 10 that the user does not want to perform a control, monitoring, and/or security, operation, action, or function, on or regarding the premises or any premises system(s), equipment, or device(s) 35 of the premises, then the operation of the apparatus will cease at step 1114.

Although described and illustrated herein as being used in connection with a residential premises, it is important to note that the preferred embodiment of FIGS. 11A, 11B, 11C, and 11D can also be utilized in a same, a similar, and/or an analogous manner, with any of the various premises and/or with any of the types or kinds of premises described herein, with any of the various vehicles and/or with any of the types or kinds of vehicle described herein, and/or with any of the various articles and/or with any of the types or kinds of articles described herein.

In another preferred embodiment of the embodiment of FIGS. 11A, 11B, 11C, and 11D, the user's accessing of the central processing computer 10 at step 1101 can also include the additional security steps of requiring the user to take a digital photograph of himself or herself using the camera or video recording device of the communication device 60 and transmitting the digital photograph to the central processing computer 10 where it can be stored in an activity log or activity file in the database 10H for the user's personal control and monitoring account or PCMA and in the respective premises account for the residential premises. The digital photograph can also be included in or attached to any account activity alerts described herein. In another preferred embodiment of the embodiment of FIGS. 11A, 11B, 11C, and 11D, the user's accessing of the central processing computer 10 at step 1101 can also include the additional security steps of requiring the user provide any one or more of a retinal scan, a fingerprint scan, a handprint scan, a hand geometry scan, a facial feature scan, or a voice sample, or any other biometric data and/or information, each of which can be transmitted and/or analyzed by the processing computer 10 in order to verify the user's identity and where it can be stored in an activity log or activity file in the database 10H for the user's personal control and monitoring account or PCMA and in the respective premises account for the residential premises.

In another preferred embodiment of the embodiment of FIGS. 11A, 11B, 11C, and 11D, the central processing computer 10 can store any data and/or information regarding the user's access of the central processing computer 10, the user's personal control and monitoring account, the premises account, any user(s), individual(s), or person(s) present in or on the residential premises at the time of the user's access of the central processing computer 10, the user's personal control and monitoring account, and/or the premises account, and any operation(s), action(s), or function(s) performed by the user or attempted to be performed by the user, and/or any other information regarding the user's use or attempted use of the apparatus 100. In another preferred embodiment, any data and/or information regarding the user's access of the central processing computer 10, the user's personal control and monitoring account, the premises account, any user(s), individual(s), or person(s) present in or on the residential premises at the time of the user's access of the central processing computer 10, the user's personal control and monitoring account, and/or the premises account, and any operation(s), action(s), or function(s) performed by the user or attempted to be performed by the user, and/or any other information regarding the user's use or attempted use of the apparatus 100 can be stored in the database 10H of the central processing computer 10, and in an activity log or activity file in the user's personal control and monitoring account or PCMA and/or in the premises account for the residential account, and/or can also be transmitted to the premises computer 30 and stored in the database 30H of same and/or can also be transmitted to the user's communication device 60 and stored in the database 60H of same.

In another preferred embodiment of FIGS. 11A, 11B, 11C, and 11D, it can be pre-defined that if any user, individual, or person, who is determined to be present in or on the premises, is an authorized lead user regarding the premises or the premises account, the central processing computer 10 can be programmed to disallow, prevent, or prohibit, any and/or all attempts by a user to access the premises, the premises account, or the premises computer 30, and/or to disallow, prevent, or prohibit, any and/or all attempts by a user to perform any control, monitoring, and/or security, operation, action, or function, on or regarding the premises or any premises system(s), equipment, or device(s) 35 of the premises.

In another preferred embodiment, the central processing computer 10 and/or the premises computer 30, and/or the communication device 60 can record and store, in the respective databases 10H, 30H, and/or 60H of same, any operations, activities, or functions, performed by the user and any data and/or information regarding any habits of the user regarding same and/or which are either identified at the time of the creation of the user's personal control and monitoring account or PCMA and/or the premises account, and/or which can be recorded and/or ascertained at any time thereafter. In another preferred embodiment, data and/or information regarding a user's habits can also be stored and/or updated automatically by the central processing computer 10, by the premises computer 30, and/or by the user's communication device 60.

In another preferred embodiment of FIGS. 11A, 11B, 11C, and 11D, the central processing computer 10 can, at step 1117, perform an analysis to ascertain whether or not the control, monitoring, and/or security, operation, action, or function, sought to be performed on or regarding the residential premises or any premises system(s), equipment, or device(s) 35 of the residential premises is not consistent with the habits of the user, then the central processing computer 10 can generate seeking to have the user confirm or verify his or her control, monitoring, and/or security, operation, action, or function, and transmit same to the user's communication device 60. Thereafter, the central processing computer 10 can await a reply from the user communication device 60, which once received and processed by the central processing computer 10 can be determined to either confirm or verify the control, monitoring, and/or security, operation, action, or function, or serve to cause the control, monitoring, and/or security, operation, action, or function requested to be withdrawn. In the case where the control, monitoring, and/or security, operation, action, or function, which was requested is withdrawn, then the central processing computer 10 will disallow or prohibit the control, monitoring, and/or security, operation, action, or function.

In a preferred embodiment, the central processing computer 10 can utilize artificial intelligence routines in order to recognize changes in a user's habits and store any data and/or information regarding same in the user's personal control and monitoring account, in the premises account, in the database 10H of the central processing computer 10, and can transmit same to the premises computer 30 where same can be stored in the database 30H and can also transmit same to the user's communication device(s) 60 where same can be stored in the database 60. As and for an example of a habit of a user, a user may never typically use the apparatus 100, or attempt to perform a control, monitoring, and/or security, operation, action, or function, during hours in the evening, after 7:00 PM on weeknights. However, if the user should change his or her schedule so that he or she may either work late, or attend classes, two nights a week and that in doing so, he or she does not return until 9:00 PM on those nights, he or she may change his habits on those two nights and might start using the apparatus 100 or attempt to perform a control, monitoring, and/or security, operation, action, or function, after 7:00 PM. In a preferred embodiment, the central processing computer 10 can be programmed to recognize this change in the user's habits and modify the data and/or information regarding same automatically.

In another preferred embodiment, the central processing computer 10 can generate an alert message or a notification message any time a user seeks to perform, a control, monitoring, and/or security, operation, action, or function, regarding the premises or any of the premises system(s), equipment, or device(s) 35 of the premises. The user can also be required to submit a photograph, a picture, or a video clip, of the user, obtained from, provided by, submitted by, or taken by the user at the time the user attempts to perform any control, monitoring, or security, operation, action, or function, regarding any premises or any premises system(s), equipment, or device(s), of the premises. In a preferred embodiment, the alert message or the notification message can contain or include any data and/or information regarding the control, monitoring, or security, operation, action, or function, attempted to be performed or performed along with the photograph, picture, or video clip, of the user, obtained from, provided by, submitted by, or taken by, the user at the time the user attempts to perform, or performs, the control, monitoring, or security, operation, action, or function.

It is important to note that the embodiment of FIGS. 11A, 11B, 11C, and 11D, and any and/or all of the functionality described herein for or relating to the embodiment of FIGS. 11A, 11B, 11C, and 11D, can also be utilized in a same, a similar, and/or an analogous, manner, with any of the various premises and/or with any of the types or kinds of premises described herein, with any of the various vehicles and/or with any of the types or kinds of vehicle described herein, and/or with any of the various articles and/or with any of the types or kinds of articles described herein.

In another preferred embodiment, the apparatus 100 and method of the present invention can be utilized to generate a user alert message or a user notification message and/or can transmit same to any authorized user or authorized lead user for any of the herein-described premises, vehicles, and/or articles, and/or to a central control and/or monitoring center or service or to a law enforcement agency, department, or bureau, upon the occurrence of any activity, attempt, event, or happening. In a preferred embodiment, an alert message or a notification message can be generated upon any occurrence when or any time any user, individual, or person, whether authorized to do so or not authorized to do so, enters into or onto, or attempts to enter into, or onto, any premises or any vehicle, or any occurrence when or any time any user, individual, or person, whether authorized to do so or not authorized to do so, uses, or attempts to use, any premises, any vehicle, or any article, or any premises system(s), equipment, or device(s) 35 of any premises, any vehicle system(s), equipment, or device(s) 45, or any article system(s), equipment, or device(s) 55 of any article, or any occurrence when or any time any user, individual, or person, whether authorized to do so or not authorized to do so, accesses or gains access to, or attempts to access or attempts to gain access to, any premises, any vehicle, any article, any premises account, any vehicle account, any article account, any personal control and monitoring account or PCMA of any user or individual, any premises computer 30, any vehicle computer 40, or any article computer 50, or any occurrence when or any time any user, individual, or person, whether authorized to do so or not authorized to do so, performs, or attempts to perform, any control, monitoring, and/or security, operation, action, or function, on or regarding any premises, any premises system(s), equipment, or device(s) 35 of any premises, any vehicle, any vehicle system(s), equipment, or device(s) 45 of any vehicle, or any article or any article system(s), equipment, or device(s) 55 of any article, or upon any occurrence of any activity, attempt, even, or happening, for which any authorized user or an authorized lead user of any premises, vehicle, or article, desires to be notified or for which an alert message or a notification message is warranted.

In a preferred embodiment, any user, individual, or person, whether authorized to use the apparatus 100 or not, can be required to provide a photograph or picture of himself or herself, which can be taken with or using any camera or video recording device of or associated with any communication device 60 which the user, individual, or person, is using, and/or which can also be any camera of or associated with any premises security device of a premises, any vehicle security device of a vehicle, or any article security device of an article. In another preferred embodiment, any user, individual, or person, whether authorized to use the apparatus 100 or not, can, in addition to, or instead of, taking a photograph of himself or herself, can also be required to submit to providing a retinal scan, a fingerprint scan, a handprint scan, a hand geometry scan, a facial feature scan, or a voice sample, or any other biometric data and/or information, via any suitable input device of or associated with the communication device 60 or any premises security device of a premises, any vehicle security device of a vehicle, or any article security device of an article.

In a preferred embodiment, upon an occurrence of any activity, attempt, event, or happening, which can be any occurrence when or any time any user, individual, or person, whether authorized to do so or not authorized to do so, enters into or onto, or attempts to enter into, or onto, any premises or any vehicle, any occurrence when or any time any user, individual, or person, whether authorized to do so or not authorized to do so, uses, or attempts to use, any premises, any vehicle, or any article, or any premises system(s), equipment, or device(s) 35 of any premises, any vehicle system(s), equipment, or device(s) 45, or any article system(s), equipment, or device(s) 55 of any article, or any occurrence when or any time any user, individual, or person, whether authorized to do so or not authorized to do so, accesses or gains access to, or attempts to access or attempts to gain access to, any premises, any vehicle, any article, any premises account, any vehicle account, any article account, any personal control and monitoring account or PCMA of any user or individual, any premises computer 30, any vehicle computer 40, or any article computer 50, or any occurrence when or any time any user, individual, or person, whether authorized to do so or not authorized to do so, performs, or attempts to perform, any control, monitoring, and/or security, operation, action, or function, on or regarding any premises, any premises system(s), equipment, or device(s) 35 of any premises, any vehicle, any vehicle system(s), equipment, or device(s) 45 of any vehicle, or any article or any article system(s), equipment, or device(s) 55 of any article, or upon any occurrence of any activity, attempt, event, or happening, for which any authorized user or an authorized lead user of any premises, vehicle, or article, desires to be notified or for which an alert message or a notification message is warranted, the apparatus 100, the central processing computer 10, the user communication device 60 used by the user, individual, or person, or the premises computer 30 of or associated with the premises involved, the vehicle computer 40 of or associated with the vehicle involved, or the article computer 50 of the article involved, can generate an appropriate alert message or notification message.

In a preferred embodiment, the alert message or the notification message can include, or can have attached thereto, a photograph or a picture of the user, individual, or person taken at the time of the occurrence of any activity, attempt, event, or happening. In addition to, or instead of a photograph or a picture, the alert message or the notification message can also include, or can have attached thereto, data and/or information regarding any retinal scan, fingerprint scan, handprint scan, hand geometry scan, facial feature scan, or voice sample, or any other biometric data and/or information, obtained from, provided by, or submitted by, the user, individual, or person at the time of the occurrence of any activity, attempt, event, or happening.

In another preferred embodiment, the alert message or the notification message can also contain or include, or have attached thereto, a Premises Occupied Message, a Vehicle Occupied or In Use Message, or an Article In Use Message, which can contain or include, for each user, individual, or person, identified as being in, on, or at, or using, the premises, the vehicle, or the article, the name, user name, file photograph, and/or photograph recorded upon his or her respective entry into or onto, or use of, the respective premises, vehicle, or article. The respective Premises Occupied Message, Vehicle Occupied or In Use Message, or Article In Use Message, can also include a video clip of the user, individual, person, entering or using the premises, vehicle, or article, and/or an audio recording or voice recording obtained upon entry into or onto, or use of, the premises, vehicle, or article. In this manner an authorized user or authorized lead user can be notified of the activity, attempt, event, or happening, and be notified as to any user, individual, or person, identified as being in, on, or at, or using, the premises, the vehicle, or the article, at the time of the activity, attempt, event, or happening. As and for an example, an authorized lead user, who is a parent in a household, can be alerted to someone attempting to perform a control, monitoring, and/or security, operation, action, or function, on or regarding a premises system(s), equipment, or device(s) 35, in his or her house while any of his children and/or spouse are in the house.

In a preferred embodiment, the apparatus 100, the central processing computer 10, the user communication device 60 used by the user, individual, or person, or the premises computer 30 of or associated with the premises involved, the vehicle computer 40 of or associated with the vehicle involved, or the article computer 50 of the article involved, can transmit the alert message or the notification message to a communication device 60 used by or of or associated with an authorized user or an authorized lead user of the respective premises, vehicle, or article, which is the subject of the occurrence of the activity, attempt, event, or happening. In a preferred embodiment, the alert message or the notification message can be transmitted as or in an electronic mail (e-mail) message, an instant messaging message, and SMS message, a recorded telephone message, or any electronic communication or electronic transmission.

Once received and/or reviewed, the authorized user or the authorized lead user can transmit an alert response message or a notification response message to the central processing computer 10 and/or to the respective premises computer 30, the vehicle computer 40, or the article computer 50, of the respective premises, vehicle, or article, which is the subject of the occurrence of any activity, attempt, event, or happening. The alert response message or the notification response message can contain data and/or information for disallowing, preventing, cancelling, or stopping, the activity, attempt, event, or happening, or information for allowing the activity, attempt, event, or happening. The alert response message or the notification response message can also contain data and/or information for recording information regarding the activity, attempt, event, or happening, reporting the occurrence of the activity, attempt, event, or happening, to another authorized user(s), to an authorized lead user(s), and/or to the central processing computer 10, and/or to a law enforcement computer 70 of or associated with a law enforcement agency, department, or bureau so as to report the occurrence of the activity, attempt, event, or happening, to a law enforcement agency, department, or bureau.

Figure 12:
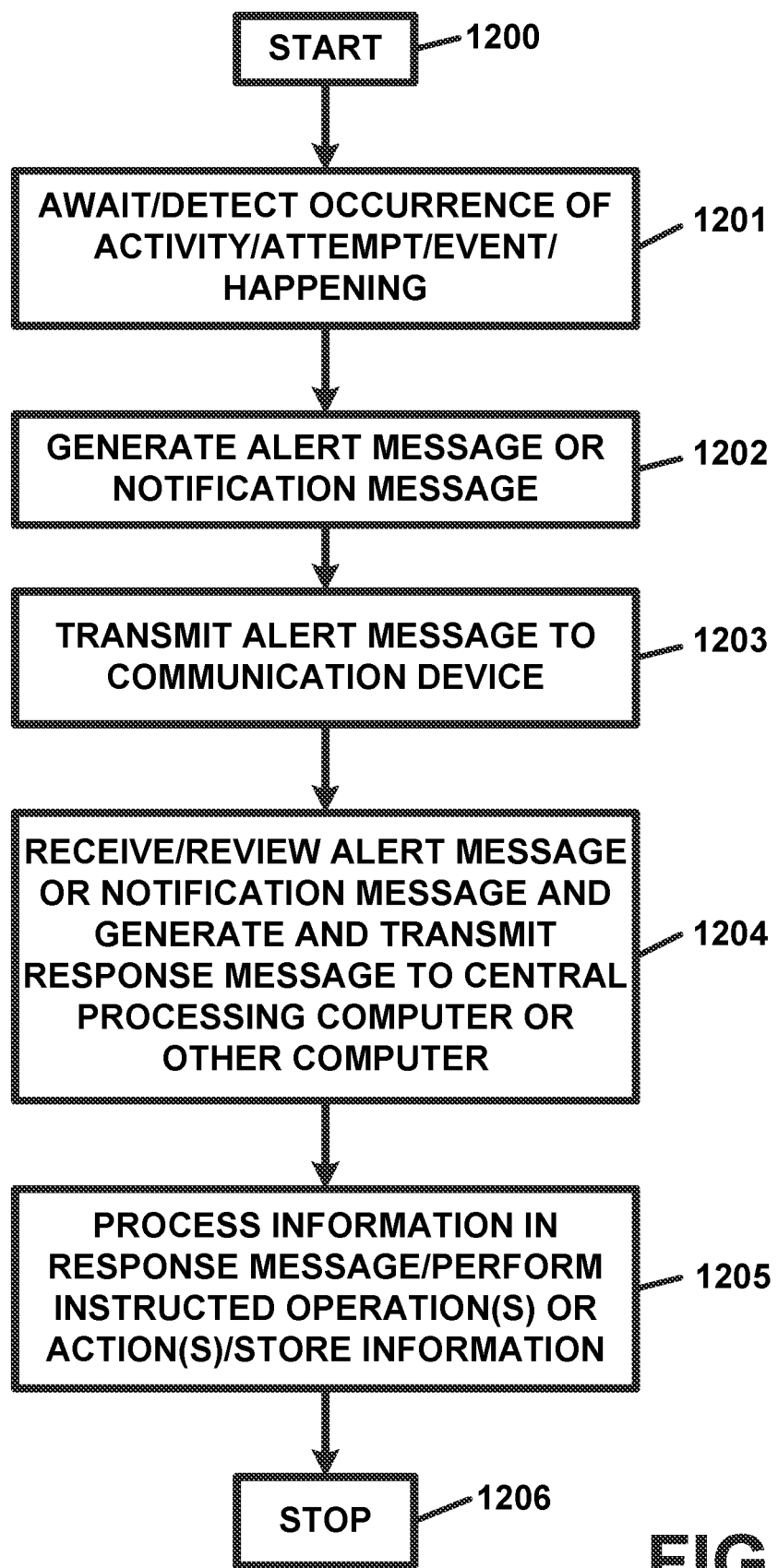
FIG. 12 illustrates another preferred embodiment method for utilizing the apparatus of the present invention, in flow diagram form.

FIG. 12 illustrates another preferred embodiment method for utilizing the apparatus 100 of the present invention, in flow diagram form. With reference to FIG. 12, the operation of the apparatus 100 commences at step 1200. At step 1201, the apparatus 100 of the present invention can await an occurrence of an activity, attempt, event, or happening, regarding or involving a premises, a vehicle, or an article. At step 1201, the central processing computer 10 can detect the occurrence of the activity, attempt, event, or happening, and/or any of the user communication device 60 used by the user, individual, or person, or the premises computer 30 of or associated with the premises involved, or the vehicle computer 40 of or associated with the vehicle involved, or the article computer 50 of the article involved, can detect the occurrence of the activity, attempt, event, or happening, and transmit an appropriate signal to the central processing computer 10.

In a preferred embodiment, the detected occurrence of the activity, attempt, event, or happening, is or can be any occurrence when or any time any user, individual, or person, whether authorized to do so or not authorized to do so, enters into or onto, or attempts to enter into, or onto, any premises or any vehicle, or any occurrence when or any time any user, individual, or person, whether authorized to do so or not authorized to do so, uses, or attempts to use, any premises, any vehicle, or any article, or any premises system(s), equipment, or device(s) 35 of any premises, any vehicle system(s), equipment, or device(s) 45, or any article system(s), equipment, or device(s) 55 of any article, or any occurrence when or any time any user, individual, or person, whether authorized to do so or not authorized to do so, accesses or gains access to, or attempts to access or attempts to gain access to, any premises, any vehicle, any article, any premises account, any vehicle account, any article account, any personal control and monitoring account or PCMA of any user or individual, any premises computer 30, any vehicle computer 40, or any article computer 50, or any occurrence when or any time any user, individual, or person, whether authorized to do so or not authorized to do so, performs, or attempts to perform, any control, monitoring, and/or security, operation, action, or function, on or regarding any premises, any premises system(s), equipment, or device(s) 35 of any premises, any vehicle, any vehicle system(s), equipment, or device(s) 45 of any vehicle, or any article or any article system(s), equipment, or device(s) 55 of any article, or upon any occurrence of any activity, attempt, event, or happening, for which any authorized user or an authorized lead user, of any premises, vehicle, or article, desires to be notified or for which an alert message or a notification message is warranted. Upon a detection of the occurrence of the activity, attempt, event, or happening, regarding or involving a premises, a vehicle, or an article, the operation of the apparatus 100 will proceed to step 1202.

At step 1202, the central processing computer 10 and/or any of the the user communication device 60 used by the user, individual, or person, or the premises computer 30 of or associated with the premises involved, or the vehicle computer 40 of or associated with the vehicle involved, or the article computer 50 of the article involved, can generate an alert message or a notification message. In a preferred embodiment, the alert message or the notification message can include, or can have attached thereto, a photograph or a picture of the user, individual, or person taken at the time of the occurrence of any activity, attempt, event, or happening. In addition to, or instead of a photograph or a picture, the alert message or the notification message can also include, or can have attached thereto, data and/or information regarding any retinal scan, fingerprint scan, handprint scan, hand geometry scan, facial feature scan, or voice sample, or any other biometric data and/or information, obtained from, provided by, or submitted by, the user, individual, or person at the time of the occurrence of the activity, attempt, event, or happening.

In another preferred embodiment, the alert message or the notification message generated at step 1202 can also contain or include, or have attached thereto, a Premises Occupied Message, a Vehicle Occupied or In Use Message, or an Article In Use Message, which can contain or include, for each user, individual, or person, identified as being in, on, or at, or using, the premises, the vehicle, or the article, the name, user name, file photograph, and/or photograph recorded upon his or her respective entry into or onto, or use of, the respective premises, vehicle, or article. The respective Premises Occupied Message, Vehicle Occupied or In Use Message, or Article In Use Message, can also include a video clip of the user, individual, person, entering or using the premises, vehicle, or article, and/or an audio recording or voice recording obtained upon entry into or onto, or use of, the premises, vehicle, or article. In this manner an authorized user or authorized lead user can be notified of the activity, attempt, event, or happening, and can be notified as to any user, individual, or person, identified as being in, on, or at, or using, the premises, the vehicle, or the article, at the time of the activity, attempt, event, or happening. As and for an example, an authorized lead user, who is a parent in a household, can be alerted to someone attempting to perform a control, monitoring, and/or security, operation, action, or function, on or regarding a premises system(s), equipment, or device(s) 35, in his or her house while any of his children and/or spouse are in the house.

At step 1203, the apparatus 100, the central processing computer 10, the user communication device 60 used by the user, individual, or person, or the premises computer 30 of or associated with the premises involved, or the vehicle computer 40 of or associated with the vehicle involved, or the article computer 50 of the article involved, can transmit the alert message or the notification message to a communication device 60 used by, or of, or associated with, an authorized user or an authorized lead user of the respective premises, vehicle, or article, or the respective premises account, vehicle account, or article account, which is the subject of the occurrence of the activity, attempt, event, or happening. In a preferred embodiment, the alert message or the notification message can be transmitted to the communication device 60 as or in an electronic mail (e-mail) message, an instant messaging message, and SMS message, a recorded telephone message, or any electronic communication or electronic transmission. In the case of an e-mail, the alert message or the notification message can also be transmitted to an e-mail server computer associated with the authorized user's or the authorized lead user's e-mail account.

At step 1204, the authorized user or authorized lead user can receive the alert message or the notification message on his or her communication device 60. Once received by the communication device 60 and/or reviewed by the authorized user or authorized lead user, the authorized user or the authorized lead user can enter into the communication device 60 an alert response message or a notification response message and can transmit same to the central processing computer 10 and/or to the respective premises computer 30, the vehicle computer 40, or the article computer 50, of the respective premises, vehicle, or article, which is the subject of the occurrence of the activity, attempt, event, or happening. The alert response message or the notification response message can contain data and/or information for disallowing, preventing, cancelling, or stopping, the activity, attempt, event, or happening, or information for allowing the activity, attempt, event, or happening. The alert response message or the notification response message can also contain data and/or information for recording information regarding the activity, attempt, event, or happening, reporting the activity, attempt, event, or happening, to another authorized user(s), to an authorized lead user(s), and/or to the central processing computer 10, and/or to a law enforcement computer 70 of or associated with a law enforcement agency, department, or bureau so as to report the activity, attempt, event, or happening, to a law enforcement agency, department, or bureau.

At step 1205, the central processing computer 10, and/or the respective premises computer 30, the vehicle computer 40, or the article computer 50, of the respective premises, vehicle, or article, which is the subject of the occurrence of the activity, attempt, event, or happening, can receive, and can process any data and/or information contained in, the alert response message or the notification response message. At step 1205, the central processing computer 10, and/or the respective premises computer 30, the vehicle computer 40, or the article computer 50, of the respective premises, vehicle, or article, which is the subject of the occurrence of the activity, attempt, event, or happening, can, depending upon the instructions contained in the alert response message or the notification response message, disallow, prevent, cancel, or stop, the activity, attempt, event, or happening, or can allow the activity, attempt, event, or happening.

At step 1205, the central processing computer 10, and/or the respective premises computer 30, the vehicle computer 40, or the article computer 50, of the respective premises, vehicle, or article, which is the subject of the occurrence of the activity, attempt, event, or happening, can also record and/or store in any of the herein-described database(s) 10H, 30H, 40H, 50H, and/or 60H, or in the central processing computer 10, and/or the respective premises computer 30, the vehicle computer 40, or the article computer 50, and/or in the communication device of the authorized user or the authorized lead user, or in the respective premises account, vehicle account, or article account, or in the personal control and monitoring account of the authorized user or the authorized lead user, any data and/or information regarding the activity, attempt, event, or happening, the alert message or the notification message, the alert response message or the notification response message, and/or any control, monitoring, and/or security, operations, actions, or functions, performed pursuant to any instructions in the alert response message or the notification response message, and/or any other data and/or information regarding or relating to the occurrence of the activity, attempt, event, or happening, and/or any of the herein-described actions or operations relating thereto.

At step 1205, the central processing computer 10, and/or the respective premises computer 30, the vehicle computer 40, or the article computer 50, of the respective premises, vehicle, or article, which is the subject of the occurrence of the activity, attempt, event, or happening, can also report the occurrence of the activity, attempt, event, or happening, to another authorized user(s), to another authorized lead user(s), and/or to the central processing computer 10, and/or to a law enforcement computer 70 of or associated with a law enforcement agency, department, or bureau so as to report the occurrence of the activity, attempt, event, or happening, to a law enforcement agency, department, or bureau. Thereafter, the operation of the apparatus 100 will cease at step 1206.

In another preferred embodiment, the apparatus 100 and method of the present invention can detect a malfunction, a state of disrepair, an operational failure or an operating failure, or a use, an unauthorized use, and/or a theft, and/or an accessing of and/or any entry into or onto, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article.

In a preferred embodiment, any one or more of the herein-described monitoring devices can detect an occurrence of a respective malfunction, state of disrepair, operational failure or operating failure, or use, unauthorized use, and/or theft, and/or accessing of and/or entry into or onto, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article. The respective monitoring device can generate an appropriate signal or message and transmit same to the respective promises computer 30, vehicle computer 40, or article computer 50, which can, in turn, generate and transmit a signal or an alert message or a notification message to the central processing computer 10. The central processing computer 10 can them generate an alert message or a notification message to the communication device 60 of or associated with an authorized user or an authorized lead user of the respective premises, vehicle, or article. In another preferred embodiment, the respective promises computer 30, vehicle computer 40, or article computer 50, can generate and transmit an alert message or a notification message to the communication device 60 of or associated with the authorized user or the authorized lead user of the respective premises, vehicle, or article.

In another preferred embodiment, in the case of a detected malfunction, state of disrepair, or operational failure or operating failure, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article, a respective diagnostic device can be activated, either automatically or otherwise, and can perform an diagnostic evaluation of the respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article, generate a diagnostic report, and transmit the diagnostic report to the respective premises computer 30, vehicle compute 40, article computer 50, and/or to the central processing computer 10, and/or the communication device 60 of or associated with the authorized user or the authorized lead user of the respective premises, vehicle, or article.

In another preferred embodiment, any one or more of the diagnostic device, the monitoring device, the respective premises computer 30, vehicle computer 40, or article computer, the central processing computer, and/or the communication device 60 can generate and/or transmit a repair or a re-programming signal, program, or software, to the respective premises system(s), equipment, or device(s) 35, vehicle or any vehicle system(s), equipment, or device(s) 45, or article system(s), equipment, or device(s) 55 of the article so as to effectuate a repair and/or re-programming of same.

Figure 13:
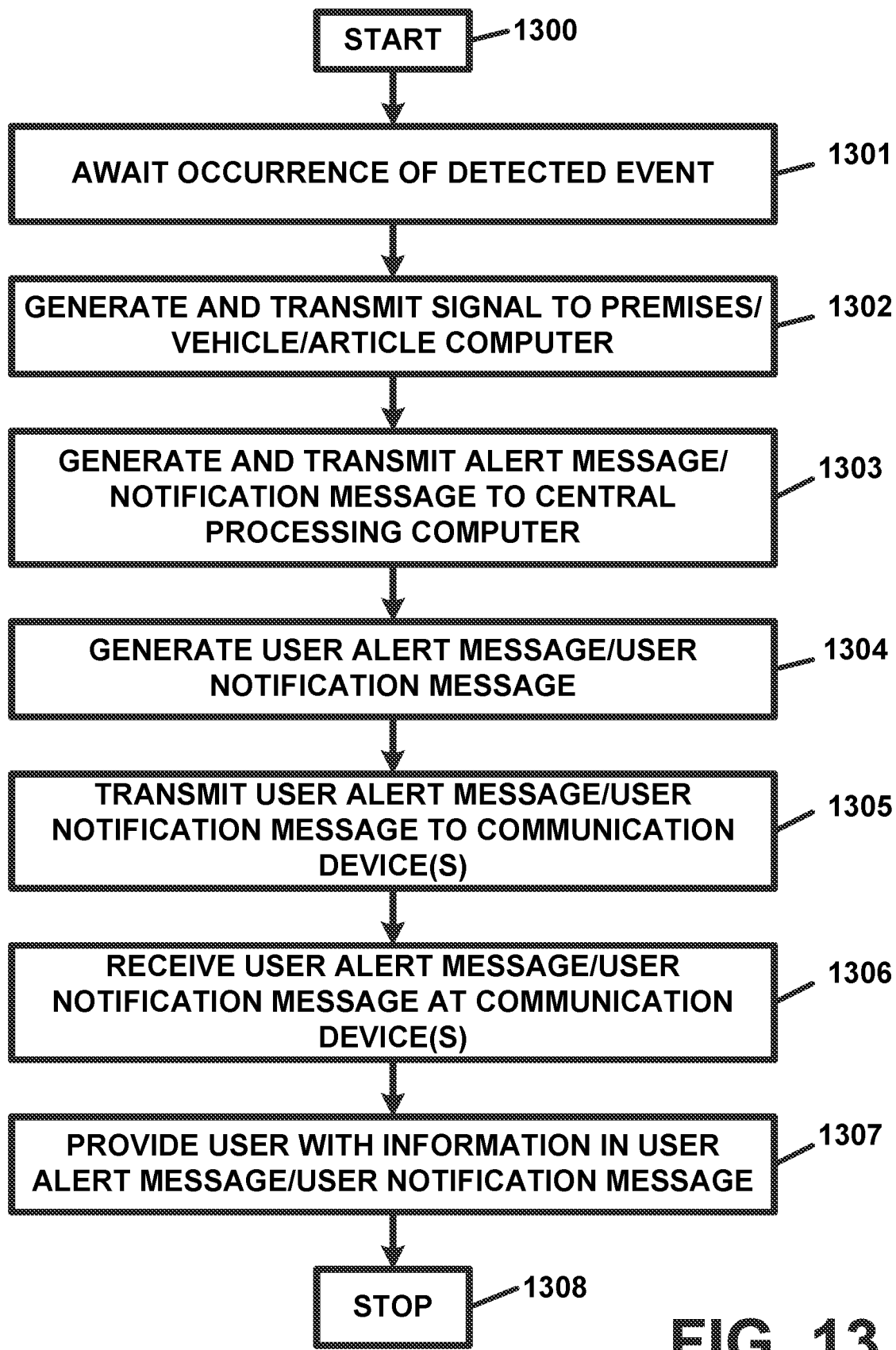
FIG. 13 illustrates another preferred embodiment method for utilizing the apparatus of the present invention, in flow diagram form.

FIG. 13 illustrates another preferred embodiment method for utilizing the apparatus 100 of the present invention, in flow diagram form. With reference to FIG. 13, the operation of the apparatus 100 commences at step 1300. At step 1301, the apparatus 100 of the present invention can await an occurrence of a detected malfunction, state of disrepair, operational failure or an operating failure, or use, unauthorized use, and/or theft, and/or accessing of and/or entry into or onto, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article. At step 1301, a respective monitoring device 35, 45, or 55 can detect an occurrence of a respective malfunction, state of disrepair, operational failure or operating failure, or use, unauthorized use, and/or theft, and/or accessing of and/or entry into or onto, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article. At step 1302, the respective monitoring device 35, 45, or 55, can generate an appropriate signal or message and transmit same to the respective promises computer 30, vehicle computer 40, or article computer 50.

At step 1303, the respective premises computer 30, vehicle computer 40, or article computer 50 can generate and transmit an alert message or a notification message to the central processing computer 10. At step 1303, the respective premises computer 30, vehicle computer 40, or article computer 50 can also process any data and/or information regarding the detected malfunction, state of disrepair, operational failure or operating failure, or use, unauthorized use, and/or theft, and/or accessing of and/or entry into or onto, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article, and can be programmed to, and can automatically activate, operate, control an operation of, or monitor an operation of any respective premises system(s), equipment, or device(s) 35, any respective vehicle or any vehicle system(s), equipment, or device(s) 45, or any respective article or any article system(s), equipment, or device(s) 55 involved in or relating to the detected malfunction, state of disrepair, operational failure or operating failure, or use, unauthorized use, and/or theft, and/or accessing and/or entry, occurrence or event. At step 1303, the respective premises computer 30, vehicle computer 40, or article computer 50 can also activate a camera or video recoding device or any number of cameras or video recording devices in order to record or obtain a picture(s), a photograph(s), a video recording, video information, and/or a video clip, at the respective place, location, scene or, site, of the detected malfunction, state of disrepair, operational failure or operating failure, or use, unauthorized use, and/or theft, and/or accessing and/or entry, occurrence or event and/or at the respective premises, vehicle, or article.

At step 1303, the respective premises computer 30, vehicle computer 40, or article computer 50 can also activate a microphone or audio recoding device or any number of microphone or audio recoding device in order to record or obtain audio information or an audio clip at the respective place, location, scene or, site, of the detected malfunction, state of disrepair, operational failure or operating failure, or use, unauthorized use, and/or theft, and/or accessing and/or entry, occurrence or event and/or at the respective premises, vehicle, or article.

In a preferred embodiment, the alert message or notification message can also include an data and/or information regarding the detected malfunction, state of disrepair, operational failure or operating failure, or use, unauthorized use, and/or theft, and/or accessing and/or entry, of, for, or regarding, a respective premises or a premises system(s), equipment, or device(s) 35 of the premises, a respective vehicle or any vehicle system(s), equipment, or device(s) 45 of the vehicle, or a respective article or any article system(s), equipment, or device(s) 55 of the article, the respective premises system(s), equipment, or device(s) 35, the respective vehicle or any vehicle system(s), equipment, or device(s) 45, or the respective article or any article system(s), equipment, or device(s) 55 which is or are the subject of, or which is or are involved in and/or related to, the detected malfunction, state of disrepair, operational failure or operating failure, or use, unauthorized use, and/or theft, and/or accessing and/or entry, and/or any picture(s), photograph(s), video information, video clip obtained at the respective premises, vehicle, or article.

In a preferred embodiment, the alert message or notification message can also include diagnostic data and/or information or a diagnostic report, obtained from or generated by the respective diagnostic device, regarding the respective premises system(s), equipment, or device(s) 35, the respective vehicle or any vehicle system(s), equipment, or device(s) 45, or the respective article or any article system(s), equipment, or device(s) 55 which is or are the subject of, or which is or are involved in and/or related to, the detected malfunction, state of disrepair, operational failure or operating failure. In a preferred embodiment, the respective diagnostic device can be programmed to perform a diagnostic analysis, a diagnostic evaluation, and/or generate a diagnostic report, automatically upon the occurrence of the detected malfunction, state or disrepair, or operational failure or operating failure, of or regarding the respective premises system(s), equipment, or device(s) 35, the respective vehicle or any vehicle system(s), equipment, or device(s) 45, or the respective article or any article system(s), equipment, or device(s) 55 which is or are the subject of same.

In another preferred embodiment, the respective premises computer 30, vehicle computer 40, or article computer 50, can activate the diagnostic device upon the occurrence of the detected malfunction, state or disrepair, or operational failure or operating failure, of or regarding the respective premises system(s), equipment, or device(s) 35, the respective vehicle or any vehicle system(s), equipment, or device(s) 45, or the respective article or any article system(s), equipment, or device(s) 55.

At step 1303, the respective premises computer 30, vehicle computer 40, or article computer 50 can also transmit the alert message or the notification message to the central processing computer 10. At step 1303, the respective premises computer 30, vehicle computer 40, or article computer 50 can also transmit the alert message or the notification message to the communication device 60 of or associated with the authorized user or the authorized lead user.

At step 1304, the central processing computer 10 can generate an user alert message or a user notification message which include any and/or all of the data and/or information described herein as being included or contained in the alert message or the notification message. At step 1304, the central processing computer 10 can also generate a respective Premises Occupied Message, Vehicle Occupied or In Use Message, or Article In Use Message, which can contain or include, for each user, individual, or person, identified as being in, on, or at, or using, the premises, the vehicle, or the article, at the time of the detected malfunction, state of disrepair, operational failure or operating failure, or use, unauthorized use, and/or theft, and/or accessing and/or entry, the name, user name, file photograph, and/or photograph recorded which was recorded upon his or her most recent respective entry into or onto, or use of, the respective premises, vehicle, or article.

In a preferred embodiment, the user alert message or user notification message can also contain or include any and/or all of the data and/or information contained or included in the alert message or the notification message as well as the respective Premises Occupied Message, Vehicle Occupied or In Use Message, or Article In Use Message.

In a preferred embodiment, the user alert message or the user notification message can also contain a link(s) or a hyperlink(s) to the central processing computer 10 and/or the respective premises computer 30, vehicle computer 40, or article computer 50 which can allow the authorized user or the authorized lead user to perform any control, monitoring, or security, operation, action, or function, on or regarding the respective premises system(s), equipment, or device(s) 35, the respective vehicle system(s), equipment, or device(s) 45, or the respective article system(s), equipment, or device(s) 55, which is or are the subject of, or which is or are involved in and/or related to, the detected malfunction, state of disrepair, operational failure or operating failure, or use, unauthorized use, and/or theft, and/or accessing and/or entry.

In a preferred embodiment, the user alert message or the user notification message can also contain a link(s) or a hyperlink(s) to the central processing computer 10 and/or the respective premises computer 30, vehicle computer 40, or article computer 50 which can allow the authorized user or the authorized lead user to perform any remote repair, re-programming, or re-setting, of any of the respective premises system(s), equipment, or device(s) 35, the respective vehicle system(s), equipment, or device(s) 45, or the respective article system(s), equipment, or device(s) 55, which is or are the subject of, or which is or are involved in and/or related to, the detected malfunction, state of disrepair, operational failure or operating failure, or use, unauthorized use, and/or theft, and/or accessing and/or entry.

In a preferred embodiment, the user alert message or the user notification message can also contain a link(s) or a hyperlink(s) to the central processing computer 10 and/or the respective premises computer 30, vehicle computer 40, or article computer 50 which can allow the authorized user or the authorized lead user to perform any control, monitoring, or security, operation, action, or function, on or regarding any of the respective premises system(s), equipment, or device(s) 35 of the premises, any of the respective vehicle or any vehicle system(s), equipment, or device(s) 45 of the vehicle, or any of the respective article system(s), equipment, or device(s) 55 of the article.

In a preferred embodiment, the user alert message or the user notification message can also contain a link(s) or a hyperlink(s) to a law enforcement computer 70 or communication device associated with a law enforcement agency, department, or bureau in order to allow the authorized user or the authorized lead user to report a theft, a burglary, an unsafe condition, and/or the detected malfunction, state of disrepair, operational failure or operating failure, or use, unauthorized use, and/or theft, and/or accessing and/or entry, to a law enforcement agency, department, or bureau.

At step 1305, the central processing computer 10 can transmit the user alert message of the user notification message to the communication device(s) 60 of or associated with each authorized user and/or each authorized lead user of the respective premises, vehicle, or article. In a preferred embodiment, the user alert message or the user notification message can be transmitted as or in an electronic mail (e-mail) message, an instant messaging message, and SMS message, a recorded telephone message, or any electronic communication or electronic transmission. At step 1305, the central processing computer 10 can also record and/or store the user alert message or the user notification message, in the respective premises account associated with the premises, in the vehicle account associated with the vehicle, or in the article account associated with the article, and/or in the personal control and monitoring account of each authorized user and/or each authorized lead user of the respective premises, vehicle, or article.

At step 1306, the communication device(s) 60 of the authorized user or the authorized lead user can receive the user alert message or the user notification message. At step 1307, the authorized user or the authorized lead user can be provided with the information contained or included in the user alert message or the user notification message.

At step 1307, the authorized user or the authorized lead user can access the central processing computer 10, and/or can access the respective premises computer 30, vehicle computer 40, or article computer 50, such as by using a link(s) or a hyperlink(s) contained or included in the user alert message or the user notification message. At step 1307, the authorized user or the authorized lead user can then perform any control, monitoring, or security, operation, action, or function, or can perform any number of control, monitoring, or security, operations, actions or functions, on or regarding the respective premises system(s), equipment, or device(s) 35, the respective vehicle system(s), equipment, or device(s) 45, or the respective article system(s), equipment, or device(s) 55, which is or are the subject of, or which is or are involved in and/or related to, the detected malfunction, state of disrepair, operational failure or operating failure, or use, unauthorized use, and/or theft, and/or accessing and/or entry.

At step 1307, the accessing of the central processing computer 10, and/or can access the respective premises computer 30, vehicle computer 40, or article computer 50, can require that the authorized user or authorized lead user take a picture, photograph, or video clip, of himself or herself which picture, photograph, or video clip, or record a voice sample, which can be transmitted to the central processing computer 10, and/or to the respective premises computer 30, vehicle computer 40, or article computer 50, in connection with the authorized user or authorized lead user accessing same and/or any respective premises account, vehicle account, article account, and/or personal control and monitoring account, and/or in connection with the authorized user or authorized lead user performing any control, monitoring, or security, operation(s), action(s), or function(s), on or regarding the respective premises or any premises system(s), equipment, or device(s) 35 of the premises, the respective vehicle or any vehicle system(s), equipment, or device(s) 45 of the vehicle, or the respective article or any article system(s), equipment, or device(s) 55 of the article. At step 1307, the authorized user or the authorized lead user can also perform a repair, re-programming, or re-setting, operation, action, or function, or procedure, of, for, or regarding, any of the respective premises system(s), equipment, or device(s) 35, the respective vehicle system(s), equipment, or device(s) 45, or the respective article system(s), equipment, or device(s) 55, which is or are the subject of, or which is or are involved in and/or related to, the detected malfunction, state of disrepair, operational failure or operating failure, or use, unauthorized use, and/or theft, and/or accessing and/or entry.

At step 1307, the authorized user or the authorized lead user can also perform any control, monitoring, or security, operation, action, or function, on or regarding any of the respective premises system(s), equipment, or device(s) 35 of the premises, any of the respective vehicle or any vehicle system(s), equipment, or device(s) 45 of the vehicle, or any of the respective article system(s), equipment, or device(s) 55 of the article. At step 1307, the authorized user or the authorized lead user can also report a theft, a burglary, an unsafe condition, and/or the detected malfunction, state of disrepair, operational failure or operating failure, or use, unauthorized use, and/or theft, and/or accessing and/or entry, to a law enforcement agency, department, or bureau such as by transmitting or forwarding the user alert message or the user notification message, or any portion of same, or any data and/or information contained or included therein, and/or any other additional information, to a computer or communication device associated with the respective law enforcement agency, department, or bureau.

At step 1307, data and/or information regarding any and/or all actions taken or performed by the authorized user or the authorized lead user, and/or any data and/or information regarding any control, monitoring, or security, operation(s), action(s), or function(s), on or regarding any of the respective premises system(s), equipment, or device(s) 35 of the premises, any of the respective vehicle or any vehicle system(s), equipment, or device(s) 45 of the vehicle, or any of the respective article system(s), equipment, or device(s) 55 of the article, can be stored in the database 10H of the central processing computer, in the personal control and monitoring account of the authorized user or authorized lead user, in the respective premises account, vehicle account, or article account of the respective premises, vehicle, or article, and/or in the respective database 30H, 40H, 50H, or 60H, of the respective premises computer 30, vehicle computer 40, article computer 50, and/or the communication device 60 of or associated with the authorized user or the authorized lead user. Thereafter, the operation of the apparatus 100 will cease at step 1308.

In another preferred embodiment, the central processing computer 10 and/or the respective premises computer 30, vehicle computer 40, or article computer 50, can also, for each detected malfunction, state of disrepair, operational failure or operating failure, or use, unauthorized use, and/or theft, and/or accessing and/or entry, generate and transmit the respective alert message or notification message and/or the respective user alert message or user notification message to the communication device 60 of any user or individual present in, on, at, or using the respective premises, vehicle, or article.

In another preferred embodiment, the central processing computer 10 and/or the respective premises computer 30, vehicle computer 40, or article computer 50, can also, for each detected malfunction, state of disrepair, operational failure or operating failure, or use, unauthorized use, and/or theft, and/or accessing and/or entry, provide an audio or audible announcement in or at the premises, in or at the vehicle, or at article, via an appropriate speaker, intercom, or public address system.

In another preferred embodiment, the central processing computer 10 and/or the respective premises computer 30, vehicle computer 40, or article computer 50, can also, for each control, monitoring, or security, operation, action, or function, performed, or for each repair, reprogramming or re-setting, performed regarding of any respective premises system(s), equipment, or device(s) 35 of the premises, any respective vehicle system(s), equipment, or device(s) 45, or any respective article system(s), equipment, or device(s) 55, generate a message containing information regarding the respective control, monitoring, or security, operation, action, or function, performed, or regarding each repair, reprogramming or re-setting, performed, and transmit the message to the communication device 60 of any user or individual present in, on, at, or using the respective premises, vehicle, or article.

In another preferred embodiment, the central processing computer 10 and/or the respective premises computer 30, vehicle computer 40, or article computer 50, can also, for each control, monitoring, or security, operation, action, or function, performed, or each repair, reprogramming or re-setting, performed, provide an audio or audible announcement in or at the premises, in or at the vehicle, or at article, via an appropriate speaker, intercom, or public address system.

In another preferred embodiment, as well as any and/or all of the embodiments described herein, the apparatus 100 and/or each of the herein-described central processing computer(s) 10, premises computer(s) 30, vehicle computer(s) 40. article computer(s) 50, and communication device(s) 60, can be programmed to perform a systematic check, and/or can be programmed to poll, each and/or every premises system(s), equipment, or device(s) 35 for each premises that has a premises account with the apparatus 100 or is otherwise serviced by the apparatus 100, each and/or every vehicle system(s), equipment, or device(s) 35 for each vehicle that has a vehicle account with the apparatus 100 or is otherwise serviced by the apparatus 100, and/or each and/or every article system(s), equipment, or device(s) 55 for each article that has an article account with the apparatus 100.

For example, for each given premises, each of the central processing computer 10, the premises computer 30 for or associated with that premises, and any of the communication device(s) 60 associated with or used by any authorized user(s) or authorized lead user(s) for the premises, can each be programmed to automatically perform a systematic check and/or to poll each and/or every premises system(s), equipment, or device(s) of the premises.

In a preferred embodiment, the systematic check and/or the polling can be done on a system-by-system basis, and equipment-by-equipment basis, and/or a device-by-device basis, on a room-by-room basis, on a floor-by-floor basis, on a building-by-building basis, and/or on any other basis or using any another methodology.

In a preferred embodiment, the systematic check and/or the polling can also be done in order to determine or ascertain, for each premises system, equipment, or device, its presence in the premises control, monitoring, and/or security system, its connection to or with the premises computer 30, its operation status, whether it is on, off, activated, de-activated, enabled, and/or disabled, it state of operability, whether it is functioning correctly or malfunctioning, whether it is in a state of disrepair, whether it is experiencing an operating failure or any operation failure, whether it has been activated or has experienced a disturbance, and/or any operating information or operational information, and/or can determine or ascertain any other data or information regarding the premises system, equipment, or device, its status, its readiness, and/or its operability, or any other data or information.

The respective central processing computer 10, premises computer 30, or communication device(s) 60, can perform the systematic check or polling and can generate a comprehensive system report or system report for the premises. In a preferred embodiment, the system report can, for each premises system, equipment, or device, contain or include data and/or information regarding its presence in the premises control, monitoring, and/or security system, its connection to or with the premises computer 30, its operation status, whether it is on, off, activated, de-activated, enabled, and/or disabled, it state of operability, whether it is functioning correctly or malfunctioning, whether it is in a state of disrepair, whether it is experiencing an operating failure or any operation failure, whether it has been activated or has experienced a disturbance, and/or any operating information or operational information, and/or can determine or ascertain any other data or information regarding the premises system, equipment, or device, its status, its readiness, and/or its operability, or any other data or information.

In a preferred embodiment, if generated by the premises computer 30, the premises computer 30 can transmit the system report to the central processing computer 10 and to each communication device(s) 60 associated with each authorized user(s) or authorized lead user(s) of the premises. In a preferred embodiment, if generated by the central processing computer 10, the central processing computer 10 can transmit the system report to the premises computer 30 and to each communication device(s) 60 associated with each authorized user(s) or authorized lead user(s) of the premises. In a preferred embodiment, if generated by a communication device 60, the communication device 60 can transmit the system report to the central processing computer 10 and to the premises computer 30. In any and/or all of the embodiments described herein, the apparatus 100 can be utilized in a same, a similar, and/or an analogous, manner, in order to perform a systematic check for, and/or to poll, the vehicle system(s), equipment, or device(s) for each vehicle, and to perform a systematic check for, and/or to poll, the article system(s), equipment, or device(s) for each article.

In a preferred embodiment, any and/or all system reports for a respective premises, vehicle, or article, can be stored in the database 10H of the central processing computer 10, in the respective database 30H, 40H, or 50H, of the respective premises computer 30, vehicle computer 40, article computer 50, in the database 60H of any communication device 60 of or associated with any and/or all authorized user(s) or authorized lead user(s), in a respective premises account, vehicle account, article account, or any respective personal control and monitoring account associated with and and/or all authorized user(s) or authorized lead user(s).

In a preferred embodiment, any of the herein-described systematic checks and/or polling can be programmed to be performed automatically on certain days, at certain times, at certain time intervals, at certain times of the year, month, week, or day, or upon an occurrence of a detection of a malfunction, a state of disrepair, an operational failure or operating failure, or a use, or an unauthorized use, and/or a theft, and/or accessing and/or entry, of or regarding the respective premises or a premises system(s), equipment, or device(s) 35 of the premises, of or regarding a respective vehicle or any vehicle system(s), equipment, or device(s) 45 of the vehicle, or of or regarding a respective article or an article system(s), equipment, or device(s) 55 of the article.

In another preferred embodiment, any of the herein-described systematic checks and/or polling can be activated at any time by any authorized user or any authorized lead user of the respective premises, vehicle, or article. If an authorized user or any authorized lead user of the respective premises, vehicle, or article, activates the systematic check or the polling, then he or she, in a preferred embodiment, can be required to take a picture, photograph, or video or video clip of himself or herself with the communication device camera or video recording device and transmit same to the central processing computer 10 along with the request or instruction to perform the systematic check or polling.

In any and/or all of the embodiments described herein, any user or individual, or any authorized user or authorized individual, or any authorized lead user, can utilize the apparatus 100 and method of the present invention in order to access a camera or video recording device associated with any of the herein-described premises, vehicles, or articles, and request via his or her communication device 60 and/or the central processing computer, or a respective premises computer 30, vehicle computer 40, or article computer 50, that a picture(s), photograph(s), or video information, taken or recorded by, or which has been taken by or which has been recorded by the camera or the video recording device be transmitted to the communication device 60. In this manner, the user or individual, or the authorized user or the authorized individual, or the authorized lead user can view the picture(s), photograph(s), or video information, and/or view activity in, on, at, or in the vicinity of the respective premises, vehicle, or article.

In another preferred embodiment, the user or individual, or the authorized user or authorized individual, or the authorized lead user, can also engage in a video conference and/or a video chat with any other users, individuals, or persons, located at, on, in, or in the vicinity of, the respective premises, vehicle, or article, by using any camera(s), video recording device(s), microphone(s), audio recording device(s), speaker(s), public address system, intercom system, or any other appropriate device(s) or system(s). In another preferred embodiment, the video conferencing and/or video chatting capability of the apparatus 100 can also be used in interactive learning of any subject matter taught in any education institutions, schools, colleges, universities, and/or in any instruction or classes in physical activities, exercise and fitness classes, martial arts classes, Krav Maga classes, mixed martial arts classes, wrestling classes, yoga, aerobics classes, and/or any other exercise and/or fitness classes.

In any and/or all of the embodiments described herein, any user or individual, or any authorized user or authorized individual, or any authorized lead user, can utilize the apparatus 100 and method of the present invention in order to access a microphone, or audio recording device, associated with any of the herein-described premises, vehicles, or articles, and request via his or her communication device 60 and/or the central processing computer, or a respective premises computer 30, vehicle computer 40, or article computer 50, that a audio information, taken or recorded by, or which has been taken by or which has been recorded by the microphone or audio recording device be transmitted to the communication device 60. In this manner, the user or individual, or the authorized user or the authorized individual, or the authorized lead user can listen to the audio information, and/or listen to any activity in, on, at, or in the vicinity of the respective premises, vehicle, or article.

In another preferred embodiment, the user or individual, or the authorized user or authorized individual, or the authorized lead user, can also engage in an audio conference via an speaker, a public address system, an intercom system or any other appropriate device or system, in order to speak or talk with, or engage in or participate in an audio conference with, any other users, individuals, or persons, located at, on, in, or in the vicinity of the respective premises, vehicle, or article.

In another preferred embodiment, the audio conferencing capability of the apparatus 100 can also be used in connection with and/or to facilitate interactive learning of any subject matter taught in any education institutions, schools, colleges, universities, and/or in any instruction or classes in physical activities, exercise and fitness classes, martial arts classes, Krav Maga classes, mixed martial arts classes, wrestling classes, yoga, aerobics classes, and/or any other exercise and/or fitness classes.

In another preferred embodiment, as well as any and/or all of the embodiments described herein, the apparatus 100 of the present invention can be used to take or record pictures, photographs, or video information and/or audio information, in, on, at, or in the vicinity or a respective premises, vehicle, or article and store same, use same for any purpose, and/or to submit same or to transmit same to a law enforcement agency, department or bureau. In another preferred embodiment, the apparatus 100 can be utilized to record a picture, photograph, video information, and/or audio information at, in, on, or in the vicinity of, a respective premises, vehicle, or article, and submit same or transmit same to a to a law enforcement agency, department or bureau in connection with reporting criminal or other activity, violations, motor vehicle violations, traffic violations, speeding violations, passing school bus violations, red light violations, or any other activities.

In another preferred embodiment, the apparatus 100 and method of the present invention can be utilized by any user, individual, person, authorized user, or authorized lead user, in order to obtain a picture, a photograph, video information and/or audio information from a premises camera or video recording device and submit or transmit same to a law enforcement computer 70 of or associated with a law enforcement agency, department, or bureau. In this regard, the respective user, individual, person, authorized user, or authorized lead user, can utilize the apparatus 100 of the present invention in order to report a theft of the premises, an unlawful access into or onto the premises, a trespassing upon the premises, or a breaking and/or entering regarding the premises, and/or any other activity, event, or happening, the occurrence of which the user, individual, person, authorized user, or authorized lead user, desires to report to the law agency, department, or bureau. In another preferred embodiment, the user can also report any criminal activity at the premises and/or any report any detected malfunction, failure, or state of disrepair, of or regarding any of the herein-described premises or any premises system(s), equipment, or device(s) 35.

Figure 14:
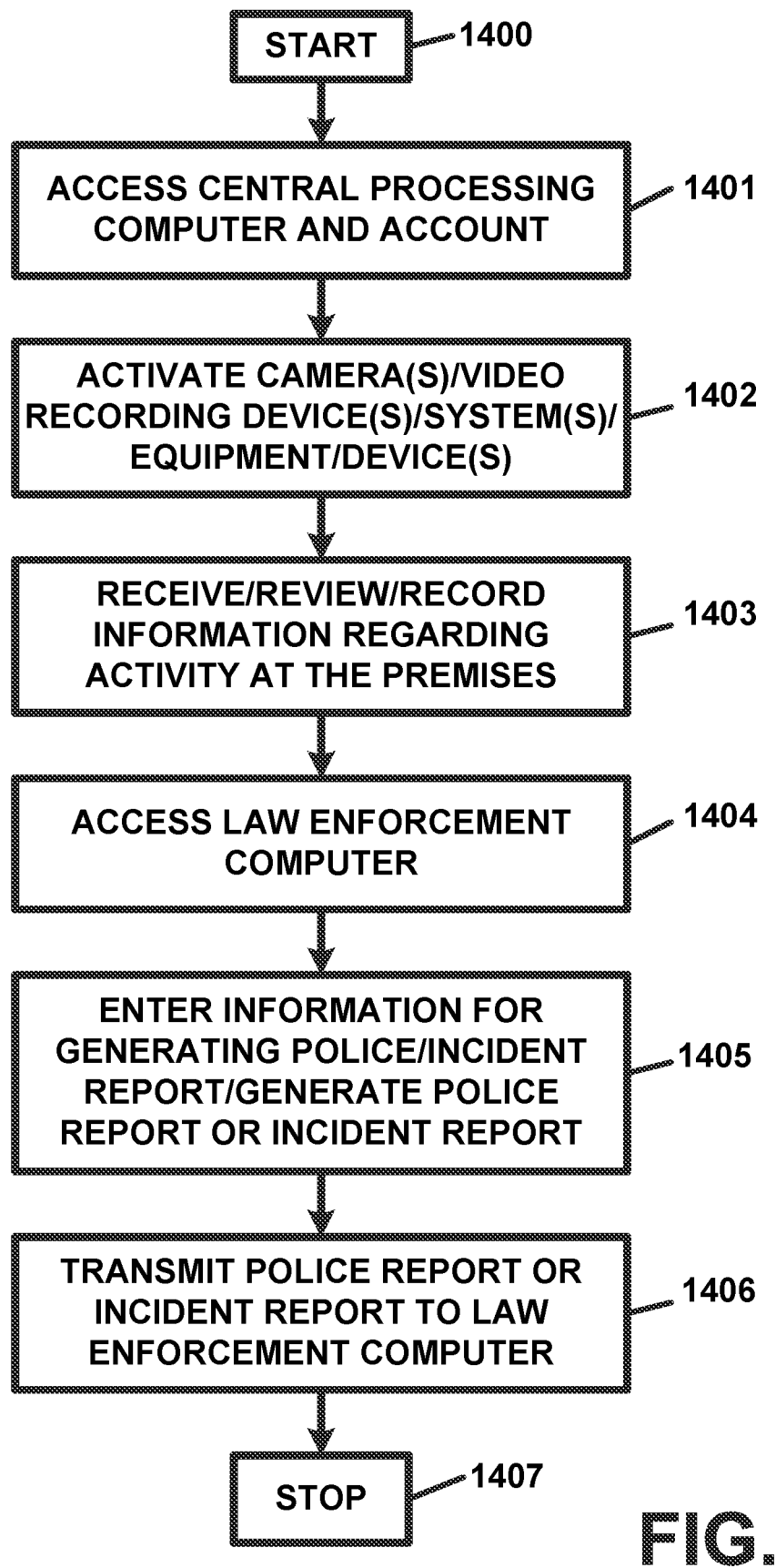
FIG. 14 illustrates yet another preferred embodiment method for utilizing the apparatus of the present invention, in flow diagram form.

FIG. 14 illustrates another preferred embodiment method for utilizing the apparatus 100 and method of the present invention, in flow diagram form. With reference to FIG. 14, the operation of the apparatus 100 commences at step 1400. At step 1401, the user, individual, person, authorized user, or authorized lead user, can access the central processing computer 10, and access his or her personal control and monitoring account, and/or the premises account for the premises, and/or the premises which he or she is seeking to monitor by using his or her communication device 60. At step 1401, the user, individual, person, authorized user, or authorized lead user, can access the central processing computer 10, and access his or her personal control and monitoring account, and/or the premises account for the premises, and/or the premises which he or she is seeking to monitor, at any time and/or upon receiving any of the herein-described alert messages or notification message and/or any of the herein-described user alert messages or user notification messages.

At step 1402, the user, individual, person, authorized user, or authorized lead user, can utilize his or her communication device 60 in order to activate any camera(s) or video recording device(s) and/or any microphone(s) or audio recording device(s) either inside, outside, or in the vicinity of the premises and view and/or listen to any activity at the premises. At step 1402, the user, individual, person, authorized user, or authorized lead user, can also activate an intercom system or public address system in order to speak to any individual(s) or person(s) in, on, or at the premises. At step 1403, the user, individual, person, authorized user, or authorized lead user, can activate ad/or operate the respective camera(s) or video recording device(s) and/or the microphone(s) or audio recording device(s) and record, and/or receive and store, at the communication device 60, any respective picture(s), photograph(s), video information, video clips, audio information, or audio clips, of the activity in, at, or in the vicinity of the premises.

For example, at step 1403, if, after accessing the video information and/or audio information, the user, individual, person, authorized user, or authorized lead user, determines that a crime is occurring at the premises, then the user, individual, person, authorized user, or authorized lead user, can record a picture(s), a photograph(s), video information, and/or audio information, from one or more, or any number of cameras or video recording devices and/or any microphones or audio recording devices. In a preferred embodiment, any picture(s), photograph(s), video information, video clips, audio information, or audio clips, obtained from the premises can be date-stamped and/or time-stamped.

At step 1404, the user, individual, person, authorized user, or authorized lead user, can access the law enforcement computer 70 of his or her local law enforcement agency, department, or bureau, or of any other law enforcement agency, department, or bureau, either directly with the communication device 60, or via the central processing computer 10. At step 1405, the user, individual, person, authorized user, or authorized lead user, can enter information needed to generate and file a police report or incident report into the communication device 60. At step 1405, the user, individual, person, authorized user, or authorized lead user, can enter any pertinent or needed information, into the communication device 60 information, for generating and for filing a police report or incident report. At step 1405, the user, individual, person, authorized user, or authorized lead user, can also attach any of the respective picture(s), photograph(s), video information, video clips, audio information, or audio clips, of the activity in, at, or in the vicinity of the premises, to the police report or incident report. At step 1405, the communication device can generate the police report or the incident report.

At step 1406, the user, individual, person, authorized user, or authorized lead user, can transmit, from the communication device 60, the police report or the incident report, along with the picture(s), photograph(s), video information, video clips, audio information, or audio clips, of the activity in, at, or in the vicinity of the premises, to the law enforcement computer 70 either directly or via the central processing computer 10. In this manner, the user, individual, person, authorized user, or authorized lead user, can use the apparatus 100 of the present invention to report any criminal activity or any other activity, event, or happening, to a law enforcement agency, department, or bureau, along with a picture(s), photograph, video information, and/or audio information obtained from the premises which can be utilized for evidentiary purposes and/or for any other purpose. Thereafter, the operation of the apparatus 100 will cease at step 1407.

In another preferred embodiment, the user, individual, person, authorized user, or authorized lead user, can utilize the embodiment of FIG. 14 while away from the premises and/or while in, on, at, or in the vicinity of the premises.

The embodiment of FIG. 14 can also be utilized in a same, a similar, and/or an analogous, manner, in connection with any of the other herein-described premises, with any of the herein-described vehicles, and/or with any of the herein-described articles, in order to report any criminal activity or any other activity, event, or happening, to a law enforcement agency, department, or bureau, along with a picture(s), photograph, video information, and/or audio information obtained from the respective premises, the respective vehicle(s), or the respective article(s), and which can be utilized for evidentiary purposes and/or for any other purpose.

In another preferred embodiment, the apparatus 100 of the present invention can be utilized by an user, operator, passenger, or any authorized user or authorized lead user, of a vehicle, while in, or, or at, the vehicle, in order to report a traffic violation or illegal activity or conduct ("a reportable traffic or other situation") by another driver or motorist, or to report a driver or motorist who is about to or has passed a red light, who is about to make or has made an illegal turn, who is driving in excess of the speed limit, who is driving unsafely, who is driving erratically, who is driving below the speed limit in an unsafe manner, who is tailgating another vehicle, who is driving while texting, who is driving while using a cellular telephone or handheld telephone, who is driving aggressively, who is violating vehicle and traffic laws, who is exhibiting road rage, and/or who engaging in conduct that constitutes road rage or aggressive driving, or who is driving while intoxicated, or who driving while under the influence of alcohol or drugs, or who is otherwise driving while impaired, and/or who has caused and/or who has been involved in an accident.

In another preferred embodiment, the apparatus 100 of the present invention can also be utilized by an user, operator, passenger, or any authorized user or authorized lead user, of a vehicle, while in, or, or at, the vehicle, in order to report the sighting of a vehicle which is the subject of a public alert message regarding an Amber Alert, a missing child, a kidnapped child, or an elderly or other ill individual, or a vehicle identified as being stolen or identified as being operated by or used by a fugitive from justice.

Figure 15:
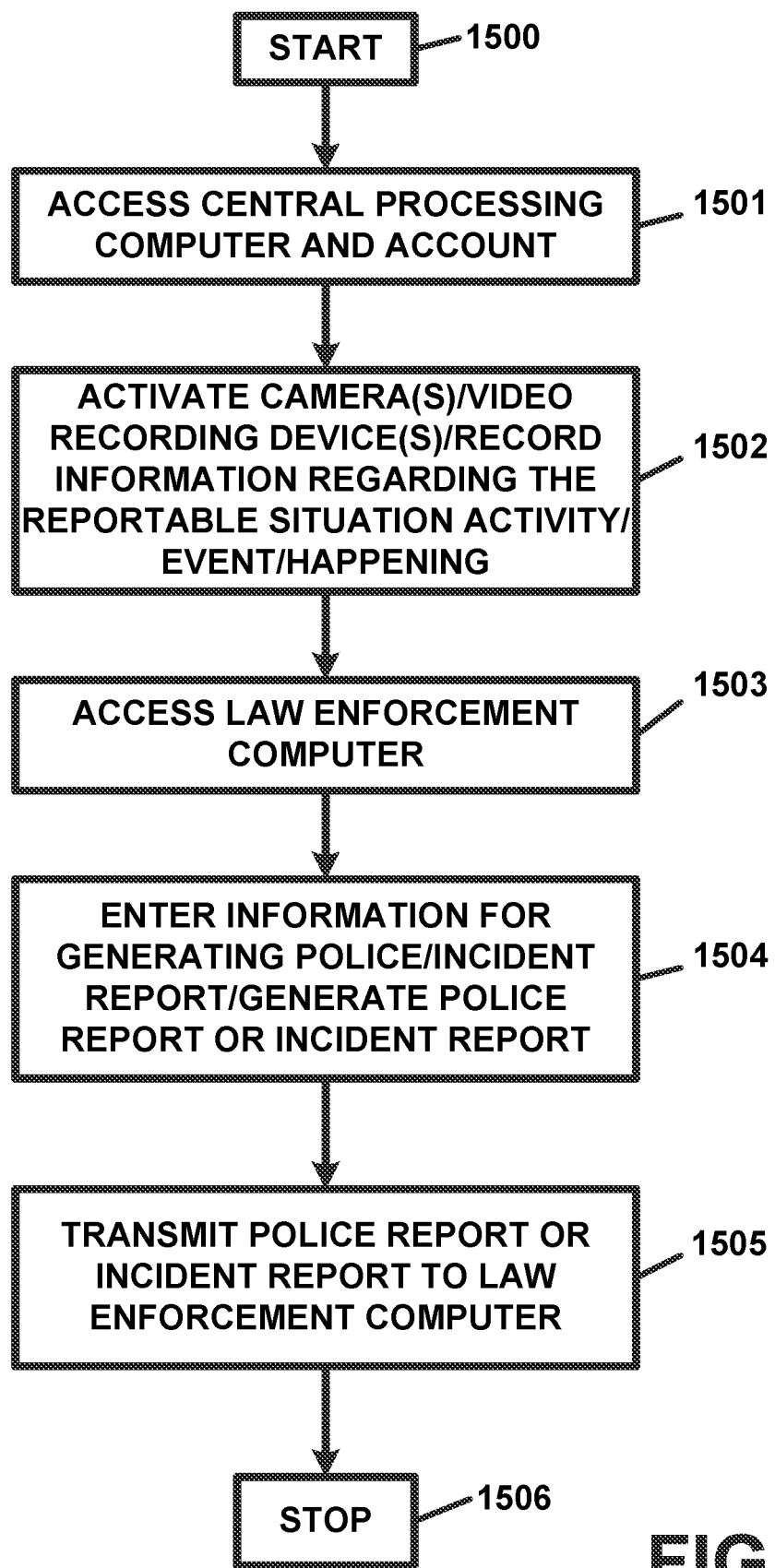
FIG. 15 illustrates another preferred embodiment method for utilizing the apparatus of the present invention, in flow diagram form.

FIG. 15 illustrates another preferred embodiment method for utilizing the apparatus 100 and method of the present invention, in flow diagram form. With reference to FIG. 15, the operation of the apparatus 100 commences at step 1500.

At step 1501, the user, individual, person, authorized user, or authorized lead user, while in, or, or at, the vehicle, can access the central processing computer 10, and access his or her personal control and monitoring account, and/or the vehicle account for the vehicle, by using his or her communication device 60 and/or any communication device 60 in or associated with the vehicle. In a preferred embodiment, the vehicle can also be equipped with a communication device 60, and may have an input device(s) mounted on the dashboard and/or integrated with the steering wheel or navigation system or radio, for allowing any user, individual, person, authorized user, or authorized lead user, while in the vehicle, to access to the central processing computer 10 and/or the apparatus 100 of the present invention.

At step 1501, the user, individual, person, authorized user, or authorized lead user, can access the central processing computer 10, and access his or her personal control and monitoring account, and/or the vehicle account for the vehicle at any time and/or when he or she witnesses or is alerted to a reportable traffic or other situation which can be, or which can include, but which is not limited to, the occurrence of a traffic violation or illegal activity or conduct by another driver or motorist, and/or a driver or motorist who has passed or is passing a red light, who has made or is about to make an illegal turn, who is driving in excess of the speed limit, who is driving unsafely, who is driving erratically, who is driving below the speed limit in an unsafe manner, who is tailgating another vehicle, who is driving while texting, who is driving while using a cellular telephone or handheld telephone, who is driving aggressively, who is violating vehicle and traffic laws, who is exhibiting road rage, and/or who is engaging in conduct that constitutes road rage or aggressive driving, who is driving while intoxicated, or who is driving while under the influence of alcohol or drugs, or who is otherwise driving while impaired, and/or who has caused and/or who has been involved in an accident, or who might be a in vehicle which is the subject of a public alert message regarding an Amber Alert, a missing child, a kidnapped child, or an elderly or other ill individual, or who might be in a vehicle which has been identified as being stolen or identified as being operated by or used by a fugitive from justice.

At step 1502, the user, individual, person, authorized user, or authorized lead user, can utilize his or her communication device 60, or the communication device 60 in the vehicle, in order to activate any camera(s) or video recording device(s)

and/or any microphone(s) or audio recording device(s) either on the vehicle interior and/or exterior. In a preferred embodiment, any number of cameras, video recording devices, microphones, or audio recording devices, can be strategically located on and around the vehicle exterior, and/or on the front and rear bumpers, license plate brackets, rear deck lid, hood, sides, and/or any where else about and around vehicle exterior. In a preferred embodiment, any number of cameras, video recording devices, microphones, or audio recording devices, can also be strategically located in and around the vehicle interior.

At step 1502, the user, individual, person, authorized user, or authorized lead user, can activate the respective camera(s) or video recording device(s) and/or the microphone(s) or audio recording device(s) and record, and/or receive and store, at the communication device 60, any respective picture(s), photograph(s), video information, video clips, audio information, or audio clips, of or regarding the reportable traffic or other situation. For example, at step 1502, if, the user, individual, person, authorized user, or authorized lead user, witnesses and is able to record another driver or motorist passing a red light or tailgating another vehicle, or committing any other reportable traffic or other situation, the user, individual, person, authorized user, or authorized lead user, can record a picture, a photograph, a video or video clip of the other driver or motorist in the act, and/or can record any audio or audio clip at his or her vehicle.

The user, individual, person, authorized user, or authorized lead user, can record a picture(s), a photograph(s), video information, and/or audio information, from one or more, or any number of cameras or video recording devices and/or any microphones or audio recording devices. In a preferred embodiment, any picture(s), photograph(s), video information, video clips, audio information, or audio clips, obtained at the vehicle can be date-stamped and/or time-stamped.

At step 1503, the user, individual, person, authorized user, or authorized lead user, can access the law enforcement computer 70 of the local law enforcement agency, department, or bureau, which can be automatically identified, in a preferred embodiment, by using global positioning data and/or information determined by the global positioning device 40J of the vehicle computer 40 of the vehicle, or any other law enforcement agency, department, or bureau, either directly with the communication device 60, or via the central processing computer 10. At step 1504, the user, individual, person, authorized user, or authorized lead user, can enter information needed to generate and file a police report or incident report into the communication device 60.

At step 1504, the user, individual, person, authorized user, or authorized lead user, can enter any pertinent or needed information for generating and filing a police report or incident report, regarding the reportable traffic or other situation or the activity, event, or happening, into the communication device 60. At step 1504, the user, individual, person, authorized user, or authorized lead user, can also attach any of the respective picture(s), photograph(s), video information, video clips, audio information, or audio clips, obtained at the vehicle, to the police report or incident report. At step 1504, the communication device 60 can generate the police report or the incident report.

At step 1505, the user, individual, person, authorized user, or authorized lead user, can transmit, from the communication device 60, the police report or the incident report, along with the picture(s), photograph(s), video information, video clips, audio information, or audio clips, obtained at the vehicle, to the law enforcement computer 70 either directly or via the central processing computer 10. In this manner, the user, individual, person, authorized user, or authorized lead user, can use the apparatus 100 of the present invention to report the reportable traffic or other situation to a law enforcement agency, department, or bureau, along with a picture(s), photograph, video information, and/or audio information obtained at the vehicle which can be utilized for evidentiary purposes and/or for any other purpose. Thereafter, the operation of the apparatus 100 will cease at step 1506.

The embodiment of FIG. 15 can also be utilized in a same, a similar, and/or an analogous, manner, in connection with any of the herein-described premises, with any other of the herein-described vehicles, and/or with any of the herein-described articles, in order to report reportable traffic or other situations to a law enforcement agency, department, or bureau, along with a picture(s), photograph, video information, and/or audio information obtained at the vehicle and which can be utilized for evidentiary purposes and/or for any other purpose.

In another preferred embodiment, in situations where the reporting of any of the herein-described, or other, reportable traffic or other situations, can result in the collection of a fine or monetary penalty from the offending driver or motorist, the user, individual, person, authorized user, or authorized lead user, can, as compensation for reporting same, be paid a fee which can be any pre-determined percentage of the fine or monetary penalty collected. In this embodiment, the central processing computer 10 can administer a financial account(s) for the respective user, individual, person, authorized user, or authorized lead user, and for any number of users, individuals, persons, authorized users, or authorized lead users who use the apparatus 100 of the present invention. The law enforcement computer 70 can transmit, to the central processing computer 10, the payment or a payment message containing or including the payment and/or data and/or information for effecting or for making the payment to the respective user, individual, person, authorized user, or authorized lead user. The central processing computer 10 can receive the payment or the payment message, and/or any payment or payments, for or on behalf of the respective user, individual, person, authorized user, or authorized lead user, and can also record and/or store any data and/or information regarding same in the financial account(s) of the respective user, individual, person, authorized user, or authorized lead user.

The central processing computer 10 can also generate an alert message informing the respective user, individual, person, authorized user, or authorized lead user, of the payment received or the payment message and can transmit same to the communication device 60 of or associated with the respective user, individual, person, authorized user, or authorized lead user.

In another preferred embodiment, the law enforcement computer 70 can transmit the payment or the payment message directly to the communication device 60 of or associated with the respective user, individual, person, authorized user, or authorized lead user.

In the above-described manner, the apparatus 100 of the present invention can provide an incentive for any of the herein-described user, individual, person, authorized user, or authorized lead user, to report any of the herein-described or any other reportable traffic or other situations. In a preferred embodiment, the identity of any reporting user, individual, person, authorized user, or authorized lead user, can be withheld/or the reporting user, individual, person, authorized user, or authorized lead user, can remain anonymous.

In another preferred embodiment, the apparatus 100 of the present invention and/or the central processing computer 10 can generate an alert message or a notification message, and can transmit same to a communication device 60 of or associated with an authorized user or an authorized lead user of or associated with any premises described herein, any vehicle described herein, or any article described herein. In a preferred embodiment, the central processing computer 10 can generate an alert message or a notification message any time a user seeks to perform a control, monitoring, or security, operation, action, or function, on or regarding a premises or any of the premises system(s), equipment, or device(s) 35 of the premises, on or regarding a vehicle or any of the vehicle system(s), equipment, or device(s) 45 of the vehicle, or on or regarding an article or any of the article system(s), equipment, or device(s) 55 of the article.

In a preferred embodiment, the user can be required to submit a photograph, a picture, or a video clip, of himself or herself, obtained from, provided by, submitted by, or taken by the user, at the time the user attempts to perform any control, monitoring, or security, operation, action, or function, on or regarding a premises or any of the premises system(s), equipment, or device(s) 35 of the premises, on or regarding a vehicle or any of the vehicle system(s), equipment, or device(s) 45 of the vehicle, or on or regarding an article or any of the article system(s), equipment, or device(s) 55 of the article. In a preferred embodiment, the user can take or record the picture, photograph, or video clip, with or using the camera or video recording device of the communication device 60.

In another preferred embodiment, the user can also record a voice sample of himself or herself using a microphone or an audio recording device of the communication device 60 at the time the user attempts to perform any control, monitoring, or security, operation, action, or function. In another preferred embodiment, the user can also provide a retinal scan, a fingerprint scan, a handprint scan, a hand geometry scan, a facial feature scan, or any other biometric data and/or information, obtained from, provided by, or submitted by, the user at the time the user attempts to perform any control, monitoring, or security, operation, action, or function.

In a preferred embodiment, once the central processing computer 10 receives any signal(s), control signal(s), or monitoring signal(s), or any other signal(s), which is associated with the control, monitoring, or security, operation, action, or function, attempted to be performed, or performed, by the user, and once the central processing computer receives the picture, photograph, or video clip, of the user, the central processing computer 10 can generate an alert message or a notification message containing information regarding the control, monitoring, or security, operation, action, or function, attempted to be performed, or performed, by the user, and the picture, photograph, or video clip, of the user. Thereafter, the central processing computer 10 can then transmit the alert message or the notification message to a communication device 60 of or associated with any authorized user(s) and any authorized lead user(s). Any authorized user or authorized lead user can then review the information contained in the alert message or the notification message and can transmit an alert response message or a notification response message to the central processing computer 10. The alert response message or a notification response message can contain or include information regarding an instruction for allowing or authorizing the control, monitoring, or security, operation, action, or function, for disallowing or cancelling the control, monitoring, or security, operation, action, or function, or for reporting the incident to a law enforcement computer 70 associated with a law enforcement agency, department, or bureau.

The user can then transmit the alert response message or the notification response message to the central processing computer 10 which can then process the information contained in the alert response message or the notification response message. If the central processing computer 10 determines that the alert response message or the notification response message contains or includes an instruction to allow the control, monitoring, or security, operation, action, or function, then the central processing computer 10 will allow the control, monitoring, or security, operation, action, or function. If the central processing computer 10 determines that the alert response message or the notification response message contains an instruction to disallow the control, monitoring, or security, operation, action, or function, then the central processing computer 10 will disallow the control, monitoring, or security, operation, action, or function. If the central processing computer 10 determines that the alert response message or the notification response message contains an instruction to report the incident to a law enforcement agency, department, or bureau, then the central processing computer 10 will report the incident to a law enforcement agency, department, or bureau.

In this manner, the alert message or the notification message can contain or include any data and/or information regarding the control, monitoring, or security, operation, action, or function, attempted to be performed, or performed, by the user along with the photograph, picture, or video clip, of the user, obtained from, provided by, submitted by, or taken by, the user at the time the user attempts to perform, or performs, the control, monitoring, or security, operation, action, or function.

In another preferred embodiment, the alert message or the notification message can contain or include any data and/or information regarding the control, monitoring, or security, operation, action, or function, attempted to be performed, or performed, by the user, along with the user's voice sample. In another preferred embodiment, the alert message or the notification message can contain or include any data and/or information regarding the control, monitoring, or security, operation, action, or function, attempted to be performed, or performed, by the user, along with the user's retinal scan, a fingerprint scan, a handprint scan, a hand geometry scan, a facial feature scan, or any other biometric data and/or information, obtained from, provided by, or submitted by, the user.

Figure 16:
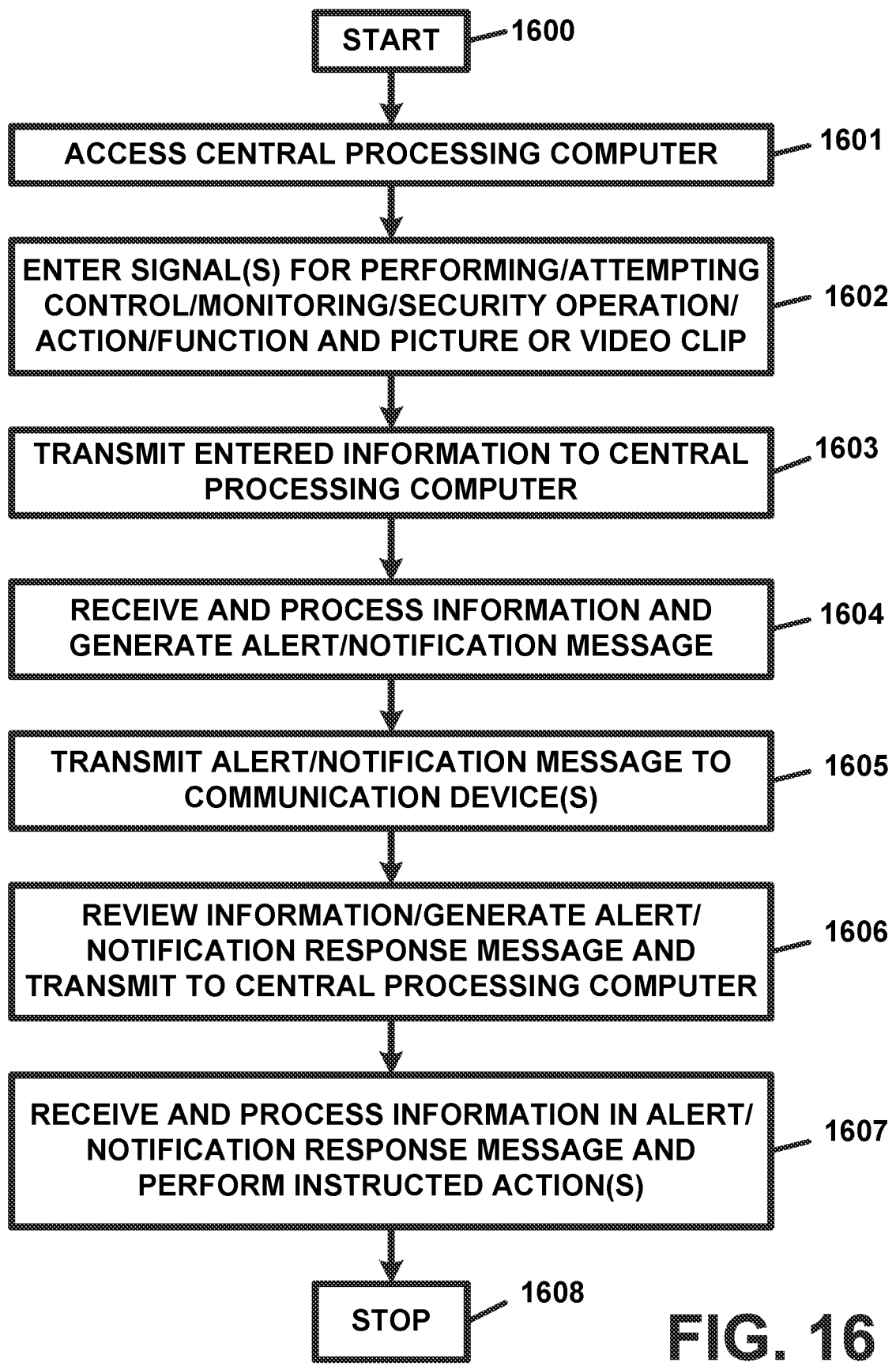
FIG. 16 illustrates another preferred embodiment method for utilizing the apparatus of the present invention, in flow diagram form.

FIG. 16 illustrates another preferred embodiment method for utilizing the apparatus 100 of the present invention, in flow diagram form. With reference to FIG. 16, the operation of the apparatus 100 commences at step 1600. At step 1601, the user can access the central processing computer 10 using a communication device 60. At step 1602, the user can access the respective account for the premises, vehicle, or article. At step 1602, the user can also enter a signal(s), a control signal(s), a monitoring signal(s), or any other appropriate signal(s) for performing, or for attempting to perform, a control, monitoring, or security, operation, action, or function, on or regarding a premises or any of the premises system(s), equipment, or device(s) 35 of the premises, on or regarding a vehicle or any of the vehicle system(s), equipment, or device(s) 45 of the vehicle, or on or regarding an article or any of the article system(s), equipment, or device(s) 55 of the article. At step 1602, the user can also enter or submit a photograph, a picture, or a video clip, of himself or herself, obtained from, provided by, submitted by, or taken by, the user. In a preferred embodiment, the user can, at step 1602, take or record the picture, photograph, or video clip, with or using the camera or video recording device of the communication device 60.

In another preferred embodiment, the user can, at step 1602, also record a voice sample of himself or herself using a microphone or an audio recording device of the communication device 60. In another preferred embodiment, the user can also, at step 1602, provide a retinal scan, a fingerprint scan, a handprint scan, a hand geometry scan, a facial feature scan, or any other biometric data and/or information.

At step 1603, the user can transmit, from the communication device 60, the signal(s), control signal(s), monitoring signal(s), or any other appropriate signal(s) for performing, or for attempting to perform, a control, monitoring, or security, operation, action, or function, along with the photograph, picture, or video clip, of himself or herself, to the central processing computer 10. In another preferred embodiment, the user, at step 1603, can also transmit the voice sample of himself or herself to the central processing computer 10 using the communication device 60. In another preferred embodiment, the user, at step 1603, can also transmit the retinal scan, fingerprint scan, handprint scan, hand geometry scan, facial feature scan, or any other biometric data and/or information, to the central processing computer 10 using the communication device 60.

At step 1604, the central processing computer 10 can receive and process any and/or all of the data and/or information transmitted to it from the communication device 60. At step 1604, the central processing computer 10 can generate the alert message or the notification message. At step 1604, the central processing computer 10 will generate an alert message or a notification message containing information regarding the control, monitoring, or security, operation, action, or function, attempted to be performed, or performed, by the user, and the picture, photograph, or video clip, of the user. In another preferred embodiment, the alert message or the notification message can contain or include the voice sample of the user, and/or the retinal scan, fingerprint scan, handprint scan, hand geometry scan, facial feature scan, or any other biometric data and/or information, of the user.

At step 1605, the central processing computer 10 can then transmit the alert message or the notification message to the communication device(s) 60 of or associated with any authorized user(s) and any authorized lead user(s). At step 1606, the authorized user or authorized lead user can then review the information contained in the alert message or the notification message and can generate an alert response message or a notification response message. The alert response message or a notification response message can contain or include information regarding an instruction for allowing or authorizing the control, monitoring, or security, operation, action, or function, for disallowing or cancelling the control, monitoring, or security, operation, action, or function, or for reporting the incident to a law enforcement computer 70 associated with a law enforcement agency, department, or bureau. At step 1606, the user can also transmit the alert response message or the notification response message to the central processing computer 10.

At step 1607, the central processing computer 10 can receive the alert response message or the notification response message and can process the data and/or information contained therein. At step 1607, if the central processing computer 10 determines that the alert response message or the notification response message contains or includes an instruction to allow the control, monitoring, or security, operation, action, or function, then the central processing computer 10 will allow the control, monitoring, or security, operation, action, or function. At step 1607, if the central processing computer 10 determines that the alert response message or the notification response message contains an instruction to disallow the control, monitoring, or security, operation, action, or function, then the central processing computer 10 will disallow the control, monitoring, or security, operation, action, or function. At step 1607, if the central processing computer 10 determines that the alert response message or the notification response message contains an instruction to report the incident to a law enforcement agency, department, or bureau, then the central processing computer 10 will report the incident to a law enforcement agency, department, or bureau by transmitting a message to the law enforcement computer 70 of or associated with the law enforcement agency, department, or bureau. Thereafter, the operation of the apparatus 100 will cease at step 1608.

In a preferred embodiment, as well as in any and/or all of the embodiments described herein, any user, individual, or person, whether authorized to use the apparatus 100 or not, can be required to provide a photograph or picture, or a video or video clip of himself or herself, which can be taken with or using any camera or video recording device of or associated with the communication device 60 which the user, individual, or person, is using, and/or which can also be any camera of or associated with any premises security device of a premises, any vehicle security device of a vehicle, or any article security device of an article. In another preferred embodiment, any user, individual, or person, whether authorized to use the apparatus 100 or not, can, in addition to, or instead of, taking a photograph of himself or herself, can also be required to submit to providing a retinal scan, a fingerprint scan, a handprint scan, a hand geometry scan, a facial feature scan, or a voice sample, or any other biometric data and/or information, via any suitable input device of or associated with the communication device 60 or any premises security device of a premises, any vehicle security device of a vehicle, or any article security device of an article.

In a preferred embodiment, if the user, individual, or person, fails to provide a photograph or picture, or a video or video clip of himself or herself, or fails to provide a requested retinal scan, fingerprint scan, handprint scan, hand geometry scan, facial feature scan, or voice sample, or any other biometric data and/or information, the apparatus 100 and/or the central processing computer 10 can prevent the user, individual, or person, from gaining access to respective premises account or premises computer 30, a vehicle account or vehicle computer 40, or an article account or an article computer 50, and/or the central processing computer 10 can prevent or disallow any control, monitoring, or security, operation, action, or function, which is attempted to be performed by the user, individual, or person, or prevent or disallow any control, monitoring, or security, operation, action, or function, which is performed by the user, individual, or person.

In another preferred embodiment, as well as any and/or all of the embodiments described herein, the central processing computer 10, and/or any of the respective premises computers 30, vehicle computers 40, and/or article computers 50, and/or the communication device 60, can maintain and/or store an activity history or activity histories for each and every respective premises account, vehicle account, and article account, as well as can maintain and/or store an activity history for each and every respective personal control and monitoring account.

The activity history or activity histories can contain or include data and/or information regarding each instance when any user, individual, or person, or any authorized user or authorized lead user, has attempted to gain access to the respective account, has used the respective account, has used or has accessed a respective premises, vehicle, or article, associated with the respective account, has entered onto or into or has operated a respective premises, vehicle, or article, has attempted to perform, or has performed, a control, monitoring, or security, operation, action, or function, on, for, or regarding a respective premises or premises system(s), equipment, device(s) 35 of the premises, a respective vehicle or a vehicle system(s), equipment, device(s) 45 of the vehicle, or an article or an article system(s), equipment, device(s) 55 of the article, and/or has attempted to perform, or has performed, a repair, a reprogramming, or a re-setting, operation, action, or function, on, for, or regarding a respective premises or premises system(s), equipment, device(s) 35 of the premises, a respective vehicle or a vehicle system(s), equipment, device(s) 45 of the vehicle, or an article or an article system(s), equipment, device(s) 55 of the article, along with the date and time of each occurrence, event, or happening and picture, photograph, or video or video clip of the respective user, individual, person, authorized user, or authorized lead user, who performed any such access, attempted access, use, attempted use, or who has performed, or who has attempted to perform, any such control, monitoring, or security, operation, action, or function, or who has performed, or who has attempted to perform, any such repair, reprogramming, or re-setting, operation, action, or function.

The activity history or activity histories can also contain or include data and/or information regarding any alert messages or notification messages or any user alert messages or user notification messages which were generated as described herein along with the data and time of such and any Premises Occupied Message, a Vehicle Occupied or In Use Message, or an Article In Use Message which was contained in or attached to the respective alert messages, notification messages, user alert messages, or user notification messages. Any other communications described herein as being transmitted to and/or transmitted from any communication device 60 for or regarding a respective premises account, vehicle account, or article account, or any respective personal control and monitoring account can also be stored in the activity history or activity histories for the respective account along with the date and time of same.

In a preferred embodiment, the central processing computer 10, and/or any of the respective premises computers 30, vehicle computers 40, or article computers 50, can, upon receiving a request, from an authorized user or an authorized lead user, or any other user, individual, or person authorized to obtain same (hereinafter "the requesting user"), for a respective activity report or a respective periodic activity report for a respective premises account, vehicle account, or article account, or for a respective personal control and monitoring account, and for a selected or desire time period and can, can generate the respective activity report and transmit same to the communication device 60 of or associated with requesting user. A copy of the activity report can also be stored in the database 10H of the central processing computer 10 and in the respective premises account, vehicle account, article account, or personal control and monitoring account.

In another preferred embodiment, the central processing computer 10, and/or the respective premises computer 30, vehicle computer 40, or article computer 50 can be programmed, by the requesting user or by another, to automatically generate and transmit any of the herein-described activity reports regarding any of the respective premises accounts, vehicle accounts, article accounts, or personal control and monitoring accounts, hourly, daily, weekly, monthly, quarterly, yearly, or at any other time interval, or upon the elapsing of any pre-selected time period. Any activity report can also include or contain, in addition to any of the data and/or information described herein, a picture, photograph, video recording, or video clip, or a voice sample of audio sample, of any user or individual involved in each activity reported.

In another preferred embodiment, any activity report can be generated and transmitted on demand or upon request by a user, individual, or person authorized to do so, or by any authorized user an authorized lead user. In another preferred embodiment, any activity report can be generated and transmitted upon the occurrence of any of the herein-described detected malfunctions, failures, or state of disrepairs, of or regarding any of the herein-described premises or any premises system(s), equipment, or device(s) 35, vehicle or any vehicle system(s), equipment, or device(s) 45, or article or any vehicle system(s), equipment, or device(s) 55.

In a preferred embodiment, as well as in any and/or all of the embodiments described herein, the apparatus 100 and/or the central processing computer 10, and/or any respective premises computer 30, vehicle computer 40, and/or article computer 50, can provide the user or individual seeking to perform a control, monitoring, or security, operation, action, of function, with a control panel or other graphical user interface (GUI) with and/or from which the user or individual can perform any of the herein-described control, monitoring, or security, operations, actions, or functions, and/or any repair, reprogramming or re-setting, operations, actions, or functions. In a preferred embodiment, the control panel or graphical user interface can be accessed via the central processing computer 10, and/or a respective premises computer 30, vehicle computer 40, or article computer 50. In another preferred embodiment, any communication device 60 can also be provided with a control panel or graphical user interface or an application or an "app" for same. In another preferred embodiment, any and/or all of the herein-described signals, messages, or reports, described herein as being transmitted from the central processing computer 10, and/or any respective premises computer 30, vehicle computer 40, and/or article computer 50, can include or contain a link(s) or hyperlink(s) to a control panel or graphical user interface for the respective premises, vehicle, or article.

In a preferred embodiment, any of the herein-described control panels or graphical user interfaces can also include and/or utilize any type or kind of selection devices or means, selection menus, screens, screen types, drop-down menus, and/or any other devices or techniques, pointing devices or techniques, and/or selection devices or techniques and/or use devices or techniques.

In another preferred embodiment, as well as any and/or all of the embodiments described herein, the central processing computer 10, and/or any of the respective premises computers 30, vehicle computers 40, and/or article computers 50, can process any information regarding any control, monitoring, or security, operation, action, or function, in conjunction with any limitation(s) or restriction(s) which can be, or which may have been, placed on a user's or an individual's ability to access and/or use a respective personal control and monitoring account, premises account, vehicle account, or article account, an allowed time(s) of allowed or authorized use, disallowed time(s) of use, any limitation(s) or restriction(s) regarding a user's or individual's ability to perform, and/or the extent to which the user or individual can perform, any control, monitoring, or security, operation, action, or function, for or regarding any respective premises or any premises system(s), equipment, or device(s) 35 of the premises, vehicle or any vehicle system(s), equipment, or device(s) 45 of the vehicle, or article or any article system(s), equipment, or device(s) 55 of the article.

Any limitation(s) or restriction(s) can also be, or can pertain to, any limitation or restriction on a user's or individual's ability or authority to perform any control, monitoring, or security, operation, action, of function, or any user's or individual's ability to access the apparatus 100, the central processing computer 10, or any premises computer 30, vehicle computer 40, or article computer 50, or any premises account, vehicle account, or article account, or the user's or individual's personal control and monitoring account.

Any other type or kind of limitation(s) or restriction(s) can be placed on any user's or individual's ability to use the apparatus 100 of the present invention in connection with any respective premises, vehicle, or article.

In a preferred embodiment, the central processing computer 10, and/or any respective premises computer 30, vehicle computer 40, or article computer 50, and/or any communication device 60, can process any operation, activity, or function, attempted to be performed, or performed, in connection with any limitation(s) or restriction(s) placed on any personal control and monitoring account, premises account, vehicle account, or article account. If a respective operation, action, or function, is not limited or restricted, then it can be performed by the respective central processing computer 10, and/or the respective premises computer 30, vehicle computer 40, or article computer 50, and/or the communication device 60. If a respective operation, action, or function, is limited or restricted, then it can either be disallowed by the respective central processing computer 10, and/or the respective premises computer 30, vehicle computer 40, or article computer 50, and/or the communication device 60 or it can be performed only to the extent dictated by the limitation or restriction.

In any and/or all of the embodiments described herein, the respective central processing computer 10, and/or the respective premises computer 30, vehicle computer 40, or article computer 50, and/or the communication device 60, can also record and store data and/or information regarding a user's or individual's habits in using the apparatus 100, the central processing computer 10, any premises computer 30, vehicle computer 40, or article computer 50, or any premises account, vehicle account, or article account, or the user's or individual's personal control and monitoring account.

The respective central processing computer 10, and/or the respective premises computer 30, vehicle computer 40, or article computer 50, and/or the communication device 60 can determine whether or not a use, or an attempted use, or any control, monitoring, or security, operation, action, or function, sought or attempted to be performed, is consistent with the user's or individual's use habits. If consistent with the user's or individual's use habits, then the use, or the attempted use, or the control, monitoring, or security, operation, action, or function, can be allowed and/or performed by the respective central processing computer 10, and/or the respective premises computer 30, vehicle computer 40, or article computer 50, and/or the communication device 60. If not consistent with, or inconsistent with, the user's or individual's use habits, then the use, or the attempted use, or the control, monitoring, or security, operation, action, or function, can be disallowed by the respective central processing computer 10, and/or the respective premises computer 30, vehicle computer 40, or article computer 50, and/or the communication device 60, or the respective central processing computer 10, and/or the respective premises computer 30, vehicle computer 40, or article computer 50, and/or the communication device 60, can seek to obtain additional information or a confirmation from the user or the individual.

In any and/or all of the embodiments described herein, an authorized user or individual can disable or de-activate, or an enable, re-enable, or activate, any of the herein-described personal control and monitoring accounts, premises accounts, vehicle accounts, or article accounts, at any time. In another preferred embodiment, the central processing computer 10, or a respective premises computer 30, vehicle computer 40, or article computer 50, and/or the communication device 60, can be programmed to disable or de-activate, or an enable, re-enable, or activate, any of the herein-described personal control and monitoring accounts, premises accounts, vehicle accounts, or article accounts, at any time and for any reason.

In another preferred embodiment, as well as any and/or all of the embodiments described herein, any of the alert messages, notification messages, user alert messages, or user notification messages, can contain a link(s) or a hyperlink(s) to the central processing computer, to a respective personal control and monitoring account, to a premises account or a respective premises computer 30. to a vehicle account or a respective vehicle computer 40, to an article account or a respective article computer 50, to a respective control panel of graphic user interface for the respective premises, vehicle, or article, or a link(s) or hyperlink(s) to an activity report or activity report for the respective personal control and monitoring account, and/or the respective premises account, the respective vehicle account, or the respective article account.

In any and or all of the embodiments described herein, any of the various signals, messages, reports, activity reports, or any other information, messages, communications, or transmissions, described herein as being generated or transmitted by any of the herein-described central processing computers 10, server computers 20, premises computers 30, vehicle computers 40, article computers 50, and/or communication devices 60, can be generated and/or transmitted as or in a e-mail message, an instant messaging message, an SMS message, an electronic transmission, an electronic communication, a telephone call message, a recorded telephone call message, an answering machine message, a facsimile transmission, a facsimile message, or any other message, communication, or transmission.

In any and/or all of the embodiments described herein, any of the personal control and monitoring accounts described herein can have a link(s) or hyperlink(s) to any of premises account or premises accounts, any vehicle account or vehicle accounts, and/or any article account or article accounts, included in the respective personal control and monitoring account. In any and/or all of the embodiments described herein, any of the personal control and monitoring accounts described herein can also have a link(s) or hyperlink(s) to any control panel or control panels associated with any premises associated with any premises account or premises accounts, any control panel or control panels associated with any vehicle or vehicles associated with any vehicle account or vehicle accounts, and/or any control panel or control panels associated with any article or articles associated with any article account or article accounts.

In any and/or all of the embodiments described herein, any of the premises accounts, vehicle accounts, or article accounts, described herein can have a link(s) or hyperlink(s) to any personal control and monitoring account(s) associated with same. In any and/or all of the embodiments described herein, any of the premises accounts, vehicle accounts, or article accounts, described herein can have a link(s) or hyperlink(s) to any control panel or control panels associated with any premises associated with the premises account or premises accounts, any control panel or control panels associated with any vehicle or vehicles associated with the vehicle account or vehicle accounts, and/or any control panel or control panels associated with the article or articles associated with any article account or article accounts.

In any and/or all of the embodiments described herein, any of the communication devices 60 described herein can also be equipped with appropriate hardware and/or software, can be utilized in connection with a suitable interface device or interface devices, or can be programmed with software or software applications or "apps" in order to operate or to function as a premises computer 30 or a vehicle computer 40, or, where appropriate, an article computer 50.

In any and/or all of the embodiments described herein, any of the communication devices 60 described herein can also be equipped with appropriate hardware and/or software, can be utilized in connection with a suitable interface device or interface devices, or can be programmed with software or software applications or "apps" in order to operate or to function as a central processing computer 10.

In any and/or all the embodiments described herein, the apparatus 100 and/or any of the central processing computers 10, server computers 20, premises computers 30, vehicle computers 40, article computers 50, and/or communication devices 60 can be programmed for automatic and/or for automatic or programmed activation, operation, and/or de-activation.

In any and/or all the embodiments described herein, the apparatus 100 and/or any of the central processing computers 10, server computers 20, premises computers 30, vehicle computers 40, article computers 50, and/or communication devices 60 can be programmed to automatically control, monitor, and/or provide security for a respective premises, a respective vehicle, or a respective article, and/or can be programmed to effectuate pre-programmed, automatic, or scheduled, control, monitoring, or security operations for any of the herein-described premises system(s), equipment, device(s) 35, vehicle system(s), equipment, device(s) 45, and/or article system(s), equipment, device(s) 55. In this manner, the apparatus 100 of the present invention can be utilized in a automatic operation mode.

In another preferred embodiment, the apparatus 100 and/or the central processing computer 10 can be programmed and/or can be equipped to "ping" a communication device 60 being used by a user or individual in order to ascertain the user's or the individual's location or position as a way in which to confirm or verify that the user or individual is in fact an authorized user or an authorized lead user on a respective premises, vehicle, or article, account. For example, if a premises is located in Yonkers, N.Y., and an authorized user or authorized lead individual lives at the premises and typically never travels to a certain region in the World outside of the United States, then, if a "pinging" operation should identify the communication device 60 being present in that region of the World at a time when the control, monitoring, or security, operation, action, or function, is being attempted on the premises, then, absent a prior notification that the authorized user or authorized lead was travelling that region of the World, the central processing computer 10 can determine that the control, monitoring, or security, operation, action, or function, being attempted is not authorized and can cancel or disregard same. In a preferred embodiment, the apparatus 100 and/or the central processing computer 10 can utilize any type or kind of "pinging" technique(s) know by those skilled in the "pinging" technology arts at the time of the filing of this patent application.

In another preferred embodiment, as well as any and/or all of the embodiments described herein, the central processing computer 10 can also record and store data and/or information regarding the IP address(es) of or for each communication device 60 which is used in accessing the central processing computer 10 and/or the apparatus 100.

The apparatus 100 and method of the present invention can be utilized to perform any control, monitoring, or security, operation, action, or function, for or regarding any of the herein-described premises, vehicles, or articles, and/or for any of the herein-described premises system(s), equipment, device(s) 35, vehicle system(s), equipment, device(s) 45, and/or article system(s), equipment, device(s) 55.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments, with the scope of the present invention being limited only by the claims which follow.

What is claimed is:

1. An apparatus, comprising:
    a server computer, wherein the server computer processes information for or regarding a personal control and monitoring account for performing a control function or a monitoring function regarding a premises or a system, equipment, or device, of a premises, and further wherein the server computer is located at a location remote from the premises;
    a computer or a processor located at the premises, wherein the computer or the processor is specially programmed to control or to monitor the premises or the system, equipment, or device, of the premises; and
    a user device, wherein the user device is specially programmed to control or to monitor the premises or the system, equipment, or device, of the premises via the server computer, wherein the user device is located at a location remote from the server computer and remote from the premises,
    wherein the server computer receives a first message transmitted from the user device, wherein the first message contains information regarding the premises or the system, equipment, or device, of the premises, wherein the server computer generates a second message containing information regarding an individual identified as being present inside, or occupying, the premises at a time when the server computer receives or processes the first message, wherein the individual is an authorized user under the personal control and monitoring account for the premises,
    wherein the second message contains information regarding whether or not the premises is occupied at the time when the server computer receives or processes the first message and, if the premises is occupied at the time when the server computer receives or processes the first message, the second message contains information identifying the individual identified as being inside, or occupying, the premises at the time when the server computer receives or processes the first message, and further wherein the server computer transmits the second message to the user device, and further wherein the server computer determines that the individual, identified as being inside, or occupying, the premises at the time when the server computer receives or processes the first message, is an authorized lead user under the personal control and monitoring account for the premises, and further wherein the server computer disallows a control operation or a monitoring operation.

2. An apparatus, comprising:
a server computer, wherein the server computer processes information for or regarding a personal control and monitoring account regarding a premises or a system, equipment, or device, of a premises, and further wherein the server computer is located at a location remote from the premises;
a computer or a processor located at the premises, wherein the computer or the processor is specially programmed to control or to monitor the premises or the system, equipment, or device, of the premises; and
a user device, wherein the user device is located at a location remote from the server computer and remote from the premises,
wherein the server computer receives a first message transmitted from the user device, wherein the first message contains information regarding the premises or the system, equipment, or device, of the premises, wherein the server computer generates a second message containing information regarding an individual identified as being present inside, or occupying, the premises,
wherein the second message contains information that the premises is occupied and contains information identifying the individual identified as being inside, or occupying, the premises, and further wherein the server computer transmits the second message to the user device, wherein the server computer receives a third message transmitted from the user device in response to the second message,
wherein the third message contains information for performing a control operation or a monitoring operation regarding the premises or the system, equipment, or device, of the premises, and further wherein the server computer transmits a control signal or a monitoring signal to the computer or to the processor in response to the third message, and further wherein the computer or the processor performs or effectuates the control operation or the monitoring operation regarding the premises or the system, equipment, or device, of the premises in response to the control signal or the monitoring signal.

3. An apparatus, comprising:
a server computer, wherein the server computer processes information for or regarding a personal control and monitoring account for performing a control function or a monitoring function regarding a premises or a system, equipment, or device, of a premises, and further wherein the server computer is located at a location remote from the premises;
wherein the server computer receives a first message transmitted from a user device, wherein the user device is located at a location remote from the server computer and remote from the premises, wherein the server computer generates a second message containing information regarding an individual identified as being present inside, or occupying, the premises, wherein the second message contains information regarding whether or not the premises is occupied and, if the premises is occupied, the second message contains information identifying the individual identified as being inside, or occupying, the premises, and further wherein the server computer transmits the second message to the user device,
wherein the server computer receives a third message transmitted from the user device, wherein the third message contains information for performing a control operation or a monitoring operation regarding the premises or the system, equipment, or device, of the premises, and further wherein the server computer transmits a control signal or a monitoring signal to a computer or to a processor in response to the third message, wherein the computer or the processor is located at the premises, wherein the computer or the processor performs or effectuates a control operation or a monitoring operation regarding the premises or the system, equipment, or device, of the premises, in response to the control signal or the monitoring signal.

4. The apparatus of claim 3, further comprising:
a camera, a video recording device, a microphone, or an audio recording device, wherein the camera, the video recording device, the microphone, or the audio recording device, is located at the premises.

5. The apparatus of claim 4, wherein the camera, the video recording device, the microphone, or the audio recording device, records a photograph, video information, or audio information, and automatically transmits the photograph, the video information, or the audio information, to the server computer.

6. The apparatus of claim 4, wherein the camera, the video recording device, the microphone, or the audio recording device, records a photograph, video information, or audio information, at the premises, and further wherein the apparatus transmits the photograph, the video information, or the audio information, along with information for filing a police report, to a law enforcement computer, or wherein the apparatus automatically transmits the photograph, the video information, or the audio information, to a law enforcement computer.

7. The apparatus of claim 4, wherein the camera, the video recording device, the microphone, or the audio recording device, records a photograph, video information, or audio information, at the premises, and further wherein the apparatus automatically transmits the photograph, the video information, or the audio information, to the user device or to a second user device.

8. The apparatus of claim 3, further comprising:
a camera, a video recording device, a microphone, or an audio recording device, wherein the camera, the video recording device, the microphone, or the audio recording device, is located at the premises, wherein the camera, the video recording device, the microphone, or the audio recording device, records a photograph, video information, or audio information, at the premises, and further wherein the apparatus detects an occurrence of an event, and further wherein the apparatus automatically transmits the photograph, the video information, or the audio information, to the user device or to a second user device in response to the occurrence of the event.

9. The apparatus of claim 3, wherein the second message contains a photograph, a video clip, an audio recording, or a voice recording, of the individual identified as occupying or using the premises at a time when the server computer receives the first message.

10. The apparatus of claim 3, wherein the server computer is specially programmed to process and to store information for performing a control function or a monitoring function regarding a second premises or a system, equipment, or device, of a second premises.

11. The apparatus of claim 10, wherein the system, equipment, or device, of the second premises, further comprises:
   a camera, a video recording device, a microphone, or an audio recording device, wherein the camera, the video recording device, the microphone, or the audio recording device, is located at the second premises, wherein the camera, the video recording device, the microphone, or the audio recording device, records a photograph, video information, or audio information, regarding an occurrence of an event,
   wherein the apparatus automatically transmits the photograph, the video information, or the audio information, along with information for filing a police report, to a law enforcement computer, or wherein the apparatus automatically transmits the photograph, the video information, or the audio information, to a law enforcement computer.

12. The apparatus of claim 3, wherein the server computer determines that an authorized lead user is present inside or within the premises and disallows the control operation or the monitoring operation.

13. The apparatus of claim 3, wherein the server computer generates a notification message containing information regarding the control operation or the monitoring operation, wherein the notification message is transmitted to the user device or to a second user device, wherein the second user device is associated with the personal control and monitoring account.

14. The apparatus of claim 13, wherein the notification message also contains a photograph or a video clip of a person using the user device.

15. The apparatus of claim 3, wherein the server computer determines whether a limitation or a restriction is placed on an ability to perform the control operation or the monitoring operation, and further wherein the server computer determines whether or not the control operation or the monitoring operation is limited or restricted, and further wherein, if the control operation or the monitoring operation is not limited or not restricted, then the server computer generates and transmits the control signal or the monitoring signal to perform the control operation or the monitoring operation.

16. The apparatus of claim 13, wherein the server computer determines whether a limitation or a restriction is placed on an ability to perform the control operation or the monitoring operation, and further wherein the server computer determines whether or not the control operation or the monitoring operation is limited or restricted, and further wherein, if the control operation or the monitoring operation is limited or is restricted, then the server computer processes information for prohibiting or for disallowing the control operation or the monitoring operation.

17. The apparatus of claim 3, wherein the server computer receives a reply message in response to the notification message, wherein the reply message contains information for allowing or for disallowing the control operation or the monitoring operation.

18. The apparatus of claim 3, wherein the server computer determines whether a person using the user device is an authorized user of the personal control and monitoring account.

19. The apparatus of claim 3, wherein the server computer determines whether a limitation or a restriction is placed on an ability of a person to perform the control operation or the monitoring operation via the user device.

20. The apparatus of claim 3, wherein the server computer stores information regarding the individual entering inside the premises.

* * * * *